United States Patent [19]
Fields et al.

[11] Patent Number: 5,805,570
[45] Date of Patent: Sep. 8, 1998

[54] METHOD OF SIMULATING AN ISDN-BRI CENTRAL OFFICE SWITCH USING A SINGLE MICROCOMPUTER

[75] Inventors: Gary C. Fields; James G. Fields, both of Napa, Calif.

[73] Assignee: Merge Technologies Group, Inc., Napa, Calif.

[21] Appl. No.: 432,788

[22] Filed: May 2, 1995

[51] Int. Cl.$^6$ .................................................. H04J 3/12
[52] U.S. Cl. .......................................... 370/241; 370/526
[58] Field of Search ............................ 370/13, 17, 110.1, 370/100.1, 110.2, 110.3, 94.1, 94.2, 94.3, 60, 60.1, 79, 112, 85.8, 118, 7, 53, 54, 58.1, 58.2, 58.3, 59, 63, 64, 105.1, 131, 14, 97, 68, 66, 241, 242–248, 250–254, 360, 364, 377, 904, 389, 392, 437, 438, 264, 451, 465, 522, 502, 509, 541, 526, 525; 340/825.08, 825.22, 825.2, 825.14, 825.48, 825.74, 310.01, 310.08; 379/92, 93, 94, 95, 96, 339, 399, 88, 63, 97, 98, 257, 418, 220, 225, 235, 234, 240; 375/354, 355, 356, 240, 241, 242, 220, 222, 211; 455/72, 11.1, 7, 13.1, 16; 371/20.1, 20.2, 20.3; 348/384; 364/578; 395/500, 800, 183.09, 309, 828, 836, 883; 380/23; 381/29

[56] References Cited

U.S. PATENT DOCUMENTS 4,592,048  5/1986  Beckner et al. .......................... 370/60
4,970,723  11/1990  Lin ........................................ 370/110.1
5,479,407  12/1995  Ko et al. ................................. 370/95.1
5,502,723  3/1996  Sanders .................................. 370/94.2

Primary Examiner—Dang Ton
Attorney, Agent, or Firm—James D. Ivey

[57] ABSTRACT

End-to-end call processing of an ISDN-BRI central-office switch is simulated using a polled multi-tasking method which is executed by a single microcomputer in an ISDN-BRI central-office emulator which includes (i) a packet handler, (ii) a time-space multiplexer, (iii) an in-band tone generator, and (iv) a plurality of dual-interface line modules, each of which includes a U-interface loop termination device and an S/T-interface network termination device. The method includes controlling the packet handler to simulate packet-handling functions required for ISDN signalling and ISDN data exchange, controlling the time-space multiplexer and in-band-tone generator to simulate at least one of the circuit mode voice and data connections functions of the ISDN-BRI central-office switch, and activating either the U-interface loop termination device or the S/T-interface network termination device of at least one of the dual-interface line modules. All relevant in-band call progress tones are generated by a progress tone generator circuit using a single microcomputer which (i) receives a command from an external source, (ii) determines proper inputs to a tone generator and cut-through logic circuit to generate a tone requested by the command, (iii) sends the proper inputs to the tone generator and cut-through logic circuit, and (iv) converts the output of an analog tone generator to a digital signal which is compatible with a digital highway.

1 Claim, 19 Drawing Sheets

TIME BASE GENERATOR

+5 VOLT POWER SUPPLY

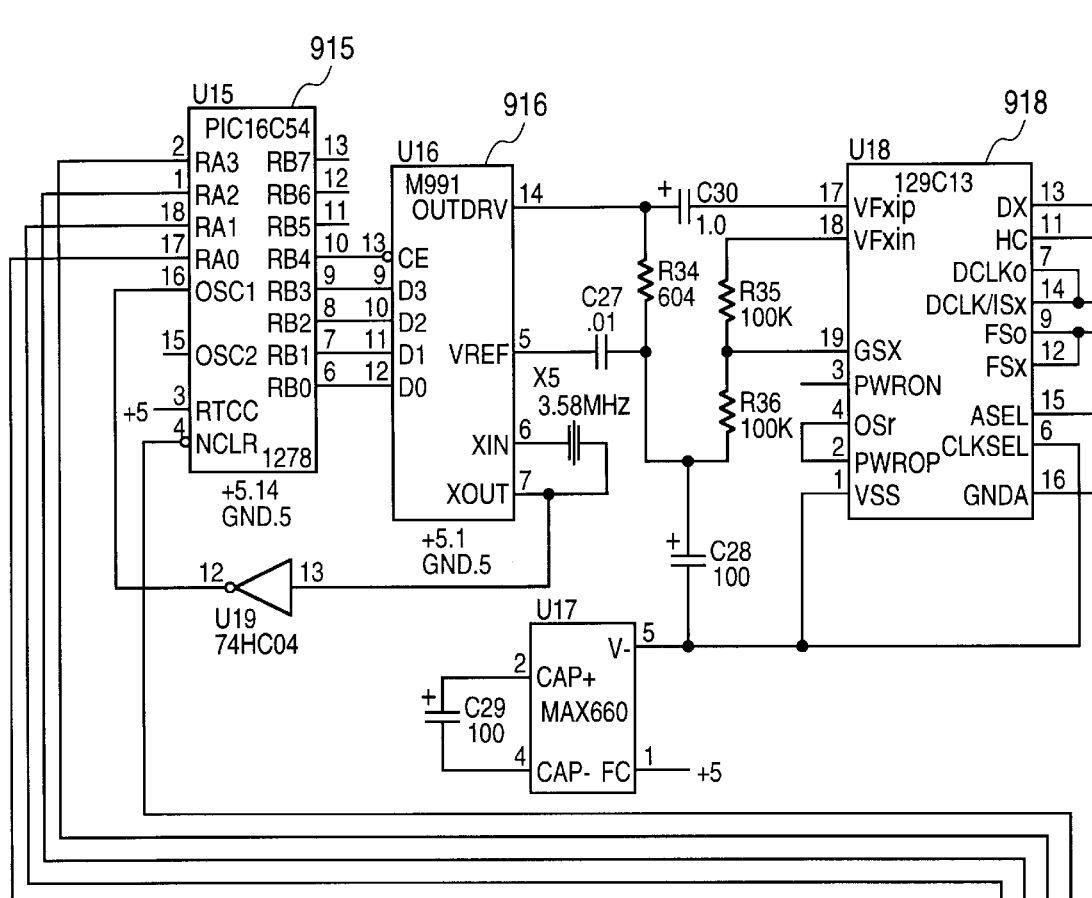

| TABLE A |||
|---|---|---|
| TRUTH TABLE FOR |||
| CALL PROGRESS TONE GENERATOR |||
| INPUT TO U15 | | INPUT TO U16 |
| HEX | CALL PROGRESS TONES | HEX | CE (PIN 13) ACTIVITY |
| 0 | IDLE | F | 1 STEADY |
| 1 | DIAL TONE | 0 | 0 STEADY |
| 2 | AUDIBLE RING | 3 | 1 2000MS 0 4000MS |
| 3 | BUSY | 6 | 1 500MS 0 500MS |
| 4 | REORDER | 6 | 1 250MS 0 250MS |
| 5 | RECALL DIAL | 0 | 1 100MS 0 100MS X 3 THEN 0 STEADY |
| 6 | AUDIBLE RING PABX | 3 | 1 1000MS 0 3000MS |
| 7 | INTERCEPT | 4 | 1 230MS 0 230MS |
| 8 | CALL WAITING | 2 | 1 300MS 0 10 SECONDS |
| 9 | EXECUTIVE OVERRIDE | 0 | 1 3000MS 0 STEADY |
| A | CONFIRMATION TONE | 0 | 1 100MS 0 100MS X 3 |
| B | BUSY VERIFICATION 1 | 2 | 1 1750MS 0 STEADY BEFORE ATTNT, THEN BY2 |
| C | BUSY VERIFICATION 2 | 2 | 1 650MS 0 1400MS REPEAT FOR REST OF CALL |
| D | SPECIAL AR | 0.2 | TONES 200MS. SINGLE TONE 200MS. OFF 3000MS |
| E | HIGH-LOW TEST TONE | 8.1 | 620HZ 200MS THEN 400HZ 200MS CONTINUOUS |
| F | DTHF * | 9 | 0 STEADY |

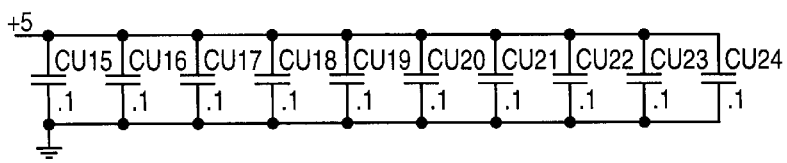

FIG. 9A

METHOD OF SIMULATING AN ISDN-BRI CENTRAL OFFICE SWITCH USING A SINGLE MICROCOMPUTER

BACKGROUND OF THE INVENTION

For many years, public telephone companies have used digital technology to route voice, high-speed data, and computer network connections across the world over what has popularly become known as the "information superhighway." Most people, however, could not afford to install digital communications lines in their home or office to access this powerful digital network.

As known to those of ordinary skill, Integrated Services Digital Network—Basic Rate Interface (ISDN-BRI) is an emerging technology that gives individuals affordable access to the world's largest digital network using the analog copper wire lines currently entering their home or office. With ISDN-BRI, users may connect almost any form of personal communications device to a single phone line and establish multiple, simultaneous voice and data transmissions at speeds of up to 64 thousand bits per second (64 Kbs).

The invention described below relates to a polled, multitasking method of simulating end-to-end call processing by an ISDN-BRI Central Office switch. Simulator apparatus in accordance with the invention enables one skilled in the art to create improved ISDN-BRI simulators for ISDN-BRI Private Branch Exchange (PBX) and Central Office (CO) Telephony switches. As briefly explained below, the improved simulators in turn facilitate the efforts of practitioners in the art of digital telephony to develop new and improved applications for the information superhighway.

A second aspect of the invention relates to a method of generating all relevant in-band call progress tones which is executed by a microprocessor in an improved call progress tone generator circuit. This aspect of the invention further improves ISDN-BRI simulators.

Those of ordinary skill in the art will recognize that the term "simulator" is used broadly to encompass both conventional simulators and "emulators." The term "emulator" is often used to refer to hardware and/or software that both (i) simulates a target piece of hardware or software, and (ii) performs additional functions as well. The basic purpose of ISDN-BRI simulators and emulators is to enable persons skilled in digital telephony to design, test, demonstrate, and trouble-shoot any device that is intended to be connected to the digital telephone network. In order to better explain the background of the present invention, some general principles and terminology of ISDN-BRI technology, well-known to those of ordinary skill, will first be explained.

ISDN-BRI is an extremely robust networking technology that accommodates many pre-existing communications protocols and provides the capability to add additional protocols for new applications of the digital network. The design of ISDN is based on the Open Systems Interconnection (OSI) model set forth in the International Standards Organization specification, ISO84.

The OSI model specifies a layered protocol architecture. Layer 1, also referred to as the Physical Layer, consists of the two interfaces known as the U and S/T Interfaces. Layer 2, also referred to as the Data Link layer, is a packet transport protocol known as LAP-D, which was adapted from CCITT X.25. Layer 3, also referred to as the Network Layer or the Call Control Layer, is a versatile switching and signaling language referred to as Call Control.

Layer 1 of the OSI model, the Physical Layer, establishes the physical architecture of ISDN. ISDN-BRI terminations and interfaces are shown in FIG. 1. Each interface (which the telephone company also refers to as a reference point) is designed for a specific task. The U Interface reference point 105 connects the central office to the customer's premises. It is a 160 Kbs two-wire, bi-directional transmission path that employs 2B1Q encoding to endure long distances. The U Interface 105 is designed to provide as much bandwidth as possible over existing copper wire pairs. The U Interface 105 signal carries two 64 Kbs data channels, called B channels, one 16 Kbs signaling channel, called the D-channel, overhead bits for framing and echo cancellation, and an Embedded Operations Channel (EOC) for testing and monitoring.

The U Interface 105 terminates at a device called a Network Termination-1, or NT-1 110. This device converts the U Interface to an S/T Interface reference point 115. The NT-1 110 also permits loop back and testing by the telephone company and a means of routing local power to devices previously designed to receive power from the line, such as a telephone.

The S/T Interface reference point 115 is a four-wire path; two wires are used for transmission and two are used for reception. Unlike the U Interface, the S/T Interface carries far fewer overhead bits and synchronizes quickly. ISDN-compatible user devices, or Type 1 Terminating Equipment (TE-1), are connected directly to the S/T interface 115.

To accommodate a variety of communications equipment, the S/T Interface 115 may be connected to a Terminal Adapter (TA) 120. This device provides any necessary conversion from an older or proprietary interface, such as RS-232 or a Local Area Network (LAN) protocol, to an ISDN-BRI S/T Interface. Devices that connect to a TA are called Type 2 Terminating Equipment (TE-2).

Layer 2 of the OSI model, the Link Layer, establishes a method of transporting binary information via data links. The ISDN data link layer is a variant of the X.25 packet exchange protocol called Link Access Protocol—D Channel, (LAP-D). signaling and switching information (Layer 3), and optionally X.25 LAP-B data transmissions, are transported on the D Channel at 16 Kbs using this protocol. LAP-D packets are of variable length, and are bounded by a flag pattern and terminated with a cyclic redundancy checksum.

There are three kinds of packets, which are also referred to as frames. Unnumbered Information frames, or UI frames, carry LAP-D protocol commands. LAP-D protocol commands establish addresses, initiate sequenced packet exchanges, or negotiate various protocol parameters. Numbered Information frames, or I frames, carry layer 3 Call Control information or X.25 data. These packets are given sequence numbers referred to as Next Send (NS) and Next Receive (NR), which ensure delivery in the correct order. Supervisory, or S frames, acknowledge or reject sequenced I frame packets.

Each packet is given an address consisting of two numbers. The first number, called a Service Access Point Identifier or SAPI, addresses one of three logical links or destinations within a device. SAPI 0 addresses Call Control functions, and SAPI 16 addresses the Packet Handling Function (PHF) associated with X.25 LAP-B data exchange. SAPI 63 addresses the Signaling Access Controller, which negotiates and assigns the second packet address number, called a Terminal Endpoint Identifier or TEI. The TEI is a unique number for each Terminating Equipment on a particular line. For example, if a packet addressed to SAPI 0 and TEI 3 is sent to four ISDN devices connected to a single line, only the Call Control function (SAPI 0) of the device assigned TEI 3 will acknowledge and process the packet.

Most ISDN Terminating Equipment supports a feature called automatic TEI assignment. After a device is connected and synchronized, packets are exchanged with the switch to establish the TEI. The switch knows which TEI's are assigned to that line and can query each device if in doubt. A unique TEI between 64 and 126 is then formulated and returned to the requesting device. TEI 127, the default broadcast TEI, is used for this operation. Some switches or devices do not support automatic assignment, however. The user is then responsible for configuring the device with a unique fixed TEI between 1 and 63. TEI assignment is one of the most technically difficult areas of ISDN technology.

Layer 3 of the OSI model is the Network or Call Control Layer. Once packet exchange is established, the Network Layer can begin the Call Control dialogue that replaces traditional telephony switching. The dialogue is based on a set of commands that operate on one or more parameters, similar to a computer operating system language. Commands are called Messages and parameters are called Information Elements (IE). There are over 35 Messages and 65 Information Elements currently in use. The size of an Information Element can range from one to over 100 bytes of constant or variable data.

For example, the SETUP Message initiates an incoming or outgoing connection on demand. Several Information Elements are contained in a SETUP Message, and each element is expected to be a particular value or variable type. The SETUP Message usually contains the Channel ID, Bearer Capability, and Calling Party Number Information Elements, among others. The Channel ID determines which B or D Channel is used for the connection. The Bearer Capability describes the call as voice, high-speed data, or packet mode data and sets the data rate and other parameters. The Calling Party Number is the caller's telephone number (directory number) in ASCII code.

Other Messages and Information Elements enable tones, transport keypad numbers, alert the called party, connect the call across the network, and disconnect the call and release its resources when either party hangs up. Call Control is extensive, and many Messages and Information Elements have been added to Layer 3 to manage features such as hold, call transfer, and conference calling.

Normally, each telephone line is assigned a single Directory Number. When a customer orders service or features, they are programmed into a Service Profile stored at the switch. Any call associated with that line can be assumed to apply only to that customer's Directory Number and Service Profile. When a single ISDN device is connected and serviced this way, the configuration is said to be point-to-point. ISDN also supports point-to-multipoint, however, and allows up to eight devices to be connected to a single line. It is not always desirable for all ISDN devices on a single line to share the same Directory Number and Service Profile. Consequently, ISDN relies on an initialization procedure for associating Service Profiles with individual Terminating Equipment, rather than phone lines.

Terminating Equipment that supports this procedure is said to be Auto-Initializing. The phone company gives an ISDN customer a Service Profile ID (SPID) up to twenty digits long. The customer programs the number into the Terminating Equipment. When the Switch sends a SETUP Message to a line configured for point-to-multipoint communications, it includes the Endpoint ID so that only matching Terminating Equipment will respond. If multiple devices share the same Endpoint ID and can support the Bearer Capability defined in the Setup Message, the call is said to be in contention. In this case, the switch will award the call to the first respondent.

SUMMARY OF THE INVENTION

The first aspect of the invention described below relates to a polled multitasking method of simulating end-to-end call processing by an ISDN-BRI central-office switch and to an apparatus for performing the method, referred to as a simulator. The described method is executed by a single microcomputer in an ISDN-BRI central-office emulator having (i) a packet handler, (ii) a time-space multiplexer, (iii) an in-band tone generator, and (iv) a plurality of dual-interface line modules each comprising a U-interface loop termination device and an S/T-interface network termination device. In summary, the method comprises:

(a) controlling the packet handler to simulate the packet-handling functions required for (i) ISDN signalling and (ii) ITU-T recommendation X.25 data exchange on the ISDN D channel;

(b) controlling the time-space multiplexer and in-band tone generator to simulate at least one of the circuit mode voice and data connection functions of said ISDN central-office switch;

(c) activating either the U-interface loop termination device or the S/T interface network termination device, referred to as the activated interface, of at least one of the dual-interface line modules; and (d) controlling the U-interface loop termination devices and said S/T-interface network termination devices to synchronize and transfer data through said activated interface in accordance with ANSI standard T1.601.

In one embodiment of the invention, the single microcomputer is an eight-bit microcomputer.

In another embodiment, the method further comprises executing an operating system program to selectively simulate one or more of the signalling protocols, line provisioning operations, and supplementary services of said ISDN-BRI central-office switch.

In still another embodiment, the controlling of the packet handler includes (i) simultaneous servicing of ITU-T Q.931 call control signalling and (ii) ITU-T recommendation X.25 data exchange.

In another embodiment, the activation of the activated interface includes automatic detection of multiple interfaces such that the selected interface type is automatically detected and activated without user intervention.

In one embodiment, the method comprises changing switch protocols and line-provisioning settings without physically reconfiguring the emulator, such as by swapping circuit cards.

In a second aspect, the invention relates to a method of generating all relevant in-band call progress tones. This method is executed by a single microcomputer, such as the PIC 16C54 manufactured by Microchip, Inc., which is used in the preferred embodiment. In addition to the microcomputer, the call progress tone generator circuit also has (i) a conventional analog tone generator, such as Teltone's M991 which is used in the preferred embodiment, connected to the microcomputer, (ii) a conventional compressor-decompressor connected to said tone generator; and (iii) a cut-through logic circuit for routing the output of said tone generator to one of a plurality of temporarily unused digital PCM highways. The cut-through logic circuit of the preferred embodiment can be seen in FIG. 9.

The method of generating the call progress tones comprises:

(a) receiving a command from an external source, such as a second external microcomputer, dip switches, or any other digital interface;

(b) determining the proper inputs to the tone generator and cut-through logic circuit to generate the tone requested by the command;

(c) sending the proper inputs to the tone generator and cut-through logic circuit; and (d) converting the output of the analog tone generator to a digital signal compatible with the standard digital PCM highways, such as AT&T K2 highway. In the preferred embodiment, the compressor-decompressor is used to perform this conversion.

The method for generating call progress tones disclosed below has advantages over the prior art because it uses a command-driven, microprocessor-based architecture instead of a hardware conditioned architecture using only logic circuits. A microprocessor-based system provides greater versatility and expandability because only the software resident in the microprocessor must be changed to modify the circuit. In addition, the microprocessor-based system is less costly than the tone generators of the prior art. Finally, the cut-through logic circuit of the invention provides an advantage over the prior art because it allows temporarily unused digital highways to be used as call progress tone sources. The tone generators of the prior art were dedicated to particular highways and thus utilized a less efficient, more costly, and less versatile architecture.

A user of the apparatus in accordance with the first aspect of the invention can connect ISDN-BRI equipment to a simulated ISDN-BRI line. This advantageously permits the user to develop, test, and use ISDN-BRI equipment without tying up (and perhaps damaging) an expensive ISDN line. The apparatus can be used to this end in virtually any location, regardless of whether the location has ISDN-BRI capability. With an ISDN-BRI CO Emulator in accordance with the invention, users can demonstrate and monitor physical layer, data link layer, and network layer Call Control operations during multiple, real time voice or data calls on their desktops. Such an ISDN-BRI CO Emulator can also perform operations that are not defined in any international or public specification but that permit it to function as an emulator and test measurement instrument. These operations include auto-detection of the selected ISDN-BRI Interface, application of primary power to the TE at a nominal 34–50 VDC, display and printing of D channel signaling packet headers and call control messages, and user control via an RS-232 serial connection to a keypad or host computer. Using the described method, all of the above may be accomplished at a significantly lower cost than conventional simulators.

An ISDN-BRI CO Emulator in accordance with the invention has a number of advantages over prior art ISDN-BRI simulators, including the following:

It allows for automatic detection of multiple interfaces. Simulators of the prior art known to the inventors allowed for simulation of either the U or S/T ISDN-BRI interface types. In prior art designs that did allow the interface to be changed from one type to the other, the user effected the change by removing and replacing printed circuit cards. The method described below permits emulation of both interface types; the selected interface type is automatically detected and activated without user intervention.

It consists of only a single microcomputer. Prior art simulators known to the inventors employed a separate microprocessor (and associated support circuitry such as Read Only Memory, Random Access Memory, address decoding and latching, etc.) for each interface and an additional microcomputer for call data processing and circuit switching. The simulator described below performs functional signaling and control of multiple interfaces for multiple lines using a single, low-cost, eight bit microcomputer. The ability of a single microcomputer to achieve the performance of the current art is possible because of the software architecture described below and referred to as "multiple virtual protocol stacks" in a real-time multi-tasking environment. The software enables the single microcomputer to appear as if it is multitasking. The single microcomputer architecture provides several advantages over the prior art, such as decreased cost, increased portability, greater ease of operation, increased protocol flexibility, and increased reliability. It is estimated that an emulator in accordance with the present invention costs only about one-tenth as much as comparable prior art emulators.

It implements multiple embedded signaling protocols. Prior art simulators known to the inventors could implement one signaling protocol for each physical configuration. If the design permitted changing the protocol, the change was effected either by removing and replacing printed circuit cards, or by connecting to a host computer. The simulator described below supports multiple embedded protocols which may be selected as required without changing the physical configuration or connecting to a host computer.

It emulates end-to-end operation. Prior art simulators known to the inventors provided functional signaling between the TE and the network entity, but did not provide functional signaling or circuit switching for a second network to TE connection. These simulators were single-line simulators and functioned merely as line conditioners that allowed equipment to "think" that it was hooked up to a real line. These simulators allowed a user to simulate the activity that would occur between the equipment and the switch, but did not let the user actually place a call. The simulator described below uses two lines and time slot interchanging technology to permit a second network to TE connection so that a user can simulated an end-to-end call.

It provides in-band tones. Simulators of the prior art known to the inventors did not digitally encode standard telephony tones (such as dial tone, busy tone, reorder, tone, etc.) and apply them to B Channels at the appropriate time. The simulator described below encodes the standard telephony tones and applies them at the appropriate times to both B Channels of both lines.

It provides primary TE power. Prior art simulators did not provide a power source at the RJ-45 connector used to connect TE to the line interface. The ISDN-BRI CO Emulator described below provides a nominal 34–56 VDC to pins 7 and 8 of the RJ-45 connector to power up to 6 terminating devices (TE and NT-1).

BRIEF DESCRIPTION OF THE DRAWINGS

FIG. 9 is a detailed schematic of the hardware connections for the call progress tone generator 410, which manifests the second aspect of the described invention.

APPENDIX 1 sets out copyrighted selected source code listings and general use information concerning a commercial software package distributed by the assignee of this application which manifests the invention. In particular, this source code implements the method of simulating end-to-end call processing by an ISDN-BRI central office switch using a single Intel 80C52 microcomputer. (Permission is granted to make copies of APPENDIX 1 solely in connection with the making of facsimile copies of this application in accordance with applicable law; all other rights are reserved, and all other reproduction, distribution, creation of derivative works based on the content, public display, and public performance of APPENDIX 1 or any part thereof are prohibited by the copyright laws.)

APPENDIX 2 sets out copyrighted selected source code listings and general use information concerning a commercial software package distributed by the assignee of this application which manifests the second aspect of the invention. In particular, this source code implements the software for the call progress tone generator using a PIC 16C54 microprocessor. (Permission is granted to make copies of APPENDIX 2 solely in connection with the making of facsimile copies of this application in accordance with applicable law; all other rights are reserved, and all other reproduction, distribution, creation of derivative works based on the content, public display, and public performance of APPENDIX 2 or any part thereof are prohibited by the copyright laws.)

DETAILED DESCRIPTION OF THE INVENTION

Figure 1:
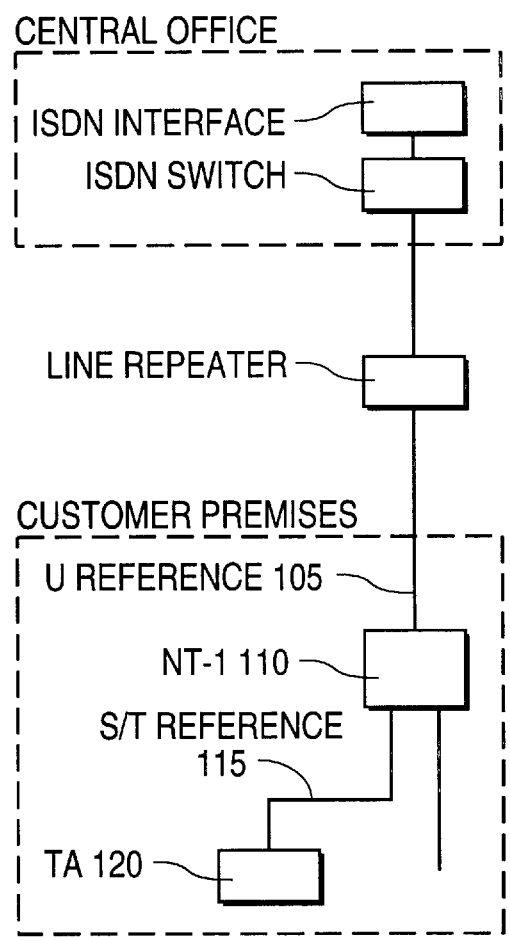
FIG. 1 is a high-level block diagram of the ISDN-BRI terminations and interfaces.
Figure 2:
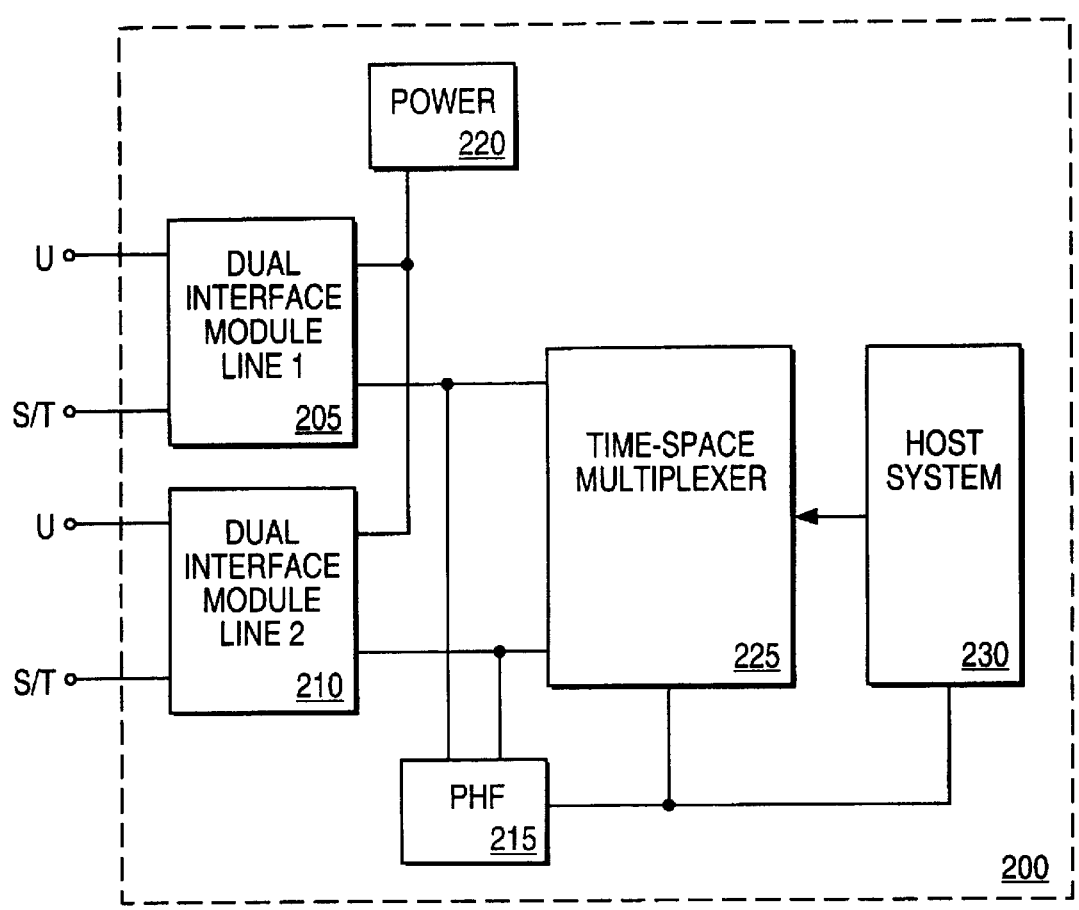
FIG. 2 is a high-level block diagram of a central-office-switch emulator 200 in accordance with the present invention.

FIG. 2 is a high-level block diagram of the hardware configuration for a central-office-switch emulator 200 in accordance with the present invention. The emulator 200 includes:

two dual-interface line modules 205 and 210, each of which provides a U interface and an S/T interface for a separate simulated ISDN line, discussed below in connection with FIG. 3;

a power supply 220, simulating the Terminating Equipment power source;

a command-driven digital time-space multiplexer 225 having frame integrity; and a host system 230 that provides a user interface to control the multiplexer 225.

Figure 3:
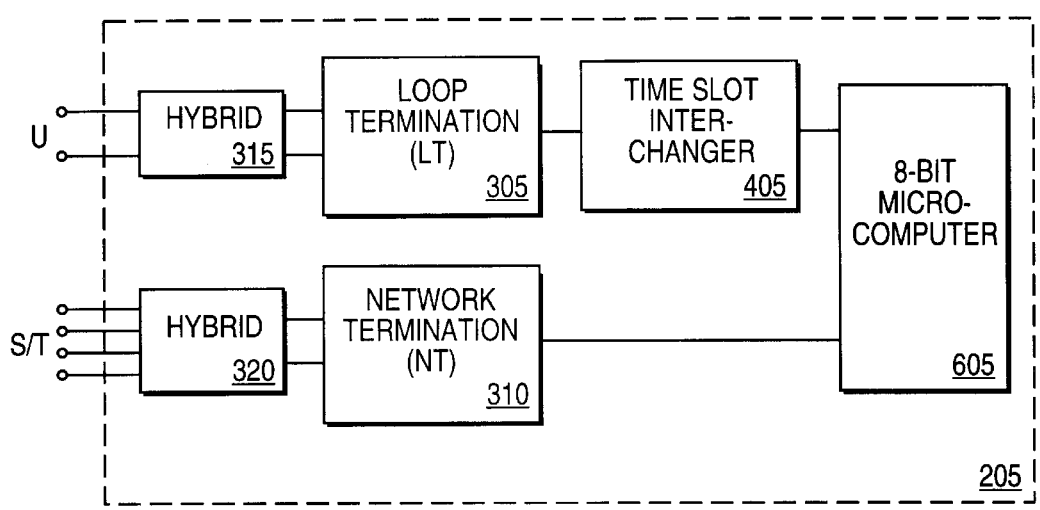
FIG. 3 is a block diagram of the dual-interface line modules 205 and 210.
Figure 7A:
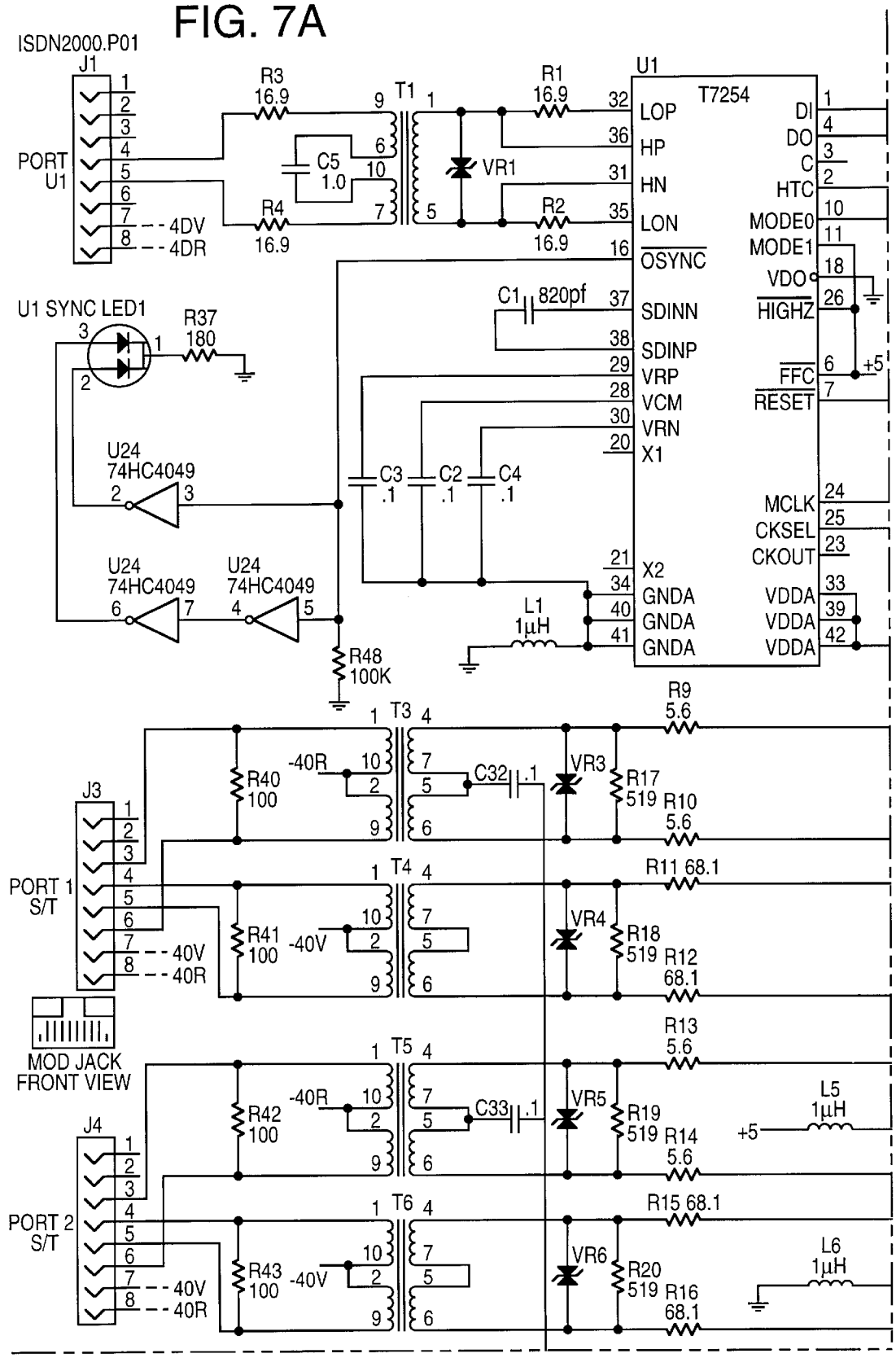
FIGS. 7 through 15 are detailed hardware schematics and general use information concerning a commercial hardware package distributed by the assignee of this application which manifests the invention. Those skilled in the art will be able to duplicate the hardware configuration of the preferred embodiment of the invention using these schematics.
Figure 7B:
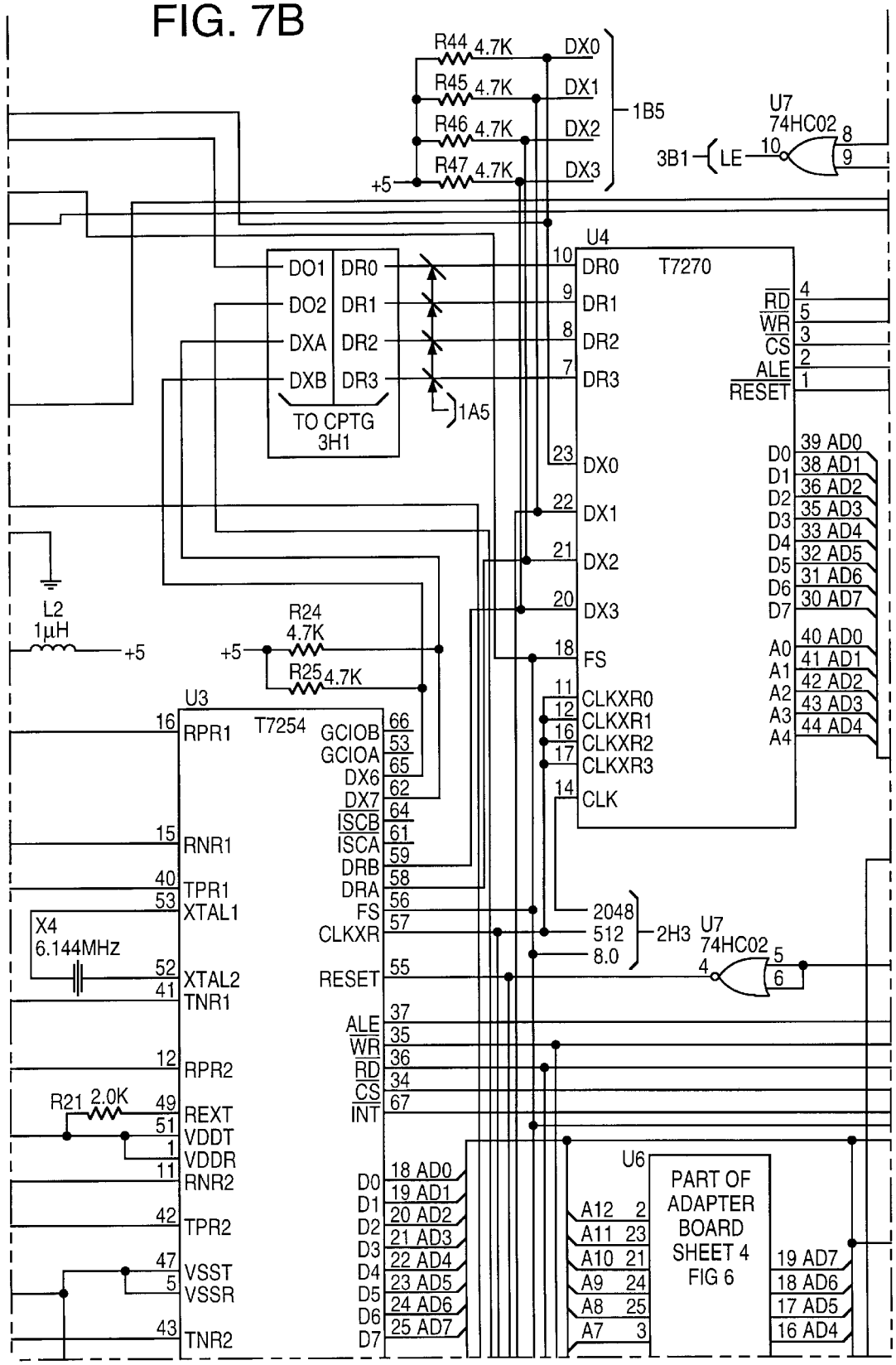
Figure 7C:
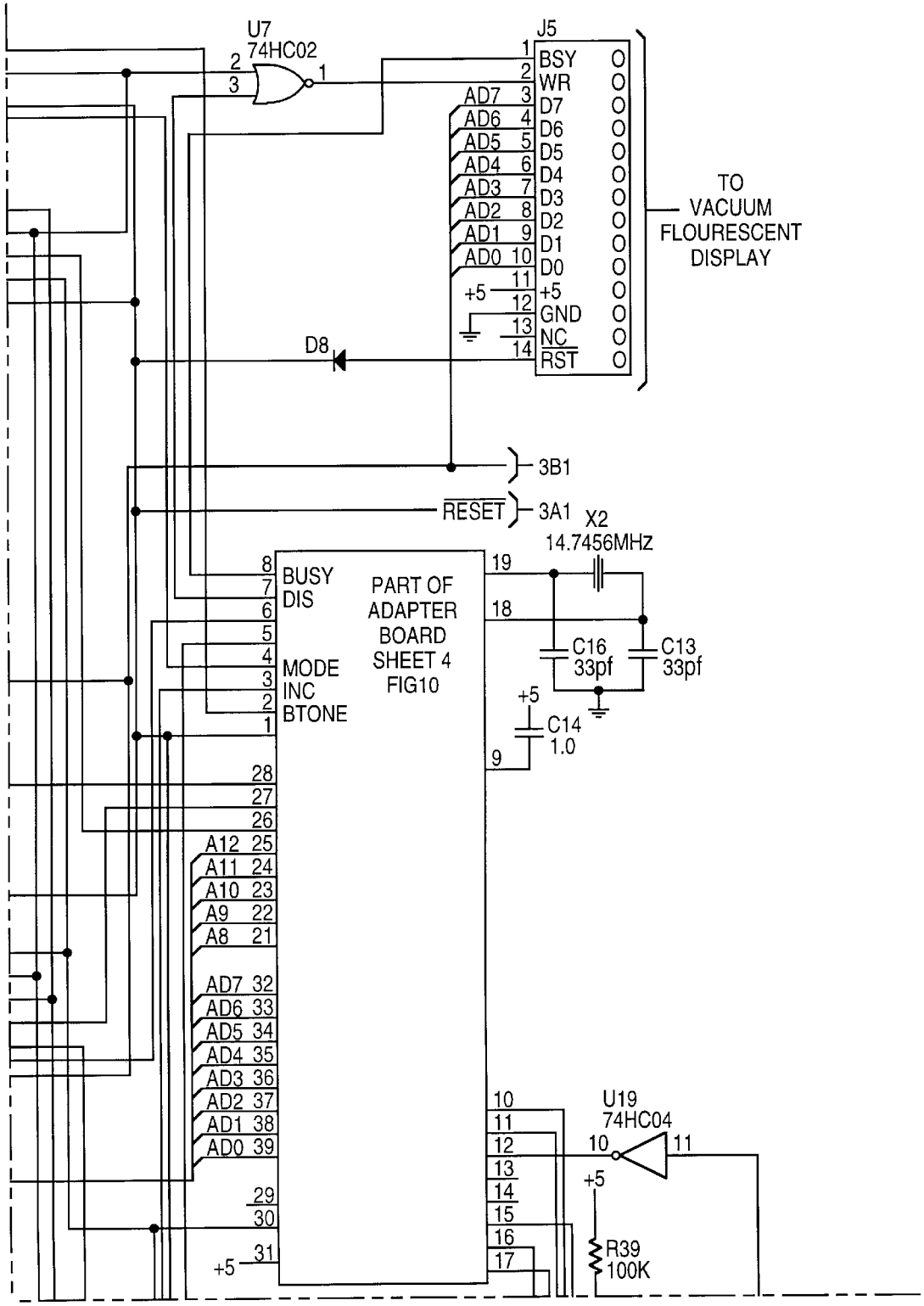
Figure 7D:
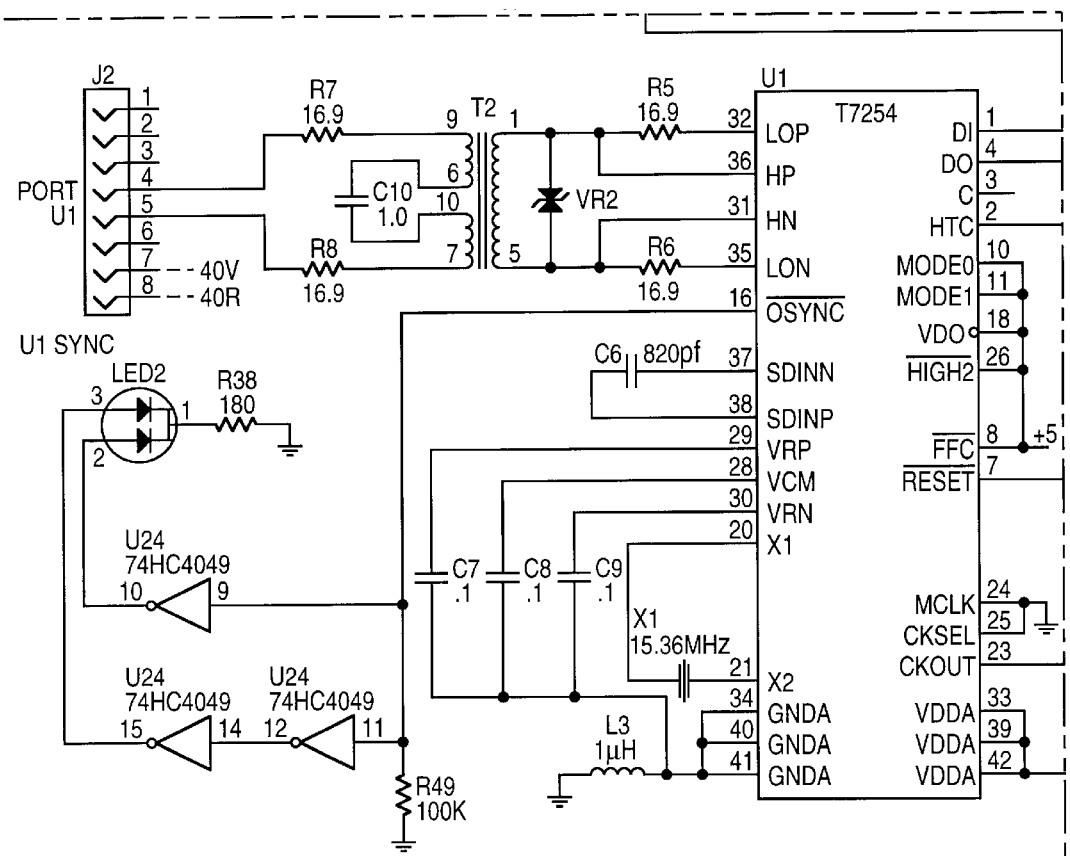
Figure 7E:
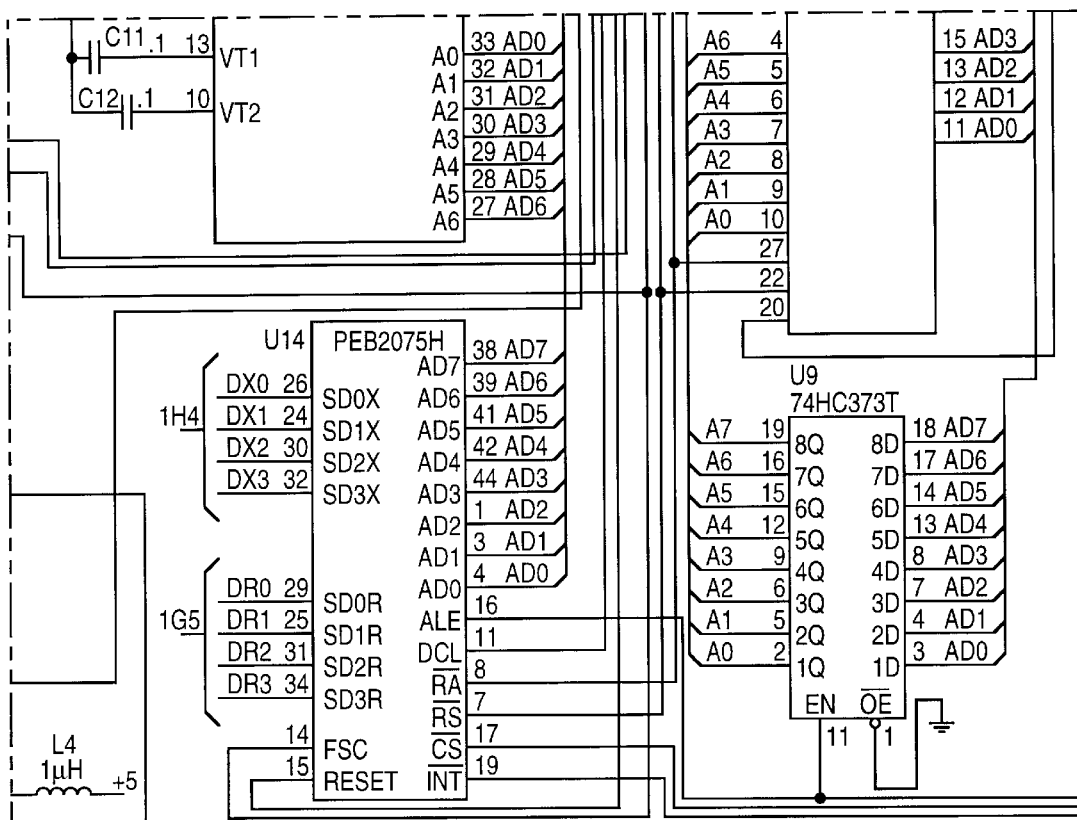
Figures 7, 7F:
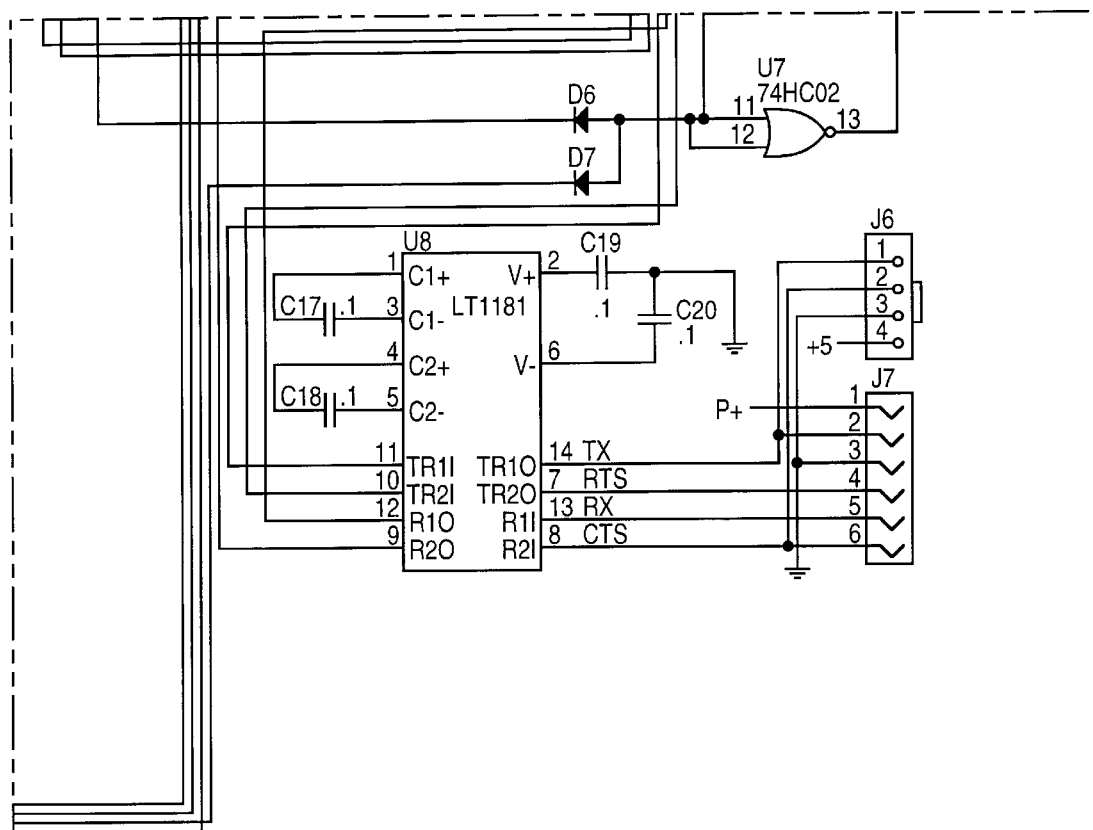
Figure 8A:
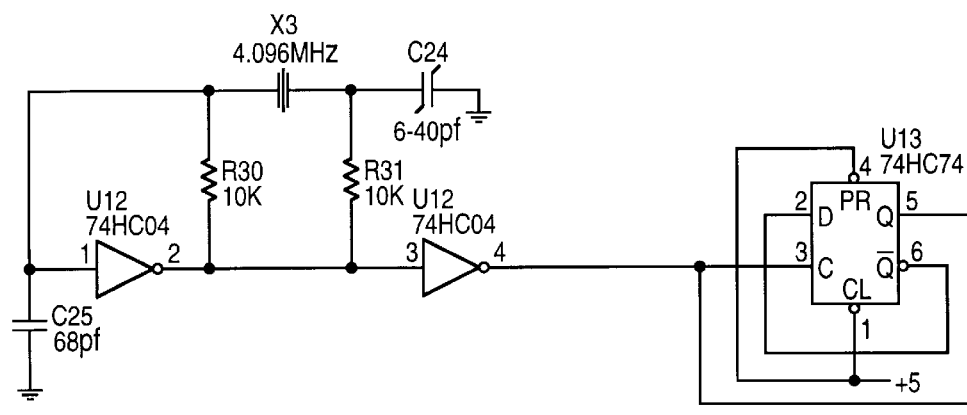
Figure 8A:
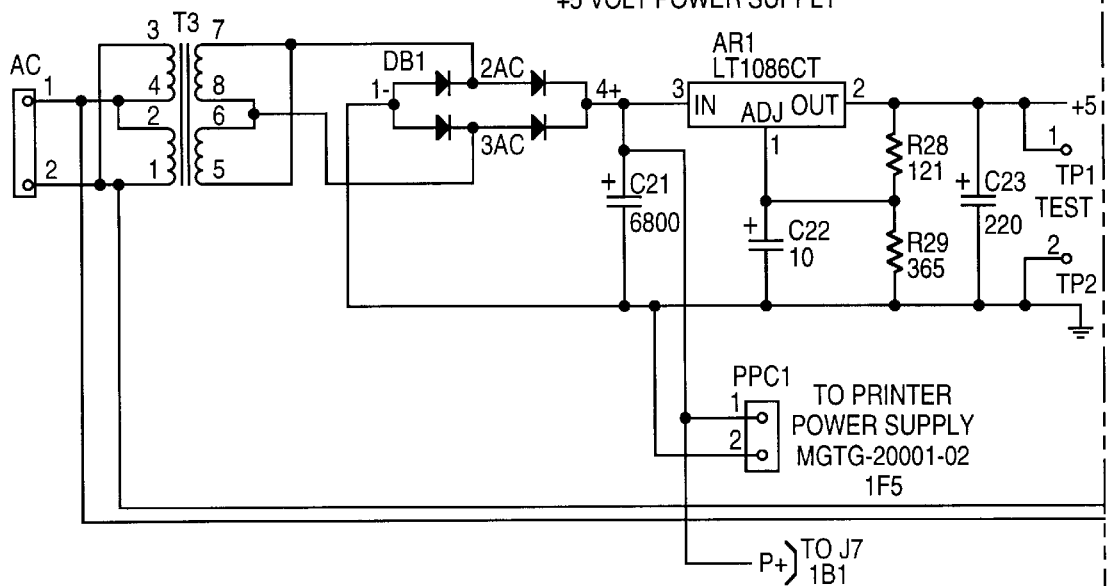
Figure 8A:
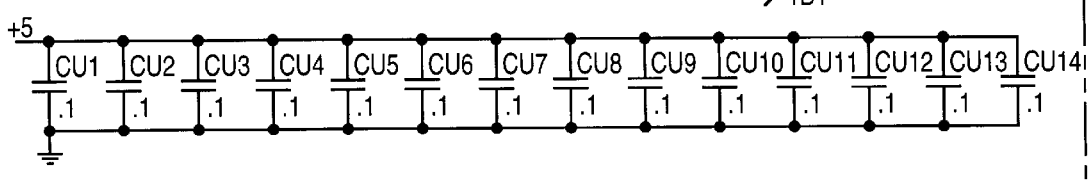
Figures 8, 8B:
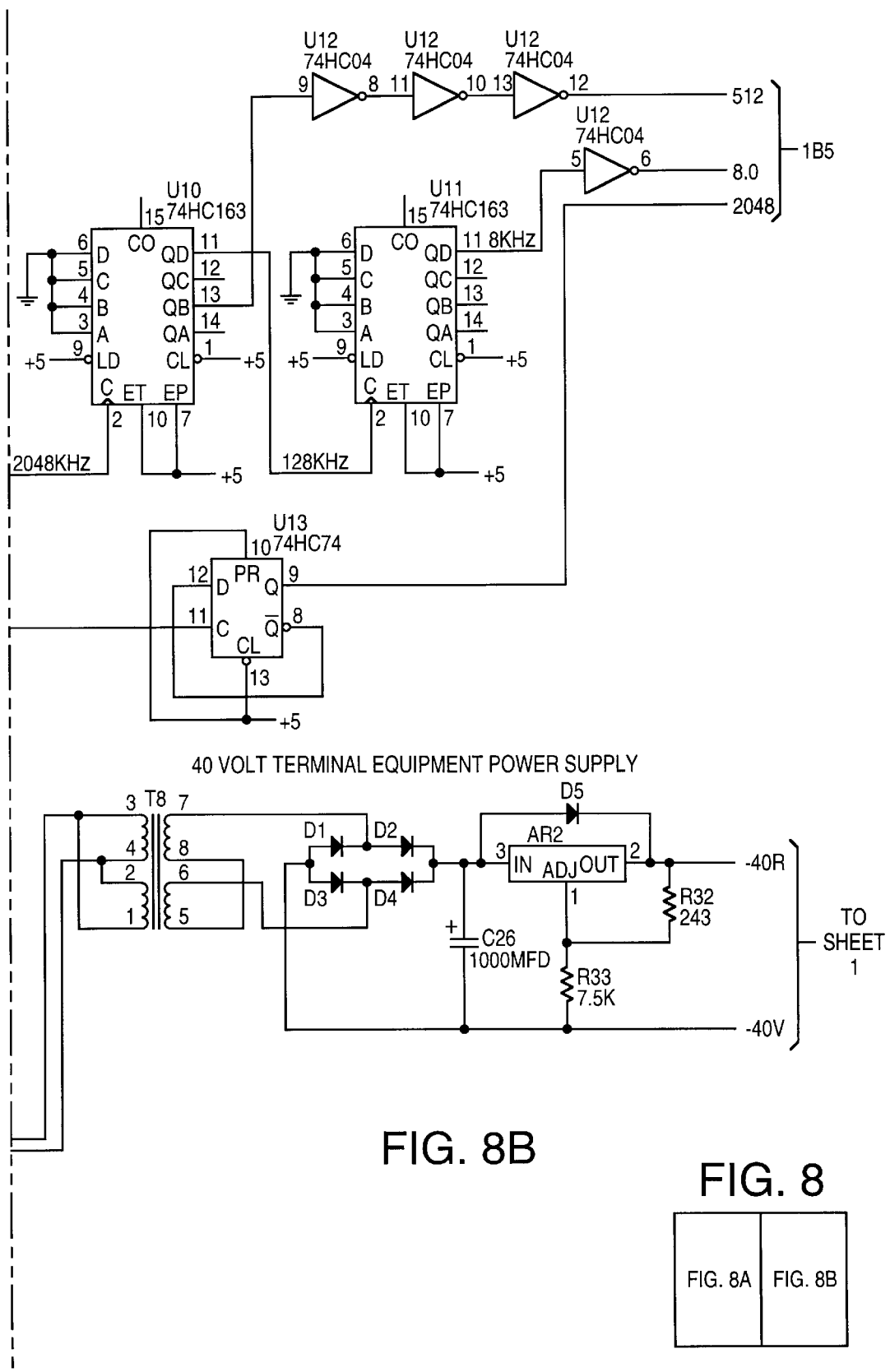
Figure 10A:
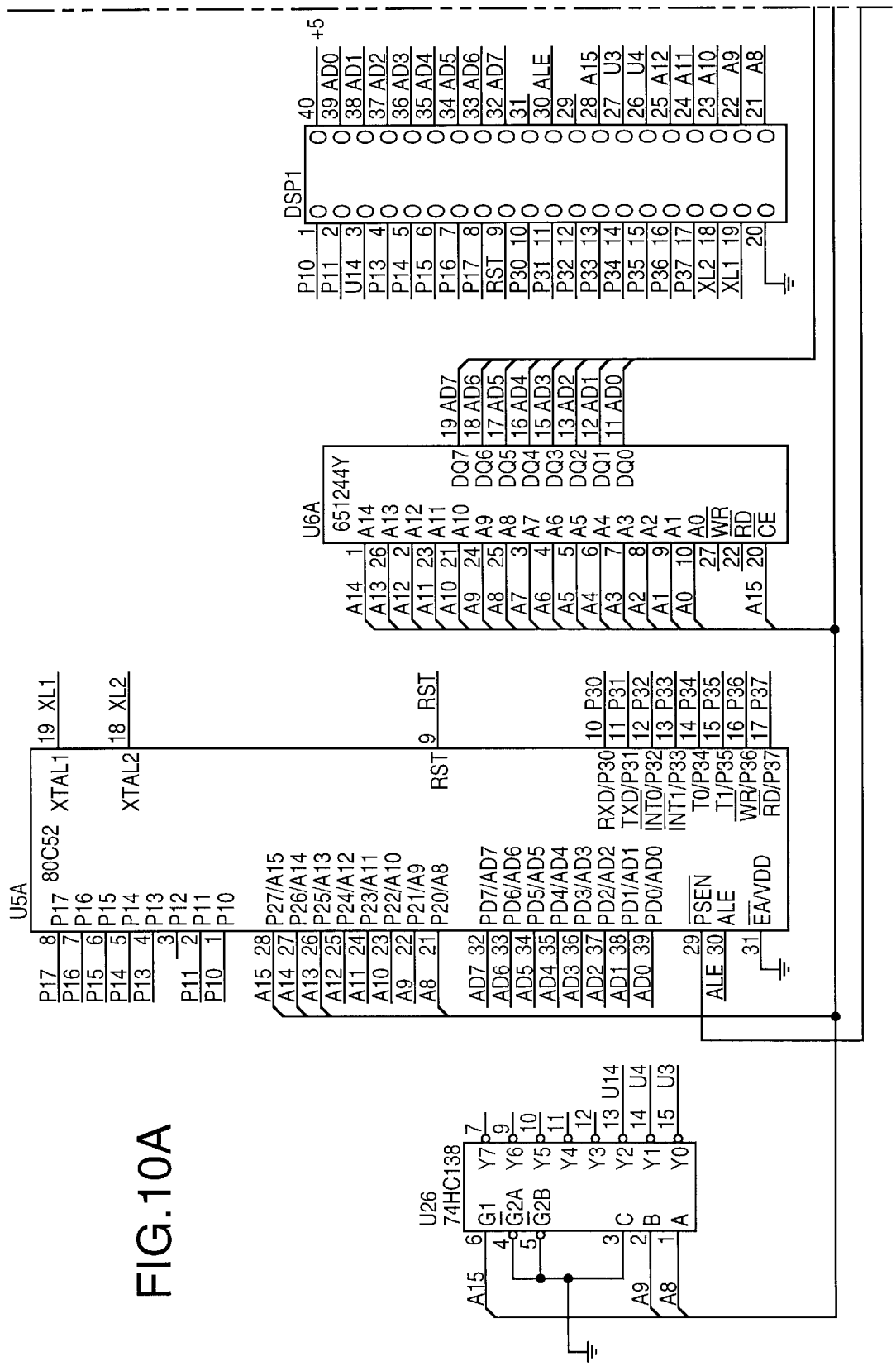
Figure 10:
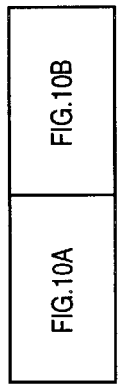
Figure 10B:
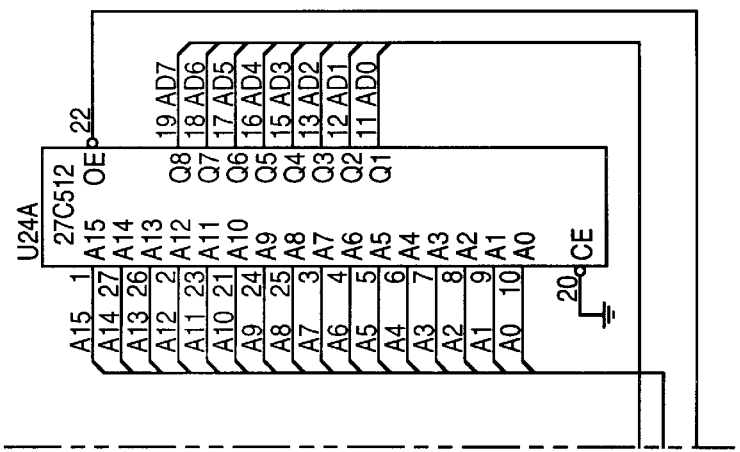
Figure 12:
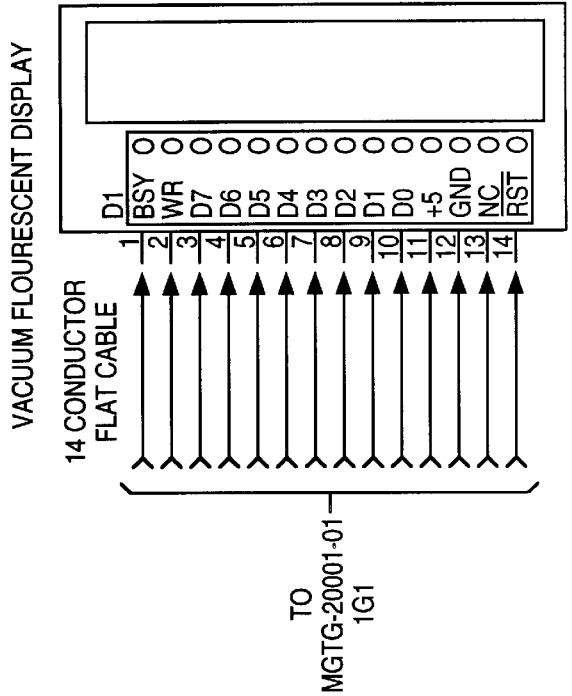
Figure 14:
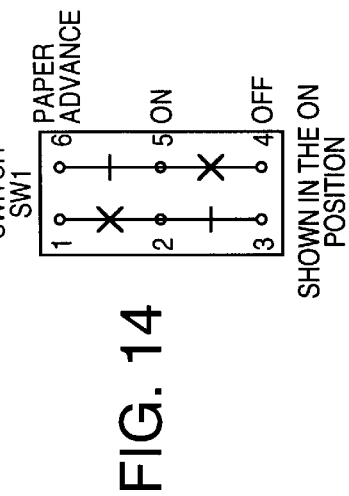
Figure 11:
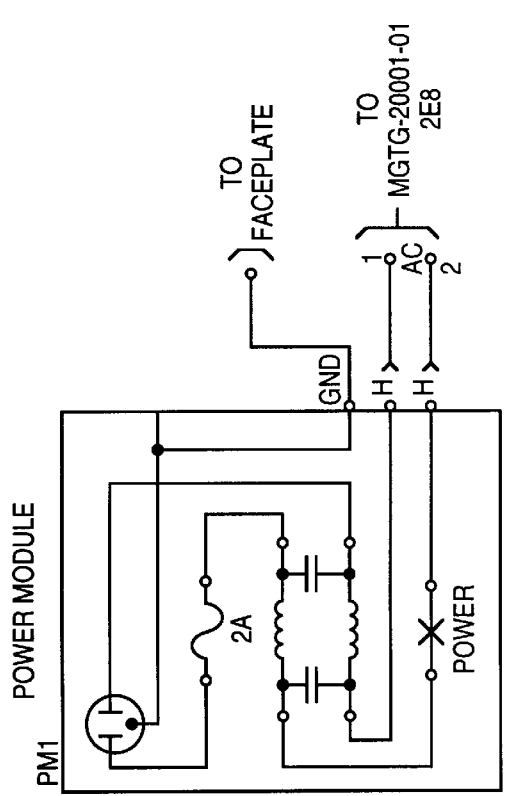
Figure 13:
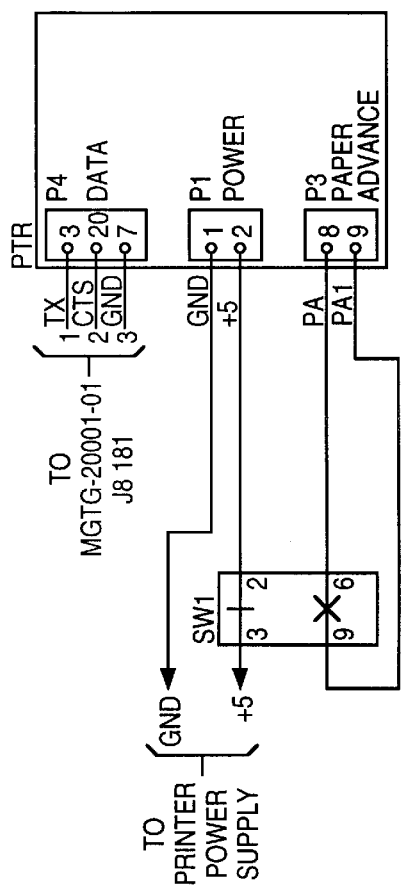
Figure 15:
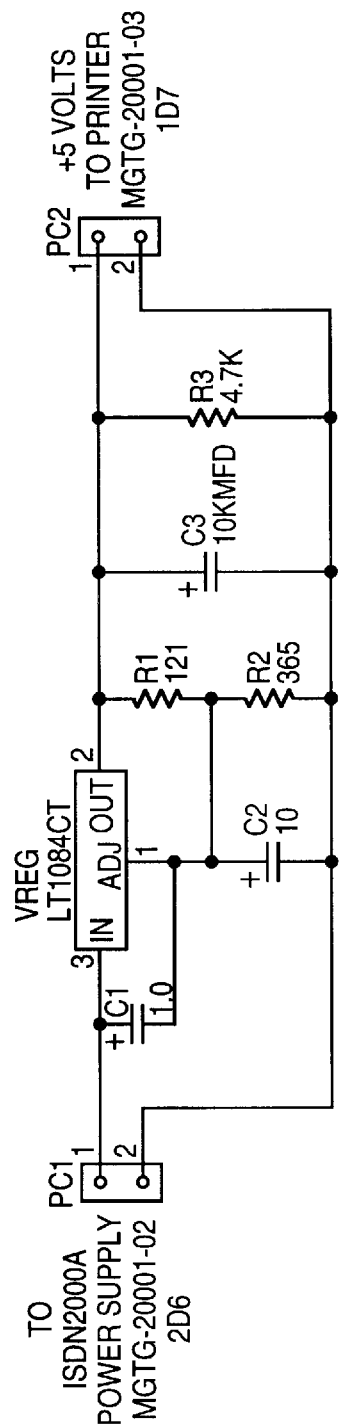

FIG. 3 is a block diagram of the dual-interface line modules 205 and 210. 210 is essentially identical to 205 except that 210 provides synchronization signals to 205. The line module 205 includes:

a conventional Loop Termination (LT) device 305, which provides the U interface of the line module (and which also includes a visual synchronization indicator, e.g., a light-emitting diode, not shown). The loop termination device 305 uses the AT&T K2 digital micro-controller interface;

a conventional Network Termination (NT) device 310 for the S/T interface of the line module, which also uses the AT&T K2 digital micro-controller interface;

a conventional Time-Slot Interchanger (TSI) 405, described in more detail below, used for control and indication functions for the loop termination device 305. The AT&T T7270 interchanger has been found to work satisfactorily;

a conventional microcomputer 605, described in more detail below, programmed for (a) monitoring and controlling the loop termination device 305, (b) simulation of the network termination operations for the network termination device 310, and (c) autodetection of Layer-1 activation and concomitant shutdown of the inactive interface. The Intel 80C52 microcomputer has been found to work satisfactorily and is depicted in the preferred embodiment. (See, e.g., FIGS. 7 and 10); and conventional line impedance-matching/isolation hybrid circuitry 315 and 320 for compliance with ANSI standard T1.601.

Figure 4:
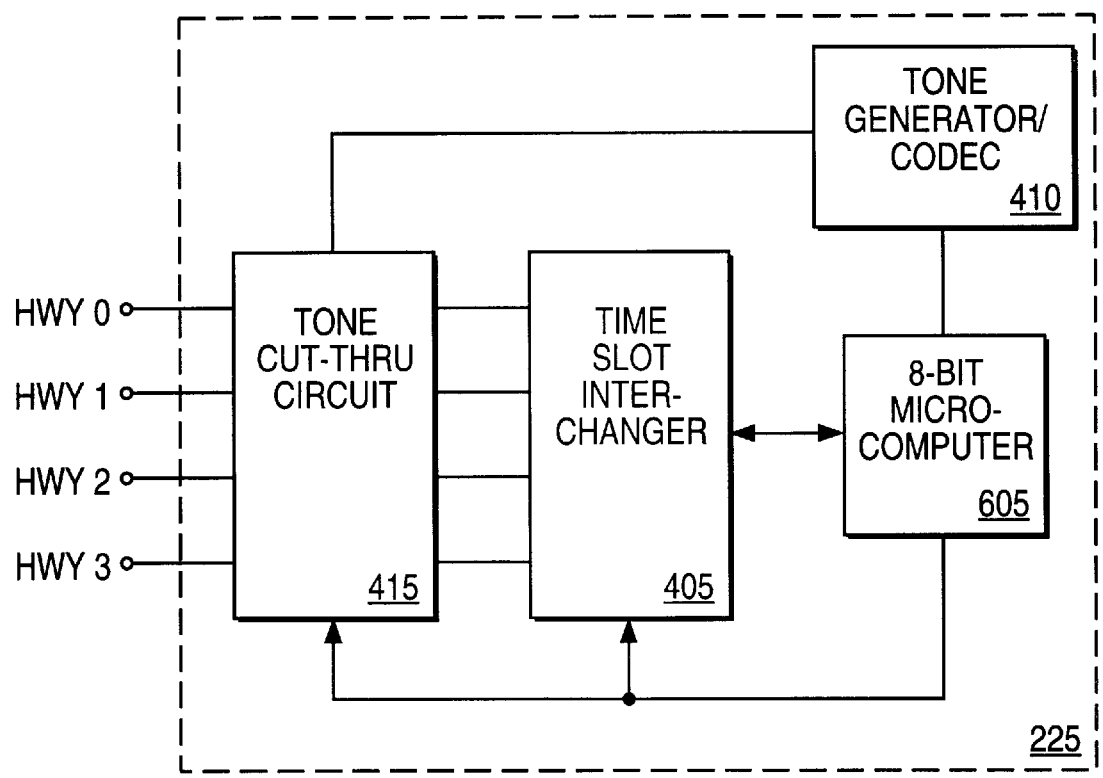
FIG. 4 is a block diagram of the Time—Space Multiplexer 225, which is controlled by the microcomputer 605.

FIG. 4 shows the Time-Space multiplexer 225, controlled by the micro-computer 605. The multiplexer 225 includes:

a four-highway time slot interchanger 405, compatible with the AT&T K2 interface, to provide time-space multiplexing with frame integrity;

a call progress tone generator/CODEC 410, which uses a small PIC 16C54 microcomputer to decode eight states to drive a conventional tone generation circuit (not shown) and thereby to provide conventional network call-progress audio tones. The tones are converted to digital form by a conventional CODEC;

a tone cut-through circuit 415 that gates the output of the Tone Generator/CODEC 410 onto whichever of highways 0 through 3 are deactivated as required to support voice calls.

The microcomputer 605 controls the above switch functions during the course of call progress for voice and data calls.

Figure 5:
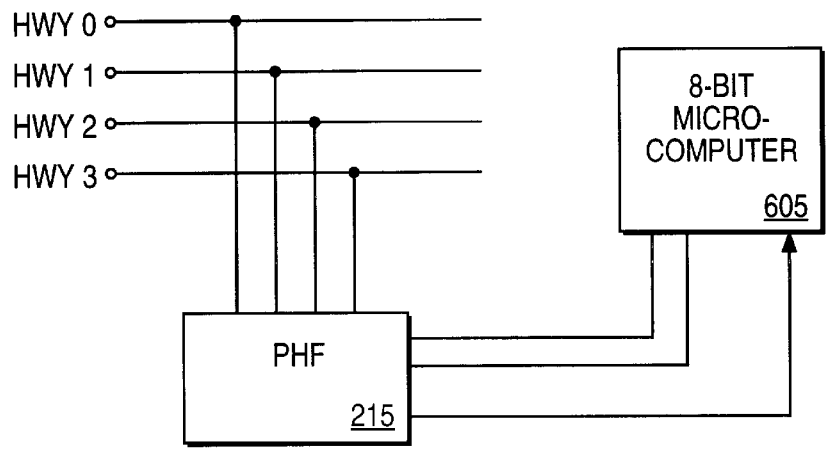
FIG. 5 shows the packet handling function 215 for D-channel signalling as required by ISDN-BRI.

FIG. 5 shows the packet handling function 215 for D-channel signalling as required by ISDN-BRI. The PHF comprises a four-channel, high-level data link control (HDLC) packet transceiver that is time-slot-assignable for each channel. The Siemens PEB 2075 has been found to be useful. The microcomputer 605 implements the virtual multiple data link controllers to allow signalling in accordance with the ITU-T Q.921 data link specification over multiple service access points (SAP) and terminal endpoint identifiers (TEI) (which together are commonly referred to as the data link connection identifier (DLCI)).

Figure 6:
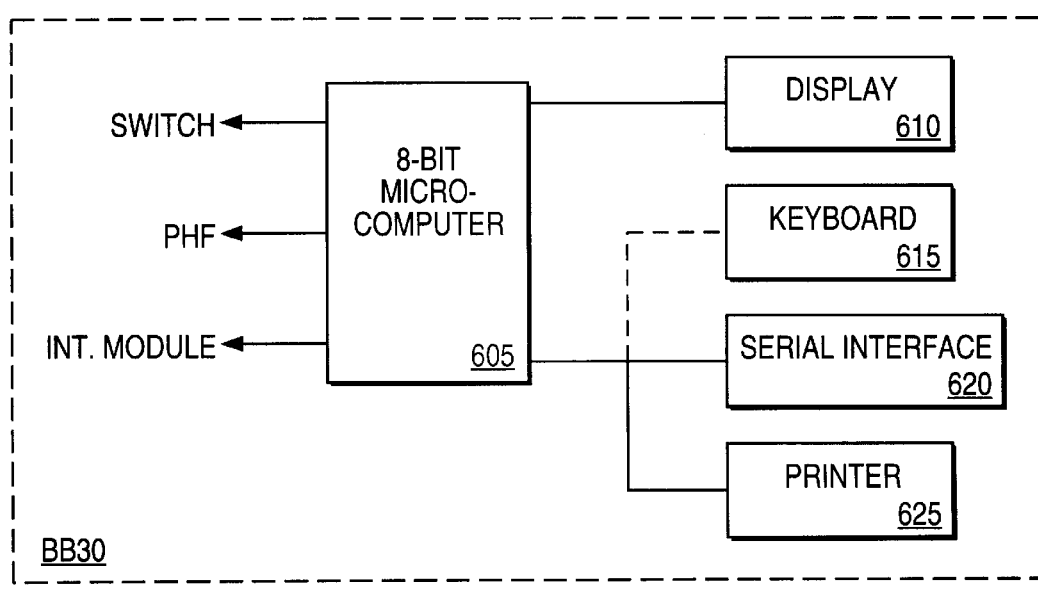
FIG. 6 shows the host system 230.

FIG. 6 shows the host system 230. The host system includes:

a microcomputer 605 such as an 8-bit microcomputer a display 610 such as a conventional liquid crystal or fluorescent display;

a user input device 615 such as a conventional detachable keyboard, a touch screen, etc.;

a serial interface 620 such as an RS-232 interface, which may share an interface with the microcomputer 605; and optionally, a printer or other output device 625.

The host system 230 provides control signals for the switch 225, the packet handler 215, and the interface modules 205 and 210. It also provides a user interface and a standard serial connection.

Figures 9, 9B:
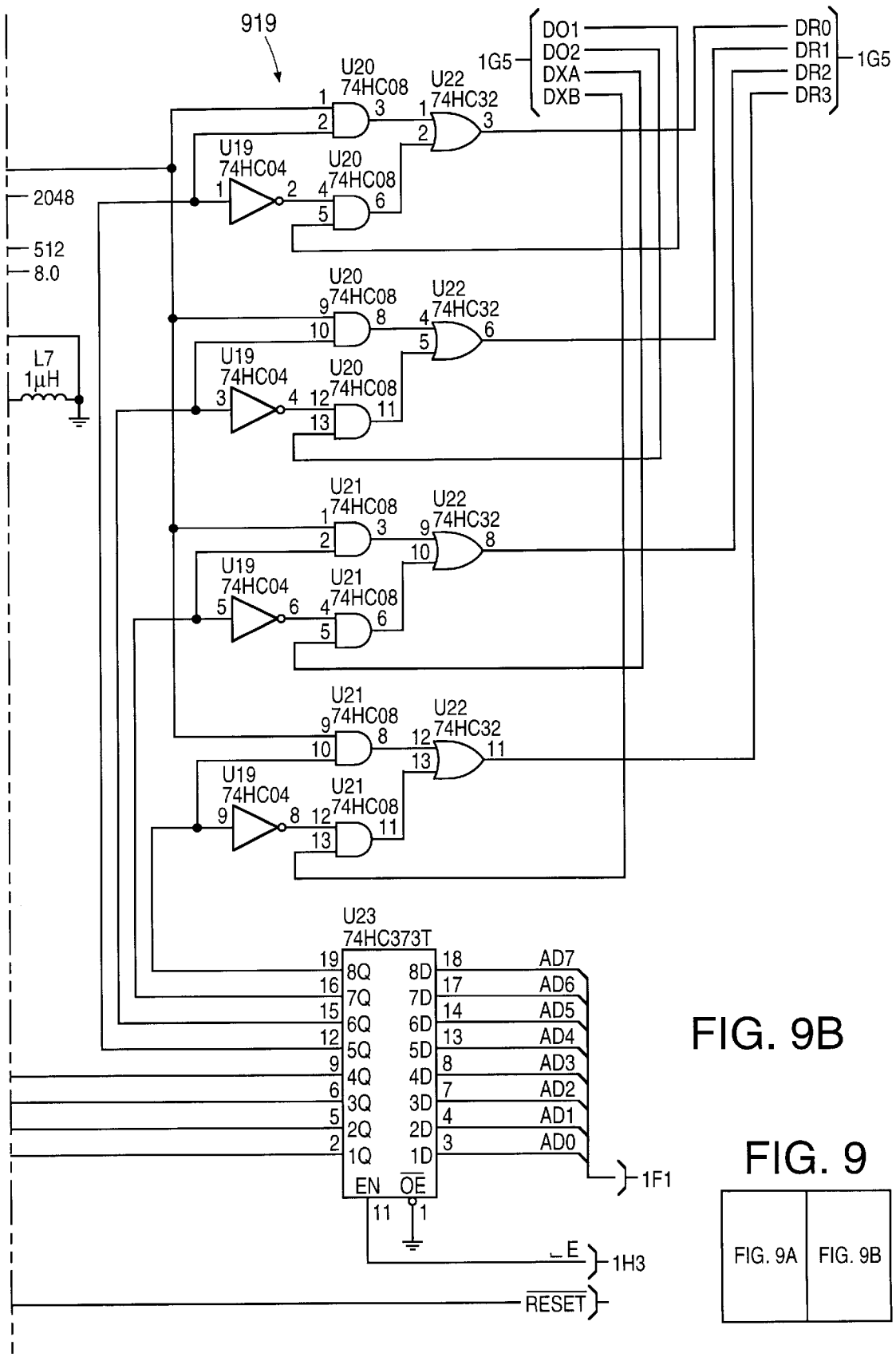

FIG. 9 is a detailed schematic of the call progress tone generator 410. The principle circuit elements for the call progress tone generator are:

a microcomputer 915, such as the PIC 16C54 manufactured by Microchip, Inc.;

a conventional tone generator chip U16, such as the M991 manufactured by Teltone Corporation;

a conventional CODEC 918, such as the Model 129C13 manufactured by Texas Instruments; and a cut-through logic circuit 919 for identifying and selecting a temporarily unused digital highway to be used as a call progress tone source.

The assembly code program listing for the software running on the PIC16C54 Microcomputer 915 is attached as APPENDIX 2.

If the software is loaded into the Microcomputer 915 and the circuit elements are connected as shown in FIG. 9, the call progress tone generator generates all of the call progress tones listed in Table A of FIG. 9.

APPENDIX 1

```
/****************************************************************

ISDN 2000 Central Office Emulator

Main Operating System Module (c) 1994 Merge Technologies Inc.

This is the Operating System entry module.
****************************************************************/ ifndef NODEBUG
pragma DEBUG CODE SYMBOLS OBJECTEXTEND
endif include <coe_reg.h>
include <coe.h>
include <lib_str.h>
#include <lib_io.h>
include <lib_util.h>
#include <lib_trc.h>
#include <lib_swch.h>
#include <lib_mon.h>
#include <lib_13.h>
#include <lib_set.h>

/****************************************************************
   Function:  DoReset
   Input:     Sign on message flag
   Output:    None Emulator initialization routine. Called for both
              cold (power on) and warm (RESTART key) starts.
****************************************************************/ void DoReset (UCHAR ColdStart, UCHAR PowerOn) { if (PowerOn) {
      Pause (50);
      Reset ();
      InitRegisters ();
      DisplayMsg (pszTiming1, pszTiming2);
      Pause (30000);
      DisplayMsg (pszTiming1, pszTiming3);
      Pause (2000);
   }

ClrDisplay ();
   Display (pszSignOn1);
   Display (pszSignOn2);
   Display (pszSignOn3);
   Display (pszSignOn4);
```

```
   if (ColdStart)
      Pause (3000);

ClearMem (RAM_START_ADDR, (MAX_RAM - MAX_SETTINGS_RAM));
   InitString ();
   InitTime ();
   ClrTrace ();
   TestSettings ();
}

/****************************************************************
Function:  Main
Input:     None
Output:    None Handles initialization and keypad input
           processing.
****************************************************************/ void main (void) {

UCHAR ColdStart =   TRUE;
   UCHAR PowerOn =     TRUE;
   UCHAR L3Startup =   TRUE;
   BOOL  ClearDisplay = TRUE;
   XUCHAR ErrorNo;
   XUCHAR MenuKey;

DoReset (ColdStart, PowerOn);
   PowerOn = FALSE;
   ErrorNo = LOG_ERR_NO_ERRORS;
   MenuKey = KBD_NULL;

while (TRUE) { if (ClearDisplay) {
         ClearDisplay = FALSE;
         ClrDisplay ();
         SetIDEC (IDEC_INT_OFF);
      }
      if (!ColdStart) {
         L3Startup = FALSE;
         if (!MenuKey)
            MenuKey = OnKbd ();
      }
      else if ((ColdStart) && (MenuKey == KBD_NULL)) {
         ColdStart = FALSE;
         L3Startup = TRUE;
         ClrTrace ();
         MenuKey = KBD_EMULATE;
      } switch (MenuKey) {
```

```
case KBD_BREAK:
   if (!gRemote)
      DisplayMsg (pszEmuHalt1, pszAnyKey);
   else
      DisplayMsg (pszEmuHalt1, pszEmuHalt3);
   MenuKey = OnKbd ();
   break;

case KBD_F1:
   MenuKey = DoSettings (MenuKey);
   ClearDisplay = TRUE;
   break;

case KBD_F2:
   MenuKey = DoSettings (MenuKey);
   ClearDisplay = TRUE;
   break;

case KBD_F3:
   MenuKey = DoSettings (MenuKey);
   ClearDisplay = TRUE;
   break;

case KBD_F4:
   if (gRemote) {
      DoRemSettings ();
      MenuKey = KBD_BREAK;
   }
   else {
      ErrorNo = GetError ();
      pszErrorMsg = GetString (STR_ERRORS, ErrorNo);
      if (ErrorNo) {
         ErrorNo = GetErrCnt ();
         HexToAscii (ErrorNo, pszErrorCode);
         DisplayMsg (pszTotalErr, pszErrorMsg);
         DisplayPosition (2,17);
         Display (pszErrorCode);
      }
      else
         DisplayMsg (pszErrorMsg, pszAnyKey);
      MenuKey = OnKbd ();
      ClearDisplay = TRUE;
   }
   break;

case KBD_MON_L1:
   MenuKey = DoMonitor ();
   if (MenuKey != KBD_MON_L1)
      ClearDisplay = TRUE;
   break;

case KBD_TRC_L2:
   MenuKey = DoL2Trace ();
```

```
            ClearDisplay = TRUE;
            break;

case KBD_TRC_L3:
            MenuKey = DoL3Trace ();
            ClearDisplay = TRUE;
            break;

case KBD_EMULATE:
            CTS = ENABLE;
            MenuKey = DoLayer3 (L3Startup);
            ClearDisplay = TRUE;
            SetEmuOff ();
            break;

case KBD_RESTART:
            DoReset (ColdStart, PowerOn);
            MenuKey = KBD_NULL;
            ColdStart = TRUE;
            ClearDisplay = TRUE;
            break;

default:
            MenuKey = KBD_BREAK;
            break;
      }
    }
}
```

}

/****************************************************************
Function: ClearTerminal
Input:   TEI of selected terminal.
Returns: None Clears calls and TSP data for the terminal
        associated with hTerminal. Called by layer 3
        when a TEI is removed at layer 2, or when
        a terminal is disconnected from the interface.
****************************************************************/ void ClearTerminal (UCHAR hTerminal) {

GetTsp (hTerminal);
  ClearTeCalls (hTerminal);
  ClearTsp (hTerminal);
}

```
/****************************************************************

ISDN 2000 Central Office Emulator

Call Control Database and
Data Access Functions For Layer 3

(c) 1994 Merge Technologies Inc.

General: This module contains all the call database variables
and access functions, as well as the ReadMsgData() and
WriteMsgData() parsing and generation engines that produce
formated Q.931 messages.

The call database is a set of arrays, which contain
terminal, call, or information element objects. The object
is selected using a "handle," which is really an array
subscript. This subscript is then used to set the global
data pointers at the array variables. Layer 3 can access
data only indirectly through these pointers or through
access function in this module that may search for or
test the data first.

****************************************************************/ ifndef NODEBUG
pragma DEBUG CODE SYMBOLS OBJECTEXTEND
endif include <coe.h>
include <lib_db.h>
#include <lib_util.h>
#include <lib_msg.h>
#include <lib_swch.h>
#include <lib_set.h>
#include <lib_io.h>

/****************************************************************
   IE Pointer Table To Current Call Data Pointers
****************************************************************/

XPXUCHAR IePtrTable[MAX_IE_TYPES];

/****************************************************************
   Incoming Call Reference Variable
****************************************************************/

XUCHAR gNextCallRef;
XUCHAR gCauseDiag;

/****************************************************************
   Call Data Arrays and Pointers
****************************************************************/
```

```
XUCHAR DbTei[MAX_CALLS];
XUCHAR DbPort[MAX_CALLS];
XUCHAR DbCallRefLen[MAX_CALLS];
XUCHAR DbCallRef[MAX_CALLS];
XUCHAR DbRcvMsgType[MAX_CALLS];
XUCHAR DbXmtMsgType[MAX_CALLS];
XUCHAR DbCallAppearance[MAX_CALLS];
XUCHAR DbCalledDN[MAX_CALLS][MAX_DN_LENGTH];
XUCHAR DbDNIndex[MAX_CALLS];
XUCHAR DbLocalhCall[MAX_CALLS];
XUCHAR DbRemotehCall[MAX_CALLS];
XUCHAR DbTimerType[MAX_CALLS];
XUINT DbTimerTime[MAX_CALLS];
XUINT DbTimerStart[MAX_CALLS];

XUCHAR IeSendComplete[MAX_CALLS][1];
XUCHAR IeBearer[MAX_CALLS][8];
XUCHAR IeCause[MAX_CALLS][5];
XUCHAR IeConnectedNo[MAX_CALLS][11];
XUCHAR IeExFacility[MAX_CALLS][127];
XUCHAR IeCallState[MAX_CALLS][2];
XUCHAR IeChannelID[MAX_CALLS][2];
XUCHAR IeProgressInd[MAX_CALLS][3];
XUCHAR IeTerminalCap[MAX_CALLS][2];
XUCHAR IeNotificationInd[MAX_CALLS][2];
XUCHAR IeKeypad[MAX_CALLS][13];
XUCHAR IeInfoRqst[MAX_CALLS][2];
XUCHAR IeSignal[MAX_CALLS][2];
XUCHAR IeSwitchHook[MAX_CALLS][2];
XUCHAR IeSPID[MAX_CALLS][21];
XUCHAR IeEndpointID[MAX_CALLS][5];
XUCHAR IeCallingPartyNo[MAX_CALLS][13];
XUCHAR IeCallingPartySubaddr[MAX_CALLS][23];
XUCHAR IeCalledPartyNo[MAX_CALLS][13];
XUCHAR IeCalledPartySubaddr[MAX_CALLS][23];
XUCHAR IeTransitNetSel[MAX_CALLS][8];
XUCHAR IeRestartInd[MAX_CALLS][2];
XUCHAR IeLowLayerCap[MAX_CALLS][16];
XUCHAR IeHighLayerCap[MAX_CALLS][5];
XUCHAR IeUserInfo[MAX_CALLS][33];
XUCHAR IeDisplayText[MAX_CALLS][35];
XUCHAR IeUserCode[MAX_CALLS][3];
XUCHAR IeLogicalLinkID[MAX_CALLS][3];
XUCHAR IeAssocType[MAX_CALLS][2];
XUCHAR IeSelCA[MAX_CALLS][2];
XUCHAR IeOrigCA[MAX_CALLS][2];
XUCHAR IeDestCA[MAX_CALLS][2];
XUCHAR Ie6EndpointID[MAX_CALLS][4];
XUCHAR IeKeypadCont[MAX_CALLS][2];
XUCHAR IeOtherCallRef[MAX_CALLS][2];
XUCHAR IeFeatureAct[MAX_CALLS][3];
XUCHAR IeFeatureInd[MAX_CALLS][3];
XUCHAR IeAdjunctCont[MAX_CALLS][2];
```

```
XUCHAR IeDisplayCont[MAX_CALLS][3];
XUCHAR IeDisplayField1[MAX_CALLS][21];
XUCHAR IeDisplayField2[MAX_CALLS][21];
XUCHAR IeDisplayField3[MAX_CALLS][21];
XUCHAR IeDisplayField4[MAX_CALLS][21];
XUCHAR IePacketLayerParam[MAX_CALLS][12];
XUCHAR IeLinkLayerParam[MAX_CALLS][11];
XUCHAR IeCUG[MAX_CALLS][5];
XUCHAR IeReverseCharge[MAX_CALLS][5];
XUCHAR IeThroughPutClass[MAX_CALLS][5];
XUCHAR IeRedirectSub[MAX_CALLS][5];
XUCHAR IeRedirectNo[MAX_CALLS][12];
XUCHAR IeCallAppear[MAX_CALLS][3];
XUCHAR IeNotUsed[MAX_CALLS][3];

XPXUCHAR pDbTei;
XPXUCHAR pDbPort;
XPXUCHAR pDbCallRefLen;
XPXUCHAR pDbCallRef;
XPXUCHAR pDbRcvMsgType;
XPXUCHAR pDbXmtMsgType;
XPXUCHAR pDbCallAppearance;
XPXUCHAR pDbCalledDN;
XPXUCHAR pDbDNIndex;
XPXUCHAR pDbLocalhCall;
XPXUCHAR pDbRemotehCall;
XPXUCHAR pDbTimerType;
XPXUINT pDbTimerTime;
XPXUINT pDbTimerStart;

XPXUCHAR pIeBearer;
XPXUCHAR pIeCause;
XPXUCHAR pIeConnectedNo;
XPXUCHAR pIeExFacility;
XPXUCHAR pIeCallState;
XPXUCHAR pIeChannelID;
XPXUCHAR pIeProgressInd;
XPXUCHAR pIeTerminalCap;
XPXUCHAR pIeNotificationInd;
XPXUCHAR pIeKeypad;
XPXUCHAR pIeInfoRqst;
XPXUCHAR pIeSignal;
XPXUCHAR pIeSwitchHook;
XPXUCHAR pIeSPID;
XPXUCHAR pIeEndpointID;
XPXUCHAR pIeCallingPartyNo;
XPXUCHAR pIeCallingPartySubaddr;
XPXUCHAR pIeCalledPartyNo;
XPXUCHAR pIeCalledPartySubaddr;
XPXUCHAR pIeTransitNetSel;
XPXUCHAR pIeRestartInd;
XPXUCHAR pIeLowLayerCap;
XPXUCHAR pIeHighLayerCap;
```

```
XPXUCHAR pIeUserInfo;
XPXUCHAR pIeSendComplete;
XPXUCHAR pIeDisplayText;
XPXUCHAR pIeUserCode;
XPXUCHAR pIeLogicalLinkID;
XPXUCHAR pIeAssocType;
XPXUCHAR pIeSelCA;
XPXUCHAR pIeOrigCA;
XPXUCHAR pIeDestCA;
XPXUCHAR pIe6EndpointID;
XPXUCHAR pIeKeypadCont;
XPXUCHAR pIeOtherCallRef;
XPXUCHAR pIeFeatureAct;
XPXUCHAR pIeFeatureInd;
XPXUCHAR pIeAdjunctCont;
XPXUCHAR pIeDisplayCont;
XPXUCHAR pIeDisplayField1;
XPXUCHAR pIeDisplayField2;
XPXUCHAR pIeDisplayField3;
XPXUCHAR pIeDisplayField4;
XPXUCHAR pIePacketLayerParam;
XPXUCHAR pIeLinkLayerParam;
XPXUCHAR pIeCUG;
XPXUCHAR pIeReverseCharge;
XPXUCHAR pIeThroughPutClass;
XPXUCHAR pIeRedirectSub;
XPXUCHAR pIeRedirectNo;
XPXUCHAR pIeCallAppear;
XPXUCHAR pIeNotUsed;

/****************************************************************
  Terminating Equipment Data
****************************************************************/

XUCHAR TePort[MAX_TERMINALS];
XUCHAR TeTei[MAX_TERMINALS];
XUCHAR TeFirstCref[MAX_TERMINALS];
XUCHAR TeAutoInit[MAX_TERMINALS];
XUCHAR TeSelCA[MAX_TERMINALS];
XUCHAR TeSwitchHook[MAX_TERMINALS];
XUCHAR TeUSID[MAX_TERMINALS];
XUCHAR TeTID[MAX_TERMINALS];
XUCHAR TeDisplay[MAX_TERMINALS];
XCHAR  TeSPID[MAX_TERMINALS][MAX_SPID_LENGTH];
XCHAR  TeDN[MAX_TERMINALS][MAX_DN_LENGTH];
XCHAR  TeNoDN[MAX_DN_LENGTH];
XCHAR  TeName[MAX_TERMINALS][MAX_NAME_LENGTH];
XUCHAR TeErrors[MAX_TERMINALS];

CUCHAR TspPort[MAX_TERMINALS] = { 0, PORT1, PORT2, PORT1, PORT2 };
CUCHAR TspSPID[MAX_TERMINALS][MAX_SPID_LENGTH] = {"        ",
                        "0555100001",
                        "0555200001",
                        "0555300001",
```

```
                            "0555400001" };

CUCHAR TspDN[MAX_TERMINALS][MAX_DN_LENGTH] = {"         ",
                        "8005551000",
                        "8005552000",
                        "8005553000",
                        "8005554000" };

CUCHAR TspName[MAX_TERMINALS][MAX_NAME_LENGTH] = {"UNKNOWN   ",
                        "Terminal 1",
                        "Terminal 2",
                        "Terminal 3",
                        "Terminal 4" };
XPXUCHAR pTePort;
XPXUCHAR pTeTei;
XPXUCHAR pTeFirstCref;
XPXUCHAR pTeAutoInit;
XPXUCHAR pTeSelCA;
XPXUCHAR pTeSwitchHook;
XPXUCHAR pTeUSID;
XPXUCHAR pTeTID;
XPXUCHAR pTeDisplay;
XPXCHAR  pTeSPID;
XPXCHAR  pTeDN;
XPXCHAR  pTeName;
XPXUCHAR pTeErrors;

/****************************************************************
  Function: GetTsp
  Input:    A handle to a Terminal Service Profile data array,
            provided by GetTeHandle ()
  Returns:  None Sets the TE data pointers to the address of
            the selected arrays
****************************************************************/ void GetTsp (UCHAR hTerminal) { pTePort = &TePort[hTerminal];
  pTeTei = &TeTei[hTerminal];
  pTeFirstCref = &TeFirstCref[hTerminal];
  pTeAutoInit = &TeAutoInit[hTerminal];
  pTeSelCA = &TeSelCA[hTerminal];
  pTeSwitchHook = &TeSwitchHook[hTerminal];
  pTeUSID = &TeUSID[hTerminal];
  pTeTID = &TeTID[hTerminal];
  pTeDisplay = &TeDisplay[hTerminal];
  pTeSPID = &TeSPID[hTerminal][0];
  pTeDN = &TeDN[hTerminal][0];
  pTeName = &TeName[hTerminal][0];
  pTeErrors = &TeErrors[hTerminal];
```

}

```
/****************************************************************
Function: ClearTsp
Input:    A handle to a Terminal Service Profile array,
          provided by GetTeHandle()
Returns:  None Resets arrays that contain data changed during
          TE initialization or call control. This function
          is also called when removing a terminal.
          See RemoveTerminal() in COE_L3.C
****************************************************************/ void ClearTsp (UCHAR hTerminal) {

TePort[hTerminal] =        TspPort[hTerminal];
   TeTei[hTerminal] =         0;
   TeFirstCref[hTerminal] =   0;
   TeAutoInit[hTerminal] =    0;
   TeSelCA[hTerminal] =       DEFAULT_SCA;
   TeSwitchHook[hTerminal] =  ON_HOOK;
   TeUSID[hTerminal] =        hTerminal;
   TeTID[hTerminal] =         1;
   TeDisplay[hTerminal] =     0;
   TeErrors[hTerminal] =      0;
   CopyString (TeSPID[hTerminal],TspSPID[hTerminal]);
   CopyString (TeDN[hTerminal],TspDN[hTerminal]);
   CopyString (TeName[hTerminal],TspName[hTerminal]);
}

/****************************************************************
Function: InitTeData
Input:    None
Returns:  None Initializes terminal equipment arrays for
          four terminals. This data may be downloaded
          in the future.
****************************************************************/ void InitTeData (void) {

UCHAR hTerminal;

for (hTerminal = 0; hTerminal < MAX_TERMINALS; ++hTerminal)
      ClearTsp (hTerminal);

CopyString (TeNoDN," NONE");
   GetTsp (0);

}
```

```
/******************************************************************
Function: GetTeHandle
Input:   A constant id for the data item used in the
         search and a pointer to the item variable
Returns: A handle to a TSP Depending on the TE initialization scheme or
         the state of a call, the TE array must be
         accessed using different search criteria.
******************************************************************/

UCHAR GetTeHandle (UCHAR SearchType, PUCHAR pSearchItem) {

UCHAR i;
   UCHAR hTerminal = 0;

switch (SearchType) { case SEARCH_TEI:
         // Takes a pointer to a Terminal Endpoint ID for (i = 1; i < MAX_TERMINALS; ++i) {
            if (*pSearchItem == TeTei[i]) {
               hTerminal = i;
               break;
            }
         }
         break;

case SEARCH_CREF:
         // Takes a pointer to a Call Reference number for (i = 1; i < MAX_TERMINALS; ++i) {
            if (*pSearchItem == TeFirstCref[i]) {
               hTerminal = i;
               break;
            }
         }
         break;

case SEARCH_SPID:
         // Takes a pointer to a Service Profile ID for (i = 1; i < MAX_TERMINALS; ++i) {
            if (CmpString (pSearchItem,
                     &TeSPID[i][0],
                     (MAX_SPID_LENGTH - 1))) { hTerminal = i;
               break;
            }
         }
```

```
          break;

case SEARCH_DN:
          // Takes a pointer to a Called or Calling Party Number for (i = 1; i < MAX_TERMINALS; ++i) {
              if (CmpString (pSearchItem, &TeDN[i][0], 10)) {
                  hTerminal = i;
                  break;
              }
              else if (CmpString (pSearchItem, &TeDN[i][3], 7)) {
                  hTerminal = i;
                  break;
              }
          }
          break;

case SEARCH_CALLS:
          // Takes a pointer to a call handle for (i = 1; i < MAX_TERMINALS; ++i) {
              if (DbTei[*pSearchItem] == TeTei[i]) {
                  hTerminal = i;
                  break;
              }
          }
          break;
   } return (hTerminal);

}

/***************************************************************
Function: GetCalledTe
Input:    None
Returns:  A handle to the called terminal's TSP This function associates a called number with
       its terminal. The number can be a 7 digit local
       number (when dialed), or a 10 digit number (when
       included in the Called Party Number information
       element.
****************************************************************/

UCHAR GetCalledTe (void) {

UCHAR i;
   UCHAR hTerminal = 0;

for (i = 0; i <= MAX_DN_LENGTH; ++i) {
      if (*(pDbCalledDN + i) == '#')
         *(pDbCalledDN + i) = 0;
```

```
    }
    if ((*pDbDNIndex < MAX_DN_LENGTH) &&
        (*pDbDNIndex >= 7)) { for (i = 1; i < MAX_TERMINALS; ++i) {
        if (CmpString (pDbCalledDN, &TeDN[i][0], *pDbDNIndex)) {
          hTerminal = i;
          break;
        }
        else if (CmpString (pDbCalledDN, &TeDN[i][3], *pDbDNIndex)) {
          hTerminal = i;
          break;
        }
      }
    }
    return (hTerminal);
}

/****************************************************************
Function: GetDn
Input:    Terminal TEI
Returns:  Pointer to a TSP Directory Number Access function that returns the 7 digit local
          directory number associated with a specific TEI
****************************************************************/

PUCHAR GetDn (UCHAR Tei) {

UCHAR i;
    UCHAR hTerminal = 0;
    PXUCHAR pDn;

for (i = 1; i < MAX_TERMINALS; ++i) {
      if (Tei == TeTei[i]) {
        hTerminal = i;
        break;
      }
    }
    if (hTerminal)
      pDn = &TeDN[hTerminal][3];
    else
      pDn = TeNoDN;
    return (pDn);
}

/****************************************************************
Function: GetIdleCA
Input:    None
Returns:  An integer representing an idle call appearance
          for the TE associated with the current call.
```

```
       Searches the call database for any active calls
       for the TE and selects its next sequential unused
       number. The idle call appearance is used for the
       Call Appearance information element.
****************************************************************/

UCHAR GetIdleCA (void) {

BOOL CAIsIdle;
   UCHAR i;
   UCHAR IdleCA = 0;

if (*pTotalCASet) {
      for (IdleCA = 1; IdleCA <= *pTotalCASet; ++IdleCA) {
         CAIsIdle = TRUE;
         for (i = 1; i < MAX_CALLS; ++i) {
            if ((DbTei[i] == *pDbTei) &&
                (IdleCA == DbCallAppearance[i])) {
               CAIsIdle = FALSE;
               break;
            }
         }
         if (CAIsIdle)
            break;
      }
   }
   if (IdleCA > *pTotalCASet)
      IdleCA = 0;

return (IdleCA);
}

/****************************************************************
   Function: PutIeData
   Input:    A pointer to a call data Information Element
             array, and a list of parameters.
   Returns:  None An access function that moves fixed data into
             an Information Element string.
****************************************************************/ void PutIeData (
         PUCHAR pIe,
         UCHAR IeLen,
         UCHAR Var1,
         UCHAR Var2,
         UCHAR Var3) {

*pIe = IeLen;

if (IeLen >= 1)
      *(pIe + 1) = Var1;
   if (IeLen >= 2)
```

```
        *(pIe + 2) = Var2;
    if (IeLen >= 3)
        *(pIe + 3) = Var3;

}

/***************************************************************
Function: SendIeData
Input:   A pointer to a call data Information Element
         array, and a list of parameters.
Returns: None Same as PutIeData, except adds a "send flag" so the
         message engine will include it in the next appropriate
         outbound message. See WriteMsgData().
***************************************************************/ void SendIeData (

PUCHAR pIe,
        UCHAR IeLen,
        UCHAR Var1,
        UCHAR Var2,
        UCHAR Var3) {

PutIeData (pIe, IeLen, Var1, Var2, Var3);
    *pIe = (IeLen | IE_SEND_FLAG);

}

/***************************************************************
Function: LoadIePtrTable
Input:   None
Returns: None Loads the current call data information element
         pointers into a table that the message engines
         can index into. Called by GetCall(). The
         "pIeNotUsed" pointers are place holders (bit buckets).
***************************************************************/ void LoadIePtrTable (void) {

IePtrTable[0] = pIeSendComplete;
    IePtrTable[1] = pIeBearer;
    IePtrTable[2] = pIeCause;
    IePtrTable[3] = pIeConnectedNo;
    IePtrTable[4] = pIeExFacility;
    IePtrTable[5] = pIeCallState;
    IePtrTable[6] = pIeChannelID;
    IePtrTable[7] = pIeExFacility;
    IePtrTable[8] = pIeProgressInd;
    IePtrTable[9] = pIeTerminalCap;
```

```
        lePtrTable[10] = pIeNotificationInd;
        lePtrTable[11] = pIeKeypad;
        lePtrTable[12] = pIeInfoRqst;
        lePtrTable[13] = pIeSignal;
        lePtrTable[14] = pIeSwitchHook;
        lePtrTable[15] = pIeSPID;
        lePtrTable[16] = pIeEndpointID;
        lePtrTable[17] = pIeCallingPartyNo;
        lePtrTable[18] = pIeCallingPartySubaddr;
        lePtrTable[19] = pIeCalledPartyNo;
        lePtrTable[20] = pIeCalledPartySubaddr;
        lePtrTable[21] = pIeTransitNetSel;
        lePtrTable[22] = pIeRestartInd;
        lePtrTable[23] = pIeLowLayerCap;
        lePtrTable[24] = pIeHighLayerCap;
        lePtrTable[25] = pIeUserInfo;
        lePtrTable[26] = pIeNotUsed;    // Locking Shift 5
        lePtrTable[27] = pIeNotUsed;    // Operator Access
        lePtrTable[28] = pIeDisplayText;
        lePtrTable[29] = pIeNotUsed;    // Locking Shift 6
        lePtrTable[30] = pIeUserCode;
        lePtrTable[31] = pIeLogicalLinkID;
        lePtrTable[32] = pIeAssocType;
        lePtrTable[33] = pIeSelCA;
        lePtrTable[34] = pIeOrigCA;
        lePtrTable[35] = pIeDestCA;
        lePtrTable[36] = pIe6EndpointID;
        lePtrTable[37] = pIeKeypadCont;
        lePtrTable[38] = pIeOtherCallRef;
        lePtrTable[39] = pIeFeatureAct;
        lePtrTable[40] = pIeFeatureInd;
        lePtrTable[41] = pIeAdjunctCont;
        lePtrTable[42] = pIeDisplayCont;
        lePtrTable[43] = pIeDisplayField1;
        lePtrTable[44] = pIeDisplayField2;
        lePtrTable[45] = pIeDisplayField3;
        lePtrTable[46] = pIeDisplayField4;
        lePtrTable[47] = pIePacketLayerParam;
        lePtrTable[48] = pIeLinkLayerParam;
        lePtrTable[49] = pIeCUG;
        lePtrTable[50] = pIeReverseCharge;
        lePtrTable[51] = pIeThroughPutClass;
        lePtrTable[52] = pIeRedirectSub;
        lePtrTable[53] = pIeRedirectNo;
        lePtrTable[54] = pIeNotUsed;        // Management
        lePtrTable[55] = pIeCallAppear;
        lePtrTable[56] = pIeNotUsed;        // Unknown
}

/***************************************************************
Function: SetCallState
Input:    Layer 3 call state constant
Returns: None
```

```
                Access function that inserts the call state
                constant into the call state information
                element string for the current call.
****************************************************************/ void SetCallState (UCHAR CallState) {

*(pIeCallState + 1) = CallState;

}

/***************************************************************
   Function: GetCallState
   Input:   Handle to a call data array
   Returns: Layer 3 call state constant Access function that returns the call state
                of the call associated with the call handle
                provided. Used for both orig and term calls.
****************************************************************/

UCHAR GetCallState (UCHAR hCall) { return (IeCallState[hCall][1]);

}

/***************************************************************
   Function: GetCAHandle
   Input:   The TEI and Call Appearance associated with a call.
   Returns: Integer for handle if the call exists, or a
            global call handle if not.

****************************************************************/

UCHAR GetCAHandle (UCHAR CallTei, UCHAR CallAppearance) {

UCHAR hCall;

for (hCall = 1; hCall < MAX_CALLS; ++hCall) {
      if ((DbCallAppearance[hCall] == CallAppearance) &&
          (DbTei[hCall] == CallTei))
         break;
   }
   if (hCall >= MAX_CALLS)
      hCall = 0;

return (hCall);
}

/***************************************************************
```

```
Function: GetCallHandle
Input:   The TEI and Call Reference associated with a call.
Returns: Integer for handle if the call exists, or a
         global call handle if not. Handle is greater than
         MAX_CALLS if no data space available.

****************************************************************/

UCHAR GetCallHandle (UCHAR CallTei, UCHAR CallRef) {

UCHAR hCall = 0;

// If a global call, use GLOBAL_CALL (array index 0);

if (!(CallRef & CALL_REF_MASK)) {
     hCall = GLOBAL_CALL;
  }

// Test call ref and tei for outgoing calls else if (CallRef & CALL_REF_FLAG) {
     for (hCall = 1; hCall < MAX_CALLS; ++hCall) {
        if ((CallTei == DbTei[hCall]) &&
           (CallRef == DbCallRef[hCall]))
           break;
     }
  }

// Test only the call ref for incoming calls else if (!(CallRef & CALL_REF_FLAG)) {
     for (hCall = 1; hCall < MAX_CALLS; ++hCall) {
        if (CallRef == DbCallRef[hCall])
           break;
     }
  } return (hCall);
}

/****************************************************************
Function: GetCall
Input:   The Call Reference associated with a call.
Returns: False if the call exists, or a CAUSE code if not.

This function sets all call data and information
         element pointers to the array index used
         for a call instance.
****************************************************************/ void GetCall (UCHAR hCall) { if (hCall < MAX_CALLS) {
```

```
pIeSendComplete = IeSendComplete[hCall];
pDbTei = &DbTei[hCall];
pDbPort = &DbPort[hCall];
pDbCallRefLen = &DbCallRefLen[hCall];
pDbCallRef = &DbCallRef[hCall];
pDbRcvMsgType = &DbRcvMsgType[hCall];
pDbXmtMsgType = &DbXmtMsgType[hCall];
pDbCallAppearance = &DbCallAppearance[hCall];
pDbCalledDN = &DbCalledDN[hCall][0];
pDbDNIndex = &DbDNIndex[hCall];
pDbLocalhCall = &DbLocalhCall[hCall];
pDbRemotehCall = &DbRemotehCall[hCall];
pDbTimerType = &DbTimerType[hCall];
pDbTimerTime = &DbTimerTime[hCall];
pDbTimerStart = &DbTimerStart[hCall];

pIeBearer = IeBearer[hCall];
pIeCause = IeCause[hCall];
pIeConnectedNo = IeConnectedNo[hCall];
pIeExFacility = IeExFacility[hCall];
pIeCallState = IeCallState[hCall];
pIeChannelID = IeChannelID[hCall];
pIeProgressInd = IeProgressInd[hCall];
pIeTerminalCap = IeTerminalCap[hCall];
pIeNotificationInd = IeNotificationInd[hCall];
pIeKeypad = IeKeypad[hCall];
pIeInfoRqst = IeInfoRqst[hCall];
pIeSignal = IeSignal[hCall];
pIeSwitchHook = IeSwitchHook[hCall];
pIeSPID = IeSPID[hCall];
pIeEndpointID = IeEndpointID[hCall];
pIeCallingPartyNo = IeCallingPartyNo[hCall];
pIeCallingPartySubaddr = IeCallingPartySubaddr[hCall];
pIeCalledPartyNo = IeCalledPartyNo[hCall];
pIeCalledPartySubaddr = IeCalledPartySubaddr[hCall];
pIeTransitNetSel = IeTransitNetSel[hCall];
pIeRestartInd = IeRestartInd[hCall];
pIeLowLayerCap = IeLowLayerCap[hCall];
pIeHighLayerCap = IeHighLayerCap[hCall];
pIeUserInfo = IeUserInfo[hCall];
pIeDisplayText = IeDisplayText[hCall];
pIeUserCode = IeUserCode[hCall];
pIeLogicalLinkID = IeLogicalLinkID[hCall];
pIeAssocType = IeAssocType[hCall];
pIeSelCA = IeSelCA[hCall];
pIeOrigCA = IeOrigCA[hCall];
pIeDestCA = IeDestCA[hCall];
pIe6EndpointID = Ie6EndpointID[hCall];
pIeKeypadCont = IeKeypadCont[hCall];
pIeOtherCallRef = IeOtherCallRef[hCall];
pIeFeatureAct = IeFeatureAct[hCall];
pIeFeatureInd = IeFeatureInd[hCall];
pIeAdjunctCont = IeAdjunctCont[hCall];
```

```
pIeDisplayCont = IeDisplayCont[hCall];
pIeDisplayField1 = IeDisplayField1[hCall];
pIeDisplayField2 = IeDisplayField2[hCall];
pIeDisplayField3 = IeDisplayField3[hCall];
pIeDisplayField4 = IeDisplayField4[hCall];
pIePacketLayerParam = IePacketLayerParam[hCall];
pIeLinkLayerParam = IeLinkLayerParam[hCall];
pIeCUG = IeCUG[hCall];
pIeReverseCharge = IeReverseCharge[hCall];
pIeThroughPutClass = IeThroughPutClass[hCall];
pIeRedirectSub = IeRedirectSub[hCall];
pIeRedirectNo = IeRedirectNo[hCall];
pIeCallAppear = IeCallAppear[hCall];
pIeNotUsed = IeNotUsed[hCall];

LoadIePtrTable ();

*pDbRcvMsgType = DbRcvMsgType[0];
*pDbXmtMsgType = NO_MESSAGE;

}
}

/***************************************************************
Function: CreateCall
Input:    Terminal TEI and assigned call reference
Returns:  A handle (array subscript) to the created call Called by Layer 3 when creating an incoming or
          outgoing call. Locates an unused array
          entry and initializes the call data.
***************************************************************/

UCHAR CreateCall (UCHAR CallTei, UCHAR CallRef) {

UCHAR hCall = 1;

while ((DbTei[hCall] != 0) &&
           (DbCallRef[hCall] != 0) &&
           (hCall < MAX_CALLS))
        ++hCall;
    if (hCall < MAX_CALLS) {

DbTei[hCall] = CallTei;
        DbCallRef[hCall] = CallRef;
        DbRcvMsgType[hCall] = NO_MESSAGE;
        DbXmtMsgType[hCall] = NO_MESSAGE;
        DbCallAppearance[hCall] = 0;
        DbDNIndex[hCall] = 0;
        DbLocalhCall[hCall] = 0;
        DbRemotehCall[hCall] = 0;
        DbTimerType[hCall] = 0;
        DbTimerTime[hCall] = 0;
```

```
   DbTimerStart[hCall] = 0;
   IeCallState[hCall][0] = 1;
   IeCallState[hCall][1] = CS_NULL;
   IeChannelID[hCall][1] = 0;
   IeSignal[hCall][0] = 1;
   IeSignal[hCall][1] = SIGNAL_TONES_OFF;
 }
 else
    hCall = GLOBAL_CALL;

return (hCall);
}
/****************************************************************
Function: GetGlobalCall
Input:   None
Returns: None The first element of all call data and information
        element arrays is used as the Global Call instance,
        where incoming messages are parsed and qualified
        before using them. This data is always distroyed
        prior to getting the next message.
****************************************************************/ void GetGlobalCall (void) {

GetCall (GLOBAL_CALL);

}

/****************************************************************
Function: ClearCall
Input:   None
Returns: None You guessed it - deletes data for the current call.
        GetCall () must be called to establish which call
        is destroyed.
****************************************************************/ void ClearCall (void) {

UCHAR hCall = *pDbLocalhCall;

if (*pDbRemotehCall)
     DbRemotehCall[hCall] = 0;
  if (*pTeTei == BROADCAST_TEI)
     *pTeTei = 0;

*pDbTei = 0;
  *pDbPort = 0;
  *pDbCallRefLen = 0;
```

```
*pDbCallRef = 0;
*pDbRcvMsgType = NO_MESSAGE;
*pDbXmtMsgType = NO_MESSAGE;
*pDbCallAppearance = 0;
*pDbDNIndex = 0;
*pDbLocalhCall = 0;
*pDbRemotehCall = 0;
*pDbTimerType = 0;
*pDbTimerTime = 0;
*pDbTimerStart = 0;

ClearMem (pDbCalledDN, MAX_DN_LENGTH);

*pIeSendComplete = 0;
*pIeBearer = 0;
*pIeCause = 0;
*(pIeCause + 1) = 0;
*(pIeCause + 2) = 0;
*pIeConnectedNo = 0;
*pIeExFacility = 0;
*pIeCallState = 1;
*(pIeCallState + 1) = CS_NULL;
*pIeChannelID = 0;
*pIeProgressInd = 0;
*pIeTerminalCap = 0;
*pIeNotificationInd = 0;
*pIeKeypad = 0;
*pIeInfoRqst = 0;
*pIeSignal = 1;
*(pIeSignal + 1) = SIGNAL_TONES_OFF;
*pIeSwitchHook = 0;
*pIeSPID = 0;
*pIeEndpointID = 0;
*pIeCallingPartyNo = 0;
*pIeCallingPartySubaddr = 0;
*pIeCalledPartyNo = 0;
*pIeCalledPartySubaddr = 0;
*pIeTransitNetSel = 0;
*pIeRestartInd = 0;
*pIeLowLayerCap = 0;
*pIeHighLayerCap = 0;
*pIeUserInfo = 0;
*pIeDisplayText = 0;
*pIeUserCode = 0;
*pIeLogicalLinkID = 0;
*pIeAssocType = 0;
*pIeSelCA = 0;
*pIeOrigCA = 0;
*pIeDestCA = 0;
*pIe6EndpointID = 0;
*pIeKeypadCont = 0;
*pIeOtherCallRef = 0;
*pIeFeatureAct = 0;
*pIeFeatureInd = 0;
```

```
    *pIeAdjunctCont = 0;
    *pIeDisplayCont = 0;
    *pIeDisplayField1 = 0;
    *pIeDisplayField2 = 0;
    *pIeDisplayField3 = 0;
    *pIeDisplayField4 = 0;
    *pIePacketLayerParam = 0;
    *pIeLinkLayerParam = 0;
    *pIeCUG = 0;
    *pIeReverseCharge = 0;
    *pIeThroughPutClass = 0;
    *pIeRedirectSub = 0;
    *pIeRedirectNo = 0;
    *pIeCallAppear = 0;
    *pIeNotUsed = 0;

GetGlobalCall ();

}

/****************************************************************
Function: GetOtherCall
Input:   A handle (array subscript) to a call array
Returns: True, if call still exists, and sets call data
         array pointers to the selected call array.

Used by Layer 3 to test if the other end of the
         call is still active. If so, calls GetCall().
****************************************************************/

UCHAR GetOtherCall (UCHAR hCall) {

UCHAR CallExists = FALSE;

if ((hCall > 0) && (hCall < MAX_CALLS)) {
            if (DbTei[hCall] != 0) {
                if (DbTei[hCall] == BROADCAST_TEI)
                        GetTsp (GetTeHandle (SEARCH_CREF, &DbCallRef[hCall]));
                else
                        GetTsp (GetTeHandle (SEARCH_TEI, &DbTei[hCall]));
                GetCall (hCall);
                CallExists = TRUE;
            }
    } return (CallExists);
}

/****************************************************************
Function: GetMsgHeader
Input:   Pointer to a message buffer
Returns: None
```

```
            Loads message header variables from incoming
            messsage packets into the currently selected
            call array.
************************************************************/ void GetMsgHeader (PUCHAR pMsgBuffer) {

*pDbPort = GetField (GET_PORT, pMsgBuffer);
   *pDbTei = GetField (GET_TEI, pMsgBuffer);
   *pDbCallRefLen = GetField (GET_CREF_LENGTH, pMsgBuffer);
   *pDbCallRef = GetField (GET_CREF_NUMBER, pMsgBuffer);
   *pDbRcvMsgType = GetField (GET_MSG_TYPE, pMsgBuffer);
   if (*pDbRcvMsgType == NET_ESCAPE)
      *pDbRcvMsgType = GetField (GET_NET_MSG_TYPE, pMsgBuffer);
   *pDbXmtMsgType = NO_MESSAGE;
}

/***************************************************************
  Function: ClearTeCalls
  Input:   Handle (array subscript) to a terminal data array
  Returns: None Clears all calls for the terminal. Used when a
            terminal is no longer active, either by TEI
            substitution or by removal. Sets a timer to
            disconnect any active call at the other end.
****************************************************************/ void ClearTeCalls (UCHAR hTerminal) {

UCHAR Tei = TeTei[hTerminal];
   UCHAR hCall;
   UCHAR hOtherCall;

for (hCall = 1; hCall < MAX_CALLS; ++hCall) {
      if (Tei == DbTei[hCall]) {
         GetTsp (hTerminal);
         GetCall (hCall);
         hOtherCall = *pDbRemotehCall;
         ReleaseChannel ();
         ClearCall ();
         if (GetOtherCall (hOtherCall)) {
            *pDbTimerType = TIMER_T301;
            *pDbTimerTime = T301_TIME;
            *pDbTimerStart = GetTime ();
         }
      }
   }
}

/***************************************************************
  Function: GetIePtr
```

```
Input:   The Q.931 information element code.
Returns: A pointer to the current call data array
         to that information element's parameters.

Used by the message engines to put or get
         IE parameters into or out of messages.
*****************************************************************/

PUCHAR GetIePtr (UCHAR hIe) {

PXUCHAR pIe = IePtrTable[hIe];

return (pIe);
}

/*****************************************************************
Function: GetFirstIE
Input:   A pointer to a layer 3 message buffer.
Returns: A pointer to the position in the message where the
         first information element is located.

Called by the message engines. Must be called
         before GetIeIndex().
*****************************************************************/

PUCHAR GetFirstIE (PUCHAR pMsg) {

PUCHAR pFirstIe = (pMsg + FIRST_IE_POS);

if ((*(pMsg + CREF_LENGTH_POS) == 0) &&
        (*(pMsg + CREF_NUMBER_POS) != NET_ESCAPE))
        --pFirstIe;
    else if ((*(pMsg + CREF_LENGTH_POS) != 0) &&
        (*(pMsg + MSG_TYPE_POS) == NET_ESCAPE))
        ++pFirstIe;

return (pFirstIe);
}

/*****************************************************************
Function: GetNextIE
Input:   A pointer to the last information element
         located in a layer 3 message buffer.
Returns: A pointer to the next information element position.

Called by the message engines.
*****************************************************************/

PUCHAR GetNextIE (PUCHAR pMsg) { return (pMsg + (*(pMsg + 1) + 2));
}
```

```
/******************************************************************
Function: ReadMsgData
Input:   A pointer to a layer 3 message buffer.
Returns: False if message reads ok, or a CAUSE code
         if an error occurs.

This is the message engine that transfers the
         information element parameters from the layer 3
         rcv message buffer to the call data arrays. The
         possible information elements for a given
         message are defined by tables in COE_MSG.C
******************************************************************/

UCHAR ReadMsgData (PUCHAR pMsg) {

PUCHAR pIeTable;
   PUCHAR pIe;
   PUCHAR pIeData;
   PUCHAR pCallData;
   UCHAR MsgType;
   UCHAR MsgCode;
   UCHAR IeIndexTotal;
   UCHAR i = 0;
   UCHAR j = 0;
   UCHAR IeLen = 0;
   UCHAR IeType;
   UCHAR IePresent;
   UCHAR IeMinLen;
   UCHAR IeMaxLen;
   UCHAR IeVarType;
   UCHAR IeSentBy;
   UCHAR hIe;
   UCHAR CodeSet =      IE_LOCKING_SHIFT_0;
   XUCHAR MsgError =    FALSE;

gLastIeType =   0;
   gIeRepeatCnt =  0;
   gCauseDiag =    0;

MsgType = GetField (GET_MSG_TYPE, pMsg);
   if (MsgType == NET_ESCAPE)
      MsgType = GetField (GET_NET_MSG_TYPE, pMsg);
   *pDbRcvMsgType = MsgType;
   MsgCode = GetMsgIndex (MsgType);
   pIeTable = GetMsgPtr (MsgCode);
   pIe = GetFirstIE (pMsg);
   pIeData = pIe;
   IeIndexTotal = GetMaxIe (MsgCode);

if (MsgIndex[MsgCode] == UNKNOWN) {
      MsgError = CAUSE_97;
      gCauseDiag = MsgType;
   }
   else {
```

```
while (i < IeIndexTotal) {
   IeType = *pIeTable;
   IeSentBy = *(pIeTable + 5);
   if ((IeSentBy == USER) ||
       (IeSentBy == BOTH)) {
      IePresent = *(pIeTable + 1);
      IeMinLen = *(pIeTable + 2);
      IeMaxLen = *(pIeTable + 3);
      IeVarType = *(pIeTable + 4);
      if ((IePresent == MANDATORY) &&
          (*pIe != IeType)) {
         MsgError = CAUSE_96;
         gCauseDiag = IeType;
         break;
      }
      if ((IeType == *pIe) &&
          (IeVarType != FLAG) &&
          (IeVarType != SHIFT)) {
         if (((*(pIe + 1) < IeMinLen)) ||
             ((*(pIe + 1) > IeMaxLen))) {
            MsgError = CAUSE_100;
            gCauseDiag = IeType;
            break;
         }
         hIe = GetIeIndex (IeType, CodeSet);
         pCallData = GetIePtr (hIe);
         IeLen = *(++pIeData);
         for (j = 0; j < (IeLen + 1); ++j)
            *(pCallData++) = *(pIeData++);
         pIe = GetNextIE (pIe);
      }
      else if ((IeType == *pIe) &&
               (IeVarType == SHIFT)) {
         CodeSet = IeType;
         hIe = GetIeIndex (IeType, CodeSet);
         pCallData = GetIePtr (hIe);
         *(pCallData++) = *(pIeData++);
         ++pIe;
      }
      else if ((IeType == *pIe) &&
               (IeVarType == FLAG)) {
         hIe = GetIeIndex (IeType, CodeSet);
         pCallData = GetIePtr (hIe);
         *(pCallData++) = *(pIeData++);
         ++pIe;
      }
   }
   ++i;
   pIeTable += MAX_IE_PARAM;
  }
 }
 return (MsgError);
}
```

```
/*****************************************************************
Function: WriteMsgData
Input:   A count of bytes into the message buffer where the
         first information element should be located, and a
         pointer to the layer 3 xmt message buffer.
Returns: False if message writes ok, or a CAUSE code
         if an error occurs.

This is the message engine that transfers the
         information element parameters from the call data
         arrays to the the layer 3 xmt message buffer.  The
         possible information elements for a given
         message are defined by tables in COE_MSG.C
*****************************************************************/

UINT WriteMsgData (UCHAR IePosition, PUCHAR pMsg) {

UCHAR MsgCode =      GetMsgIndex (*pDbXmtMsgType);
   PUCHAR pIeTable =    GetMsgPtr (MsgCode);
   PUCHAR pNextIe =     (pMsg + IePosition);
   PUCHAR pLastIe =     pNextIe;
   PUCHAR pCallData;
   UCHAR IeIndexTotal = GetMaxIe (MsgCode);
   UCHAR i =            0;
   UCHAR j =            0;
   UCHAR IeLen =        0;
   UCHAR IeType;
   UCHAR IePresent;
   UCHAR IeVarType;
   UCHAR IeSentBy;
   UCHAR hIe;
   XUINT TotalMsgBytes = (IePosition - 1);
   UCHAR CodeSet =      IE_LOCKING_SHIFT_0;
   BOOL IeAfterShift =  TRUE;

gLastIeType =   0;
   gIeRepeatCnt =  0;

while (i < IeIndexTotal) {
      IeType = *pIeTable;
      IeSentBy = *(pIeTable + 5);
      if ((IeSentBy == NETWORK) ||
          (IeSentBy == BOTH)) {
         IePresent = *(pIeTable + 1);
         IeVarType = *(pIeTable + 4);
         hIe = GetIeIndex (IeType, CodeSet);
         pCallData = GetIePtr (hIe);

if ((IePresent == MANDATORY) &&
             (IeVarType != SHIFT)) { pLastIe = pNextIe;
            *pCallData &= IE_SEND_MASK;
            IeLen = *(pCallData++);
```

```
            *(pNextIe++) = IeType;
            *(pNextIe++) = IeLen;
            TotalMsgBytes += (IeLen + 2);
            for (j = 0; j < IeLen; ++j)
                *(pNextIe++) = *(pCallData++);
            IeAfterShift = TRUE;
        }
        else if ((IePresent != MANDATORY) &&
            (IeVarType != SHIFT) &&
            (*pCallData & IE_SEND_FLAG)) {

*pCallData &= IE_SEND_MASK;
            IeLen = *(pCallData++);
            pLastIe = pNextIe;
            *(pNextIe++) = IeType;
            *(pNextIe++) = IeLen;
            TotalMsgBytes += (IeLen + 2);
            for (j = 0; j < IeLen; ++j)
                *(pNextIe++) = *(pCallData++);
            IeAfterShift = TRUE;
        }
        else if ((IePresent == COPY) &&
            (*pCallData != 0x00)) {

*pCallData &= IE_SEND_MASK;
            IeLen = *pCallData;
            *(pCallData++) = 0x00;
            pLastIe = pNextIe;
            *(pNextIe++) = IeType;
            *(pNextIe++) = IeLen;
            TotalMsgBytes += (IeLen + 2);
            for (j = 0; j < IeLen; ++j)
                *(pNextIe++) = *(pCallData++);
            IeAfterShift = TRUE;
        }
        else if (IeVarType == SHIFT) {
            if (!IeAfterShift) {
                pNextIe = pLastIe;
                --TotalMsgBytes;
            }
            IeAfterShift = FALSE;
            pLastIe = pNextIe;
            ++TotalMsgBytes;
            *(pNextIe++) = IeType;
            CodeSet = IeType;
        }
    }
    ++i;
    pIeTable += MAX_IE_PARAM;
}
if (!IeAfterShift) {
    *pLastIe = 0x00;
    --TotalMsgBytes;
}
```

```
    return (TotalMsgBytes);
}

/****************************************************************
Function: GetFeatureInfo
Input:   None
Returns: Feature indication data Access function that inspects the called number
         for the star character (*) and returns the first
         digit to follow it.
****************************************************************/

UCHAR GetFeatureInfo (void) {

UCHAR Feature = 0;

if ((*pDbCalledDN == '*') && (*(pDbCalledDN + 1)))
      Feature = *(pDbCalledDN + 1);

return (Feature);

}

/****************************************************************
Function: GetAddressInfo
Input:   Pointer to an information element containing
         address data; may be calling party number or
         keypad info elements
Returns: False or cause code if an error occurs during
         address parsing.

This function inspects the addressing data and
         determines if enough digits have been dialed
         (correctly) to further process the address with
         GetCalledTe().
****************************************************************/

UCHAR GetAddressInfo (PUCHAR pAddressIe) {

UCHAR AddrIndex;
   UCHAR DigitCnt;
   UCHAR AddressError = FALSE;

if (pAddressIe == pIeCalledPartyNo) {
      AddrIndex = 2;
      DigitCnt = (*pAddressIe - 1);
   }
   else {
      AddrIndex = 1;
      DigitCnt = *pAddressIe;
   } if ((*pDbDNIndex == 0) &&
```

```
        ((*(pAddressIe + AddrIndex) < '2') ||
        (*(pAddressIe + AddrIndex) > '8'))) {
      --DigitCnt;
      CopyData ((pAddressIe + AddrIndex),
            (pAddressIe + (AddrIndex + 1)),
              DigitCnt);
    } if (DigitCnt > MAX_DN_LENGTH) {
      DigitCnt = (MAX_DN_LENGTH - 1);
      AddressError = CAUSE_14;
    }
    else if ((DigitCnt + *pDbDNIndex) > MAX_DN_LENGTH) {
      DigitCnt = ((MAX_DN_LENGTH - 1) - *pDbDNIndex);
      AddressError = CAUSE_14;
    }
    if ((GetCallState (*pDbLocalhCall) == CS_NULL) ||
      (GetCallState (*pDbLocalhCall) == CS_OVERLAP_SEND)) {

CopyData ((pDbCalledDN + *pDbDNIndex),
            (pAddressIe + AddrIndex),
              DigitCnt);
      *pDbDNIndex += DigitCnt;
      *pAddressIe = 0;
    } return (AddressError);
}

/***************************************************************
  Function: GetIeHandle
  Input:    A pointer to an Information Element.
  Returns:  An index to the pointer's location in the
            IePtrTable.

General purose access function used by this module.
***************************************************************/

UCHAR GetIeHandle (PUCHAR pIe) {

UCHAR i;
  UCHAR hIe = 0;

for (i = 0; i <MAX_IE_TYPES; ++i) {
    if (IePtrTable[i] == pIe) {
      hIe = i;
      break;
    }
  } return (hIe);
}
/***************************************************************
```

```
Function: CopyIeData
Input:   Pointers to source and destination calls, and a
         pointer to an information element.
Returns: None Copies information element data from one call
         to another.
****************************************************************/ void CopyIeData (UCHAR hDestCall, UCHAR hSrcCall, PUCHAR pIe) {

PUCHAR pIeTo   = NULL;
    PUCHAR pIeFrom = NULL;
    UCHAR hIe;
    UCHAR hLocalCall = *pDbLocalhCall;

if ((hDestCall) && (hSrcCall)) { if (((GetCallState (hDestCall) != CS_NULL) &&
            (GetCallState (hSrcCall) != CS_NULL))) { hIe = GetIeHandle (pIe);

if (hDestCall == hLocalCall) {
                pIeTo = pIe;
                if (GetOtherCall (hSrcCall))
                    pIeFrom = GetIePtr (hIe);
            }
            else if (hSrcCall == hLocalCall) {
                pIeFrom = pIe;
                if (GetOtherCall (hDestCall))
                    pIeTo = GetIePtr (hIe);
            }
            if ((pIeFrom != NULL) && (pIeTo != NULL)) {
                if (*pIeFrom) {
                    CopyData (pIeTo, pIeFrom, (*pIeFrom + 1));
                    *pIeTo |= IE_SEND_FLAG;
                }
            }
            GetOtherCall (hLocalCall);
        }
    }
}

/****************************************************************
Function: GetChanPtr
Input:   None
Returns: Pointer to a port's channel status byte

****************************************************************/

PUCHAR GetChanPtr (void) {

PXUCHAR pChannel = NULL;
```

```
   switch (*pDbPort) { case PORT1:
      pChannel = &gP1BusyChan;
      break;

case PORT2:
      pChannel = &gP2BusyChan;
      break;

default:
      LogError (LOG_ERR_UNDEFINED_PORT);
      break;
   }
   return (pChannel);
}

/*****************************************************************
Function: ReserveChannel
Input:    None
Returns:  Channel ID information element constant in the
          current calls Channel ID info element. Returns False
          if a channel is assigned, or a cause code if
          assignment fails.

Used by Layer 3 for B channel requests from orig
          calls (outgoing calls)
*****************************************************************/

UCHAR ReserveChannel (void) {

PXUCHAR pChanFlags =   GetChanPtr ();
   UCHAR ChannelError =   FALSE;

if ((*(pIeChannelID + 1) == 0) ||
       ((*(pIeChannelID + 1) & CHANNEL_ID_ANY) == CHANNEL_ID_ANY) ||
       ((*(pIeChannelID + 1) & CHANNEL_ID_EXCLUSIVE) == CHANNEL_ID_NONE)) {

*pIeChannelID = (1 | IE_SEND_FLAG);
      *(pIeChannelID + 1) = CHANNEL_ID_EXCLUSIVE;

switch (*pChanFlags) { case 0x00:
            *pChanFlags = 0x01;
            *(pIeChannelID + 1) |= CHANNEL_ID_B1;
            break;

case 0x01:
            *pChanFlags = 0x03;
            *(pIeChannelID + 1) |= CHANNEL_ID_B2;
```

```
              break;

case 0x02:
            *pChanFlags = 0x03;
            *(pIeChannelID + 1) |= CHANNEL_ID_B1;
            break;

case 0x03:
            *(pIeChannelID + 1) = CHANNEL_ID_NONE;
            ChannelError = CAUSE_34;
            break;
          }

}
  else if ((*(pIeChannelID + 1) &
    CHANNEL_ID_EXCLUSIVE) == CHANNEL_ID_EXCLUSIVE) {
    if (!(*(pIeChannelID + 1) & *pChanFlags)) {
      *pIeChannelID = (1 | IE_SEND_FLAG);
      *pChanFlags |= (*(pIeChannelID + 1) & CHANNEL_ID_MASK);
    }
    else
      ChannelError = CAUSE_34;
  }
  else {
    if (*pSwitchTypeSet == ATT_SWITCH_SET)
      ChannelError = CAUSE_66;
    else
      ChannelError = CAUSE_44;
  } return (ChannelError);
}

/****************************************************************
Function: SelectChannel
Input:   None
Returns: Channel ID constant in Channel ID information Element
         Returns False if channel assigned, or a cause code
         if assignment fails.

Used by Layer 3 to select an available B channel
         for terminating calls (incoming calls).
****************************************************************/

UCHAR SelectChannel (void) {

PXUCHAR pChanFlags =   GetChanPtr ();
  UCHAR ChannelError =   FALSE;

*pIeChannelID = 1;
  *(pIeChannelID + 1) = CHANNEL_ID_EXCLUSIVE;

switch (*pChanFlags) {
```

```
      case 0x00:
         *(pIeChannelID + 1) |= CHANNEL_ID_B1;
         *pChanFlags = 0x01;
         break;

case 0x01:
         *(pIeChannelID + 1) |= CHANNEL_ID_B2;
         *pChanFlags = 0x03;
         break;

case 0x02:
         *(pIeChannelID + 1) |= CHANNEL_ID_B1;
         *pChanFlags = 0x03;
         break;

case 0x03:
         *(pIeChannelID + 1) |= CHANNEL_ID_NONE;
         ChannelError = CAUSE_17;
         break;
      } return (ChannelError);
}

/***************************************************************
Function: ReleaseChannel
Input:    None
Returns:  None Uses the current call's Channel ID informtion
         element to reset the B channel status byte, making
         the B channel available for other calls.
***************************************************************/ void ReleaseChannel (void) {

UCHAR ChanId = ((*(pIeChannelID + 1) & CHANNEL_ID_MASK));
   PXUCHAR pChanFlags = GetChanPtr ();

switch (ChanId) { case 0x01:
         *pChanFlags &= 0x02;
         *pIeChannelID = 0;
         *(pIeChannelID + 1) = 0;
         break;

case 0x02:
         *pChanFlags &= 0x01;
         *pIeChannelID = 0;
         *(pIeChannelID + 1) = 0;
         break;

}
```

}

/*****************************************************************
Function: GetNextCallRef
Input:   None
Returns: The selected call reference number Used by Layer 3 to assign a unique call reference
        number to the current terminating (incoming)
        call.
*****************************************************************/

UCHAR GetNextCallRef (void) {

UCHAR ThisCallRef;

if (gNextCallRef > MAX_CALLS)
     gNextCallRef = 1;
  ThisCallRef = gNextCallRef;
  ++gNextCallRef;

return (ThisCallRef);
}

/*****************************************************************
Function: SendDisplay
Input:   Terminal ID for the selected terminal
Returns: None Formats terminal information text for display
        using the NI-1 display text information element.
*****************************************************************/ void SendDisplay (UCHAR TeID) {

XUCHAR hTerminal;
  XUCHAR Offset = 0;

switch (TeID) { case ORIGINATING:
       hTerminal = GetCalledTe ();
       *(pIeDisplayText + 1) = DISPLAY_TYPE;
       if (*pTotalCASet) {
          *(pIeDisplayText + 2) = TAG_CA_ID;
          *(pIeDisplayText + 3) = 2;
          *(pIeDisplayText + 4) = (*pDbCallAppearance + 0x60);
          *(pIeDisplayText + 5) = '=';
          Offset = 4;
       }
       *(pIeDisplayText + (2 + Offset)) = TAG_CALLED_DN;

```
        *(pIeDisplayText + (3 + Offset)) = 7;
        CopyData ((pIeDisplayText + (4 + Offset)),
                    &TeDN[hTerminal][3], 7);
        *(pIeDisplayText + (11 + Offset)) = TAG_CALLED_NAME;
        *(pIeDisplayText + (12 + Offset)) = 11;
        *(pIeDisplayText + (13 + Offset)) = ' ';
        CopyData ((pIeDisplayText + (14 + Offset)),
                    TeName[hTerminal], 10);
        *pIeDisplayText = ((23 + Offset) | 0x80);
        break;

case TERMINATING:
        hTerminal = GetTeHandle (SEARCH_CALLS, pDbRemotehCall);
        *(pIeDisplayText + 1) = DISPLAY_TYPE;
        if (*pTotalCASet) {
            *(pIeDisplayText + 2) = TAG_CA_ID;
            *(pIeDisplayText + 3) = 2;
            *(pIeDisplayText + 4) = (*pDbCallAppearance + 0x60);
            *(pIeDisplayText + 5) = '=';
            Offset = 4;
        }
        *(pIeDisplayText + (2 + Offset)) = TAG_CALLING_DN;
        *(pIeDisplayText + (3 + Offset)) = 7;
        CopyData ((pIeDisplayText + (4 + Offset)),
                    &TeDN[hTerminal][3], 7);
        *(pIeDisplayText + (11 + Offset)) = TAG_CALLING_NAME;
        *(pIeDisplayText + (12 + Offset)) = 11;
        *(pIeDisplayText + (13 + Offset)) = ' ';
        CopyData ((pIeDisplayText + (14 + Offset)),
                    TeName[hTerminal], 10);
        *pIeDisplayText = ((23 + Offset) | 0x80);
        break;
    }
}

/***************************************************************
Function: SendATTDisplay
Input:    Terminal ID for the selected terminal
Returns:  None Formats terminal information text for display
            using AT&T's display field information elements.
****************************************************************/ void SendATTDisplay (UCHAR TeID) {

XUCHAR hTerminal;

switch (TeID) { case ORIGINATING:
            hTerminal = GetCalledTe ();
```

```
        if (*pTotalCASet) {
           SendIeData (pIeDisplayField1,
                 4,
                 FIELD_MODE_NORMAL,
                 FIELD_CA,
                 0x20);
                 *(pIeDisplayField1 + 4) =
                 (*pDbCallAppearance + 0x60);
        }
        SendIeData (pIeDisplayField2,
              (sizeof(TeDN[hTerminal]) - 2),
              FIELD_MODE_NORMAL,
              FIELD_CALLED_PARTY_ID,
              BLANK);
        CopyData ((pIeDisplayField2 + 3),
                  &TeDN[hTerminal][3], 7);
        SendIeData (pIeDisplayField3,
              (sizeof(TeName[hTerminal]) + 1),
              FIELD_MODE_NORMAL,
              FIELD_CALLED_NAME,
              BLANK);
        CopyString ((pIeDisplayField3 + 3),
                   TeName[hTerminal]);
        break;

case TERMINATING:
        hTerminal = GetTeHandle (SEARCH_CALLS, pDbRemotehCall);
        if (*pTotalCASet) {
           SendIeData (pIeDisplayField1,
                 4,
                 FIELD_MODE_NORMAL,
                 FIELD_CA,
                 0x20);
                 *(pIeDisplayField1 + 4) =
                 (*pDbCallAppearance + 0x60);
        }
        SendIeData (pIeDisplayField2,
              (sizeof(TeDN[hTerminal]) - 2),
              FIELD_MODE_NORMAL,
              FIELD_CALLING_PARTY_ID,
              BLANK);
        CopyData ((pIeDisplayField2 + 3),
                  &TeDN[hTerminal][3], 7);
        SendIeData (pIeDisplayField3,
              (sizeof(TeName[hTerminal]) + 1),
              FIELD_MODE_NORMAL,
              FIELD_CALLING_NAME,
              BLANK);
        CopyString ((pIeDisplayField3 + 3),
                   TeName[hTerminal]);
        break;
   }
}
```

```
/****************************************************************
Function: TestCallingPartyNo
Input:   None
Returns: True if calling party number exists and can be
         presented to called party.
****************************************************************/

UCHAR TestCallingPartyNo (void) {

UCHAR DisplayCPN = FALSE;

if (*pCallerIDSet) {
    if (*pIeCallingPartyNo) {
      if (!(*(pIeCallingPartyNo + 1) & EXT_BIT_FLAG)) {
        if (!(*(pIeCallingPartyNo + 2) &
            CPN_NO_PRESENTATION))
          DisplayCPN = TRUE;
      }
    }
    else {
      *pIeCallingPartyNo = 9;
      *(pIeCallingPartyNo + 1) = CPN_LOCAL_ISDN_EXT;
      *(pIeCallingPartyNo + 2) = CPN_PRESENTATION;
      CopyData ((pIeCallingPartyNo + 3), (pTeDN + 3), 7);
      DisplayCPN = TRUE;
    }
  }
  return (DisplayCPN);

}

/****************************************************************
Function: TestCallTimer
Input:   Handle (array subscript) to the call data array
Returns: True, if timer has expired.

Inspects the status of any network timer
         associated for the call defined by hCall.
****************************************************************/

UCHAR TestCallTimer (UCHAR hCall) {

UCHAR DoTimer = FALSE;

if (DbTimerTime[hCall]) {
    if (TimeExpire (DbTimerStart[hCall], DbTimerTime[hCall])) {
      if (GetOtherCall (hCall))
        DoTimer = TRUE;
    }
  }
  return (DoTimer);
}
```

```
/****************************************************************
Function: TestBearerCap
Input:    None
Returns:  Cause code, if bearer capability information
          element is corrupt or not supported.

Used by layer 3 to test the bearer capability of
          the currently selected call.
****************************************************************/

UCHAR TestBearerCap (void) {

UCHAR CallType = *(pIeBearer + 1);
   UCHAR CallMode = *(pIeBearer + 2);
   UCHAR BCError;

if (((CallType == BC_SPEECH) ||
       (CallType == BC_3KHZ) ||
       (CallType == BC_7KHZ) ||
       (CallType == BC_UNRESTRICTED_DATA) ||
       (CallType == BC_RESTRICTED_DATA)) &&
       ((CallMode == BC_CIRCUIT_MODE) ||
       (CallMode == BC_PACKET_MODE)))

BCError = 0;
   else
     BCError = CAUSE_65;

return (BCError);

}

/****************************************************************
Function: GetCallType
Input:    None
Returns:  Assumes operation is voice, but returns data
          if the bearer capability info element carries
          the appropriate indicators.

Used by layer 3 to test the bearer capability of
          the currently selected call.
****************************************************************/

UCHAR GetCallType (void) {

XUCHAR CallType = BC_VOICE;

if ((*(pIeBearer + 1) == BC_UNRESTRICTED_DATA) ||
       (*(pIeBearer + 1) == BC_RESTRICTED_DATA))

CallType = BC_DATA;

return (CallType);
```

/****************************************************************

ISDN 2000 Central Office Emulator

Operating System Input/Output Module (c) 1994 Merge Technologies Inc.

General: This module contains all Input/Output control and
assess functions associated with the Operating System, i.e.
Display, Printer, Keypad, Real Time Clock, and Serial Port.

For access to telephony I/O, such as the TSI, tone
generator, and interfaces, see COE_SWCH.C
****************************************************************/

```c
#ifndef NODEBUG
pragma DEBUG CODE SYMBOLS OBJECTEXTEND
endif include <coe.h>
include <coe_reg.h>
include <lib_io.h>
#include <coe_io.h>
#include <lib_util.h>
include <lib_str.h>
#include <lib_swch.h>

/****************************************************************
   Function:  InitRegisters
   Input:     None
   Returns:   None Initializes the 8051 microprocessor's
           internal registers.
****************************************************************/ void InitRegisters (void) {

SCON  = 0x50;     // Mode 1, 8-bit UART, REN = TRUE
    TMOD |= 0x22;     // Timer 1, mode 2, 8-bit reload
    TH1   = 0xfe;     // Reload value for 19200 baud
    TH0   = 0xc0;     // Reload value for 125 uSec
    TR1   = TRUE;     // Timer 1 on
    TI    = FALSE;    // Disable UART xmitter
    RI    = FALSE;    // Reset receive serial interrupt
    IP    = 0x01;     // External Interrupt 0 has priority
    ES    = TRUE;     // Enable serial interrupts
    EA    = TRUE;     // Enable global interrupts
    REN   = TRUE;     // Enable serial reception
    CTS   = ENABLE;   // CTS = High
}
```

/****************************************************************

```
Function: Reset
Input:    None
Returns:  None

Resets all emulator peripheral components,
        such as the Time Slot Interchanger, Display,
        IDEC, etc. Includes a multi-reset for the
        U interface coldstart.
****************************************************************/ void Reset (void) {

RESET_ALL = ENABLE;
  Pause (15);
  RESET_ALL = DISABLE;
  Pause (25);
  RESET_ALL = ENABLE;
  Pause (15);
  RESET_ALL = DISABLE;
}

/****************************************************************
Function: PrtStr
Input:    Buffers serial xmt string and sends first char
Returns:  True if buffered, false if buffer full Used for printing null-terminated strings
****************************************************************/

UCHAR PrtStr (PCHAR pStr) {

UCHAR i = 0;
  UCHAR Buffered = FALSE;

if ((!XmtIndex) && (!XmtBuffer[XmtIndex])) {
    ES = FALSE;
    Buffered = TRUE;
    while (*(pStr + i)) {
      XmtBuffer[i] = *(pStr + i);
      ++i;
    }
    XmtBuffer[i] = 0;
    TI = FALSE;
    SBUF = XmtBuffer[XmtIndex];
    ++XmtIndex;
    ES = TRUE;
  }
  return (Buffered);
}

/****************************************************************
Function: SendChar
```

```
Input:   Buffers serial xmt char
Returns: None

Used for sending single characters
****************************************************************/ void SendChar (CHAR c) { while ((XmtIndex) || (XmtBuffer[XmtIndex]));
   ES = FALSE;
   XmtBuffer[0] = c;
   XmtBuffer[1] = 0;
   TI = FALSE;
   SBUF = XmtBuffer[XmtIndex];
   ++XmtIndex;
   ES = TRUE;
}

/****************************************************************
Function: PrintLF
Input:    Sends CR (LF) to printer
Returns:  None

****************************************************************/ void PrintLF (CHAR TotalLF) {

UCHAR i = 0;

for (i = 0; i < TotalLF; ++i)
      SendChar (SERIAL_CR);

}

/****************************************************************
Function: Print
Input:    Pointer to a string terminated with zero
Returns:  None Outputs a character string to the serial port,
          printer.
****************************************************************/ void Print (UCHAR Format, PCHAR PrtString) { switch (Format) { case PRT_PTR:
         SendChar (' ');
         SendChar (' ');
         while (!PrtStr (PrtString));
         SendChar (SERIAL_CR);
         break;
```

```
        case PRT_RESPONSE:
            SendChar (SERIAL_LF);
            while (!PrtStr (PrtString));
            SendChar (SERIAL_CR);
            SendChar (SERIAL_LF);
            break;

case PRT_LINE:
            while (!PrtStr (PrtString));
            SendChar (SERIAL_CR);
            SendChar (SERIAL_LF);
            break;

case PRT_HEADER:
            SendChar (SERIAL_CR);
            SendChar (SERIAL_CR);
            SendChar (SERIAL_CR);
            SendChar (' ');
            SendChar (' ');
            while (!PrtStr (pszSignOn1));
            SendChar (SERIAL_CR);
            SendChar (' ');
            SendChar (' ');
            while (!PrtStr (pszSignOn2));
            SendChar (SERIAL_CR);
            SendChar (' ');
            SendChar (' ');
            while (!PrtStr (pszSignOn3));
            SendChar (SERIAL_CR);
            SendChar (' ');
            SendChar (' ');
            while (!PrtStr (pszSignOn4));
            SendChar (SERIAL_CR);
            SendChar (SERIAL_CR);
            SendChar (SERIAL_CR);
            break;
    }

}

/****************************************************************
Function:  Putbyte
Input:     Single character to send to display device
Returns:   Character sent This function is currently mapped to the 4x20
        display panel at J5.
****************************************************************/ void PutByte (CHAR c) { while (DISPLAY_BUSY);
    EA = FALSE;
```

```
  ENABLE_DISPLAY = 0;
  *NULL_ADDR = c;
  ENABLE_DISPLAY = 1;
  EA = TRUE;
}

/****************************************************************
Function:  ClearDisplay
Input:     None
Returns:   None

****************************************************************/ void ClrDisplay (void) {

PutByte (CLR);
  PutByte (CURSOR_OFF);
  PutByte (AUTO_CR_OFF);
}

/****************************************************************
Function:  DisplayPosition
Input:     Row and column coordinates to position cursor
Returns:   Nothing

****************************************************************/ void DisplayPosition (CHAR Row, CHAR Column) {

Row -= 1;
  Column -= 1;
  if (Row < 0)
    Row = 0;
  if (Row > (MAX_DISPLAY_ROWS - 1))
    Row = (MAX_DISPLAY_ROWS - 1);
  if (Column < 0)
    Column = 0;
  if (Column > (MAX_DISPLAY_COLUMNS - 1))
    Column = (MAX_DISPLAY_COLUMNS - 1);

PutByte (CURSOR_MOVE);
  PutByte (CursorMap[Row][Column]);
  PutByte (CURSOR_OFF);
  PutByte (AUTO_CR_OFF);

}

/****************************************************************
Function:  Display
Input:     Text string to display
Returns:   Nothing This is the main display function
****************************************************************/
```

```
void Display (PCHAR pszString) {

UCHAR i;

for (i = 0; i < MAX_DISPLAY_COLUMNS; ++i) {
        if (*(pszString + i) == 0)
            break;
        PutByte (*(pszString + i));
    }
}

/****************************************************************
Function: DisplayMsg
Input:    Pointers to two character strings
Returns:  None General purpose display function for two line
          messages and prompts.
****************************************************************/ void DisplayMsg (PCHAR pLine1, PCHAR pLine2) {

ClrDisplay ();
    Display (pszDashLine);
    Display (pLine1);
    Display (pLine2);
    Display (pszDashLine);

}

/****************************************************************
Function: DisplayProgress
Input:    Pointer to a character string to display, and an
          integer representing seconds to display it.
Returns:  None Displays a one line message while updating a
          progress bar at the bottom line of the display.
****************************************************************/ void DisplayProgress (PCHAR pString, UINT Seconds) {

UCHAR i;
    UINT PauseTime;

Seconds *= 500;
    PauseTime = Seconds/20;

ClrDisplay ();
    DisplayPosition (1,1);
    Display ("INITIALIZING...");
    DisplayPosition (3,1);
```

```
    Display (pString);
    DisplayPosition (4,1);

for (i = 1; i <= 20; ++i) {
      DisplayPosition (4,i);
      Display (SolidBlock);
      Pause (PauseTime);
    }
}

/***************************************************************
Function: SetEmuOn
Input:   None
Returns: None Turns on keypad's Emulation Active LED.
***************************************************************/ void SetEmuOn (void) { if (!gRemote) {
       SendChar (0x1b);
       SendChar (0x07);
    }
    else
       Print (PRT_RESPONSE, pszActive);
}

/***************************************************************
Function: SetEmuOff
Input:   None
Returns: None Turns off keypad's Emulation Active LED.
***************************************************************/ void SetEmuOff (void) { if (!gRemote) {
       SendChar (0x1b);
       SendChar (0x0b);
    }
    else
       Print (PRT_RESPONSE, pszHalted);
}

/***************************************************************
Function: DoRemote
Input:   None
Returns: None

***************************************************************/
```

```
void DoRemote (void) {

UCHAR i;

switch (gRemCmd) { case 'E':
            if (gRemParam == 1)
                gKbdBuffer = KBD_EMULATE;
            else
                gKbdBuffer = KBD_BREAK;
            gRemCmd = 0;
            gRemSet = 0;
            gRemParam = 0;
            break;

case 'M':
            if (gRemParam) {
                if (PutEoc (gRemSet, pEocStr)) {
                    SendChar (SERIAL_LF);
                    if (gRemSet == PORT1)
                        while (!PrtStr (pszXmtP1Eoc));
                    else
                        while (!PrtStr (pszXmtP2Eoc));
                    while (!PrtStr (pEocStr));
                    SendChar (SERIAL_CR);
                    SendChar (SERIAL_LF);
                    for (i = 0; i <= MAX_EOC_STRING; ++i)
                        *(pEocStr + i) = 0;
                }
                else
                    Print (PRT_RESPONSE, pszError);
            }
            else {
                if (GetEoc (gRemSet, pEocStr)) {
                    SendChar (SERIAL_LF);
                    if (gRemSet == PORT1)
                        while (!PrtStr (pszRcvP1Eoc));
                    else
                        while (!PrtStr (pszRcvP2Eoc));
                    while (!PrtStr (pEocStr));
                    SendChar (SERIAL_CR);
                    SendChar (SERIAL_LF);
                    for (i = 0; i <= MAX_EOC_STRING; ++i)
                        *(pEocStr + i) = 0;
                }
                else
                    Print (PRT_RESPONSE, pszError);
            }
            gRemCmd = 0;
            gRemSet = 0;
            gRemParam = 0;
            break;
```

```
      case 'V':
        Print (PRT_RESPONSE, pszVersion2);
        gRemCmd = 0;
        gRemSet = 0;
        gRemParam = 0;
        break;

case 'T':
        if (gRemParam) {
           gTraceOn = TRUE;
           Print (PRT_RESPONSE, pszTraceOn);
        }
        else {
           gTraceOn = FALSE;
           Print (PRT_RESPONSE, pszTraceOff);
        }
        gRemCmd = 0;
        gRemSet = 0;
        gRemParam = 0;
        break;

case 'R':
        gKbdBuffer = KBD_RESTART;
        gEmulateEsc = KBD_RESTART;
        Print (PRT_RESPONSE, pszRestart);
        gRemCmd = 0;
        gRemSet = 0;
        gRemParam = 0;
        break;

case 'S':
        gKbdBuffer = KBD_F4;
        break;

default:
        CTS = ENABLE;
        gKbdBuffer = KBD_NULL;
        gRemCmd = 0;
        gRemSet = 0;
        gRemParam = 0;
        Print (PRT_RESPONSE, pszError);
        break;
   }
}

/**************************************************************
Function: ParseRem
Input:   None
Returns: None

**************************************************************/
```

```
void ParseRem (void) {

UCHAR i = 0;
  UCHAR j = 0;

gKeyPressed = TRUE;
  gRemCmd = 0;
  gRemParam = 0;
  gRemSet = 0;

if (RcvBuffer[i] == '!') {
     ++i;
     gRemCmd = RcvBuffer[i];
     gRemCmd &= CAP_MASK;
     if ((gRemCmd >= 'A') && (gRemCmd <= 'Z')) {
        ++i;
        while (RcvBuffer[i] == ' ')
           ++i;
        if ((RcvBuffer[i] >= '0') &&
            (RcvBuffer[i] <= '9')) {
           gRemSet = RcvBuffer[i];
           gRemSet &= 0x0f;
           ++i;
           if ((RcvBuffer[i] >= '0') &&
               (RcvBuffer[i] <= '9')) {
              gRemSet *= 10;
              RcvBuffer[i] &= 0x0f;
              gRemSet += RcvBuffer[i];
              ++i;
           }
        }
        while (RcvBuffer[i] == ' ')
           ++i;
        if (RcvBuffer[i] == '=') {
           ++i;
           while (RcvBuffer[i] == ' ')
              ++i;
           if (gRemCmd == 'M') {
              if (RcvBuffer[i]) {
                 gRemParam = TRUE;
                 for (j = 0; j < MAX_EOC_STRING; ++j) {
                    if (RcvBuffer[i] >= 'a' &&
                        RcvBuffer[i] <= 'z')
                       RcvBuffer[i] &= CAP_MASK;
                    *(pEocStr + j) = RcvBuffer[i++];
                 }
              }
           }
           else if ((RcvBuffer[i] >= '0') &&
                    (RcvBuffer[i] <= '9')) {
              gRemParam = RcvBuffer[i];
              gRemParam &= 0x0f;
              ++i;
```

```
                if ((RcvBuffer[i] >= '0') &&
                    (RcvBuffer[i] <= '9')) {
                    gRemParam *= 10;
                    RcvBuffer[i] &= 0x0f;
                    gRemParam += RcvBuffer[i];
                }
            }
            else
                gRemParam = UNKNOWN;
        }
        else if (gRemCmd == 'M') {
            gRemParam = FALSE;
            for (j = 0; j < MAX_EOC_STRING; ++j)
                *(pEocStr + j) = 0;
        }
        else
            gRemParam = UNKNOWN;
    }
    else {
        gRemCmd = 0;
        gRemSet = 0;
        gRemParam = 0;
        CTS = ENABLE;
    }
}
else {
    gRemCmd = 0;
    gRemSet = 0;
    gRemParam = 0;
    CTS = ENABLE;
}
if (gRemCmd == 'R')
    gEmulateEsc = KBD_RESTART;
else
    gEmulateEsc = KBD_BREAK;
RcvBuffer[0] = 0;
RcvIndex = 0;

}

/****************************************************************
    Function:    SerialIntHandler
    Input:    Serial I/O Interrupts
    Returns:  None Processes serial i/o for keyboard, printer, RS-232
****************************************************************/ void SerialIntHandler (void) interrupt 4 {

XUCHAR InByte = KBD_NULL;

if (RI) {
```

```
InByte =    SBUF;
gKeyPressed = TRUE;
RI =        FALSE;

switch (InByte) { case KEYPAD_1:
        gRemote = FALSE;
        gKbdBuffer = KBD_EMULATE;
        break;

case KEYPAD_2:
        gRemote = FALSE;
        gKbdBuffer = KBD_BREAK;
        gEmulateEsc = KBD_BREAK;
        break;

case KEYPAD_3:
        gRemote = FALSE;
        gKbdBuffer = KBD_RESTART;
        gEmulateEsc = KBD_RESTART;
        break;

case KEYPAD_4:
        gRemote = FALSE;
        gKbdBuffer = KBD_F1;
        gEmulateEsc = KBD_F1;
        break;

case KEYPAD_5:
        gRemote = FALSE;
        gKbdBuffer = KBD_MON_L1;
        gEmulateEsc = KBD_MON_L1;
        break;

case KEYPAD_6:
        gRemote = FALSE;
        gKbdBuffer = KBD_UP;
        gEmulateEsc = KBD_NULL;
        break;

case KEYPAD_7:
        gRemote = FALSE;
        gKbdBuffer = KBD_DOWN;
        gEmulateEsc = KBD_NULL;
        break;

case KEYPAD_8:
        gRemote = FALSE;
        gKbdBuffer = KBD_F2;
        gEmulateEsc = KBD_F2;
        break;

case KEYPAD_9: // BS in remote mode
```

```
      if (!gRemote) {
         gKbdBuffer = KBD_TRC_L2;
         gEmulateEsc = KBD_TRC_L2;
      }
      else {
         --RcvIndex;
         gKeyPressed = FALSE;
         SBUF = SERIAL_BS;
      }
      break;

case KEYPAD_10:
      gRemote = FALSE;
      gKbdBuffer = KBD_PGUP;
      gEmulateEsc = KBD_NULL;
      break;

case KEYPAD_11: // LF in remote mode
      if (!gRemote) {
         gKbdBuffer = KBD_PGDOWN;
         gEmulateEsc = KBD_NULL;
      }
      else
         gKeyPressed = FALSE;
      break;

case KEYPAD_12:
      gRemote = FALSE;
      gKbdBuffer = KBD_F3;
      gEmulateEsc = KBD_F3;
      break;

case KEYPAD_13:
      gRemote = FALSE;
      gKbdBuffer = KBD_TRC_L3;
      gEmulateEsc = KBD_TRC_L3;
      break;

case KEYPAD_14: // CR in remote mode
      if (!gRemote) {
         gKbdBuffer = KBD_ENTER;
         gEmulateEsc = KBD_NULL;
      }
      else {
         CTS = DISABLE;
         RcvBuffer[RcvIndex] = 0;
         ParseRem ();
      }
      break;

case KEYPAD_15:
      gRemote = FALSE;
      gKbdBuffer = KBD_PRINT;
      gEmulateEsc = KBD_NULL;
```

```
              break;

case KEYPAD_16:
              gRemote = FALSE;
              gKbdBuffer = KBD_F4;
              gEmulateEsc = KBD_F4;
              break;

default:
              gEmulateEsc = KBD_NULL;
              gKbdBuffer = KBD_NULL;
              gKeyPressed = FALSE;
              gRemote = TRUE;
              SBUF = InByte;
              if ((RcvIndex + 1) < MAX_DESCRIPT_LENGTH)
                  RcvBuffer[RcvIndex++] = InByte;
              else
                  RcvIndex = 0;
              break;
      }
  }
  if (TI) {
      TI = FALSE;
      if (XmtBuffer[XmtIndex])
          SBUF = XmtBuffer[XmtIndex++];
      else {
          XmtIndex = 0;
          XmtBuffer[XmtIndex] = 0;
      }
  }
}

/****************************************************************
Function:  GetKbd
Input:     Gets character from interrupt kbd buffer
Returns:   Character if one is there, sets flag false
           if no character. Clears buffer for next char.

Use this routine to get characters on the fly.
****************************************************************/

UCHAR GetKbd (void) { if (!gKeyPressed)
        gKbdBuffer = KBD_NULL;
    else
        gKeyPressed = FALSE;
    return (gKbdBuffer);
}

/****************************************************************
Function:  OnKbd
Input:     Waits for character from interrupt kbd buffer
Returns:   Character from buffer
```

Use this routine to wait for a character.
**************************************************************/

UCHAR OnKbd (void) {

CTS = ENABLE;
  gKeyPressed = FALSE;
  while (!gKeyPressed);
  gKeyPressed = FALSE;
  if (gRemote)
     DoRemote ();
  return (gKbdBuffer);
}

/**************************************************************
  Function:  InitTime
  Input:     None
  Returns:   None Sets RTC to all zeros and starts the oscillator.
**************************************************************/ void InitTime (void) {

UCHAR i;
  UCHAR j;
  UCHAR BitMask;
  UCHAR RTCBit;

/* Send 8 byte enable sequence serially */

EA = FALSE;

RTCBit = *PTR_RTC;
  for (i = 0; i < MAX_RTC_REG; ++i) {
    BitMask = 0x01;
    for (j = 0; j < 8; ++j) {
      if (EnableSequence[i] & BitMask)
        *PTR_RTC = 0x01;
      else
        *PTR_RTC = 0x00;
      BitMask <<= 1;
    }
  }

/* Send RTC initialization data */ for (i = 0; i < MAX_RTC_REG; ++i) {
    BitMask = 0x01;
    for (j = 0; j < 8; ++j) {
      if (RTCData[i] & BitMask)
        *PTR_RTC = 0x01;

```
        else
            *PTR_RTC = 0x00;
        BitMask <<= 1;
      }
    }
    EA = TRUE;
}

/******************************************************************
Function:  GetTime
Input:     None
Returns:   Time stamp integer, where XXXX is XX.XX seconds

******************************************************************/

UINT GetTime (void) {

UCHAR i, j;
    UCHAR BitMask;
    UCHAR RTCBit;
    UCHAR RTCInputBuffer[MAX_RTC_REG] = {0,0,0,0,0,0,0,0};
    UINT TimeStamp = 0;

/* Send enable sequence */
    EA = FALSE;
    RTCBit = *PTR_RTC;
    for (i = 0; i < MAX_RTC_REG; ++i) {
      BitMask = 0x01;
      for (j = 0; j < 8; ++j) {
        if (EnableSequence[i] & BitMask)
            *PTR_RTC = 0x01;
        else
            *PTR_RTC = 0x00;
        BitMask <<= 1;
      }
    }

/* Read eight bytes from RTC serially on DQ0 */ for (i = 0; i < MAX_RTC_REG; ++i) {
      BitMask = 0x01;
      for (j = 0; j < 8; ++j) {
        RTCBit = *PTR_RTC;
        if (RTCBit & RTC_INPUT)
            RTCInputBuffer[i] |= BitMask;
        BitMask <<= 1;
      }
    }
    EA = TRUE;
    /* Convert 4 nibble BCD to an integer */

RTCBit = RTCInputBuffer[1];
    RTCBit >>= 4;
    TimeStamp = (RTCBit * 1000);
```

```
RTCBit = RTCInputBuffer[1];
RTCBit &= 0x0f;
TimeStamp = (TimeStamp + (RTCBit * 100));
RTCBit = RTCInputBuffer[0];
RTCBit >>= 4;
TimeStamp = (TimeStamp + (RTCBit * 10));
RTCBit = RTCInputBuffer[0];
RTCBit &= 0x0f;
TimeStamp += RTCBit;

return (TimeStamp);
}

/****************************************************************
Function: TimeExpire
Input:   Start Time and Duration expressed
         as shown above for GetTime().
Returns: True if duration completed

****************************************************************/

UCHAR TimeExpire (UINT StartTime, UINT Duration) {

UCHAR Expired = FALSE;
    UINT ElapsedTime = GetTime ();

if (ElapsedTime < StartTime)
        ElapsedTime += 6000;
    ElapsedTime -= StartTime;
    if (ElapsedTime > Duration)
        Expired = TRUE;
    return (Expired);
}
```

```
/***************************************************************

ISDN 2000 Central Office Emulator

ISDN Layer 1 Packet Processing Module (c) 1994 Merge Technologies Inc.

General: This module maintains the input and output buffers
   used by the IDEC packet handler in COE_SWCH.C. If the IDEC
   is not transmitting when Layer 2 stores a packet via this
   module, the SendPutPacket function loads the IDEC buffer.

This module also sends incoming and outgoing packets to the
   trace storage function in COE_TRC.C.
****************************************************************/ ifndef NODEBUG
pragma DEBUG CODE SYMBOLS OBJECTEXTEND
endif include <coe.h>
include <coe_reg.h>
#include <coe_l1.h>
#include <lib_io.h>
include <lib_swch.h>
include <lib_util.h>
include <lib_set.h>
#include <lib_trc.h>

/***************************************************************
   Function: GetPacket
   Input:    Pointer to a packet buffer and length of packet
   Returns:  Internal status (LOG_) code This routine unloads packets received from the IDEC
             from the input buffers. The IDEC interrupt function
             (Int0Handler in COE_SWCH.C) sets the BUFFER_FULL
             status.
****************************************************************/

UCHAR GetPacket (PUCHAR pPacket, PUINT pByteCnt) {

UCHAR PacketStatus = LOG_ERR_TIMEOUT;
   PXUCHAR pBuffer;

gOldHwys = gActiveHwys;
   gActiveHwys = SetIDEC (IDEC_INT_UPDATE);

if (gActiveHwys != gOldHwys) {
      PacketStatus = LOG_ERR_INTERFACE_CHANGE;
   }
   else if (gInBufferStatus[gInBufferPtr] == LOG_STAT_BUFFER_FULL) {
```

```
            EA = FALSE;

*pByteCnt = gInBytes[gInBufferPtr];
            pBuffer = gInBuffer[gInBufferPtr];
            CopyBuffer (pPacket, pBuffer, pByteCnt);
            ClearBuffer (pBuffer, pByteCnt);
            gInBytes[gInBufferPtr] = 0;
            gInBufferIndex[gInBufferPtr] = 0;
            gInBufferStatus[gInBufferPtr] = LOG_STAT_BUFFER_EMPTY;
            if (++gInBufferPtr == MAX_INPUT_BUFFERS)
               gInBufferPtr = 0;

EA = TRUE;

if ((GetField (GET_SAPI, pPacket) == SAPI_16) &&
                (GetField (GET_FRAME_FORMAT, pPacket) != I_FRAME))
               PutTrace (DIR_RCV, pPacket, pByteCnt);
            else if (GetField (GET_SAPI, pPacket) != SAPI_16)
               PutTrace (DIR_RCV, pPacket, pByteCnt);

PacketStatus = LOG_ERR_NO_ERRORS;
         }
         else
            DoRemTrace ();

return (PacketStatus);
      }

/***************************************************************
Function: SendPutPacket
Input:   None
Returns: None This function loads up to 64 bytes of packet data
         into the IDEC if a packet is stored in an output
         buffer and if the IDEC is not busy. If the IDEC is
         busy, the Int0Handler function in COE_SWCH.C loads
         the IDEC after an interrupt.
***************************************************************/ void SendPutPacket (void) {

XUCHAR PacketPort =       0;
   XUCHAR XmtRdy =           0;
   XUCHAR BytesLeft =        0;
   XUINT  ByteCnt =          0;
   PXUCHAR pIdecBase =              NULL;
   PXUCHAR pIdecXPR =               NULL;

if (gOutBufferStatus[gOutBufferPtr] == LOG_STAT_BUFFER_FULL) {

PacketPort = gOutBuffer[gOutBufferPtr][0];

if ((PacketPort & PORT_MASK) == PORT1_BIT) {
```

```
    PacketPort = PORT1;
    pIdecXPR = &gIdecXPR1;
    if (gActiveHwys & HWY0_STATUS) {
        pIdecBase = IDEC_HWY0_BASE;
    }
    else if (gActiveHwys & HWY2_STATUS) {
        pIdecBase = IDEC_HWY2_BASE;
    }
}
else if ((PacketPort & PORT_MASK) == PORT2_BIT) {
    PacketPort = PORT2;
    pIdecXPR = &gIdecXPR2;
    if (gActiveHwys & HWY1_STATUS) {
        pIdecBase = IDEC_HWY1_BASE;
    }
    else if (gActiveHwys & HWY3_STATUS) {
        pIdecBase = IDEC_HWY3_BASE;
    }
}
else
    LogIntError (LOG_ERR_UNDEFINED_PORT);

if ((pIdecXPR != NULL) && (pIdecBase != NULL)) {

XmtRdy = *(pIdecBase + IDEC_CMDR_OFFSET);
    XmtRdy &= IDEC_XMT_ENABLED;

if (XmtRdy)
        *pIdecXPR = TRUE;
    else
        *pIdecXPR = FALSE;

if (*pIdecXPR == TRUE) {
        if (gOutBufferIndex[gOutBufferPtr] == 0)
            ++gOutBufferIndex[gOutBufferPtr];
        while ((gOutBufferIndex[gOutBufferPtr] - 1 <
                gOutBytes[gOutBufferPtr]) &&
               (ByteCnt < MAX_IDEC_BYTES)) {
            *(pIdecBase + ByteCnt) =
                gOutBuffer[gOutBufferPtr][gOutBufferIndex[gOutBufferPtr]];
            ++gOutBufferIndex[gOutBufferPtr];
            ++ByteCnt;
        }
        BytesLeft = (gOutBytes[gOutBufferPtr] -
                (gOutBufferIndex[gOutBufferPtr] - 1));
        if (BytesLeft == 0) {
            BytesLeft = gOutBytes[gOutBufferPtr];
            for (ByteCnt = 0; ByteCnt < (BytesLeft + 1); ++ByteCnt)
                gOutBuffer[gOutBufferPtr][ByteCnt] = 0x00;
            gOutBufferStatus[gOutBufferPtr] = LOG_STAT_BUFFER_EMPTY;
            if (++gOutBufferPtr == MAX_OUTPUT_BUFFERS)
                gOutBufferPtr = 0;
            *(pIdecBase + IDEC_CMDR_OFFSET) = (IDEC_XHF | IDEC_XME);
        }
```

```
        else {
           *(pIdecBase + IDEC_CMDR_OFFSET) = IDEC_XHF;
           XmtRdy = *(pIdecBase + IDEC_CMDR_OFFSET);
           XmtRdy &= IDEC_XMT_ENABLED;

if (XmtRdy)
              *pIdecXPR = TRUE;
           else
              *pIdecXPR = FALSE;

while ((gOutBufferIndex[gOutBufferPtr] - 1 <
              gOutBytes[gOutBufferPtr]) &&
              (ByteCnt < MAX_IDEC_BYTES)) {
              *(pIdecBase + ByteCnt) =
              gOutBuffer[gOutBufferPtr][gOutBufferIndex[gOutBufferPtr]];
              ++gOutBufferIndex[gOutBufferPtr];
              ++ByteCnt;
           }
           BytesLeft = (gOutBytes[gOutBufferPtr] -
                 (gOutBufferIndex[gOutBufferPtr] - 1));
           if (BytesLeft == 0) {
              BytesLeft = gOutBytes[gOutBufferPtr];
              for (ByteCnt = 0; ByteCnt < (BytesLeft + 1); ++ByteCnt)
                 gOutBuffer[gOutBufferPtr][ByteCnt] = 0x00;
              gOutBufferStatus[gOutBufferPtr] = LOG_STAT_BUFFER_EMPTY;
              if (++gOutBufferPtr == MAX_OUTPUT_BUFFERS)
                 gOutBufferPtr = 0;
              *(pIdecBase + IDEC_CMDR_OFFSET) = (IDEC_XHF | IDEC_XME);
           }
           else {
              *pIdecXPR = FALSE;
              *(pIdecBase + IDEC_CMDR_OFFSET) = IDEC_XHF;
           }
        }
     }
   }
  }
}

/****************************************************************
Function: PutPacket
Input:    Pointers to a xmt data packet buffer and packet
          length.
Returns:  None This function loads the output buffers with
          packets sent by Layer 1. Any time this function
          is called, it tries to unload the buffer into
          the IDEC by calling SendPutPacket().
****************************************************************/ void PutPacket (PUCHAR pPacket, PUINT pByteCnt) {
```

```
UCHAR BufferPtr =      gOutBufferPtr;
UCHAR BuffersChecked = 0;
UCHAR ActivePort =     0;
UCHAR ThisPort =       GetField (GET_PORT, pPacket);
PXUCHAR pBuffer;

while (gOutBufferStatus[BufferPtr] == LOG_STAT_BUFFER_FULL) {
   if (++BufferPtr == MAX_OUTPUT_BUFFERS)
      BufferPtr = 0;
   ++BuffersChecked;
   if (BuffersChecked > MAX_OUTPUT_BUFFERS)
      BuffersChecked = 0;
} if ((GetField (GET_SAPI, pPacket) == SAPI_16) &&
   (GetField (GET_FRAME_FORMAT, pPacket) != I_FRAME))
   PutTrace (DIR_XMT, pPacket, pByteCnt);
else if (GetField (GET_SAPI, pPacket) != SAPI_16)
   PutTrace (DIR_XMT, pPacket, pByteCnt);

if (gActiveHwys & 0x05)
   ActivePort |= PORT1;
if (gActiveHwys & 0x0a)
   ActivePort |= PORT2;

if (ThisPort & ActivePort) {

EA = FALSE;
   pBuffer = gOutBuffer[BufferPtr];
   CopyBuffer (pBuffer, pPacket, pByteCnt);
   gOutBytes[BufferPtr] = *pByteCnt;
   gOutBufferIndex[BufferPtr] = 0;
   gOutBufferStatus[BufferPtr] = LOG_STAT_BUFFER_FULL;
   SendPutPacket ();
   EA = TRUE;
}
ClearBuffer (pPacket, pByteCnt);
}
```

/****************************************************************

ISDN 2000 Central Office Emulator

ISDN Layer 2 Data Link Processing Module (c) 1994 Merge Technologies Inc.

General: This module performs the Q.921 LAP-D protocol functions.
It sets up several global variables, including an array for
each Link Controller created. The array holds Link Controller
variables, such as Next Send (NS) and Next Receive (NR). Each
time an incoming packet is received or a Layer 3 packet is
rtrieved from the message (I Frame) queue, the array subscript
for that Link Controller is asssigned to a global variable
called gActiveLC. The Link Controller variables are then
transferred to a global array. This approach allows the same
code to process multiple Link Controllers in the least amount
of time, i.e. one access funtion performed per LAP-D process.

Notes:  1. The entry point for Layer 3 is DoILC().

2. The exit point for Layer 1 is DoCC().

3. Not all LAP-D functions are currently implemented,
           such as FRMR and full XID negotiation.
****************************************************************/ ifndef NODEBUG
pragma DEBUG CODE SYMBOLS OBJECTEXTEND
endif include <coe.h>
include <coe_reg.h>
include <coe_l2.h>
include <lib_l1.h>
include <lib_l2.h>
include <lib_io.h>
include <lib_swch.h>
include <lib_util.h>
include <lib_set.h>
include <lib_db.h>

/****************************************************************
Function: InitLayer2
Input:    None
Returns:  None Sets initial values for global layer 2 variables
****************************************************************/

```
void InitLayer2 (void) {

// Initialize Layer 2 Global Variables pLCRcvBytes = &LCRcvBytes;
    pLCXmtBytes = &LCXmtBytes;

gLCindex =        0;
        gLastLC =         0;
        gAckPending =     FALSE;
        gCheckTei =       0;
        gCheckPort =      0;
        gCheckBusy =      FALSE;
        gCheckResponse =  FALSE;
        gCheckTime =      0;
        gActivePort =     PORT1;
        gActiveSAPI =     SAPI_63;
        gActiveTEI =      127;
        ActiveTEI[0] =    127;
        ActiveTEI[1] =    127;
        gVR =             0;
        gVA =             0;
        gVS =             0;
        gPollMode =       FALSE;
        gLapdState =      TEI_ASSIGNED;
        gLapdType =       INDICATION;
        gLapdActivity =   DL_NULL;
        gCRbit =          FALSE;
        gUserBusy =       FALSE;
        gLCMsgInQueue =   FALSE;
        gMsgInQueue =     FALSE;

// Initialize Layer 3 Message Queue
    // ans Signaling Access Controller (SAC)

DoMsgQueue (QUEUE_INIT, pLCXmtBuffer, pLCXmtBytes);
}

/****************************************************************
Function: SetGlobalData
Input:   None
Returns: None Sets global LC variables to the values contained
        in the variable arrays indexed by gLCIndex.
****************************************************************/ void SetGlobalData (void) { gActivePort =   ActivePort[gLCindex];
    gActiveSAPI =   ActiveSAPI[gLCindex];
    gActiveTEI =    ActiveTEI[gLCindex];

gLapdState =    LapdState[gLCindex];
```

```
    gLapdType =      LapdType[gLCindex];
    gLapdActivity =  LapdActivity[gLCindex];
    gCRbit =         CRbit[gLCindex];
    gVR =            VR[gLCindex];
    gVA =            VA[gLCindex];
    gVS =            VS[gLCindex];
    gPollMode =      PollMode[gLCindex];
    gUserBusy =      UserBusy[gLCindex];
    gLCMsgInQueue =  LCMsgInQueue[gLCindex];
}

/****************************************************************
Function: SaveGlobalData
Input:   None
Returns: None Moves the global LC variables back into their
        respecitve arrays. Also tests the multi-frame
        variables and limits them to modulo 128.
****************************************************************/ void SaveGlobalData (void) { if ((gVS > 129) && (gVA > 129)) {
        gVS -= 128;
        gVA -= 128;
    }
    if (gVR > 129)
        gVR -= 128;

LapdState[gLCindex] =      gLapdState;
    LapdType[gLCindex] =       gLapdType;
    LapdActivity[gLCindex] =   gLapdActivity;
    CRbit[gLCindex] =          gCRbit;
    VR[gLCindex] =             gVR;
    VA[gLCindex] =             gVA;
    VS[gLCindex] =             gVS;
    PollMode[gLCindex] =       gPollMode;
    UserBusy[gLCindex] =       gUserBusy;
    LCMsgInQueue[gLCindex] =   gLCMsgInQueue;
}

/****************************************************************
Function: ChangeLC
Input:   None
Returns: None

****************************************************************/ void ChangeLC (UCHAR hLC) {

SaveGlobalData ();
```

```
    gLCindex = hLC;
    SetGlobalData ();

}

/***************************************************************
Function: InitLC
Input:   None
Returns: None Sets initial values for active (global) LC variables
***************************************************************/ void InitLC (UCHAR hLC) {

UCHAR i;
    UINT j;

LapdState[hLC] =     TEI_ASSIGNED;
    LapdType[hLC] =      INDICATION;
    LapdActivity[hLC] =  DL_NULL;
    CRbit[hLC] =         FALSE;
    VR[hLC] =            0;
    VA[hLC] =            0;
    VS[hLC] =            0;
    PollMode[hLC] =      FALSE;
    UserBusy[hLC] =      FALSE;
    LCMsgInQueue[hLC] =  FALSE;
    for (i = 0; i < MAX_MSG_QUEUE; ++i) {
        for (j = 0; j <= LCMsgBytes[hLC][i]; ++j) {
            LCMsgQueue[hLC][i][j] = 0x00;
        }
        LCMsgBytes[hLC][i] = 0;
        LCMsgNumber[hLC][i] = 0;
        gNextInputMsg[hLC] = 1;
        gNextOutputMsg[hLC] = 1;
    }
    gMsgInQueue = FALSE;
    for (i = 0; i < MAX_LC; ++i) {
        if (LCMsgInQueue[i] == TRUE)
            gMsgInQueue = TRUE;
    }
}

/***************************************************************
Function: ClearLCPort
Input:
Returns: None

***************************************************************/ void ClearLCPort (UCHAR hPort) {
```

```
    UCHAR hLC;

for (hLC = 2; hLC < MAX_LC; ++hLC) {
       if (ActivePort[hLC] == hPort) {
          InitLC (hLC);
          ActiveTEI[hLC] = 0;
          TeiChecked[hLC] = 0;
       }
    }
}

/*****************************************************************
Function: CreateLC
Input:
Returns: None

*****************************************************************/

UCHAR CreateLC (UCHAR SetPort, UCHAR SetSapi, UCHAR SetTEI ) {

UCHAR SetIndex;
   UCHAR LCError = FALSE;

if (((SetSapi == SAPI_0) && (SetTEI >= 1) && (SetTEI < 127)) ||
       ((SetSapi == SAPI_16) && (SetTEI >= 1) && (SetTEI < 127))) { for (SetIndex = 0; SetIndex < MAX_LC; ++SetIndex) {
         if ((ActiveTEI[SetIndex] == 0) &&
             (ActivePort[SetIndex] == SetPort) &&
             (ActiveSAPI[SetIndex] == SetSapi)) {
            ActiveTEI[SetIndex] = SetTEI;
            InitLC (SetIndex);
            break;
         }
      }
      if (SetIndex >= MAX_LC)
         LogError (SetIndex = LOG_ERR_LC_LIMIT_EXCEEDED);
   }
   else {
      LogError (SetIndex = LOG_ERR_NOT_SUPPORTED);
      gEmulateEsc = KBD_F4;
   } return (SetIndex);
}

/*****************************************************************
Function: SetActiveLC
Input:   Pointer to a packet
Returns: None Sets the global array index based on the Port,
```

SAPI, and TEI found in the packet. If an array
        does not yet exist for the detected combination, one
        is created.
*****************************************************************/

UCHAR SetActiveLC (PUCHAR pDataBuffer) {

UCHAR SetIndex;
  UCHAR SetPort =   GetField (GET_PORT, pDataBuffer);
  UCHAR SetSapi =   GetField (GET_SAPI, pDataBuffer);
  UCHAR SetTEI =    GetField (GET_TEI, pDataBuffer);
  UCHAR LCError =   FALSE;
  BOOL LCFound =    FALSE;

if ((SetPort == ActivePort[gLCindex]) &&
      (SetSapi == ActiveSAPI[gLCindex]) &&
      (SetTEI == ActiveTEI[gLCindex]))
        LCFound = TRUE;
  else {
    for (SetIndex = 0; SetIndex < MAX_LC; ++SetIndex) {
      if ((SetPort == ActivePort[SetIndex]) &&
          (SetSapi == ActiveSAPI[SetIndex]) &&
          (SetTEI == ActiveTEI[SetIndex])) {
            ChangeLC (SetIndex);
            LCFound = TRUE;
            break;
      }
    }
  }
  if (!LCFound) {
    if ((SetSapi == SAPI_16) ||
        (SetSapi == SAPI_0 && SetTEI >= 1 && SetTEI < 64)) {
      SetIndex = CreateLC (SetPort, SetSapi, SetTEI);
      if (SetIndex == LOG_ERR_LC_LIMIT_EXCEEDED)
        LCError = LOG_ERR_LC_LIMIT_EXCEEDED;
      else if (SetIndex == LOG_ERR_NOT_SUPPORTED)
        LCError = LOG_ERR_NOT_SUPPORTED;
      else
        ChangeLC (SetIndex);
    }
    else if ((!SetSapi) && (!SetTEI))
      ChangeLC (0);
    else
      LCError = LOG_ERR_LC_LIMIT_EXCEEDED;
  }
  return (LCError);
}

/****************************************************************
Function: MakeFrame
Input:   Command specifying frame type, pointers to a packet
         buffer and packet length.
Returns: None Creates all layer 2 frames for LC and SAC packets.
Copies them to the Xmt buffer for the active SAPI.
****************************************************************/

```c
void MakeFrame (UCHAR Command, PUCHAR pMakeBuffer, PUINT pByteCnt) {

UCHAR CRmask =    0x00;
    UCHAR PFmask =    0x00;
    UCHAR TEIandEA;
    UCHAR NRandPF;
    UCHAR NSandEA;

/* set port header bit */ if (gActivePort == PORT1)
        *pMakeBuffer = PORT1_BIT;
    else if (gActivePort == PORT2)
        *pMakeBuffer = PORT2_BIT;
    else
        LogError (LOG_ERR_UNDEFINED_PORT);

/* get command/response bit setting */ if (gCRbit)
        CRmask = CR_MASK;

/* format TEI and extension bit */

TEIandEA = gActiveTEI;
    TEIandEA <<= 1;
    TEIandEA |= L2_EA_BIT_SET;

/* format N(R) and N(S) */

NRandPF = gVR;
    NRandPF <<= 1;
    NSandEA = gVS;
    NSandEA <<= 1;

switch (Command) {

// Receiver Ready
        case MAKE_RR:
            *pByteCnt = 4;
            *(pMakeBuffer + 1) = (gActiveSAPI | CRmask);
            *(pMakeBuffer + 2) = TEIandEA;
            *(pMakeBuffer + 3) = RR;
            if (gPollMode)
                PFmask = S_POLL_MASK;
            NRandPF |= PFmask;
            *(pMakeBuffer + 4) = NRandPF;
            break;
```

```
// Reciever Not Ready
case MAKE_RNR:
    *pByteCnt = 4;
    *(pMakeBuffer + 1) = (gActiveSAPI | CRmask);
    *(pMakeBuffer + 2) = TEIandEA;
    *(pMakeBuffer + 3) = RNR;
    if (gPollMode)
        PFmask = S_POLL_MASK;
    NRandPF |= PFmask;
    *(pMakeBuffer + 4) = NRandPF;
    break;

// REJect
case MAKE_REJ:
    *pByteCnt = 4;
    *(pMakeBuffer + 1) = (gActiveSAPI | CRmask);
    *(pMakeBuffer + 2) = TEIandEA;
    *(pMakeBuffer + 3) = REJ;
    if (gPollMode)
        PFmask = S_POLL_MASK;
    NRandPF |= PFmask;
    *(pMakeBuffer + 4) = NRandPF;
    break;

// Set Asynchronous Balanced Mode Enabled
case MAKE_SABME:
    *pByteCnt = 3;
    *(pMakeBuffer + 1) = (gActiveSAPI | CRmask);
    *(pMakeBuffer + 2) = TEIandEA;
    if (gPollMode)
        PFmask = U_POLL_MASK;
    *(pMakeBuffer + 3) = (SABME | PFmask);
    break;

// SAC Terminal Endpoint Identifier Assignment
case MAKE_UI_TEI_ASSIGN:
    *pByteCnt = 8;
    *(pMakeBuffer + 1) = (SAPI_63 | CRmask);
    *(pMakeBuffer + 2) = L2_SAC_TEI_EA;
    if (gPollMode)
        PFmask = U_POLL_MASK;
    *(pMakeBuffer + 3) = (UI | PFmask);
    *(pMakeBuffer + 4) = L2_SAC_CONT_ID;
    *(pMakeBuffer + 5) = gRandom1;
    *(pMakeBuffer + 6) = gRandom2;
    *(pMakeBuffer + 7) = UI_TEI_ASSIGNED;
    TEIandEA = gAssignedTEI;
    TEIandEA <<= 1;
    TEIandEA |= L2_EA_BIT_SET;
    *(pMakeBuffer + 8) = TEIandEA;
    break;

// Not Implemented
case MAKE_UI_TEI_DENIED:
```

```
    *pByteCnt = 8;
    *(pMakeBuffer + 1) = (SAPI_63 | CRmask);
    *(pMakeBuffer + 2) = L2_SAC_TEI_EA;
    if (gPollMode)
        PFmask = U_POLL_MASK;
    *(pMakeBuffer + 3) = (UI | PFmask);
    *(pMakeBuffer + 4) = L2_SAC_CONT_ID;
    *(pMakeBuffer + 5) = gRandom1;
    *(pMakeBuffer + 6) = gRandom2;
    *(pMakeBuffer + 7) = UI_TEI_DENIED;
    *(pMakeBuffer + 8) = L2_SAC_TEI_EA;
    break;

// SAC Terminal Endpoint Identifier Check Request
case MAKE_UI_TEI_CHECK:
    *pByteCnt = 8;
    *(pMakeBuffer + 1) = (SAPI_63 | CRmask);
    *(pMakeBuffer + 2) = L2_SAC_TEI_EA;
    if (gPollMode)
        PFmask = U_POLL_MASK;
    *(pMakeBuffer + 3) = (UI | PFmask);
    *(pMakeBuffer + 4) = L2_SAC_CONT_ID;
    *(pMakeBuffer + 5) = 0;
    *(pMakeBuffer + 6) = 0;
    *(pMakeBuffer + 7) = UI_TEI_CHK_RQST;
    TEIandEA = gCheckTei;
    TEIandEA <<= 1;
    TEIandEA |= L2_EA_BIT_SET;
    *(pMakeBuffer + 8) = TEIandEA;
    break;

// Remove Tei
case MAKE_UI_TEI_REMOVE:
    *pByteCnt = 8;
    *(pMakeBuffer + 1) = (SAPI_63 | CRmask);
    *(pMakeBuffer + 2) = L2_SAC_TEI_EA;
    if (gPollMode)
        PFmask = U_POLL_MASK;
    *(pMakeBuffer + 3) = (UI | PFmask);
    *(pMakeBuffer + 4) = L2_SAC_CONT_ID;
    *(pMakeBuffer + 5) = 0;
    *(pMakeBuffer + 6) = 0;
    *(pMakeBuffer + 7) = UI_TEI_REMOVE;
    TEIandEA = gCheckTei;
    TEIandEA <<= 1;
    TEIandEA |= L2_EA_BIT_SET;
    *(pMakeBuffer + 8) = TEIandEA;
    break;

// Unnumbered Acknowledgement
case MAKE_UA:
    *pByteCnt = 3;
    *(pMakeBuffer + 1) = (gActiveSAPI | CRmask);
    *(pMakeBuffer + 2) = TEIandEA;
```

```
        if (gPollMode)
            PFmask = U_POLL_MASK;
        *(pMakeBuffer + 3) = (UA | PFmask);
        break;

// X.25 parameter negotiation
    case MAKE_XID:

/* this is a null XID frame */

*pByteCnt = 7;
        *(pMakeBuffer + 1) = (gActiveSAPI | CRmask);
        *(pMakeBuffer + 2) = TEIandEA;
        if (gPollMode)
            PFmask = U_POLL_MASK;
        *(pMakeBuffer + 3) = (XID | PFmask);
        *(pMakeBuffer + 4) = 0x82;
        *(pMakeBuffer + 5) = 0x80;
        *(pMakeBuffer + 6) = 0x00;
        *(pMakeBuffer + 7) = 0x00;
        break;

// Layer 3 I Frame
    case MAKE_IFRAME_HEADER:
        *(pMakeBuffer + 1) = (gActiveSAPI | CRmask);
        *(pMakeBuffer + 2) = TEIandEA;
        *(pMakeBuffer + 3) = NSandEA;
        if (gPollMode)
            PFmask = I_POLL_MASK;
        NRandPF |= PFmask;
        *(pMakeBuffer + 4) = NRandPF;
        if (GetField (GET_SAPI, pMakeBuffer) == SAPI_0)
            *(pMakeBuffer + 5) = Q931_PROTOCOL;
        break;

}
    gPollMode = FALSE;  // added 8/26 until timer recovery
                        // functions implemented, if ever
}

/****************************************************************
Function: GetTei
Input:
Returns:

****************************************************************/ void SelectTei (void) {

UCHAR i;
    UCHAR TeiExists;
    UCHAR UniqueTei = FALSE;
```

```
      if (*PTR_NEXT_TEI < 64)
         *PTR_NEXT_TEI = 64;

while (!UniqueTei) {
         TeiExists = FALSE;
         gAssignedTEI = *PTR_NEXT_TEI;
         *PTR_NEXT_TEI += 1;
         if (*PTR_NEXT_TEI > 126)
            *PTR_NEXT_TEI = 64;
         for (i = 1; i < MAX_LC; ++i) {
            if (ActiveTEI[i] == gAssignedTEI) {
               TeiExists = TRUE;
               *PTR_NEXT_TEI += 1;
               if (*PTR_NEXT_TEI > 126)
                  *PTR_NEXT_TEI = 64;
               gAssignedTEI = *PTR_NEXT_TEI;
            }
         }
         if (!TeiExists)
            UniqueTei = TRUE;
      }
   }

/****************************************************************
Function: UnmarkLC
Input:
Returns:

****************************************************************/ void UnmarkLC (void) {

UCHAR hLC;

for (hLC = 2; hLC < MAX_LC; ++hLC) {
      if (ActiveTEI[hLC] && gCheckPort == ActivePort[hLC])
         TeiChecked[hLC] = FALSE;
   }
   gCheckResponse = FALSE;
}

/****************************************************************
Function: MarkLC
Input:
Returns:

****************************************************************/ void MarkLC (Tei) {

UCHAR hLC;

for (hLC = 2; hLC < MAX_LC; ++hLC) {
      if (ActiveTEI[hLC] == Tei && gCheckPort == ActivePort[hLC])
```

```
      ++TeiChecked[hLC];
   }
   gCheckResponse = TRUE;
}

/*****************************************************************
Function: RemoveTei
Input:
Returns:

*****************************************************************/ void RemoveTei (void) { if (gCheckPort == PORT1)
      ChangeLC (0);
   else
      ChangeLC (1);

if (gCheckTei != BROADCAST_TEI)
      ClearTerminal (GetTeHandle (SEARCH_TEI, &gCheckTei));
   gPollMode = FALSE;
   gCRbit = TRUE;
   ClearBuffer (pLCXmtBuffer, pLCXmtBytes);
   MakeFrame (MAKE_UI_TEI_REMOVE, pLCXmtBuffer, pLCXmtBytes);
   PutPacket (pLCXmtBuffer, pLCXmtBytes);

}

/*****************************************************************
Function: RemoveLC
Input:
Returns:

*****************************************************************/ void RemoveLC (void) {

UCHAR hLC;
   UCHAR TeiFound = FALSE;

if (gCheckTei == BROADCAST_TEI) {
      for (hLC = 2; hLC < MAX_LC; ++hLC) {
         if (ActiveTEI[hLC] && gCheckPort == ActivePort[hLC]) {
            if (TeiChecked[hLC] != 1) {
               if (ActiveSAPI[hLC] == SAPI_0) {
                  gCheckTei = ActiveTEI[hLC];
                  RemoveTei ();
               }
               InitLC (hLC);
               ActiveTEI[hLC] = 0;
               TeiChecked[hLC] = FALSE;
            }
         }
```

```
        }
    }
    else {
        for (hLC = 2; hLC < MAX_LC; ++hLC) {
            if (ActiveTEI[hLC] == gCheckTei && gCheckPort == ActivePort[hLC]) {
                TeiFound = TRUE;
                if (TeiChecked[hLC] != 1) {
                    RemoveTei ();
                    InitLC (hLC);
                    ActiveTEI[hLC] = 0;
                    TeiChecked[hLC] = FALSE;
                }
            }
        }
        if (!TeiFound)
            RemoveTei ();
    }
    gCheckPort = 0;
    gCheckTei = 0;
    gCheckTime = 0;
    gCheckBusy = FALSE;
}

/****************************************************************
Function: MakeTeiCheck
Input:    TEI value to check
Returns:

****************************************************************/ void MakeTeiCheck (UCHAR Tei) { if (gCheckPort == PORT1)
        ChangeLC (0);
    else
        ChangeLC (1);

if (!gCheckBusy)
        UnmarkLC ();
    ++gCheckBusy;
    if (gCheckBusy == 1 || gCheckBusy == 2) {
        gCheckTime = GetTime ();
        gCheckTei = Tei;
        gPollMode = FALSE;
        gCRbit = TRUE;
        ClearBuffer (pLCXmtBuffer, pLCXmtBytes);
        MakeFrame (MAKE_UI_TEI_CHECK, pLCXmtBuffer, pLCXmtBytes);
        PutPacket (pLCXmtBuffer, pLCXmtBytes);
    }
}

/****************************************************************
Function: DoMsgQueue
Input:    Command constant, pointer to an I Frame and length
``` in bytes.
Returns: Status (LOG_) code.

Manages LC transmit message queue for Layer 3
        I Frames.
**********************************************************************/

UCHAR DoMsgQueue (

UCHAR QueueCommand,
  PUCHAR pInputBuffer,
  PUINT pByteCnt) {

UINT i;
  UCHAR SetLCIndex;
  UCHAR NextSend;
  UCHAR QueueIndex;
  UCHAR QueueStatus =   LOG_ERR_NO_ERRORS;
  XUCHAR LCcntr =    0;
  BOOL FoundMsg =    FALSE;
  BOOL MsgRemoved =     FALSE;

switch (QueueCommand) { case QUEUE_INIT:
      for (SetLCIndex = 0; SetLCIndex < MAX_LC; ++ SetLCIndex) {
        gNextInputMsg[SetLCIndex] = 1;
        gNextOutputMsg[SetLCIndex] = 1;
        for (QueueIndex = 0; QueueIndex < MAX_MSG_QUEUE; ++QueueIndex)
          LCMsgBytes[SetLCIndex][QueueIndex] = 0;
          LCMsgNumber[SetLCIndex][QueueIndex] = 0;
      }
      break;

case QUEUE_PUT_MSG:

SetActiveLC (pInputBuffer);
      for (QueueIndex = 0; QueueIndex < MAX_MSG_QUEUE; ++QueueIndex) {
        if (LCMsgNumber[gLCindex][QueueIndex] == 0)
          break;
      }
      if (QueueIndex < MAX_MSG_QUEUE) {
        LCMsgNumber[gLCindex][QueueIndex] = gNextInputMsg[gLCindex];
        ++gNextInputMsg[gLCindex];
        for (i = 0; i <= *pByteCnt; ++i)
          LCMsgQueue[gLCindex][QueueIndex][i] = *(pInputBuffer + i);
        LCMsgBytes[gLCindex][QueueIndex] = *pByteCnt;
        gMsgInQueue = TRUE;
        gLCMsgInQueue = TRUE;
        LCMsgInQueue[gLCindex] = TRUE;
        ClearBuffer (pInputBuffer, pByteCnt);
      }
      else {
        QueueStatus = LOG_ERR_MSG_QUEUE_FULL;

```
      LogError (LOG_ERR_MSG_QUEUE_FULL);
   }
   break;

case QUEUE_PUT_UI_MSG:

PutPacket (pInputBuffer, pByteCnt);
   ClearBuffer (pInputBuffer, pByteCnt);
   break;

case QUEUE_GET_LC_MSG:

for (QueueIndex = 0; QueueIndex < MAX_MSG_QUEUE; ++QueueIndex) {
      if (LCMsgNumber[gLCindex][QueueIndex] == gNextOutputMsg[gLCindex]) {
         if (gVS < (gVA + 1)) {
            gCRbit = TRUE;
            *pByteCnt = LCMsgBytes[gLCindex][QueueIndex];
            for (i = 0; i <= *pByteCnt; ++i)
               *(pInputBuffer + i) = LCMsgQueue[gLCindex][QueueIndex][i];
            MakeFrame (MAKE_IFRAME_HEADER, pInputBuffer, pByteCnt);
            LCMsgQueue[gLCindex][QueueIndex][NS_POS] = *(pInputBuffer + NS_POS);
            LCMsgQueue[gLCindex][QueueIndex][NR_POS] = *(pInputBuffer + NR_POS);
            ++gVS;
            ++gNextOutputMsg[gLCindex];
            LCMsgInQueue[gLCindex] = FALSE;
            gLCMsgInQueue = FALSE;
            FoundMsg = TRUE;
            break;
         }
         else
            QueueStatus = LOG_ERR_NO_ACK;
      }
   }
   if (FoundMsg) {
      QueueStatus = LOG_ERR_NO_ERRORS;
      gMsgInQueue = FALSE;
      for (SetLCIndex = 0; SetLCIndex < MAX_LC; ++SetLCIndex) {
         if (LCMsgInQueue[SetLCIndex] == TRUE) {
            gMsgInQueue = TRUE;
            break;
         }
      }
   }
   else if (QueueStatus == LOG_ERR_NO_ERRORS) {
      QueueStatus = LOG_ERR_MSG_QUEUE_EMPTY;
      LogError (LOG_ERR_MSG_QUEUE_EMPTY);
   }
   break;

case QUEUE_GET_ANY_MSG:

// Added test for previous FoundMsg before loading InputBuffer - 11/15/94

SetLCIndex = gLastLC;
```

```
while (LCcntr < MAX_LC) {
    for (QueueIndex = 0; QueueIndex < MAX_MSG_QUEUE; ++QueueIndex) {
        if (LCMsgNumber[SetLCIndex][QueueIndex] == gNextOutputMsg[SetLCIndex]) {
            if ((VS[SetLCIndex] < (VA[SetLCIndex] + 1)) && (!FoundMsg)) {
                *pByteCnt = LCMsgBytes[SetLCIndex][QueueIndex];
                for (i = 0; i <= *pByteCnt; ++i)
                    *(pInputBuffer + i) = LCMsgQueue[SetLCIndex][QueueIndex][i];
                SetActiveLC (pInputBuffer);
                gCRbit = TRUE;
                MakeFrame (MAKE_IFRAME_HEADER, pInputBuffer, pByteCnt);
                LCMsgQueue[SetLCIndex][QueueIndex][NS_POS] = *(pInputBuffer + NS_POS);
                LCMsgQueue[SetLCIndex][QueueIndex][NR_POS] = *(pInputBuffer + NR_POS);
                ++gVS;
                ++gNextOutputMsg[SetLCIndex];
                LCMsgInQueue[SetLCIndex] = FALSE;
                gLCMsgInQueue = FALSE;
                FoundMsg = TRUE;
            }
            else
                QueueStatus = LOG_ERR_NO_ACK;
        }
    }
    if (++SetLCIndex >= MAX_LC)
        SetLCIndex = 0;
    ++LCcntr;
    if (FoundMsg)
        break;
}
if (FoundMsg) {
    gLastLC = SetLCIndex;
    QueueStatus = LOG_ERR_NO_ERRORS;
    gMsgInQueue = FALSE;
    for (SetLCIndex = 0; SetLCIndex < MAX_LC; ++SetLCIndex) {
        if (LCMsgInQueue[SetLCIndex] == TRUE) {
            gMsgInQueue = TRUE;
            break;
        }
    }
}
else if (QueueStatus == LOG_ERR_NO_ERRORS) {
    QueueStatus = LOG_ERR_MSG_QUEUE_EMPTY;
    LogError (LOG_ERR_MSG_QUEUE_EMPTY);
}
break;

case QUEUE_REMOVE_MSG:

for (QueueIndex = 0; QueueIndex < MAX_MSG_QUEUE; ++QueueIndex) {
    if (LCMsgNumber[gLCindex][QueueIndex] != 0) {
        NextSend = LCMsgQueue[gLCindex][QueueIndex][NS_POS];
        if (!(NextSend & 0x01)) {
            NextSend >>= 1;
            if ((gVA > 128) && (NextSend < 127))
                NextSend |= 0x80;
```

```
            if (NextSend == (gVA - 1)) {
               for (i = 0; i <= LCMsgBytes[gLCindex][QueueIndex]; ++i)
                  LCMsgQueue[gLCindex][QueueIndex][i] = 0x00;
               LCMsgBytes[gLCindex][QueueIndex] = 0;
               LCMsgNumber[gLCindex][QueueIndex] = 0;
               MsgRemoved = TRUE;
            }
         }
      }
   }
   if (MsgRemoved) {
      gLCMsgInQueue = FALSE;
      LCMsgInQueue[gLCindex] = FALSE;
      for (QueueIndex = 0; QueueIndex < MAX_MSG_QUEUE; ++QueueIndex) {
         if (LCMsgNumber[gLCindex][QueueIndex] >= gNextOutputMsg[gLCindex]) {
            if (gNextInputMsg[gLCindex] > gNextOutputMsg[gLCindex]) {
               gLCMsgInQueue = TRUE;
               LCMsgInQueue[gLCindex] = TRUE;
            }
         }
      }
      if (!LCMsgInQueue[gLCindex]) {
         gNextInputMsg[gLCindex] = 1;
         gNextOutputMsg[gLCindex] = 1;
      }
      gMsgInQueue = FALSE;
      for (SetLCIndex = 0; SetLCIndex < MAX_LC; ++SetLCIndex) {
         if (LCMsgInQueue[SetLCIndex] == TRUE) {
            gMsgInQueue = TRUE;
            break;
         }
      }
   }
   break;

}
   return (QueueStatus);
}

/****************************************************************
Function: RestartLC
Input:   None
Returns: None Resets the currently active LC variables to
      initial values and removes any queued I Frames.
      Used when a SABME or UA is received.
****************************************************************/ void RestartLC (void) { gVR =     0;
```

```
    gVA =      0;
    gVS =      0;
    gUserBusy = FALSE;
    gLapdState = MF_EST_NORM;
    gLapdType =  INDICATION;
    gLapdActivity = DL_ESTABLISH;
    gLCMsgInQueue = FALSE;

}

/***************************************************************
Function: ResetLC
Input:   None
Returns: None Sets up LC's for initial status indicators after
        return from Layer 3.
***************************************************************/ void ResetLC (void) {

UCHAR i;

for (i = 0; i < MAX_LC; ++i) {
        LapdType[i] = INDICATION;
        LapdActivity[i] = DL_NULL;
    }
    gLapdType = INDICATION;
    gLapdActivity = DL_NULL;

}

/***************************************************************
Function: DoCC
Input:   Command constant
Returns: Status (LOG_) code Q.921 Channel Controller (CC) accessed by Link
        controller. This is the Layer 2 -> Layer 1 interface.
***************************************************************/

UCHAR DoCC (UCHAR CCCommand) {

UCHAR Layer1Status = LOG_ERR_NO_ERRORS;
    UCHAR CCError;
    UINT TmpTime;

switch (CCCommand) { case L2_CC_RESPONSE:

SetActiveLC (pLCXmtBuffer);

if ((gAckPending) && (gLCMsgInQueue)) {
```

```c
            Layer1Status = DoMsgQueue (QUEUE_GET_LC_MSG, pLCXmtBuffer, pLCXmtBytes);
            if (Layer1Status == LOG_ERR_NO_ERRORS) {
               gAckPending = FALSE;
               PutPacket (pLCXmtBuffer, pLCXmtBytes);
            }
         }
         if (gAckPending) {
            gAckPending = FALSE;
            PutPacket (pLCXmtBuffer, pLCXmtBytes);
            if (gMsgInQueue) {
               Layer1Status = DoMsgQueue (QUEUE_GET_ANY_MSG, pLCXmtBuffer, pLCXmtBytes);
               if (Layer1Status == LOG_ERR_NO_ERRORS)
                  PutPacket (pLCXmtBuffer, pLCXmtBytes);
            }
         }
         else if (gMsgInQueue) {
            Layer1Status = DoMsgQueue (QUEUE_GET_ANY_MSG, pLCXmtBuffer, pLCXmtBytes);
            if (Layer1Status == LOG_ERR_NO_ERRORS)
               PutPacket (pLCXmtBuffer, pLCXmtBytes);
         }
         break;

case L2_CC_INDICATE:

Layer1Status = GetPacket (pLCRcvBuffer, pLCRcvBytes);

if ((Layer1Status == LOG_ERR_NO_ERRORS) &&
            (gEmulateEsc == KBD_NULL)) {
            if (CCError = SetActiveLC (pLCRcvBuffer))
               Layer1Status = CCError;
         }
         break;

}
   if (gCheckBusy == 1) {
      if (TimeExpire (gCheckTime, 100))
         MakeTeiCheck (gCheckTei);
      else
         RemoveLC ();
   }
   else if (gCheckBusy == 2) {
      if (TimeExpire (gCheckTime, 100))
         RemoveLC ();
   }
   else if (gCheckBusy > 2)
      RemoveLC ();

return (Layer1Status);
}

/****************************************************************
Function: DoSAC
Input:    Command, pointer to a data byte.
Returns:  Status (LOG_ERR) code
```

Performs Q.921 Signaling Access Controller (SAC)
                functions.
**********************************************************/

UCHAR DoSAC (UCHAR SACCommand) {

UCHAR SACError = LOG_ERR_NO_ERRORS;
   UCHAR TmpTei;

if (!gCheckBusy)
      gCheckPort = GetField (GET_PORT, pLCRcvBuffer);

if (SACCommand == MDL_UNIT_DATA_INDICATION) { if (GetField (GET_U_FRAME, pLCRcvBuffer) == UI) {
         gRandom1 = GetField (GET_RANDOM1, pLCRcvBuffer);
         gRandom2 = GetField (GET_RANDOM2, pLCRcvBuffer);

if ((GetField (GET_TEI_MSG, pLCRcvBuffer) == ID_REQUEST) &&
            (!gCheckBusy)) {
            gPollMode = FALSE;
            gCRbit = TRUE;
            gLapdActivity = MDL_ASSIGN_INDICATION;
            ClearBuffer (pLCXmtBuffer, pLCXmtBytes);
            SelectTei ();
            SACError = CreateLC (gCheckPort, SAPI_0, gAssignedTEI);
            if (SACError == LOG_ERR_LC_LIMIT_EXCEEDED) {
               MakeFrame (MAKE_UI_TEI_DENIED, pLCXmtBuffer, pLCXmtBytes);
               PutPacket (pLCXmtBuffer, pLCXmtBytes);
               if (!gCheckBusy)
                  MakeTeiCheck (BROADCAST_TEI);
            }
            else if (SACError != LOG_ERR_NOT_SUPPORTED) {
               MakeFrame (MAKE_UI_TEI_ASSIGN, pLCXmtBuffer, pLCXmtBytes);
               PutPacket (pLCXmtBuffer, pLCXmtBytes);
            }
            SACError = LOG_ERR_NO_ERRORS;
         }
         else if ((GetField (GET_TEI_MSG, pLCRcvBuffer)) == ID_CHECK_RESPONSE)
            MarkLC (GetField (GET_SAC_TEI, pLCRcvBuffer));
         else if ((GetField (GET_TEI_MSG, pLCRcvBuffer)) == ID_VERIFY)
            MakeTeiCheck (GetField (GET_SAC_TEI, pLCRcvBuffer));
      }
   }
   else if (SACCommand == MDL_ERROR_INDICATION)
      MakeTeiCheck (GetField (GET_TEI, pLCRcvBuffer));

return (SACError);
}

/**************************************************************
Function: MakeSabme
Input:   None Returns: None
******************************************************************/

```
void MakeSabme (void) {

RestartLC ();
    gPollMode = TRUE;
    gCRbit = TRUE;
    ClearBuffer (pLCXmtBuffer, pLCXmtBytes);
    MakeFrame (MAKE_SABME, pLCXmtBuffer, pLCXmtBytes);
    gAckPending = TRUE;
}
```

/*****************************************************************
Function: DoLCProcess
Input:    None
Returns:  Status (LOG_ERR_) code.

State Machine and frame processing for Q.921 Link
        Controller (LC) functions. Reads the current
        receive packet and formulates a response.
******************************************************************/

```
UCHAR DoLCProcess (void) {

UCHAR LCcr;
    UCHAR LCPollMode;
    UCHAR LCns;
    UCHAR LCnr;
    UCHAR LCFrameFormat;
    UCHAR LCFrameType;
    UCHAR LCError = LOG_ERR_NO_ERRORS;
    UCHAR ResponseStatus = LOG_ERR_NO_ERRORS;

LCFrameFormat = GetField (GET_FRAME_FORMAT, pLCRcvBuffer);
    LCcr = GetField (GET_CR, pLCRcvBuffer);
    LCPollMode = GetField (GET_PF, pLCRcvBuffer);
    LCns = GetField (GET_NS, pLCRcvBuffer);
    LCnr = GetField (GET_NR, pLCRcvBuffer);

if (gVR > 127)
        LCns |= 0x80;
    if ((gVS > 127) && (LCnr <= 127))   // add (=) fixed reject exception error 1/5/95
        LCnr |= 0x80;

switch (LCFrameFormat) { case I_FRAME:

if (gLapdState == MF_EST_NORM) {
            if (LCns == gVR) {
                ++gVR;
```

```
            gLapdActivity = DL_DATA_INDICATION;
            gPollMode = LCPollMode;
            gCRbit = FALSE;
            ClearBuffer (pLCXmtBuffer, pLCXmtBytes);
            MakeFrame (MAKE_RR, pLCXmtBuffer, pLCXmtBytes);
            gAckPending = TRUE;

if ((gVA <= LCnr) &&
               (LCnr <= gVS)) { if ((gUserBusy) && (gVA < LCnr)) {
                  LCError = DoMsgQueue (QUEUE_REMOVE_MSG, pLCXmtBuffer, pLCXmtBytes);
                  gVA = LCnr;
               }
               else {
                  if (LCnr == gVS) {
                     if (gVA < LCnr) {
                        gVA = LCnr;
                        LCError = DoMsgQueue (QUEUE_REMOVE_MSG, pLCXmtBuffer,
pLCXmtBytes);
                     }
                  }
                  else if (gVA < LCnr) {
                     gVA = LCnr;
                     LCError = DoMsgQueue (QUEUE_REMOVE_MSG, pLCXmtBuffer,
pLCXmtBytes);
                  }
               }
            }
            else {

// reject exception - should send FRMR
               MakeSabme ();
            }
         }
         else {

// reject exception - should send FRMR
            MakeSabme ();
         }
      }
      break;

case S_FRAME:

if (gLapdState >= MF_EST_NORM) {

LCFrameType = GetField (GET_S_FRAME, pLCRcvBuffer);
         gLapdActivity = MDL_UNIT_DATA_RESPONSE;
         gCRbit = FALSE;

switch (LCFrameType) { case RR:
```

```
                        if ((!LCcr) && (LCPollMode)) {
                           gUserBusy = FALSE;
                           gPollMode = TRUE;
                           gCRbit = FALSE;
                           ClearBuffer (pLCXmtBuffer, pLCXmtBytes);
                           MakeFrame (MAKE_RR, pLCXmtBuffer, pLCXmtBytes);
                           gAckPending = TRUE;
                        }
                        else if ((LCcr) && (!LCPollMode)) {
                           gUserBusy = FALSE;

if ((gVA <= LCnr) && (LCnr <= gVS)) {
                              if (LCnr == gVS) {
                                 if (gVA < LCnr) {
                                    gVA = LCnr;
                                    LCError = DoMsgQueue (QUEUE_REMOVE_MSG, pLCXmtBuffer,
pLCXmtBytes);
                                 }
                              }
                              else if (gVA < LCnr) {
                                 gVA = LCnr;
                                 LCError = DoMsgQueue (QUEUE_REMOVE_MSG, pLCXmtBuffer,
pLCXmtBytes);
                              }
                           }
                           else
                              LCError = LOG_ERR_NR_ERROR;
                        }
                        else if ((LCcr) && (LCPollMode)) {
                           gUserBusy = FALSE;

if ((gVA <= LCnr) && (LCnr <= gVS)) {
                              if (gVA < LCnr) {
                                 gVA = LCnr;
                              }
                           }
                        }
                        else
                           LCError = LOG_ERR_NOT_SUPPORTED;
                        break;

case RNR:
                        gUserBusy = TRUE;
                        break;

case REJ:
                        gUserBusy = FALSE;
                        if (LCcr) {
                           if ((gVA <= LCnr) && (LCnr <= gVS)) {
                              gVA = LCnr;
                              if (gVS == LCnr)
                                 LCError = DoMsgQueue (QUEUE_REMOVE_MSG, pLCXmtBuffer,
pLCXmtBytes);
                              else {
```

```
                    gMsgInQueue = TRUE;
                    gLCMsgInQueue = TRUE;
                    LCMsgInQueue[gLCindex] = TRUE;
                    while (gVS != LCnr) {
                       --gNextOutputMsg[gLCindex];
                       --gVS;
                    }
                 }
              }
           }
           break;

default:
           LCError = LOG_ERR_UNDEFINED_FRAME;
           break;
     }
  }
  break;

case U_FRAME:

LCFrameType = GetField (GET_U_FRAME, pLCRcvBuffer);
  gLapdActivity = DL_UNIT_DATA;
  gCRbit = FALSE;

switch (LCFrameType) { case SABME:
        RestartLC ();
        gPollMode = TRUE;
        ClearBuffer (pLCXmtBuffer, pLCXmtBytes);
        MakeFrame (MAKE_UA, pLCXmtBuffer, pLCXmtBytes);
        gAckPending = TRUE;
        break;

case DM:
        break;

case UI:
        break;

case DISC:
        RestartLC ();
        gPollMode = TRUE;
        ClearBuffer (pLCXmtBuffer, pLCXmtBytes);
        MakeFrame (MAKE_UA, pLCXmtBuffer, pLCXmtBytes);
        gAckPending = TRUE;
        break;

case UA:
        RestartLC ();
        break;

case FRMR:
```

```
            MakeSabme ();
            break;

case XID:
            gPollMode = FALSE;
            ClearBuffer (pLCXmtBuffer, pLCXmtBytes);
            MakeFrame (MAKE_XID, pLCXmtBuffer, pLCXmtBytes);
            gAckPending = TRUE;
            break;

default:
            LogError (LCError = LOG_ERR_UNDEFINED_FRAME);
            break;
        }
        break;

default:
        LogError (LCError = LOG_ERR_UNDEFINED_FRAME);
        break;

}
    if (LCError != LOG_ERR_NO_ERRORS) {
        gLapdActivity = DL_UNIT_DATA;
            LogError (LCError);
        LCError = MDL_ERROR_INDICATION;
    } return (LCError);
}

/****************************************************************
Function: DoLC
Input:    None
Returns:  Status code or Layer 2 primitive when control
          returns to layer 3.

Q.921 Link Controller (LC) function. Basically, get
          a packet, process it, put a packet in response. What
          could be easier?
****************************************************************/

UCHAR DoLC (void) {

UCHAR LCStatus = LOG_ERR_NO_ERRORS;

ResetLC ();

while ((gLapdActivity != DL_DATA_INDICATION) &&
        (LCStatus == LOG_ERR_NO_ERRORS) &&
        (gEmulateEsc == KBD_NULL)) {

LCStatus = DoCC (L2_CC_RESPONSE);
```

```
    if (LCStatus == LOG_ERR_NO_ERRORS || LCStatus == LOG_ERR_NO_ACK)
      LCStatus = DoCC (L2_CC_INDICATE);

if ((LCStatus == LOG_ERR_NO_ERRORS) &&
        (gEmulateEsc == KBD_NULL)) { if ((gActiveSAPI == SAPI_63) &&
          (gActiveTEI == BROADCAST_TEI)) {

LCStatus = DoSAC (MDL_UNIT_DATA_INDICATION);
        if (LCStatus == LOG_ERR_NO_ERRORS)
          LCStatus = gLapdActivity;
      }
      else if ((gActiveSAPI == SAPI_0) ||
          (gActiveSAPI == SAPI_16 && *pDX25Set)) {

LCStatus = DoLCProcess ();
        if (LCStatus == LOG_ERR_NO_ERRORS)
          LCStatus = gLapdActivity;
      }
    }
    else if (LCStatus == LOG_ERR_TIMEOUT)
      LCStatus = DL_NULL;
    else if (LCStatus == LOG_ERR_INTERFACE_CHANGE) {
      if (gOldHwys > gActiveHwys)
        LCStatus = PH_DEACTIVATE;
      else {
        Pause (25);
        if (GetActiveHwys () == gActiveHwys)
          LCStatus = PH_ACTIVATE;
        else {
          gActiveHwys = gOldHwys;
          LCStatus = LOG_ERR_NO_ERRORS;
        }
      }
    }
    else if (LCStatus == LOG_ERR_LC_LIMIT_EXCEEDED) {
      gCheckTei = GetField (GET_TEI, pLCRcvBuffer);
      DoSAC (MDL_ERROR_INDICATION);
      LCStatus = LOG_ERR_NO_ERRORS;
    }
    else {
      LogError (LCStatus);
      LCStatus = LOG_ERR_NO_ERRORS;
    }
  }
  return (LCStatus);
}

/****************************************************************
Function: DoILC
Input:   Layer 3->2 primitives, and I frame if applicable
```

```
    Returns: Layer 2->3 primitives, and I frame if applicable

Q.921 Inter-Layer Controller (ILC).
        This is the Layer 3 interface to layer 2.
*****************************************************************/

UCHAR DoILC (UCHAR Layer2Primitive, PUCHAR pMsg, PUINT pMsgBytes) {

XUCHAR Layer3Primitive = DL_NULL;

switch (Layer2Primitive) { case DL_DATA_INDICATION:
         ClearBuffer (pLCRcvBuffer, pLCRcvBytes);
         ClearBuffer (pMsg, pMsgBytes);
         Layer3Primitive = DoLC ();
         if (gLapdActivity == DL_DATA_INDICATION) {
            *pMsgBytes = *pLCRcvBytes;
            CopyBuffer (pMsg, pLCRcvBuffer, pLCRcvBytes);
         }
         break;

case DL_DATA_RESPONSE:
         Layer3Primitive = DoMsgQueue (QUEUE_PUT_MSG, pMsg, pMsgBytes);
         break;

case DL_UNIT_DATA:
         Layer3Primitive = DoMsgQueue (QUEUE_PUT_UI_MSG, pMsg, pMsgBytes);
         break;

case MDL_REMOVE_REQUEST:
         ClearLCPort (*pMsg);
         gCheckPort = *pMsg;
         gCheckTei = BROADCAST_TEI;
         RemoveTei ();
         gCheckPort = 0;
         gCheckTei = 0;
         gCheckTime = 0;
         gCheckBusy = FALSE;
         break;
   } return (Layer3Primitive);
}
```

```
/****************************************************************
ISDN 2000 Central Office Emulator ISDN Layer 3 Call Control Processing Module (c) 1994 Merge Technologies Inc.

General: This modules performs Q.931 call control functions.
It receives packets from the Layer 2 ILC, sets up and accesses
a call database (COE_DB.C) for each end of a call, and processes
incoming and outgoing call control messages (COE_MSG.C).
Some operations may be altered by the settings of global
variables that can be changed by the user (COE_SET.C). This
module also accesses switch functions (COE_SWCH.C) for connecting
B channels and applying tones. D channel packet mode calls are
passed to COE_X25.C.
****************************************************************/ ifndef NODEBUG
pragma DEBUG CODE SYMBOLS OBJECTEXTEND
endif include <coe.h>
include <coe_l3.h>
#include <lib_l2.h>
#include <lib_swch.h>
#include <lib_io.h>
#include <lib_str.h>
#include <lib_util.h>
include <lib_db.h>
#include <lib_msg.h>
#include <lib_trc.h>
#include <lib_set.h>
#include <lib_x25.h>

/****************************************************************
    Function: InitLayer3
    Input:   None
    Returns: None Layer 3 variable intialization.
****************************************************************/ void InitLayer3 (void) {

UCHAR i;

// Initialize global Layer 3 variables pL3RcvBytes =   &gL3RcvBytes;
    pL3XmtBytes =   &gL3XmtBytes;
    pP1DN =         pszNoDN;
```

```
pP2DN =         pszNoDN;
pP1StatDisplay = pszBlankLine;
pP2StatDisplay = pszBlankLine;
gP1DisplayMsg =  UNKNOWN;
gP2DisplayMsg =  UNKNOWN;
gNextCallRef =   1;
gCauseDiag =     0;

for (i = 0; i < 3; ++i)
   gAlertingTei[i] = 0;

// Initialize Terminating Equipment Data

InitTeData ();

// Initialize Global Call Data

GetGlobalCall ();
ClearCall ();

// Load Pointer Table to Message Parsing Tables

LoadMsgPtrTable ();

}

/***************************************************************
Function: ClearTimer
Input:   None
Returns: None Resets network timer for the currently selected
       call.
***************************************************************/ void ClearTimer (void) {

*pDbTimerType = 0;
  *pDbTimerTime = 0;
  *pDbTimerStart = 0;
}

/***************************************************************
Function: SetTimer
Input:   Timer ID constant
Returns: None Establishes the active network timer for the
       currently selected call.
***************************************************************/ void SetTimer (UCHAR Timer) {
```

```
    *pDbTimerType = Timer;

switch (Timer) { case TIMER_T301:
            *pDbTimerTime = T301_TIME;
            break;

case TIMER_T303:
            *pDbTimerTime = T303_TIME;
            break;

case TIMER_T305:
            *pDbTimerTime = T305_TIME;
            break;

case TIMER_T306:
            *pDbTimerTime = T306_TIME;
            break;

case TIMER_T308:
            *pDbTimerTime = T308_TIME;
            break;

case TIMER_T309:
            *pDbTimerTime = T309_TIME;
            break;

case TIMER_T310:
            *pDbTimerTime = T310_TIME;
            break;

case TIMER_T312:
            *pDbTimerTime = T312_TIME;
            break;

case TIMER_T400:
            *pDbTimerTime = T400_TIME;
            break;

case TIMER_T401:
            *pDbTimerTime = T401_TIME;
            break;

}
    *pDbTimerStart = GetTime ();
}
/****************************************************************
Function: UpdateMsgDisplay
Input:    Constant flag for message direction (Net->User or
          User->Net)
```

Returns: None

Updates the display based on the last received
       or transmitted message type for the terminal
       indicated by port and directory number.
\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*/

```c
void UpdateMsgDisplay (UCHAR Direction) {

XUCHAR NewP1DN;
  XUCHAR NewP2DN;

NewP1DN = FALSE;
  NewP2DN = FALSE;

if (Direction) {
    if (*pDbPort == PORT1) {
      if (*(pP1DN + 3) != *(pTeDN + 6)) {
        pP1DN = (pTeDN + 3);
        NewP1DN = TRUE;
      }
      if ((Direction == DIR_XMT) && (*pDbXmtMsgType != UNKNOWN))
        gP1DisplayMsg = *pDbXmtMsgType;
      else if ((Direction == DIR_RCV) && (*pDbRcvMsgType != UNKNOWN))
        gP1DisplayMsg = *pDbRcvMsgType;
      pP1StatDisplay = GetString (STR_MSG, gP1DisplayMsg);
      if (gP1DisplayMsg != UNKNOWN)
        pP1StatDisplay = GetString (STR_MSG, gP1DisplayMsg);
      else
        pP1StatDisplay = pszBlankLine;
    }
    else if (*pDbPort == PORT2) {
      if (*(pP2DN + 3) != *(pTeDN + 6)) {
        pP2DN = (pTeDN + 3);
        NewP2DN = TRUE;
      }
      if ((Direction == DIR_XMT) && (*pDbXmtMsgType != UNKNOWN))
        gP2DisplayMsg = *pDbXmtMsgType;
      else if ((Direction == DIR_RCV) && (*pDbRcvMsgType != UNKNOWN))
        gP2DisplayMsg = *pDbRcvMsgType;
      if (gP2DisplayMsg != UNKNOWN)
        pP2StatDisplay = GetString (STR_MSG, gP2DisplayMsg);
      else
        pP2StatDisplay = pszBlankLine;
    }
    else
      LogError (LOG_ERR_UNDEFINED_PORT);
  }
  else {
    DisplayPosition (1,1);
    Display (pszPort1);
    DisplayPosition (3,1);
    Display (pszPort2);
  }
```

```
    if (NewP1DN) {
       DisplayPosition (1,1);
       Display (pszBlankLine);
       DisplayPosition (1,1);
       Display (pszPort1);
    }
    DisplayPosition (1,7);
    Display (pP1DN);
    DisplayPosition (2,1);
    Display (pP1StatDisplay);
    if (NewP2DN) {
       DisplayPosition (3,1);
       Display (pszBlankLine);
       DisplayPosition (3,1);
       Display (pszPort2);
    }
    DisplayPosition (3,7);
    Display (pP2DN);
    DisplayPosition (4,1);
    Display (pP2StatDisplay);
}

/****************************************************************
Function: RemoveTerminal
Input:    TEI of selected terminal.
Returns:  Port where removed terminal was connected Clears I Frame message queue, and Layer 2
          Link Controller for the seleted terminal. This
          Occurs if a terminal intializes using a previously
          initialized SPID.
****************************************************************/ void RemoveTerminal (UCHAR Tei) {

XUCHAR hTerminal;

if (Tei) {
       hTerminal = GetTeHandle (SEARCH_TEI, &Tei);
       ClearTerminal (hTerminal);
    }
}

/****************************************************************
Function: SetDefaultTsp
Input:    None
Returns:  Handle to a terminal TSP If a non-initializing terminal is serviced, the
          default Port 1 or Port 2 number and TSP is used.
****************************************************************/
```

```
UCHAR SetDefaultTsp (void) {

XUCHAR hTerminal;

if (*pDbPort == PORT1)
        hTerminal = PORT1_DEFAULT_TSP;
    else
        hTerminal = PORT2_DEFAULT_TSP;
    GetTsp (hTerminal);
    if (*pTeTei) {
        if (*pTeTei != *pDbTei)
            RemoveTerminal (*pTeTei);
    }
    *pTeTei = *pDbTei;
    *pTeAutoInit = FALSE;
    return (hTerminal);
}

/***************************************************************
Function: MakeHeader
Input:   None
Returns: Pointer to first IE position in message Creates a template I Frame Header, including protocol
        discriminator, call reference values,
        Net Escape, and Msg type. Layer 2 overwrites
        NR and NS when the packet is sent.
***************************************************************/

UCHAR MakeHeader (void) {

XUCHAR IeOffset;
    XUCHAR FormatTEI;

ClearBuffer (pL3XmtMessage, pL3XmtBytes);

FormatTEI = *pDbTei;
    FormatTEI <<= 1;
    FormatTEI |= 0x01;

if (*pDbPort == PORT1)
        *(pL3XmtMessage + HEADER_POS) =    PORT1_BIT;
    else if (*pDbPort == PORT2)
        *(pL3XmtMessage + HEADER_POS) =    PORT2_BIT;
    else
        LogError (LOG_ERR_UNDEFINED_PORT);

*(pL3XmtMessage + SAPI_POS) =      SAPI_0;
    *(pL3XmtMessage + TEI_POS) =       FormatTEI;
    *(pL3XmtMessage + NS_POS) =        UNKNOWN;
    *(pL3XmtMessage + NR_POS) =        UNKNOWN;
    *(pL3XmtMessage + PROTOCOL_POS) =    Q931_PROTOCOL;
```

```
   *(pL3XmtMessage + CREF_LENGTH_POS) =   *pDbCallRefLen;

if (*pDbCallRefLen == 0)
      IeOffset = CREF_NUMBER_POS;
   else {
      *(pL3XmtMessage + CREF_NUMBER_POS) = *pDbCallRef;
      IeOffset = MSG_TYPE_POS;
   }
   if (*pDbXmtMsgType >= NET_CONF) {
      *(pL3XmtMessage + IeOffset) = NET_ESCAPE;
      ++IeOffset;
   }
   *(pL3XmtMessage + IeOffset) = *pDbXmtMsgType;
   ++IeOffset;

return (IeOffset);

}

/****************************************************************
Function: MakeBroadcastHeader
Input:    None
Returns:  Pointer to first IE position in message Creates a UI Frame Header, for broadcasting
          SETUP messages.
****************************************************************/

UCHAR MakeBroadcastHeader (void) {

ClearBuffer (pL3XmtMessage, pL3XmtBytes);

if (*pDbPort == PORT1)
      *(pL3XmtMessage + HEADER_POS) =   PORT1_BIT;
   else if (*pDbPort == PORT2)
      *(pL3XmtMessage + HEADER_POS) =   PORT2_BIT;
   else
      LogError (LOG_ERR_UNDEFINED_PORT);

*(pL3XmtMessage + 1) = (SAPI_0 | CMD_FLAG);
   *(pL3XmtMessage + 2) = (BROADCAST_TEI | 0x80);
   *(pL3XmtMessage + 3) = UI;
   *(pL3XmtMessage + 4) = Q931_PROTOCOL;
   *(pL3XmtMessage + 5) = 1;
   *(pL3XmtMessage + 6) = *pDbCallRef;
   *(pL3XmtMessage + 7) = SETUP;

return (8);

}

/****************************************************************
Function: SendMsg
Input:    None
```

Returns: None

Uses pDbXmtMsgType and the functions in COE_DB.C
        and COE_MSG.C to format an outgoing call control
        message. The message is queued via Layer 2 and
        the ILC.
*****************************************************************/ void SendMsg () {

UCHAR IePosition;
  UCHAR SendError = LOG_ERR_NO_ERRORS;

IePosition = MakeHeader ();
  gL3XmtBytes = WriteMsgData (IePosition, pL3XmtMessage);
  UpdateMsgDisplay (DIR_XMT);

SendError = DoILC (DL_DATA_RESPONSE, pL3XmtMessage, pL3XmtBytes);
  if (SendError != LOG_ERR_NO_ERRORS)
            LogError (SendError);
}

/*****************************************************************
Function: SendSetup
Input:   None
Returns: None Formats a SETUP message. May be broadcast at SAPI 0,
        TEI 127 in an Unnumbered Information frame or sent
        point-to-point at the TE's TEI. Used to establish
        all terminating call setups (incoming calls).
*****************************************************************/ void SendSetup (void) {

XUCHAR IePosition;
  UCHAR BCError = LOG_ERR_NO_ERRORS;

*pDbXmtMsgType = SETUP;

if ((*pSwitchTypeSet == ETSI_SWITCH_SET) &&
     (!(*pConfigSet)) && (*pDbTei != BROADCAST_TEI))
     IePosition = MakeHeader ();
  else
     IePosition = MakeBroadcastHeader ();

SendIeData (pIeChannelID,
        1,
        *(pIeChannelID + 1),
        BLANK,
        BLANK);

SendIeData (pIeSignal,
        1,

```
            SIGNAL_ALERT_0,
            BLANK,
            BLANK);

if ((*pSwitchTypeSet == ATT_SWITCH_SET) && (*pEKTSSet))
        SendIeData (pIe6EndpointID,
                2,
                *pTeUSID,
                *pTeTID,
                BLANK);

else if (*pEKTSSet)
        SendIeData (pIeEndpointID,
                2,
                (*pTeUSID | 0x80),
                (*pTeTID | 0x80),
                BLANK);

if ((*pSwitchTypeSet == ATT_SWITCH_SET) &&
        (GetCallType () == BC_VOICE) &&
        (*pTotalCASet) &&
        (*pDbCallAppearance))
        SendIeData (pIeDestCA,
                0x01,
                *pDbCallAppearance,
                BLANK,
                BLANK);

else if ((*pSwitchTypeSet != ETSI_SWITCH_SET) &&
        (GetCallType () == BC_VOICE) &&
        (*pTotalCASet) &&
        (*pDbCallAppearance))
        SendIeData (pIeCallAppear,
                0x01,
                (*pDbCallAppearance | 0x80),
                BLANK,
                BLANK);
    else {
        *pIeCalledPartyNo = (8 | IE_SEND_FLAG);
        *(pIeCalledPartyNo + 1) = CPN_LOCAL_ISDN_NO;
        CopyData ((pIeCalledPartyNo + 2), (pTeDN + 3), 7);
    } gL3XmtBytes = WriteMsgData (IePosition, pL3XmtMessage);
    UpdateMsgDisplay (DIR_XMT);

if ((*pSwitchTypeSet == ETSI_SWITCH_SET) &&
        (!(*pConfigSet)) && (*pDbTei != BROADCAST_TEI))
        BCError = DoILC (DL_DATA_RESPONSE, pL3XmtMessage, pL3XmtBytes);
    else
        BCError = DoILC (DL_UNIT_DATA, pL3XmtMessage, pL3XmtBytes);
```

```
    if (BCError != LOG_ERR_NO_ERRORS)
        LogError (BCError);
}

/*****************************************************************
Function: SendNetMsg
Input:   AT&T Network Management message type constant
Returns: Status (LOG_) code.

Brute force message engine for AT&T network
        management (SPID initialization) messages.
*****************************************************************/

UCHAR SendNetMsg (UCHAR MsgType) {

XUCHAR IeOffset = MakeHeader ();
    XPXUCHAR pMsgPosition = pL3XmtMessage + IeOffset;

gL3XmtBytes = 20;

*pMsgPosition =      IE_LOCKING_SHIFT_6;
    *(pMsgPosition + 1) = IE_MIE;
    *(pMsgPosition + 2) = 8;
    *(pMsgPosition + 3) = MANAGEMENT_PROTOCOL;
    *(pMsgPosition + 4) = TR_SYNC;
    *(pMsgPosition + 5) = OP_TYPE_CONFIRM_SET;
    *(pMsgPosition + 6) = OP_CODE_ADDRESS_INFO;
    *(pMsgPosition + 7) = OP_PARAM_ID_ENDPOINT_ID;
    *(pMsgPosition + 8) = 2;
    *(pMsgPosition + 9) = *pTeUSID;
    *(pMsgPosition + 10) = *pTeTID;

if (MsgType == MSG_TE_INIT)
        *(pMsgPosition + 10) |= TSP_FULL_SERVICE;

UpdateMsgDisplay (DIR_XMT);

return (DoILC (DL_DATA_RESPONSE, pL3XmtMessage, pL3XmtBytes));
}

/*****************************************************************
Function: SendSetupAck
Input:   Signal information element variable
Returns: None Creates and sends a Q.931 SETUP ACKnowledge
        message.
*****************************************************************/ void SendSetupAck (UCHAR Signal) {

SendIeData (pIeSignal,
```

```
                    1,
                    Signal,
                    BLANK,
                    BLANK);

DoTone (Signal, *pTePort, *(pIeChannelID + 1));

*pDbXmtMsgType = SETUP_ACK;
    SendMsg ();

}

/****************************************************************
Function: SendCallProc
Input:   None
Returns: None Creates and sends a Q.931 CALL PROCeeding message.
****************************************************************/ void SendCallProc (void) { if (*pSwitchTypeSet == ATT_SWITCH_SET) {
        if ((*pDisplaySet) && (*pCallerIDSet))
            SendATTDisplay (ORIGINATING);
    }
    if (*pSwitchTypeSet != ATT_SWITCH_SET) {
        if ((*pDisplaySet) && (*pCallerIDSet))
            SendDisplay (ORIGINATING);
    }
    *pDbXmtMsgType = CALL_PROCEEDING;
    SendMsg ();

}

/****************************************************************
Function: SendStatusEnq
Input:   None
Returns: None Creates and sends a Q.931 STATus ENQuirey message.
****************************************************************/ void SendStatusEnq (void) {

*pDbXmtMsgType = STATUS_ENQUIRY;
    SendMsg ();

}
```

```
/****************************************************************
Function: SendStatus
Input:   Cause and Call State information element variables
Returns: None Creates and sends a Q.931 STATus message.
****************************************************************/ void SendStatus (UCHAR Cause, UCHAR CallState) {

UCHAR CodeStandard =   0x81;
    UCHAR Length =         0x02;

if (gCauseDiag)
        Length = 0x03;

if (Cause == CAUSE_14)
        CodeStandard = 0xe1;

if (Cause)
        SendIeData (pIeCause,
                Length,
                CodeStandard,
                Cause,
                gCauseDiag);

SendIeData (pIeCallState,
            0x01,
            CallState,
            BLANK,
            BLANK);

*pDbXmtMsgType = STATUS;
    SendMsg ();

}

/****************************************************************
Function: SendAlerting
Input:   None
Returns: None Creates and sends a Q.931 ALERTing message.

Note that additional information elements may
        have been loaded into the call database and marked
        for sending. These are picked up by the WriteMsgData()
        message engine.
****************************************************************/ void SendAlerting (void) { if (((*pSwitchTypeSet == ATT_SWITCH_SET) &&
```

```
    (GetCallType () == BC_VOICE)) ||
    (*pSwitchTypeSet != ATT_SWITCH_SET)) {

SendIeData (pIeSignal,
        1,
        SIGNAL_RINGBACK,
        BLANK,
        BLANK);

if ((*pSwitchTypeSet != ATT_SWITCH_SET) &&
       (GetCallType () == BC_VOICE))

SendIeData (pIeProgressInd,
           0x02,
           0x81,
           0x88,
           BLANK);

DoTone (SIGNAL_RINGBACK, *pTePort, *(pIeChannelID + 1));
    }

*pDbXmtMsgType = ALERTING;
    SendMsg ();

}

/****************************************************************
Function: SendConnectAck
Input:   None
Returns: None Creates and sends a Q.931 CONNect ACKnowledge
        message.

Note that additional information elements may
        have been loaded into the call database and marked
        for sending. These are picked up by the WriteMsgData()
        message engine.
****************************************************************/ void SendConnectAck (void) {

*pDbXmtMsgType = CONNECT_ACK;
  SendMsg ();

}

/****************************************************************
Function: SendConnect
Input:   None
```

```
    Returns: None

Creates and sends a Q.931 CONNext message.

Note that additional information elements may
            have been loaded into the call database and marked
            for sending. These are picked up by the WriteMsgData()
            message engine.
*****************************************************************/ void SendConnect (void) {

*pDbXmtMsgType = CONNECT;
    SendMsg ();

}

/****************************************************************
    Function: SendDisconnect
    Input:    Cause and Signal information element variables.
    Returns: None Creates and sends a Q.931 DISConnect message.

Note that additional information elements may
            have been loaded into the call database and marked
            for sending. These are picked up by the WriteMsgData()
            message engine.
*****************************************************************/ void SendDisconnect (UCHAR Cause, UCHAR Signal) {

UCHAR hLocalCall = *pDbLocalhCall;
    UCHAR hRemoteCall = *pDbRemotehCall;
    UCHAR RemotePort;
    UCHAR RemoteChan;
    UCHAR Length = 0x02;

if (gCauseDiag)
        Length = 0x03;

if (Cause)
        SendIeData (pIeCause,
                Length,
                CCITT_STANDARD_LOC,
                Cause,
                gCauseDiag);

if (Signal) {
        SendIeData (pIeSignal,
                0x01,
                Signal,
                BLANK,
```

```
            BLANK);

DoTone (Signal, *pTePort, *(pIeChannelID + 1));
} if (GetOtherCall (hRemoteCall)) {
    RemotePort = *pDbPort;
    RemoteChan = *(pIeChannelID + 1);
    DoSwitch (SWCH_DISCONNECT,
           *pDbPort,
           *(pIeChannelID + 1),
           RemotePort,
           RemoteChan);

GetOtherCall (hLocalCall);
  }

*pDbXmtMsgType = DISCONNECT;
  SendMsg ();

}

/****************************************************************
Function: SendRelease
Input:    Cause information element variable.
Returns:  None Creates and sends a Q.931 RELease message.

Note that additional information elements may
        have been loaded into the call database and marked
        for sending. These are picked up by the WriteMsgData()
        message engine.
****************************************************************/ void SendRelease (UCHAR Cause) {

UCHAR Length = 0x02;

if (gCauseDiag)
     Length = 0x03;

if (Cause)
     SendIeData (pIeCause,
           Length,
           CCITT_STANDARD_LOC,
           Cause,
           gCauseDiag);
```

```
    if ((*pSwitchTypeSet == ATT_SWITCH_SET) &&
       (GetCallType () == BC_VOICE) &&
       (*pTotalCASet))
        SendIeData (pIeSelCA,
              0x01,
              *pTeSelCA,
              BLANK,
              BLANK);

if ((*pSwitchTypeSet == NI1_SWITCH_SET) &&
       (GetCallType () == BC_VOICE) &&
       (*pTotalCASet))
        SendIeData (pIeCallAppear,
              0x01,
              (*pTeSelCA | 0x80),
              BLANK,
              BLANK);

*pDbXmtMsgType = RELEASE;
    SendMsg ();

}

/****************************************************************
Function: SendProgress
Input:   Cause, Signal, and Progress Indicator information
         element variables.
Returns: None Creates and sends a Q.931 PROGress message.

Note that additional information elements may
         have been loaded into the call database and marked
         for sending. These are picked up by the WriteMsgData()
         message engine.
****************************************************************/ void SendProgress (UCHAR Cause, UCHAR Signal, UCHAR Ind) {

UCHAR Standard = CCITT_STANDARD_LOC;
    UCHAR Length =  0x02;

if (Ind == INTERFACE_DELAY)
        Standard = NATIONAL_STANDARD_LOC;

if (gCauseDiag)
        Length = 0x03;

if (Cause)
        SendIeData (pIeCause,
              Length,
              CCITT_STANDARD_LOC,
              Cause,
```

```
                gCauseDiag);

if ((Signal) && (GetCallType () == BC_VOICE)) {

SendIeData (pIeSignal,
                0x01,
                Signal,
                BLANK,
                BLANK);

DoTone (Signal, *pTePort, *(pIeChannelID + 1));
    } if (Ind)
        SendIeData (pIeProgressInd,
                0x02,
                Standard,
                Ind,
                BLANK);

*pDbXmtMsgType = PROGRESS;
    SendMsg ();

}

/*****************************************************************
Function: SendRelComp
Input:    Cause and Signal information element variables.
Returns:  None Creates and sends a Q.931 RELease COMPlete message.

Note that additional information elements may
        have been loaded into the call database and marked
        for sending. These are picked up by the WriteMsgData()
        message engine.
*****************************************************************/ void SendRelComp (UCHAR Cause, UCHAR Signal) {

UCHAR Length = 0x02;

if (gCauseDiag)
        Length = 0x03;

ClearTimer ();

if (Cause)
        SendIeData (pIeCause,
                Length,
                CCITT_STANDARD_LOC,
                Cause,
                gCauseDiag);
```

```
   if ((Signal) && (GetCallType () == BC_VOICE)) {

SendIeData (pIeSignal,
            0x01,
            Signal,
            BLANK,
            BLANK);

DoTone (Signal, *pTePort, *(pIeChannelID + 1));
   }

*pDbXmtMsgType = RELEASE_COMPLETE;
   SendMsg ();
}
/****************************************************************
   Function: ClearOtherCall
   Input:    Call Handle
   Returns:  None

****************************************************************/ void ClearOtherCall (UCHAR hCall) {

XUCHAR Signal;
   XUCHAR Cause;
   XUCHAR i;

if (GetOtherCall (hCall)) {
      ClearTimer ();
      if (*pDbTei != BROADCAST_TEI) {
         if (GetCallState (*pDbLocalhCall) < CS_ACTIVE) {
            *pDbRemotehCall = 0;
            if (*pIeCause) {
               if (*(pIeCause + 2) == CAUSE_17) {
                  Signal = SIGNAL_BUSY;
                  if (GetCallType () != BC_VOICE)
                     Signal = BLANK;
                  SendProgress (Cause, Signal, TONES_APPLIED);

}
               else {
                  SetTimer (TIMER_T309);
                  SetCallState (CS_RELEASE_REQUEST);
               }
            }
            else {
               *(pIeCause + 1) = CCITT_STANDARD_LOC;
               *(pIeCause + 2) = CAUSE_47;
               SetTimer (TIMER_T309);
               SetCallState (CS_RELEASE_REQUEST);
            }
         }
```

```
      else if (GetCallState (*pDbLocalhCall) == CS_ACTIVE) {
        SetTimer (TIMER_T301);
        *pDbRemotehCall = 0;
      }
    }
    else {
      ClearCall ();
      for (i = 0; i < 3; ++i)
        gAlertingTei[i] = 0;
    }
  }
}

/****************************************************************
Function: DoCallProc
Input:    Incoming TEI
Returns:  None Processes incoming Q.931 CALL PROCeeding messages.
****************************************************************/ void DoCallProc (UCHAR AlertTei) {

UCHAR i;

if (GetCallState (*pDbLocalhCall) == CS_PRESENT) {
    if (!(*pEKTSSet)) {
      for (i = 0; i < 3; ++i) {
        if (gAlertingTei[i] == 0) {
          gAlertingTei[i] = AlertTei;
          break;
        }
      }
    }
    SetCallState (CS_IN_PROCEEDING);
    CopyIeData (*pDbRemotehCall, *pDbLocalhCall, pIeUserInfo);
    CopyIeData (*pDbRemotehCall, *pDbLocalhCall, pIeLogicalLinkID);
  }
}

/****************************************************************
Function: DoRelease
Input:    Cause and Signal information element variables.
Returns:  None Processes incoming Q.931 RELease messages.
****************************************************************/ void DoRelease (UCHAR Cause, UCHAR Signal) {

UCHAR Length = 0x02;
  UCHAR hRemoteCall = *pDbRemotehCall;

if (gCauseDiag)
```

```
      Length = 0x03;

ClearTimer ();
   ReleaseChannel ();

if (Cause)
      SendIeData (pIeCause,
            Length,
            CCITT_STANDARD_LOC,
            Cause,
            gCauseDiag);

if ((Signal) && (GetCallType () == BC_VOICE)) {

SendIeData (pIeSignal,
            0x01,
            Signal,
            BLANK,
            BLANK);

DoTone (Signal, *pTePort, *(pIeChannelID + 1));
   } if ((*pSwitchTypeSet == ATT_SWITCH_SET) &&
      (GetCallType () == BC_VOICE) &&
      (*pTotalCASet))
      SendIeData (pIeSelCA,
            0x01,
            *pTeSelCA,
            BLANK,
            BLANK);

if ((*pSwitchTypeSet == NI1_SWITCH_SET) &&
      (GetCallType () == BC_VOICE) &&
      (*pTotalCASet))
      SendIeData (pIeCallAppear,
            0x01,
            (*pTeSelCA | 0x80),
            BLANK,
            BLANK);

*pDbXmtMsgType = RELEASE_COMPLETE;
   SendMsg ();

if (hRemoteCall) {
      CopyIeData (hRemoteCall, *pDbLocalhCall, pIeCause);
      ClearCall ();
      ClearOtherCall (hRemoteCall);
   }
   else
      ClearCall ();

}
```

```
/*****************************************************************
Function: DoReleaseComp
Input:   None
Returns: None Processes incoming Q.931 RELease COMPlete messages.
*****************************************************************/ void DoReleaseComp (void) {

UCHAR i;
  UCHAR Cause = BLANK;
  UCHAR Signal = SIGNAL_RINGBACK;
  UCHAR hRemoteCall = *pDbRemotehCall;

ReleaseChannel ();

if ((GetCallState (*pDbLocalhCall) > CS_NULL) &&
     (GetCallState (*pDbLocalhCall) <= CS_ACTIVE)) {
    if (hRemoteCall) {
       *pDbRemotehCall = 0;
       CopyIeData (hRemoteCall, *pDbLocalhCall, pIeCause);
       ClearCall ();
       ClearOtherCall (hRemoteCall);
    }
    else
       ClearCall ();
  }
  else
     ClearCall ();
}

/*****************************************************************
Function: GetSwitchHook
Input:   None
Returns: True if information element is contained in
         current message.

Inspects call database SwitchHook information
         element. Updates terminal data Switchhook
         status if new data is found, then clears data.
*****************************************************************/

UCHAR GetSwitchHook (void) {

XUCHAR FoundSH = FALSE;

if (*pIeSwitchHook) {
    *pTeSwitchHook = *(pIeSwitchHook + 1);
    *pIeSwitchHook = 0;
    FoundSH = TRUE;
  }
  return (FoundSH);
```

}

/*****************************************************************
Function: DoProgress
Input:   None
Returns: None Processes incoming Q.931 PROGress messages.
*****************************************************************/ void DoProgress (void) {

UCHAR hCall = *pDbRemotehCall;

ClearTimer ();
    CopyIeData (*pDbRemotehCall, *pDbLocalhCall, pIeCause);
    CopyIeData (*pDbRemotehCall, *pDbLocalhCall, pIeProgressInd);
    CopyIeData (*pDbRemotehCall, *pDbLocalhCall, pIeUserInfo);
    if (GetOtherCall (hCall)) {
        *pDbXmtMsgType = PROGRESS;
        SendMsg ();
    }
}

/*****************************************************************
Function: DoAlerting
Input:   TEI of alerting terminal.
Returns: None Processes incoming Q.931 ALERTing messages.
*****************************************************************/ void DoAlerting (UCHAR AlertTei) {

UCHAR hCall = *pDbRemotehCall;
    UCHAR i;

if (!(*pEKTSSet)) {
        for (i = 0; i < 3; ++i) {
            if (gAlertingTei[i] == 0) {
                gAlertingTei[i] = AlertTei;
                break;
            }
        }
    }
    ClearTimer ();
    CopyIeData (*pDbRemotehCall, *pDbLocalhCall, pIeUserInfo);
    CopyIeData (*pDbRemotehCall, *pDbLocalhCall, pIeLogicalLinkID);
    if ((*pSwitchTypeSet == ATT_SWITCH_SET) &&
      (*pIeCallingPartyNo) &&
      (*pDisplaySet) &&
      (*pCallerIDSet)) {

```
      SendATTDisplay (TERMINATING);
      *pDbXmtMsgType = INFO;
      SendMsg ();
   }
   else if ((*pSwitchTypeSet != ETSI_SWITCH_SET) &&
      (*pIeCallingPartyNo) &&
      (*pDisplaySet) &&
      (*pCallerIDSet)) {
      SendDisplay (TERMINATING);
      *pDbXmtMsgType = INFO;
      SendMsg ();
   }
   if (GetCallState (*pDbLocalhCall) != CS_RECEIVED) {
      SetCallState (CS_RECEIVED);
      if (GetOtherCall (hCall)) {
         SetCallState (CS_RECEIVED);
         SendAlerting ();
         ClearTimer ();
      }
   }
}

/****************************************************************
Function: DoConnect
Input:    TEI of connecting terminal.
Returns:  None Processes incoming Q.931 CONNect messages.
****************************************************************/ void DoConnect (UCHAR ConnTei) {

UCHAR TermPort =   *pDbPort;
   UCHAR hCall =      *pDbRemotehCall;
   UCHAR ConError =   FALSE;
   UCHAR ChanSel =    *(pIeChannelID + 1);
   UCHAR TermChan;
   UCHAR i;

if (!(*pEKTSSet)) {
      for (i = 0; i < 3; ++i) {
         if (gAlertingTei[i] != ConnTei) {
            if (gAlertingTei[i] != 0) {
               *pDbTei = gAlertingTei[i];
               SendRelComp (CAUSE_26, SIGNAL_TONES_OFF);
            }
         }
      }
      for (i = 0; i < 3; ++i) {
         if (gAlertingTei[i] == ConnTei) {
            *pDbTei = ConnTei;
            break;
         }
```

```
        }
        for (i = 0; i < 3; ++i)
            gAlertingTei[i] = 0;
    }
    if ((*pACOSet) &&
        ((ChanSel == CHANNEL_ID_EXCLUSIVE) ||
         (ChanSel == CHANNEL_ID_ANY))) {

*(pIeChannelID + 1) = 0;
        ConError = ReserveChannel ();
        if (ConError) {
            ConError = SelectChannel ();
            if (ConError)
                DoRelease (ConError, SIGNAL_TONES_OFF);
            else
                SendIeData (pIeChannelID,
                    1,
                        *(pIeChannelID + 1),
                        BLANK,
                        BLANK);
        }
        else
            SendIeData (pIeChannelID,
                1,
                    *(pIeChannelID + 1),
                    BLANK,
                    BLANK);

}
    if (!ConError) {
        TermChan = *(pIeChannelID + 1);
        GetSwitchHook ();
        ClearTimer ();
        SendConnectAck ();
        SetCallState (CS_ACTIVE);
        CopyIeData (*pDbRemotehCall, *pDbLocalhCall, pIeUserInfo);
        if (GetOtherCall (hCall)) {
            SetCallState (CS_ACTIVE);
            ClearTimer ();
            SendConnect ();
            DoSwitch (SWCH_CONNECT,
                    *pDbPort,
                    *(pIeChannelID + 1),
                    TermPort,
                    TermChan);
        }
    }
}

/****************************************************************
Function: DoDisconnect
Input:    Cause information element variable.
Returns:  None
```

Processes incoming Q.931 DISConnect messages.
*****************************************************************/

```c
void DoDisconnect (UCHAR Cause) {

UCHAR hLocalCall = *pDbLocalhCall;
    UCHAR hRemoteCall = *pDbRemotehCall;
    UCHAR CallState;

SetTimer (TIMER_T308);
    GetSwitchHook ();
    SetCallState (CS_RELEASE_REQUEST);
    *(pIeCause + 1) = CCITT_STANDARD_LOC;
    if (!Cause)
        CopyIeData (hRemoteCall, hLocalCall, pIeCause);
    CopyIeData (hRemoteCall, hLocalCall, pIeUserInfo);
    SendRelease (Cause);
    *pDbRemotehCall = 0;
    if (GetOtherCall (hRemoteCall)) {
        *pDbRemotehCall = 0;
        if (!(*pIeCause))
            SendIeData (pIeCause,2,CCITT_STANDARD_LOC,CAUSE_31,BLANK);
        CallState = GetCallState (hRemoteCall);
        if ((CallState > CS_PRESENT) &&
            (CallState < CS_ACTIVE) &&
            (*pDbTei != BROADCAST_TEI)) {
            SetCallState (CS_RELEASE_REQUEST);
            SetTimer (TIMER_T309);
        }
        else if ((CallState >= CS_ACTIVE) &&
            (CallState < CS_DISCONNECT_INDICATION)) {
            SetTimer (TIMER_T301);
        }
        else {
            ReleaseChannel ();
            ClearCall ();
            GetOtherCall (hLocalCall);
        }
    }
}
```

/****************************************************************
Function: DoHold
Input:   None
Returns: None Processes incoming NI-1 call HOLD messages.
*****************************************************************/

```c
void DoHold (void) {

UCHAR ThisPort = *pDbPort;
```

```
        UCHAR ThisChan =   *(pIeChannelID + 1);
        UCHAR hCall =      *pDbLocalhCall;
        UCHAR hOtherCall = *pDbRemotehCall;

if ((*pSwitchTypeSet == NI1_SWITCH_SET) ||
           (*pSwitchTypeSet == DMS_SWITCH_SET)) {
          if ((GetCallState (hCall) == CS_ACTIVE) &&
             (*pHoldSet)) {
             ReleaseChannel ();
             *pTeSelCA = 0;
             if (*pTotalCASet)
                SendIeData (pIeCallAppear,
                       0x01,
                       (*pTeSelCA | 0x80),
                       BLANK,
                       BLANK);
             *pDbXmtMsgType = HOLD_ACK;
             SendMsg ();
             if (GetOtherCall (hOtherCall)) {
                DoSwitch (SWCH_DISCONNECT,
                       *pDbPort,
                       *(pIeChannelID + 1),
                       ThisPort,
                       ThisChan);
                GetOtherCall (hCall);
             }
          }
          else {
             SendIeData (pIeCause,
                    0x02,
                    CCITT_STANDARD_LOC,
                    CAUSE_41,
                    BLANK);
             *pDbXmtMsgType = HOLD_REJ;
             SendMsg ();
          }
       }
    }

/***************************************************************
    Function: DoRetrieve
    Input:   None
    Returns: None Processes incoming NI-1 call RETrieve messages.
    ***************************************************************/ void DoRetrieve (void) {

UCHAR ThisChan;
      UCHAR ThisPort = *pDbPort;
      UCHAR ReconErr = FALSE;
      UCHAR hCall = *pDbRemotehCall;
```

```
    if ((*pSwitchTypeSet == NI1_SWITCH_SET) ||
       (*pSwitchTypeSet == DMS_SWITCH_SET)) {
      if ((GetCallState (*pDbLocalhCall) == CS_ACTIVE) &&
         (*pHoldSet)) {
        if (!(ReconErr = SelectChannel ())) {
           if (GetCallState (*pDbRemotehCall) == CS_ACTIVE ) {
              *pTeSelCA = *pDbCallAppearance;
              ThisChan = *(pIeChannelID + 1);
              *pIeChannelID |= IE_SEND_FLAG;
              *pDbXmtMsgType = RET_ACK;
              SendMsg ();
              GetOtherCall (hCall);
              DoSwitch (SWCH_CONNECT,
                    *pDbPort,
                    *(pIeChannelID + 1),
                    ThisPort,
                    ThisChan);
           }
           else {
              ReconErr = CAUSE_86;
              ReleaseChannel ();
           }
        }
      }
      else
        ReconErr = CAUSE_86;

if (ReconErr) {
        SendIeData (pIeCause,
              0x02,
              CCITT_STANDARD_LOC,
              ReconErr,
              BLANK);
        *pDbXmtMsgType = RET_REJ;
        SendMsg ();
      }
    }
}

/***************************************************************
 Function: DoAttHold
 Input:  None
 Returns: None Processes incoming AT&T call HOLD messages.
***************************************************************/ void DoAttHold (void) {

UCHAR ThisPort =   *pDbPort;
  UCHAR ThisChan =   *(pIeChannelID + 1);
  UCHAR hCall =      *pDbLocalhCall;
  UCHAR hOtherCall = *pDbRemotehCall;
```

```
if (*pSwitchTypeSet == ATT_SWITCH_SET) {
   if ((GetCallState (hCall) == CS_ACTIVE) &&
      (*pHoldSet)) {
      ReleaseChannel ();
      if (!(*pIeFeatureAct))
         *pTeSelCA = 0;
      if (*pTotalCASet)
         SendIeData (pIeSelCA,
               0x01,
               *pTeSelCA,
               BLANK,
               BLANK);
      *pDbXmtMsgType = NET_HOLD_ACK;
      SendMsg ();
      if (GetOtherCall (hOtherCall)) {
         DoSwitch (SWCH_DISCONNECT,
               *pDbPort,
               *(pIeChannelID + 1),
               ThisPort,
               ThisChan);
         GetOtherCall (hCall);
      }
   }
   else {
      SendIeData (pIeCause,
            0x02,
            CCITT_STANDARD_LOC,
            CAUSE_41,
            BLANK);
      *pDbXmtMsgType = NET_HOLD_REJ;
      SendMsg ();
   }
  }
}

/*****************************************************************
Function: DoAttDrop
Input:    None
Returns:  None Processes incoming AT&T call DROP messages.
*****************************************************************/ void DoAttDrop (void) {

UCHAR hCall = *pDbRemotehCall;

if ((*pHoldSet) && (*pSwitchTypeSet == ATT_SWITCH_SET)) {
      SetCallState (CS_DISCONNECT_INDICATION);
      SendIeData (pIeCause,
            0x02,
            CCITT_STANDARD_LOC,
            CAUSE_16,
```

```
              BLANK);
        SendDisconnect (BLANK, BLANK);
        CopyIeData (*pDbRemotehCall, *pDbLocalhCall, pIeCause);
        if (GetOtherCall (hCall)) {
          if (*pDbTei != BROADCAST_TEI) {
            SetCallState (CS_DISCONNECT_INDICATION);
            *pTeSelCA = 0;
            SendDisconnect (BLANK, BLANK);
          }
          else {
            ReleaseChannel ();
            ClearCall ();
          }
        }
      }
    }

/*****************************************************************
 Function: DoAttNetMgt
 Input:    None
 Returns:  Status (LOG_) code Processes incoming AT&T Management Information
         Messages (MIM) that initialize AT&T terminals.
*****************************************************************/ void DoAttNetMgt (void) {

UCHAR BroadcastTei =  BROADCAST_TEI;
  UCHAR hTerminal =     0;
  UCHAR OperationType;
  UCHAR OperationCode;
  UCHAR OperationParam;

gCauseDiag = 0;

if ((*pDbRcvMsgType == NET_MIM) &&
      (*pSwitchTypeSet == ATT_SWITCH_SET) &&
      (*pEKTSSet)) {

OperationType  = *(pL3RcvMessage + NET_OP_TYPE_POS);
    OperationCode  = *(pL3RcvMessage + NET_OP_CODE_POS);
    OperationParam = *(pL3RcvMessage + NET_PARAM_POS);

switch (OperationType) { case OP_TYPE_UNCONFIRMED_EVENT_REPORT:

if (OperationCode == OP_CODE_INIT_REQUEST) {

*pDbXmtMsgType = NET_MIM;

if (hTerminal = GetTeHandle (SEARCH_TEI, pDbTei)) {
```

```
      if (!(*pDbCallRef &= 0x7f)) {
         GetTsp (hTerminal);
         ClearTeCalls (hTerminal);
         ClearTsp (hTerminal);
      }
   }
   while (hTerminal = GetTeHandle (SEARCH_TEI, &BroadcastTei)) {
      GetTsp (hTerminal);
      *pTeTei = 0;
   }
   if (hTerminal = GetTeHandle (SEARCH_SPID,
      (pL3RcvMessage + SPID_POS))) {
      GetTsp (hTerminal);
      if (*pTePort == *pDbPort) {
         if (!(*pTeTei) || *pTeTei == *pDbTei) {
            *pTeTei = *pDbTei;
            *pTeUSID &= 0x7f;
            *pTeTID &= 0x7f;
            *pTeAutoInit = TE_ATT_INIT;
            SendNetMsg (MSG_TE_INIT);
         }
      }
      else if (!(*pConfigSet)) {
         hTerminal = SetDefaultTsp ();
         *pTeUSID &= 0x7f;
         *pTeTID &= 0x7f;
         *pTeAutoInit = TE_ATT_INIT;
         SendNetMsg (MSG_TE_RESTRICT);
      }
      else {
         GetTsp (*pDbPort);
         SendNetMsg (MSG_TE_RESTRICT);
      }
   }
   else if (!(*pConfigSet)) {
      hTerminal = SetDefaultTsp ();
      *pTeUSID &= 0;
      *pTeTID &= 0;
      *pTeAutoInit = TE_ATT_INIT;
      SendNetMsg (MSG_TE_RESTRICT);
   }
   else {
      GetTsp (*pDbPort);
      SendNetMsg (MSG_TE_RESTRICT);
   }
}
break;

case OP_TYPE_RETURN_RESULT_SET:

if ((OperationCode == OP_CODE_ADDRESS_INFO) &&
   (OperationParam == OP_PARAM_ID_ENDPOINT_ID) &&
   (*pTeAutoInit == TE_ATT_INIT)) {
   *pDbCallRefLen = 0;
```

```
            if (*pTotalCASet) {
                SendIeData (pIeSelCA,
                    0x01,
                    *pTeSelCA,
                    BLANK,
                    BLANK);
                *pDbXmtMsgType = INFO;
                SendMsg ();
            }
        }
        break;

default:
        GetTsp (*pDbPort);
        DoRelease (CAUSE_79, BLANK);
        break;
    }
  }
  else {
    GetTsp (*pDbPort);
    gCauseDiag = *pDbRcvMsgType;
    DoRelease (CAUSE_97, BLANK);
  }
}

/****************************************************************
Function: DoInitialize
Input:    None
Returns:  False, if initialization is error-free Processes incoming Q.931 INFOrmation messages
        that contain the Service Profile ID (SPID)
        information element.
****************************************************************/ void DoInitialize (void) {

UCHAR hTerminal = 0;
  UCHAR BroadcastTei = BROADCAST_TEI;

while (hTerminal = GetTeHandle (SEARCH_TEI, &BroadcastTei)) {
    GetTsp (hTerminal);
    *pTeTei = 0;
  }
  if (hTerminal = GetTeHandle (SEARCH_TEI, pDbTei)) {
    if (!(*pDbCallRef &= 0x7f)) {
      GetTsp (hTerminal);
      ClearTeCalls (hTerminal);
      ClearTsp (hTerminal);
    }
  }
  if (hTerminal = GetTeHandle (SEARCH_SPID, (pIeSPID + 1))) {
    GetTsp (hTerminal);
```

```
    if (*pTePort == *pDbPort) {
       if (!(*pTeTei) || *pTeTei == *pDbTei) {
          *pTeTei = *pDbTei;
          *pTeAutoInit = TE_NI1_INIT;
          *pTeUSID |= 0x80;
          *pTeTID |= 0x80;
          SendIeData (pIeEndpointID, 2, *pTeUSID, *pTeTID, BLANK);
          *pDbXmtMsgType = INFO;
          SendMsg ();
       }
    }
    else {
       GetTsp (*pDbPort);
       hTerminal = 0;
    }
 }
 else
    GetTsp (*pDbPort);

if (!hTerminal) {
    GetTsp (*pDbPort);
    SendIeData (pIeCause,
         3,
         CCITT_STANDARD_LOC,
         CAUSE_100,
         IE_SERVICE_PROFILE_ID);
    *pDbXmtMsgType = INFO;
    SendMsg ();
 }

}

/****************************************************************
Function: DoRegister
Input:   None
Returns: None Not Implemented - meant to process incoming
         NI-2 or NTI REGister messages for parameter
         downloading.
****************************************************************/ void DoRegister (void) {

LogError (LOG_ERR_UNKNOWN_MSG);
}

/****************************************************************
Function: DoCACH
Input:   None
Returns: None Processes incoming Q.931 INFOrmation messages
         that contain the Feature Activation information
```

```
            element - assumes this is a Call Appearance
            Call Handling (CACH) indicator.
****************************************************************/ void DoCACH (void) {

UCHAR hCall = GetCAHandle (*pTeTei, *pTeSelCA);

if ((*pSwitchTypeSet == ATT_SWITCH_SET) &&
       (*pTotalCASet)) {
     if (*pTeSwitchHook == OFF_HOOK) {
       if (GetOtherCall (hCall)) {
         ReadMsgData (pL3RcvMessage);
         if (*pTeSelCA == *(pIeFeatureAct + 2)) {
           SendIeData (pIeSelCA,
                       0x01,
                       *pTeSelCA,
                       BLANK,
                       BLANK);
           *pDbXmtMsgType = INFO;
           SendMsg ();
         }
         else {
           if (*(pIeFeatureAct + 2) <= *pTotalCASet) {
             *pTeSelCA = *(pIeFeatureAct + 2);
             if ((*pHoldSet == HOLD_AUTO_SET) &&
                 (GetCallState (hCall) == CS_ACTIVE)) {
               DoAttHold ();
             }
             else {
               SendIeData (pIeSelCA,
                           0x01,
                           *pTeSelCA,
                           BLANK,
                           BLANK);
               SendRelComp (CAUSE_16, BLANK);
               DoReleaseComp ();
             }
           }
         }
       }
     }
     else {
       if (*(pIeFeatureAct + 2) <= *pTotalCASet) {
         *pTeSelCA = *(pIeFeatureAct + 2);
         SendIeData (pIeSelCA,
                     0x01,
                     *pTeSelCA,
                     BLANK,
                     BLANK);
         *pDbXmtMsgType = INFO;
         SendMsg ();
       }
     }
   }
```

```
      else {
         if (*(pIeFeatureAct + 2) <= *pTotalCASet) {
            *pTeSelCA = *(pIeFeatureAct + 2);
            SendIeData (pIeSelCA,
                  0x01,
                  *pTeSelCA,
                  BLANK,
                  BLANK);

SendIeData (pIeAdjunctCont,
                  0x01,
                  0x01,
                  BLANK,
                  BLANK);

*pDbXmtMsgType = INFO;
            SendMsg ();
         }
      }
   }
   else if ((*pSwitchTypeSet != ETSI_SWITCH_SET) &&
      (*pTotalCASet) &&
      ((*(pIeFeatureAct + 1) & 0x7f) <= *pTotalCASet)) {
      if (GetOtherCall (hCall)) {
         ReadMsgData (pL3RcvMessage);
         if (*pTeSelCA == (*(pIeFeatureAct + 1) & 0x7f)) {
            SendIeData (pIeCallAppear,
                  0x01,
                  (*pTeSelCA | 0x80),
                  BLANK,
                  BLANK);
            *pDbXmtMsgType = INFO;
            SendMsg ();
         }
         else {
            *pTeSelCA = (*(pIeFeatureAct + 1) & 0x7f);
            DoDisconnect (CAUSE_16);
         }
      }
      else {
         *pTeSelCA = (*(pIeFeatureAct + 1) & 0x7f);
         SendIeData (pIeCallAppear,
               0x01,
               (*pTeSelCA | 0x80),
               BLANK,
               BLANK);
         *pDbXmtMsgType = INFO;
         SendMsg ();
      }
   }
}
/****************************************************************
Function: DoDialTreatment
```

```
Input:  None
Returns: False, if valid daling or address information is
        received.

Processes any message that contains user-provided
        called party address information.
**********************************************************/

UCHAR DoDialTreatment (void) {

UCHAR DialError = FALSE;

if ((GetCallState (*pDbLocalhCall) == CS_NULL) ||
      (GetCallState (*pDbLocalhCall) == CS_OVERLAP_SEND)) { if (*pIeKeypad)
       DialError = GetAddressInfo (pIeKeypad);
    else if ((*pIeCalledPartyNo) &&
       ((*pSwitchTypeSet == ATT_SWITCH_SET) ||
       (*pSwitchTypeSet == ETSI_SWITCH_SET)) &&
       (*pDbRcvMsgType == INFO))
       DialError = GetAddressInfo (pIeCalledPartyNo);

else if ((*pIeCalledPartyNo) &&
       (*pDbRcvMsgType == SETUP))
       DialError = GetAddressInfo (pIeCalledPartyNo);

if ((!DialError) && (GetFeatureInfo ()))
       SendStatusEnq ();

else if ((!DialError) &&
       (GetCallState (*pDbLocalhCall) == CS_OVERLAP_SEND)) { if (GetCalledTe ()) {
          ClearTimer ();
          SendCallProc ();
          SetCallState (CS_OUT_PROCEEDING);
       }
       else if (*pDbDNIndex < 7)
          SetTimer (TIMER_T400);
       else
          SetTimer (TIMER_T401);
    }
    else if (DialError) {
       if (GetCallState (*pDbLocalhCall) == CS_NULL)
          SendStatus (CAUSE_14, CS_INITIATED);
       else
          SendStatus (CAUSE_14, CS_OVERLAP_SEND);
       if (GetCalledTe ()) {
          ClearTimer ();
          SendCallProc ();
          SetCallState (CS_OUT_PROCEEDING);
       }
       else
```

```
            SetTimer (TIMER_T401);
      } if ((GetCallState (*pDbLocalhCall) == CS_OVERLAP_SEND) &&
          (*(pIeSignal + 1) == SIGNAL_DIALTONE)) {
         SendIeData (pIeSignal,
                 1,
                 SIGNAL_TONES_OFF,
                 BLANK,
                 BLANK);

*pDbXmtMsgType = INFO;
         SendMsg ();
         DoTone (SIGNAL_TONES_OFF, *pTePort, *(pIeChannelID + 1));
      }
   } return (DialError);
}

/*****************************************************************
Function: DoInfo
Input:    None
Returns:  None Processes incoming Q.931 INFOrmation messages.
*****************************************************************/ void DoInfo (void) { if (*pIeSPID) {
      if ((*pSwitchTypeSet == NI1_SWITCH_SET) ||
          (*pSwitchTypeSet == DMS_SWITCH_SET)) {
         DoInitialize ();
      }
   } if ((GetSwitchHook ()) &&
       (*pTeSwitchHook == ON_HOOK) &&
       (*pSwitchTypeSet == ATT_SWITCH_SET) &&
       (*pTotalCASet)) { if (*pTeSelCA == 0)
         *pTeSelCA = DEFAULT_SCA;
      SendIeData (pIeSelCA,
              0x01,
              *pTeSelCA,
              BLANK,
              BLANK);
      *pDbXmtMsgType = INFO;
      SendMsg ();
   }
   if ((GetSwitchHook ()) &&
```

```
    (*pTeSwitchHook == ON_HOOK) &&
    (*pEKTSSet) &&
    (pTotalCASet)) {
    if ((*pSwitchTypeSet == NI1_SWITCH_SET) ||
        (*pSwitchTypeSet == DMS_SWITCH_SET)) {
      if (*pTeSelCA == 0)
          *pTeSelCA = DEFAULT_SCA;
      SendIeData (pIeCallAppear,
              0x01,
              (*pTeSelCA | 0x80),
              BLANK,
              BLANK);
      *pDbXmtMsgType = INFO;
      SendMsg ();
    }
  }
  if (*pIeFeatureAct) {
    *pIeFeatureAct = 0;
    DoCACH ();
  }

DoDialTreatment ();

}

/****************************************************************
Function: DoAttReconn
Input:   None
Returns: None Processes incoming AT&T RECONnect messages.
****************************************************************/ void DoAttReconn (void) {

UCHAR ThisChan;
  UCHAR ThisPort = *pDbPort;
  UCHAR ReconErr = FALSE;
  UCHAR hCall = *pDbRemotehCall;

if ((GetCallState (*pDbLocalhCall) == CS_ACTIVE ) &&
      (*pHoldSet) && (*pSwitchTypeSet == ATT_SWITCH_SET)) {
    if (!(ReconErr = SelectChannel ())) {
      if (GetCallState (*pDbRemotehCall) == CS_ACTIVE ) {
        ThisChan = *(pIeChannelID + 1);
        *pIeChannelID |= IE_SEND_FLAG;
        if (*pDbCallRef & CALL_REF_FLAG) {
          if (*pDisplaySet)
              SendATTDisplay (ORIGINATING);
        }
        else if (*pIeCallingPartyNo) {
          if (*pDisplaySet)
              SendATTDisplay (TERMINATING);
```

```
                }
                *pDbXmtMsgType = NET_RECONN_ACK;
                *pTeSelCA = *pDbCallAppearance;
                SendMsg ();
                GetOtherCall (hCall);
                DoSwitch (SWCH_CONNECT,
                        *pDbPort,
                        *(pIeChannelID + 1),
                        ThisPort,
                        ThisChan);
            }
            else {
                ReconErr = CAUSE_86;
                ReleaseChannel ();
            }
        }
    }
    else
        ReconErr = CAUSE_86;

if (ReconErr) {
        SendIeData (pIeCause,
                0x02,
                CCITT_STANDARD_LOC,
                ReconErr,
                BLANK);
        *pDbXmtMsgType = NET_RECONN_REJ;
        SendMsg ();
    }
}

/****************************************************************
Function: DoAttConf
Input:   None
Returns: None Not implemented. Processes incoming AT&T CONference
        messages by returning a CONference REJect message.
****************************************************************/ void DoAttConf (void) { if ((*pHoldSet) && (*pSwitchTypeSet == ATT_SWITCH_SET)) {
        SendIeData (pIeCause,
                0x02,
                CCITT_STANDARD_LOC,
                CAUSE_79,
                BLANK);
        *pDbXmtMsgType = NET_CONF_REJ;
        SendMsg ();
    }

}
```

```
/***************************************************************
Function: DoAttTrans
Input:   None
Returns: None Not implemented. Processes incoming AT&T TRANSfer
        messages by returning a TRANSfer REJect message.
***************************************************************/ void DoAttTrans (void) { if ((*pHoldSet) && (*pSwitchTypeSet == ATT_SWITCH_SET)) {
    SendIeData (pIeCause,
            0x02,
            CCITT_STANDARD_LOC,
            CAUSE_79,
            BLANK);
    *pDbXmtMsgType = NET_TRANS_REJ;
    SendMsg ();
  }
}

/***************************************************************
Function: InitOutgoingCall
Input:   None
Returns: False if call initialized, otherwise a cause code.

Creates call database and initalizes information
        element variables for all outgoing (originating)
        calls initiated by a Q.931 SETUP message.
***************************************************************/

UCHAR InitOutgoingCall (void) {

UCHAR hCall =      0;
  UCHAR hTerminal =  0;
  UCHAR DialError =  FALSE;
  UCHAR InitError =  FALSE;
  BOOL GetAddrDigits = FALSE;

if (!(*pDbCallRef & CALL_REF_FLAG))
    InitError = CAUSE_81;

if ((*pConfigSet) && (*pSwitchTypeSet == ATT_SWITCH_SET)) {
    if (!(*pTeAutoInit)) {
      if (!(*pIeCallingPartyNo)) {
        InitError = CAUSE_96;
        gCauseDiag = IE_CALLING_PARTY_NUMBER;
      }
      else {
        if (hTerminal =
```

```
                GetTeHandle (SEARCH_DN, (pIeCallingPartyNo + 2))) {
              GetTsp (hTerminal);
              if (*pTePort == *pDbPort) {
                if (*pTeTei) {
                  if (*pTeTei != *pDbTei)
                    RemoveTerminal (*pTeTei);
                }
                *pTeTei = *pDbTei;
              }
            }
          }
        }
        else
          hTerminal = GetTeHandle (SEARCH_TEI, pDbTei);
      }
      else if ((*pSwitchTypeSet == ETSI_SWITCH_SET) ||
         (*pSwitchTypeSet == ATT_SWITCH_SET)) {
        if (*pIeCallingPartyNo) {
          if (hTerminal =
              GetTeHandle (SEARCH_DN, (pIeCallingPartyNo + 2))) {
            GetTsp (hTerminal);
            if (*pTePort == *pDbPort) {
              if (*pTeTei) {
                if (*pTeTei != *pDbTei)
                  RemoveTerminal (*pTeTei);
              }
              *pTeTei = *pDbTei;
            }
          }
        }
        else if ((*pSwitchTypeSet == ATT_SWITCH_SET) &&
           (!(*pTeAutoInit)))
          hTerminal = SetDefaultTsp ();
        else if ((*pSwitchTypeSet == ETSI_SWITCH_SET) &&
            (!(*pIeCallingPartyNo))) {
          if (!(hTerminal = GetTeHandle (SEARCH_TEI, pDbTei))) {
            hTerminal = *pDbPort;
            GetTsp (hTerminal);
            if ((*pTeTei) && (*pTeTei != BROADCAST_TEI)) {
              hTerminal = (*pDbPort + 2);
              GetTsp (hTerminal);
            }
            if ((*pTeTei) && (*pTeTei != BROADCAST_TEI))
              hTerminal = 0;
            else
              *pTeTei = *pDbTei;
          }
        }
        else
          hTerminal = GetTeHandle (SEARCH_TEI, pDbTei);
      }
      else
        hTerminal = GetTeHandle (SEARCH_TEI, pDbTei);
```

```
if ((!InitError) && (hTerminal)) {
   if (hCall = CreateCall (*pDbTei, *pDbCallRef)) {
      GetCall (hCall);
      *pDbLocalhCall = hCall;
      GetMsgHeader (pL3RcvMessage);
      ReadMsgData (pL3RcvMessage);
      if (*pIeOrigCA)
         *pDbCallAppearance = *(pIeOrigCA + 1);
      else if (*pIeCallAppear) {
         *pDbCallAppearance = *(pIeCallAppear + 1);
         *pDbCallAppearance &= 0x7f;
      }
      GetSwitchHook ();
      InitError = TestBearerCap ();
      if (!InitError) {
         InitError = ReserveChannel ();
         if (!InitError) {
            if ((*pSwitchTypeSet == ETSI_SWITCH_SET) &&
               (*pIeCalledPartyNo))
               GetAddrDigits = TRUE;
            else if (((*pIeKeypad) || (*pIeCalledPartyNo)) &&
               (*pSwitchTypeSet != ETSI_SWITCH_SET))
               GetAddrDigits = TRUE;
            if (GetAddrDigits) {
               DialError = DoDialTreatment ();
               if ((!DialError) &&
                  (!(*pIeSendComplete)) &&
                  (GetCalledTe ()) &&
                  (GetCallState (*pDbLocalhCall) !=
                  CS_OUT_PROCEEDING)) {
                  ClearTimer ();
                  SendCallProc ();
                  SetCallState (CS_OUT_PROCEEDING);
               }
               else if ((!DialError) &&
                  (*pIeSendComplete) &&
                  ((*pSwitchTypeSet == ATT_SWITCH_SET) ||
                  (*pSwitchTypeSet == ETSI_SWITCH_SET))) {
                  SetTimer (TIMER_T401);
                  *pDbTimerTime = 1;
               }
               else if ((!DialError) &&
                  (!GetCalledTe ()) &&
                  (*pDbDNIndex)) {
                  SetTimer (TIMER_T400);
                  SetCallState (CS_OVERLAP_SEND);
                  SendSetupAck (SIGNAL_TONES_OFF);
               }
            }
         }
         else {
            SetCallState (CS_OVERLAP_SEND);
            SetTimer (TIMER_T400);
            SendSetupAck (SIGNAL_DIALTONE);
         }
```

```
            }
          }
        }
        else
          InitError = CAUSE_42;
      }
      if ((!InitError) && (!hTerminal))
        InitError = CAUSE_111;

return (InitError);
    }

/****************************************************************
    Function: InitIncomingCall
    Input:   None
    Returns: None Creates call database and initalizes information
            element variables for all ingoing (terminating)
            calls once the originating user has provided
            valid address (directory number) information.
    ****************************************************************/ void InitIncomingCall (void) {

UCHAR hTerminal;
      UCHAR hCall;
      UCHAR TermCallRef =   GetNextCallRef ();
      UCHAR hOrigCall =     *pDbLocalhCall;
      UCHAR DisplayCPN =    FALSE;
      UCHAR InitError =     FALSE;

if (hTerminal = GetCalledTe ()) {
        DisplayCPN = TestCallingPartyNo ();
        GetTsp (hTerminal);
        *pTeFirstCref = TermCallRef;
        if (!(*pTeTei)) {
           *pTeTei = BROADCAST_TEI;
        }
        if (hCall = CreateCall (*pTeTei, TermCallRef)) {
           *pDbRemotehCall = hCall;
           GetCall (hCall);
           *pDbLocalhCall = hCall;
           *pDbRemotehCall = hOrigCall;
           *pDbPort = *pTePort;
           *pDbTei = *pTeTei;
           *pDbCallRefLen = 1;
           *pDbCallRef = TermCallRef;
           SetCallState (CS_PRESENT);

CopyIeData (*pDbLocalhCall, *pDbRemotehCall, pIeBearer);
           CopyIeData (*pDbLocalhCall, *pDbRemotehCall, pIeCalledPartySubaddr);
           CopyIeData (*pDbLocalhCall, *pDbRemotehCall, pIeCallingPartySubaddr);
```

```
CopyIeData (*pDbLocalhCall, *pDbRemotehCall, pIeLowLayerCap);
CopyIeData (*pDbLocalhCall, *pDbRemotehCall, pIeHighLayerCap);
CopyIeData (*pDbLocalhCall, *pDbRemotehCall, pIeUserInfo);

if (DisplayCPN)
   CopyIeData (*pDbLocalhCall, *pDbRemotehCall, pIeCallingPartyNo);

if (GetCallType () == BC_VOICE) {
   *pDbCallAppearance = GetIdleCA ();
   if ((!*pDbCallAppearance) && (*pTotalCASet))
      InitError = CAUSE_17;
}
if (!InitError) {
   InitError = SelectChannel ();
   if (!InitError) {
      SendSetup ();
      SetTimer (TIMER_T303);
   }
   else if ((*pDbCallAppearance) &&
      (*pACOSet) &&
      (InitError == CAUSE_17)) {
      *pIeChannelID = 1;
      *(pIeChannelID + 1) = CHANNEL_ID_EXCLUSIVE;
      SendSetup ();
      SetTimer (TIMER_T303);
   }
   else {
      ReleaseChannel ();
      ClearCall ();
      GetOtherCall (hOrigCall);
      SetTimer (TIMER_T306);
      SendProgress (InitError, SIGNAL_BUSY, TONES_APPLIED);
   }
  }
  else {
      ReleaseChannel ();
      ClearCall ();
      GetOtherCall (hOrigCall);
      SetTimer (TIMER_T306);
      SendProgress (InitError, SIGNAL_BUSY, TONES_APPLIED);
   }
 }
 else {
      GetOtherCall (hOrigCall);
      SetTimer (TIMER_T306);
      SendProgress (CAUSE_42, SIGNAL_REORDER, TONES_APPLIED);
   }
  }
}
else {
   SetTimer (TIMER_T306);
   SendProgress (CAUSE_1, SIGNAL_REORDER, TONES_APPLIED);
}
}
```

```
/****************************************************************
Function: DoCallControl
Input:    None
Returns:  False if no call errors, cause code otherwise.

This is the "top" function for Q.931 call control
        processing. The Call Reference number is validated,
        the incoming message is loaded into the associated
        call database, the call state is tested, and the
        appropriate processing for the recieved message
        type is executed.
****************************************************************/ void DoCallControl (void) {

XUCHAR CallError = FALSE;
  XUCHAR hTerminal;
  XUCHAR hCall;
  XUCHAR CallState;
  XUCHAR IncomingTei;

gCauseDiag = 0;

hCall = GetCallHandle (*pDbTei, *pDbCallRef);

if (hCall >= MAX_CALLS) {

// Call does not (yet) exist switch (*pDbRcvMsgType) { case REGISTER:
              CallError = ReadMsgData (pL3RcvMessage);
            if (!CallError)
              DoRegister ();
            else {
              *pTeSelCA = 0;
              DoRelease (CallError, BLANK);
            }
            break;

case SETUP:
          CallError = ReadMsgData (pL3RcvMessage);
          if (!CallError)
            CallError = InitOutgoingCall ();
          if (CallError) {
            *pTeSelCA = 0;
            DoRelease (CallError, BLANK);
          }
          break;

case STATUS_ENQUIRY:
          SendStatus (CAUSE_30, CS_NULL);
          break;
```

```
          case RELEASE_COMPLETE:
             break;

default:
             if ((*pSwitchTypeSet == ATT_SWITCH_SET) ||
                 (*pSwitchTypeSet == ETSI_SWITCH_SET))
                DoRelease (CAUSE_86, BLANK);
             else
                DoRelease (CAUSE_81, BLANK);
             break;
       }

}
   else if (hCall == GLOBAL_CALL) {

// Call Reference is Global or Null switch (*pDbRcvMsgType) { case NET_MIM:
            if ((*pSwitchTypeSet == ATT_SWITCH_SET) &&
                (*pDbCallRefLen == 1))
               DoAttNetMgt ();
            else {
               gCauseDiag = *pDbRcvMsgType;
               SendRelComp (CAUSE_97, BLANK);
            }
            break;

case INFO:
            CallError = ReadMsgData (pL3RcvMessage);
            if (!CallError)
               DoInfo ();
            break;

case STATUS:
            break;

case STATUS_ENQUIRY:
            SendStatus (CAUSE_30, CS_NULL);
            break;

case RELEASE:
            DoRelease (CAUSE_81, BLANK);
            break;

case RELEASE_COMPLETE:
            break;

case RESTART:
            break;

case RESTART_ACK:
```

```
            break;

default:
            SendStatusEnq ();
            break;
        }
    }
    else if ((*pDbRcvMsgType == NET_MIM) &&
        (*pSwitchTypeSet == ATT_SWITCH_SET))
        DoAttNetMgt ();

else {

// The Call Reference number is established for
        // a call in progress...

IncomingTei = *pDbTei;
        GetCall (hCall);
        CallError = ReadMsgData (pL3RcvMessage);

// If first response from a non-initializing terminal,
        // find TSP and capture TEI.

if (*pDbTei == BROADCAST_TEI) {
            if (hTerminal = GetTeHandle (SEARCH_CREF, pDbCallRef)) {
                GetTsp (hTerminal);
                if ((*pTeTei == BROADCAST_TEI) ||
                    (*pTeTei == 0))
                    *pTeTei = IncomingTei;
            }
            if ((*pTeTei != BROADCAST_TEI) &&
                (*pTeTei != 0))
                *pDbTei = *pTeTei;
        }
        else {
            hTerminal = GetTeHandle (SEARCH_TEI, pDbTei);
            GetTsp (hTerminal);
        }
        if (CallError)
            SendStatusEnq ();

// Test incoming message for call state

CallState = GetCallState (*pDbLocalhCall);
        if (TestCallState (*pDbRcvMsgType, CallState)) {

// Process incoming message switch (*pDbRcvMsgType) { case INFO:
                    DoInfo ();
                    break;
```

```
case ALERTING:
   DoAlerting (IncomingTei);
   break;

case CALL_PROCEEDING:
   DoCallProc (IncomingTei);
   break;

case CONNECT:
   DoConnect (IncomingTei);
   break;

case CONNECT_ACK:
   break;

case PROGRESS:
   DoProgress ();
   break;

case DISCONNECT:
   DoDisconnect (BLANK);
   break;

case RELEASE:
   DoRelease (BLANK, BLANK);
   break;

case RELEASE_COMPLETE:
   DoReleaseComp ();
   break;

case STATUS:
   if (*(pIeCause + 2) == CAUSE_41)
      DoRelease (CAUSE_41, BLANK);
   if (*(pIeCause + 2) == CAUSE_101)
      DoRelease (CAUSE_111, BLANK);
   break;

case STATUS_ENQUIRY:
   SendStatus (CAUSE_30, (GetCallState (*pDbLocalhCall)));
   break;

case HOLD:
   DoHold ();
   break;

case RET:
   DoRetrieve ();
   break;

case NET_HOLD:
   DoAttHold ();
   break;
```

```
                    case NET_DROP:
                        DoAttDrop ();
                        break;

case NET_RECONN:
                        DoAttReconn ();
                        break;

case NET_CONF:
                        DoAttConf ();
                        break;

case NET_TRANS:
                        DoAttTrans ();
                        break;

default:
                        SetCallState (CS_RELEASE_REQUEST);
                        gCauseDiag = *pDbRcvMsgType;
                        SendRelease (CAUSE_97);
                        LogError (LOG_ERR_UNKNOWN_MSG);
                        break;
                }
            }
            else {
                SendStatusEnq ();
            }
        }

// Trigger for creating incoming call if (GetCallState (*pDbLocalhCall) == CS_OUT_PROCEEDING) {
            SetCallState (CS_DELIVERED);
            InitIncomingCall ();
        }
    }

/****************************************************************
Function: DoL3Timer
Input:    None
Returns:  None Processes all Q.931 network timer functions when
        they expire.
****************************************************************/ void DoL3Timer (void) {

UCHAR hCall;
    UCHAR hRemoteCall;
    UCHAR Signal = BLANK;

for (hCall = 1; hCall < MAX_CALLS; ++hCall) {
```

```
if (TestCallTimer (hCall)) { hRemoteCall = *pDbRemotehCall;

switch (*pDbTimerType) { case TIMER_T301:
      SetTimer (TIMER_T308);
      SetCallState (CS_DISCONNECT_INDICATION);
      if ((*pTeSwitchHook == OFF_HOOK) &&
          (*pTeSelCA == *pDbCallAppearance))
        *pTeSelCA = 0;
      if (*pIeSignal)
        Signal = SIGNAL_TONES_OFF;
      SendDisconnect (CAUSE_16, Signal);
      break;

case TIMER_T303:
      SetTimer (TIMER_T312);
      if (GetCallState (*pDbLocalhCall) != CS_IN_PROCEEDING)
        SendSetup ();
      if (GetOtherCall (hRemoteCall)) {
        if ((*pSwitchTypeSet == ATT_SWITCH_SET) ||
            (*pSwitchTypeSet == ETSI_SWITCH_SET)) {
          if (GetCallType () == BC_VOICE)
            SendProgress (CAUSE_31,
                    SIGNAL_RINGBACK,
                    TONES_APPLIED);
          else
            SendProgress (CAUSE_31,
                    BLANK,
                    TONES_APPLIED);
        }
        else {
          if (GetCallType () == BC_VOICE)
            SendProgress (BLANK,
                    SIGNAL_RINGBACK,
                    TONES_APPLIED);
          else
            SendProgress (BLANK,
                    BLANK,
                    INTERFACE_DELAY);
        }

}
      break;

case TIMER_T306:
      SetTimer (TIMER_T308);
      SetCallState (CS_DISCONNECT_INDICATION);
      if ((*pTeSwitchHook == OFF_HOOK) &&
          (*pTeSelCA == *pDbCallAppearance) &&
          (*pTotalCASet))
        *pTeSelCA = 0;
```

```
        if (*pIeSignal)
            Signal = SIGNAL_TONES_OFF;
        SendDisconnect (BLANK, Signal);
        break;

case TIMER_T308:
        if (GetCallState (*pDbLocalhCall) == CS_RELEASE_REQUEST) {
            SetTimer (TIMER_T308);
            SetCallState (CS_NULL);
            SendRelease (CAUSE_102);
        }
        else if (GetCallState (*pDbLocalhCall) == CS_NULL) {
            ReleaseChannel ();
            ClearCall ();
        }
        else {
            SetTimer (TIMER_T308);
            SetCallState (CS_RELEASE_REQUEST);
            SendRelease (CAUSE_102);
        }
        break;

case TIMER_T309:
        SetTimer (TIMER_T310);
        SetCallState (CS_NULL);
        SendRelease (*(pIeCause + 2));
        break;

case TIMER_T310:
        SendRelComp (*(pIeCause + 2), BLANK);
        ReleaseChannel ();
        ClearCall ();
        break;

case TIMER_T312:
        ReleaseChannel ();
        ClearCall ();
        if (GetOtherCall (hRemoteCall)) {
            SetTimer (TIMER_T306);
            if (GetCallType () == BC_VOICE)
                SendProgress (CAUSE_18,
                        SIGNAL_RINGBACK,
                        TONES_APPLIED);
            else
                SendProgress (CAUSE_18,
                        BLANK,
                        TONES_APPLIED);

}
        break;

case TIMER_T400:
        if (GetCallState (*pDbLocalhCall) == CS_NULL)
```

```
            DoRelease (CAUSE_28, SIGNAL_REORDER);
         else {
            if (GetCallType () == BC_VOICE)
               SendProgress (CAUSE_28, SIGNAL_REORDER, TONES_APPLIED);
            else
               SendProgress (CAUSE_28, BLANK, TONES_APPLIED);
            SetTimer (TIMER_T306);
         }
         break;

case TIMER_T401:
         if (GetCalledTe () &&
            GetCallState (*pDbLocalhCall) !=
            CS_OUT_PROCEEDING) {
            SendCallProc ();
            SetCallState (CS_OUT_PROCEEDING);
         }
         else if (*pIeCalledPartyNo)
            DoRelease (CAUSE_1, SIGNAL_REORDER);
         else {
            if (GetCallType () == BC_VOICE)
               SendProgress (CAUSE_1, SIGNAL_REORDER, TONES_APPLIED);
            else
               SendProgress (CAUSE_1, BLANK, TONES_APPLIED);
            SetTimer (TIMER_T306);
         }
         break;

}
    }
  }
}

/***************************************************************
Function: DoLayer3
Input:    Start up indicator
Returns:  Keypad input received during emulation.

This is the entry function for this module from
         COE.C. It initializes Layer 2 & 3 variables and
         begins emulation by calling Layer 2, DoILC() to
         get the first incoming packet.
***************************************************************/

UCHAR DoLayer3 (UCHAR Startup) {

XUCHAR hTerminal;
   XUCHAR hPort;
   XUCHAR ProvPort;
   XUCHAR L2Status;
   XUCHAR Clear;
```

```
hTerminal =   FALSE;
hPort =       FALSE;
gEmulateEsc = KBD_NULL;
L2Status =    DL_DATA_INDICATION;

ClrError ();

if (Startup)
   Clear = TRUE;
else {
   Clear = FALSE;
   ClrDisplay ();
   UpdateMsgDisplay (BLANK);
   SetEmuOn ();
   SetIDEC (IDEC_INT_UPDATE);

} while (gEmulateEsc == KBD_NULL) { if (Clear) {
      ResetSt ();
      DisplayProgress (pszPhyLayer, 3);
      InitSwitch ();
      DisplayProgress (pszDataLayer, 2);
      InitLayer2 ();
      DisplayProgress (pszNetLayer, 1);
      InitLayer3 ();
      ClrDisplay ();
      UpdateMsgDisplay (BLANK);
      Clear = FALSE;
      SetEmuOn ();
      SetIDEC (IDEC_INT_ON);
      ProvPort = 0;
      ClrError ();
   }

L2Status = DoILC (DL_DATA_INDICATION, pL3RcvMessage, pL3RcvBytes);

switch (L2Status) { case DL_NULL: // Nothing happening at layer 2
         DoL3Timer ();
         break;

case PH_DEACTIVATE: // Interface deactivation
         if (hPort = GetIdlePort ()) {
            if ((hPort & PORT1) == PORT1) {
               ProvPort &= PORT2;
               ClearTerminal (1);
               ClearTerminal (3);
               pP1DN = pszNoDN;
               pP1StatDisplay = pszBlankLine;
               gP1DisplayMsg = UNKNOWN;
```

```
      }
      if ((hPort & PORT2) == PORT2) {
        ProvPort &= PORT1;
        ClearTerminal (2);
        ClearTerminal (4);
        pP2DN = pszNoDN;
        pP2StatDisplay = pszBlankLine;
        gP2DisplayMsg = UNKNOWN;
      }
      UpdateMsgDisplay (BLANK);
      InitTone ();
      if (*pProvision != CHANNEL_LPBK_SET)
        ProvSwitch (CHANNEL_NONE_SET);
      LogError (LOG_ERR_INTERFACE_CHANGE);
      hPort = FALSE;
    }
    break;

case PH_ACTIVATE: // Interface activation
    if (hPort = GetActivePort ()) {
      Pause (100);
      if ((hPort & PORT1) == PORT1) {
        ProvPort |= PORT1;
        *pL3RcvMessage = PORT1;
        DoILC (MDL_REMOVE_REQUEST, pL3RcvMessage, pL3RcvBytes);
      }
      if ((hPort & PORT2) == PORT2) {
        ProvPort |= PORT2;
        *pL3RcvMessage = PORT2;
        DoILC (MDL_REMOVE_REQUEST, pL3RcvMessage, pL3RcvBytes);
      }
      if (ProvPort == (PORT1 | PORT2))
        ProvSwitch (*pProvision);
      else if (*pProvision == CHANNEL_LPBK_SET)
        ProvSwitch (*pProvision);
    }
    break;

case DL_DATA_INDICATION: // Incoming packet if (GetField (GET_SAPI, pL3RcvMessage) == SAPI_0) {
      GetGlobalCall ();
      ClearCall ();
      GetMsgHeader (pL3RcvMessage);
      if (hTerminal = GetTeHandle (SEARCH_TEI, pDbTei))
        GetTsp (hTerminal);
      else
        GetTsp (*pDbPort);
      UpdateMsgDisplay (DIR_RCV);
      DoCallControl ();
    }
    else if (GetField (GET_SAPI, pL3RcvMessage) == SAPI_16)
      DoX25 (pL3RcvMessage,
          pL3RcvBytes,
```

```
                pL3XmtMessage,
                pL3XmtBytes);
        break;

}
  }
  InitTone ();
  return (gEmulateEsc);
}
```

```
/*****************************************************************

ISDN 2000 Central Office Emulator

Monitor Functions and Routines (c) 1994 Merge Technologies Inc.

General: This module performs Layer 1 monitoring and
display functions when the user presses LAYER 1 MONITOR
on the keypad.
*****************************************************************/ ifndef NODEBUG
pragma DEBUG CODE SYMBOLS OBJECTEXTEND
endif include <coe_reg.h>
include <coe.h>
#include <coe_mon.h>
#include <lib_util.h>
#include <lib_io.h>
include <lib_swch.h>
#include <lib_str.h>

/*****************************************************************
  Function: MonitorU
  Input:    U interface highway to monitor
  Returns:  Key pressed by user This function is called when the user chooses to
            monitor either U interface.
*****************************************************************/

UCHAR MonitorU (UCHAR Hwy) {

UCHAR StatusBytes[MAX_STATUS_BYTES];
   UCHAR MenuKey =    KBD_NULL;
   BOOL Done =        FALSE;
   BOOL ClearDisplay = TRUE;

while (!Done) { if (ClearDisplay) {
         ClearDisplay = FALSE;
         ClrDisplay ();
         DisplayPosition (1,1);

if (Hwy == HWY0) {
            Display ("--------P1 U--------");
         }
         else {
            Display ("--------P2 U--------");
         }
```

```
    DisplayPosition (2,1);
    Display (BulletOff);
    Display ("SYNC ");
    Display (BulletOff);
    Display ("ACT  ");
    Display (BulletOff);
    Display ("XACT ");
    DisplayPosition (3,1);
    Display (BulletOff);
    Display ("NEBE ");
    Display (BulletOff);
    Display ("FEBE ");
    Display (BulletOff);
    Display ("SAI ");
    DisplayPosition (4,1);
    Display (BulletOff);
    Display ("PWR1 ");
    Display (BulletOff);
    Display ("PWR2 ");
    Display (BulletOff);
    Display ("CSO ");

}

GetUStatus (Hwy, StatusBytes);

DisplayPosition (2,1);
if (StatusBytes[MON_DS] & MON_OOF)
    Display (BulletOn);
else {
    Display (BulletOff);
    StatusBytes[MON_DS] = 0;
    StatusBytes[MON_UM2] = 0;
    StatusBytes[MON_UM3] = 0;
}

DisplayPosition (2,8);
if (StatusBytes[MON_UM2] & MON_ACT)
    Display (BulletOn);
else
    Display (BulletOff);

DisplayPosition (2,15);
if (StatusBytes[MON_DS] & MON_XACT)
    Display (BulletOn);
else
    Display (BulletOff);

DisplayPosition (3,1);
if (!(StatusBytes[MON_DS] & MON_NEBE))
    Display (BulletOn);
else
    Display (BulletOff);
```

```c
    DisplayPosition (3,8);
    if (!(StatusBytes[MON_UM3] & MON_FEBE))
       Display (BulletOn);
    else
       Display (BulletOff);

DisplayPosition (3,15);
    if (StatusBytes[MON_UM3] & MON_SAI)
       Display (BulletOn);
    else
       Display (BulletOff);

DisplayPosition (4,1);
    if (StatusBytes[MON_UM2] & MON_PS1)
       Display (BulletOn);
    else
       Display (BulletOff);

DisplayPosition (4,8);
    if (StatusBytes[MON_UM3] & MON_PS2)
       Display (BulletOn);
    else
       Display (BulletOff);

DisplayPosition (4,15);
    if (StatusBytes[MON_UM3] & MON_CSO)
       Display (BulletOn);
    else
       Display (BulletOff);

MenuKey = GetKbd ();
    switch (MenuKey) { case KBD_NULL:
          break;

default:
          Done = TRUE;
          break;

}
  }
  return (MenuKey);
}

/***************************************************************
Function: MonitorST
Input:   S/T interface highway to monitor
Returns: Key pressed by user This function is called when the user chooses
         to monitor either S/T interface.
```

```
*****************************************************************/

UCHAR MonitorST (UCHAR Hwy) {

UCHAR StatusBytes[MAX_STATUS_BYTES];
  UCHAR MenuKey =    KBD_NULL;
  UCHAR TempStatus;
  UCHAR TestCntr = 0;
  BOOL Done =        FALSE;
  BOOL ClearDisplay = TRUE;

StatusBytes[MON_QSBITS] &= MON_QBIT_MASK;
  StatusBytes[MON_QSBITS] |= MON_SBIT_NORM;
  StatusBytes[MON_LBITS] = MON_LPBK_NORM;

while (!Done) { if (ClearDisplay) {
      ClearDisplay = FALSE;
      ClrDisplay ();
      DisplayPosition (1,1);

if (Hwy == HWY2) {
        Display ("-------P1 S/T-------");
      }
      else {
        Display ("-------P2 S/T-------");
      }

DisplayPosition (2,1);
      Display ("XMT=INFO0 ");
      Display ("RCV=INFO0 ");
      DisplayPosition (3,1);
      Display ("SBIT=NONE ");
      Display ("QBIT=NONE ");
      DisplayPosition (4,1);
      Display ("LPBK=NONE ");
    }

GetSTStatus (Hwy, StatusBytes);

DisplayPosition (2,5);
    TempStatus = (StatusBytes[MON_INFO] & MON_XMT_MASK);

switch (TempStatus) { case MON_XMT_INFO1:
        Display ("INFO1");
        break;

case MON_XMT_INFO2:
        Display ("INFO2");
        break;
```

```
    case MON_XMT_INFO4:
      Display ("INFO4");
      break;

default:
      Display ("INFO0");
      break;
}

DisplayPosition (2,16);
TempStatus = (StatusBytes[MON_INFO] & MON_REC_MASK);

switch (TempStatus) { case MON_REC_INFO1:
      Display ("INFO1");
      break;

case MON_REC_INFO3:
      Display ("INFO3");
      break;

default:
      Display ("INFO0");
      break;
}

DisplayPosition (3,17);
StatusBytes[MON_QSBITS] &= MON_QBIT_MASK;
TempStatus = StatusBytes[MON_QSBITS];

switch (TempStatus) { case MON_QBIT_NORM:
      Display ("NORM");
      StatusBytes[MON_QSBITS] |= MON_SBIT_NORM;
      StatusBytes[MON_LBITS] = MON_LPBK_NORM;
      break;

case MON_QBIT_PWR:
      Display ("PWR ");
      StatusBytes[MON_QSBITS] |= MON_SBIT_PWR;
      break;

case MON_QBIT_LB1:
      Display ("LBB1");
      StatusBytes[MON_QSBITS] |= MON_SBIT_LB1;
      StatusBytes[MON_LBITS] = MON_LPBK_B1;
      break;

case MON_QBIT_LB2:
      Display ("LBB2");
```

```
      StatusBytes[MON_QSBITS] |= MON_SBIT_LB2;
      StatusBytes[MON_LBITS] = MON_LPBK_B2;
      break;

case MON_QBIT_LPBK:
      Display ("LPBK");
      StatusBytes[MON_QSBITS] |= MON_SBIT_LPBK;
      StatusBytes[MON_LBITS] = MON_LPBK_B1B2;
      break;

case MON_QBIT_RQST:
      Display ("TEST");
      if (++TestCntr > 10) {
         StatusBytes[MON_QSBITS] |= MON_SBIT_PASS;
         TestCntr = 0;
      }
      else
         StatusBytes[MON_QSBITS] |= MON_SBIT_TEST;
      break;

default:
      Display ("ERR ");
      break;
}

DisplayPosition (3,6);
TempStatus = (StatusBytes[MON_QSBITS] & MON_SBIT_MASK);

switch (TempStatus) { case MON_SBIT_NORM:
      Display ("NORM");
      break;

case MON_SBIT_PWR:
      Display ("PWR ");
      break;

case MON_SBIT_LB1:
      Display ("LBB1");
      break;

case MON_SBIT_LB2:
      Display ("LBB2");
      break;

case MON_SBIT_LOSSR:
      Display ("LOSS");
      break;

case MON_SBIT_LPBK:
      Display ("LPBK");
      break;
```

```
    case MON_SBIT_TEST:
        Display ("TEST");
        break;

case MON_SBIT_PASS:
        Display ("PASS");
        break;

case MON_SBIT_FAIL:
        Display ("FAIL");
        break;

default:
        Display ("ERR ");
        break;
}

DisplayPosition (4,6);

TempStatus = (StatusBytes[MON_LBITS] & MON_LPBK_MASK);

switch (TempStatus) { case MON_LPBK_NORM:
        Display ("NONE");
        break;

case MON_LPBK_B1:
        Display ("B1 ");
        break;

case MON_LPBK_B2:
        Display ("B2 ");
        break;

case MON_LPBK_D:
        Display ("D  ");
        break;

case MON_LPBK_2BD:
        Display ("2B+D");
        break;

case MON_LPBK_B1B2:
        Display ("B1B2");
        break;
}

MenuKey = GetKbd ();
switch (MenuKey) { case KBD_NULL:
        break;
```

```
        default:
            Done = TRUE;
            break;

}
    }
    return (MenuKey);
}

/****************************************************************
Function: UpdateMonDisplay
Input:    Clear display flag
Returns:  None This function, called by DoMonitor, updates the
        top level menu as needed when the LAYER 1 MONITOR
        key is pressed or the menu is returned to from an
        interface monitor display.
****************************************************************/ void UpdateMonDisplay (UCHAR ClearDisplay) {

UCHAR Status;
    UCHAR ActiveStr[] =   "ACTIVE";
    UCHAR IdleStr[] =     "IDLE  ";

if (ClearDisplay)
        ClrDisplay ();

DisplayPosition (1,1);
    Display (Menu1);
    Display (" P1 U:");
    DisplayPosition (2,1);
    Display (Menu2);
    Display (" P1 S/T:");
    DisplayPosition (3,1);
    Display (Menu3);
    Display (" P2 S/T:");
    DisplayPosition (4,1);
    Display (Menu4);
    Display (" P2 U:");

Status = GetActiveHwys ();

DisplayPosition (1,13);
    if (Status & HWY0_STATUS)
        Display (ActiveStr);
    else
        Display (IdleStr);

DisplayPosition (2,13);
    if (Status & HWY2_STATUS)
```

```
      Display (ActiveStr);
   else
      Display (IdleStr);

DisplayPosition (3,13);
   if (Status & HWY3_STATUS)
      Display (ActiveStr);
   else
      Display (IdleStr);

DisplayPosition (4,13);
   if (Status & HWY1_STATUS)
      Display (ActiveStr);
   else
      Display (IdleStr);

}

/****************************************************************
Function: DoMonitor
Input:   None
Returns: Key pressed by user This is the entry function for this module. It
         displays the interface menu, updates the interface
         status, and processes keyboard input.
****************************************************************/

UCHAR DoMonitor (void) {

UCHAR MenuKey =   KBD_MON_L1;
   BOOL Done =       FALSE;

while (!Done) { if (MenuKey == KBD_NULL)
         MenuKey = GetKbd ();

switch (MenuKey) { case KBD_F1:
            MenuKey = MonitorU (HWY0);
            break;

case KBD_F2:
            MenuKey = MonitorST (HWY2);
            break;

case KBD_F3:
            MenuKey = MonitorST (HWY3);
            break;

case KBD_F4:
```

```
            MenuKey = MonitorU (HWY1);
            break;

case KBD_MON_L1:
            MenuKey = KBD_NULL;
            UpdateMonDisplay (TRUE);
            break;

case KBD_NULL:
            UpdateMonDisplay (FALSE);
            Pause (250);
            break;

default:
            Done = TRUE;
            break;
        }

} return (MenuKey);
}
```

```
/****************************************************************

ISDN 2000 Central Office Emulator

Layer 3 Message Tables and Functions (c) 1994 Merge Technologies Inc.

General: This module defines the structure and content of
all messages and their information elements used by COE_L3.C.
Access routines are also provided to COE_DB.C for message
parsing and generation.

This module also defines and tests the call states allowed
for a particular message type.
****************************************************************/ ifndef NODEBUG
pragma DEBUG CODE SYMBOLS OBJECTEXTEND
endif include <coe.h>
include <lib_msg.h>
#include <coe_msg.h>
#include <lib_db.h>
#include <lib_util.h>
include <lib_set.h>

/****************************************************************
  Q.931 Message Index Table
****************************************************************/

UCHAR code MsgIndex[MAX_MSG_TYPES] = {

NET_ESCAPE,
    SETUP,
    SETUP_ACK,
    CALL_PROCEEDING,
    PROGRESS,
    ALERTING,
    CONNECT,
    CONNECT_ACK,
    DISCONNECT,
    RELEASE,
    RELEASE_COMPLETE,
    RESTART,
    RESTART_ACK,
    FACILITY,
    REGISTER,
    NOTIFY,
    INFO,
    STATUS,
    STATUS_ENQUIRY,
    HOLD,
```

```
        HOLD_ACK,
        HOLD_REJ,
        RET,
        RET_ACK,
        RET_REJ,
        X25_PROTOCOL,
        NET_CONF,
        NET_CONF_ACK,
        NET_CONF_REJ,
        NET_TRANS,
        NET_TRANS_ACK,
        NET_TRANS_REJ,
        NET_ASSOC,
        NET_ASSOC_ACK,
        NET_DROP,
        NET_DROP_ACK,
        NET_DROP_REJ,
        NET_HOLD,
        NET_HOLD_ACK,
        NET_HOLD_REJ,
        NET_RECONN,
        NET_RECONN_ACK,
        NET_RECONN_REJ,
        NET_REDIRECT,
        NET_MIM,
        UNKNOWN };

/****************************************************************
    Index Tabel to Message/Info Element Tables
****************************************************************/

UCHAR code MaxIEIndex[MAX_MSG_TYPES] = {

MAX_NETESC_IE,
        MAX_SETUP_IE,
        MAX_SETUPACK_IE,
        MAX_CALLPROC_IE,
        MAX_PROGRESS_IE,
        MAX_ALERTING_IE,
        MAX_CONNECT_IE,
        MAX_CONNACK_IE,
        MAX_DISC_IE,
        MAX_REL_IE,
        MAX_RELCOMP_IE,
        MAX_RESTART_IE,
        MAX_RESTACK_IE,
        MAX_FACILITY_IE,
        MAX_REGISTER_IE,
        MAX_NOTIFY_IE,
        MAX_INFO_IE,
        MAX_STATUS_IE,
        MAX_STATENQ_IE,
        MAX_HOLD_IE,
```

```
MAX_HOLD_ACK_IE,
MAX_HOLD_REJ_IE,
MAX_RET_IE,
MAX_RET_ACK_IE,
MAX_RET_REJ_IE,
MAX_X25_IE,
MAX_NET_CONF_IE,
MAX_NET_CONF_ACK_IE,
MAX_NET_CONF_REJ_IE,
MAX_NET_TRANS_IE,
MAX_NET_TRANS_ACK_IE,
MAX_NET_TRANS_REJ_IE,
MAX_NET_ASSOC_IE,
MAX_NET_ASSOC_ACK_IE,
MAX_NET_DROP_IE,
MAX_NET_DROP_ACK_IE,
MAX_NET_DROP_REJ_IE,
MAX_NET_HOLD_IE,
MAX_NET_HOLD_ACK_IE,
MAX_NET_HOLD_REJ_IE,
MAX_NET_RECONN_IE,
MAX_NET_RECONN_ACK_IE,
MAX_NET_RECONN_REJ_IE,
MAX_NET_REDIRECT_IE,
MAX_NET_MIM_IE,
MAX_UNKNOWN_IE };

/****************************************************************
Message/Info Element Tables Contains:

IeType, IePresent, IeMinLen, IeMaxLen, IeVarType, IeSentBy
****************************************************************/

UCHAR code NetEscIE[MAX_NETESC_IE][MAX_IE_PARAM] = {

{UNKNOWN,           0,      0, 0, 0, 0 }
};

UCHAR code SetupIE[MAX_SETUP_IE][MAX_IE_PARAM] = {

{IE_SENDING_COMPLETE,       OPTIONAL,  0, 0, FLAG, USER },
    {IE_BEARER,             MANDATORY, 2, 7, BINARY, BOTH },
    {IE_CHANNEL_ID,             OPTIONAL,  1, 1, BINARY, BOTH },
    {IE_PROGRESS_INDICATOR,     OPTIONAL,  2, 2, BINARY, NETWORK },
    {IE_TERMINAL_CAPABILITIES,  OPTIONAL,  1, 1, BINARY, USER },
    {IE_KEYPAD,                 OPTIONAL,  1, 11, STRING, USER },
    {IE_SIGNAL,                 OPTIONAL,  1, 1, BINARY, NETWORK },
    {IE_SWITCH_HOOK,            OPTIONAL,  1, 1, BINARY, USER },
    {IE_ENDPOINT_ID,            OPTIONAL,  2, 4, BINARY, NETWORK },
    {IE_CALLING_PARTY_NUMBER,   COPY,      8, 12, STRING, BOTH },
```

```
{IE_CALLING_PARTY_SUBADDR,   COPY,     3, 22, BINARY, BOTH },
{IE_CALLED_PARTY_NUMBER,     COPY,     3, 12, STRING, BOTH },
{IE_CALLED_PARTY_SUBADDR,    COPY,     3, 22, BINARY, BOTH },
{IE_TRANSIT_NETWORK_SEL,     COPY,     3, 7, BINARY, BOTH },
{IE_LOW_LAYER_CAP,           COPY,     1, 14, BINARY, BOTH },
{IE_HIGH_LAYER_CAP,          COPY,     1, 4, BINARY, BOTH },
{IE_USER_INFO,               COPY,     1, 32, BINARY, BOTH },
{IE_LOCKING_SHIFT_5,         OPTIONAL, 0, 0, SHIFT, BOTH },
{IE5_DISPLAY_TEXT,           OPTIONAL, 1, 32, STRING, NETWORK },
{IE_LOCKING_SHIFT_6,         OPTIONAL, 0, 0, SHIFT, BOTH },
{IE6_USER_CODE,              COPY,     2, 2, BINARY, USER },
{IE6_LOGICAL_LINK_ID,        COPY,     2, 2, BINARY, BOTH },
{IE6_SELECTED_CA,            OPTIONAL, 1, 1, BINARY, NETWORK },
{IE6_ORIGINATION_CA,         OPTIONAL, 1, 1, BINARY, USER },
{IE6_DESTINATION_CA,         OPTIONAL, 1, 1, BINARY, NETWORK },
{IE6_ENDPOINT_ID,            COPY,     3, 3, BINARY, NETWORK },
{IE6_FEATURE_ACT,            OPTIONAL, 2, 2, BINARY, USER },
{IE6_FEATURE_IND,            OPTIONAL, 2, 2, BINARY, NETWORK },
{IE6_ADJUNCT_CONTROL,        OPTIONAL, 1, 1, BINARY, NETWORK },
{IE6_DISPLAY_CONTROL,        OPTIONAL, 1, 1, BINARY, NETWORK },
{IE6_DISPLAY_FIELD,          OPTIONAL, 3, 20, REPEAT, NETWORK },
{IE6_DISPLAY_FIELD,          OPTIONAL, 3, 20, REPEAT, NETWORK },
{IE6_DISPLAY_FIELD,          OPTIONAL, 3, 20, REPEAT, NETWORK },
{IE6_DISPLAY_FIELD,          OPTIONAL, 3, 20, REPEAT, NETWORK },
{IE6_PACKET_LAYER_PARAMETERS, COPY,    2, 10, BINARY, BOTH },
{IE6_LINK_LAYER_PARAMETERS,  COPY,     2, 14, BINARY, BOTH },
{IE6_THROUGHPUT_CLASS,       COPY,     1, 4, BINARY, BOTH },
{IE6_CALL_APPEARANCE,        OPTIONAL, 1, 2, BINARY, BOTH },
{UNKNOWN,                    0,        0, 0, 0, 0 }
};

UCHAR code SetupAckIE[MAX_SETUPACK_IE][MAX_IE_PARAM] = {

{IE_CHANNEL_ID,       MANDATORY, 1, 1, BINARY, NETWORK },
{IE_SIGNAL,           OPTIONAL, 1, 1, BINARY, NETWORK },
{IE_LOCKING_SHIFT_6,  OPTIONAL, 0, 0, SHIFT, NETWORK },
{IE6_LOGICAL_LINK_ID, COPY,     2, 2, BINARY, NETWORK },
{IE6_FEATURE_IND,     OPTIONAL, 2, 2, BINARY, NETWORK },
{IE6_DISPLAY_CONTROL, OPTIONAL, 1, 1, BINARY, NETWORK },
{IE6_DISPLAY_FIELD,   OPTIONAL, 3, 20, REPEAT, NETWORK },
{IE6_DISPLAY_FIELD,   OPTIONAL, 3, 20, REPEAT, NETWORK },
{IE6_DISPLAY_FIELD,   OPTIONAL, 3, 20, REPEAT, NETWORK },
{IE6_DISPLAY_FIELD,   OPTIONAL, 3, 20, REPEAT, NETWORK },
{UNKNOWN,             0,        0, 0, 0, 0 }
};

UCHAR code CallProcIE[MAX_CALLPROC_IE][MAX_IE_PARAM] = {

{IE_CHANNEL_ID,          OPTIONAL, 1, 1, BINARY, BOTH },
{IE_PROGRESS_INDICATOR,  OPTIONAL, 2, 2, BINARY, NETWORK },
{IE_TERMINAL_CAPABILITIES, OPTIONAL, 1, 1, BINARY, USER },
{IE_SIGNAL,              OPTIONAL, 1, 1, BINARY, NETWORK },
{IE_LOCKING_SHIFT_5,     OPTIONAL, 0, 0, SHIFT, BOTH },
```

```
{IE5_DISPLAY_TEXT,      OPTIONAL,  1, 32, STRING, NETWORK },
{IE_LOCKING_SHIFT_6,    OPTIONAL,  0,  0, SHIFT, BOTH },
{IE6_LOGICAL_LINK_ID,   COPY,      2,  2, BINARY, BOTH },
{IE6_DISPLAY_CONTROL,   OPTIONAL,  1,  1, BINARY, NETWORK },
{IE6_DISPLAY_FIELD,     OPTIONAL,  3, 20, REPEAT, NETWORK },
{IE6_DISPLAY_FIELD,     OPTIONAL,  3, 20, REPEAT, NETWORK },
{IE6_DISPLAY_FIELD,     OPTIONAL,  3, 20, REPEAT, NETWORK },
{IE6_DISPLAY_FIELD,     OPTIONAL,  3, 20, REPEAT, NETWORK },
{UNKNOWN,          0,       0, 0, 0,    0 }
};

UCHAR code ProgressIE[MAX_PROGRESS_IE][MAX_IE_PARAM] = {

{IE_CAUSE,              OPTIONAL,  2,  4, BINARY, NETWORK },
{IE_PROGRESS_INDICATOR, MANDATORY, 2,  2, BINARY, NETWORK },
{IE_SIGNAL,             OPTIONAL,  1,  1, BINARY, NETWORK },
{IE_USER_INFO,          COPY,      1, 32, BINARY, BOTH },
{IE_LOCKING_SHIFT_6,    OPTIONAL,  0,  0, SHIFT, NETWORK },
{IE6_DISPLAY_CONTROL,   OPTIONAL,  1,  1, BINARY, NETWORK },
{IE6_DISPLAY_FIELD,     OPTIONAL,  3, 20, REPEAT, NETWORK },
{IE6_DISPLAY_FIELD,     OPTIONAL,  3, 20, REPEAT, NETWORK },
{IE6_DISPLAY_FIELD,     OPTIONAL,  3, 20, REPEAT, NETWORK },
{IE6_DISPLAY_FIELD,     OPTIONAL,  3, 20, REPEAT, NETWORK },
{UNKNOWN,          0,       0, 0, 0,    0 }
};

UCHAR code AlertingIE[MAX_ALERTING_IE][MAX_IE_PARAM] = {

{IE_CHANNEL_ID,         CONDITION, 1,  1, BINARY, USER },
{IE_PROGRESS_INDICATOR, OPTIONAL,  2,  2, BINARY, NETWORK },
{IE_TERMINAL_CAPABILITIES, OPTIONAL, 1, 1, BINARY, USER },
{IE_SIGNAL,             OPTIONAL,  1,  1, BINARY, NETWORK },
{IE_USER_INFO,          COPY,      1, 32, BINARY, BOTH },
{IE_LOCKING_SHIFT_6,    OPTIONAL,  0,  0, SHIFT, BOTH },
{IE6_LOGICAL_LINK_ID,   COPY,      2,  2, BINARY, BOTH },
{IE6_FEATURE_IND,       OPTIONAL,  2,  2, BINARY, NETWORK },
{IE6_DISPLAY_CONTROL,   OPTIONAL,  1,  1, BINARY, NETWORK },
{IE6_DISPLAY_FIELD,     OPTIONAL,  3, 20, REPEAT, NETWORK },
{IE6_DISPLAY_FIELD,     OPTIONAL,  3, 20, REPEAT, NETWORK },
{IE6_DISPLAY_FIELD,     OPTIONAL,  3, 20, REPEAT, NETWORK },
{IE6_DISPLAY_FIELD,     OPTIONAL,  3, 20, REPEAT, NETWORK },
{UNKNOWN,          0,       0, 0, 0,    0 }
};

UCHAR code ConnectIE[MAX_CONNECT_IE][MAX_IE_PARAM] = {

{IE_CHANNEL_ID,         CONDITION, 1,  1, BINARY, BOTH },
{IE_PROGRESS_INDICATOR, OPTIONAL,  2,  2, BINARY, NETWORK },
{IE_TERMINAL_CAPABILITIES, OPTIONAL, 1, 1, BINARY, USER },
{IE_SIGNAL,             OPTIONAL,  1,  1, BINARY, NETWORK },
{IE_SWITCH_HOOK,        OPTIONAL,  1,  1, BINARY, USER },
```

```
{IE_USER_INFO,           COPY,    1, 32, BINARY, BOTH },
{IE_LOCKING_SHIFT_6,     OPTIONAL, 0, 0, SHIFT, BOTH },
{IE6_LOGICAL_LINK_ID,    COPY,    2, 2, BINARY, BOTH },
{IE6_DISPLAY_CONTROL,    OPTIONAL, 1, 1, BINARY, NETWORK },
{IE6_DISPLAY_FIELD,      OPTIONAL, 3, 20, REPEAT, NETWORK },
{IE6_DISPLAY_FIELD,      OPTIONAL, 3, 20, REPEAT, NETWORK },
{IE6_DISPLAY_FIELD,      OPTIONAL, 3, 20, REPEAT, NETWORK },
{IE6_DISPLAY_FIELD,      OPTIONAL, 3, 20, REPEAT, NETWORK },
{IE6_PACKET_LAYER_PARAMETERS, COPY,  2, 10, BINARY, BOTH },
{IE6_LINK_LAYER_PARAMETERS,   COPY,  2, 14, BINARY, BOTH },
{IE6_THROUGHPUT_CLASS,   COPY,    1, 4, BINARY, BOTH },
{UNKNOWN,                0,       0, 0, 0,  0 }
};

UCHAR code ConnAckIE[MAX_CONNACK_IE][MAX_IE_PARAM] = {

{IE_CHANNEL_ID,          OPTIONAL, 1, 1, BINARY, NETWORK },
{IE_PROGRESS_INDICATOR,  OPTIONAL, 2, 2, BINARY, NETWORK },
{IE_SIGNAL,              OPTIONAL, 1, 1, BINARY, NETWORK },
{IE_LOCKING_SHIFT_6,     OPTIONAL, 0, 0, SHIFT, NETWORK },
{IE6_FEATURE_IND,        OPTIONAL, 2, 2, BINARY, NETWORK },
{IE6_DISPLAY_CONTROL,    OPTIONAL, 1, 1, BINARY, NETWORK },
{IE6_DISPLAY_FIELD,      OPTIONAL, 3, 20, REPEAT, NETWORK },
{IE6_DISPLAY_FIELD,      OPTIONAL, 3, 20, REPEAT, NETWORK },
{IE6_DISPLAY_FIELD,      OPTIONAL, 3, 20, REPEAT, NETWORK },
{IE6_DISPLAY_FIELD,      OPTIONAL, 3, 20, REPEAT, NETWORK },
{UNKNOWN,                0,       0, 0, 0,  0 }
};

UCHAR code DiscIE[MAX_DISC_IE][MAX_IE_PARAM] = {

{IE_CAUSE,               MANDATORY, 2, 4, BINARY, BOTH },
{IE_SIGNAL,              OPTIONAL, 1, 1, BINARY, NETWORK },
{IE_SWITCH_HOOK,         OPTIONAL, 1, 1, BINARY, USER },
{IE_USER_INFO,           COPY,    1, 32, BINARY, BOTH },
{IE_LOCKING_SHIFT_6,     OPTIONAL, 0, 0, SHIFT, BOTH },
{IE6_FEATURE_IND,        OPTIONAL, 2, 2, BINARY, NETWORK },
{IE6_ADJUNCT_CONTROL,    OPTIONAL, 1, 1, BINARY, NETWORK },
{IE6_DISPLAY_CONTROL,    OPTIONAL, 1, 1, BINARY, NETWORK },
{IE6_DISPLAY_FIELD,      OPTIONAL, 3, 20, REPEAT, NETWORK },
{IE6_DISPLAY_FIELD,      OPTIONAL, 3, 20, REPEAT, NETWORK },
{IE6_DISPLAY_FIELD,      OPTIONAL, 3, 20, REPEAT, NETWORK },
{IE6_DISPLAY_FIELD,      OPTIONAL, 3, 20, REPEAT, NETWORK },
{UNKNOWN,                0,       0, 0, 0,  0 }
};

UCHAR code RelIE[MAX_REL_IE][MAX_IE_PARAM] = {

{IE_CAUSE,               CONDITION, 2, 4, BINARY, BOTH },
{IE_SIGNAL,              OPTIONAL, 1, 1, BINARY, NETWORK },
{IE_USER_INFO,           COPY,    1, 32, BINARY, BOTH },
```

```
{IE_LOCKING_SHIFT_6,      OPTIONAL, 0, 0, SHIFT, BOTH },
{IE6_SELECTED_CA,         OPTIONAL, 1, 1, BINARY, NETWORK },
{IE6_KEYPAD_CONTROL,      OPTIONAL, 1, 1, BINARY, NETWORK },
{IE6_FEATURE_IND,         OPTIONAL, 2, 2, BINARY, NETWORK },
{IE6_ADJUNCT_CONTROL,     OPTIONAL, 1, 1, BINARY, NETWORK },
{IE6_DISPLAY_CONTROL,     OPTIONAL, 1, 1, BINARY, NETWORK },
{IE6_DISPLAY_FIELD,       OPTIONAL, 3, 20, REPEAT, NETWORK },
{IE6_DISPLAY_FIELD,       OPTIONAL, 3, 20, REPEAT, NETWORK },
{IE6_DISPLAY_FIELD,       OPTIONAL, 3, 20, REPEAT, NETWORK },
{IE6_DISPLAY_FIELD,       OPTIONAL, 3, 20, REPEAT, NETWORK },
{IE6_CALL_APPEARANCE,     OPTIONAL, 1, 2, BINARY, NETWORK },
{UNKNOWN,           0,    0, 0, 0,   0 }
};

UCHAR code RelCompIE[MAX_RELCOMP_IE][MAX_IE_PARAM] = {

{IE_CAUSE,           CONDITION, 2, 4, BINARY, BOTH },
{IE_SIGNAL,          OPTIONAL, 1, 1, BINARY, NETWORK },
{IE_USER_INFO,       COPY,    1, 32, BINARY, BOTH },
{IE_LOCKING_SHIFT_6,      OPTIONAL, 0, 0, SHIFT, NETWORK },
{IE6_SELECTED_CA,         OPTIONAL, 1, 1, BINARY, NETWORK },
{IE6_FEATURE_IND,         OPTIONAL, 2, 2, BINARY, NETWORK },
{IE6_ADJUNCT_CONTROL,     OPTIONAL, 1, 1, BINARY, NETWORK },
{IE6_DISPLAY_CONTROL,     OPTIONAL, 1, 1, BINARY, NETWORK },
{IE6_DISPLAY_FIELD,       OPTIONAL, 3, 20, REPEAT, NETWORK },
{IE6_DISPLAY_FIELD,       OPTIONAL, 3, 20, REPEAT, NETWORK },
{IE6_DISPLAY_FIELD,       OPTIONAL, 3, 20, REPEAT, NETWORK },
{IE6_DISPLAY_FIELD,       OPTIONAL, 3, 20, REPEAT, NETWORK },
{IE6_CALL_APPEARANCE,     OPTIONAL, 1, 2, BINARY, NETWORK },
{UNKNOWN,           0,    0, 0, 0,   0 }
};

UCHAR code RestartIE[MAX_RESTART_IE][MAX_IE_PARAM] = {

{IE_CHANNEL_ID,        OPTIONAL, 1, 1, BINARY, BOTH },
{IE_RESTART_INDICATOR, MANDATORY, 1, 1, BINARY, BOTH },
{UNKNOWN,         0,   0, 0, 0,   0 }
};

UCHAR code RestAckIE[MAX_RESTACK_IE][MAX_IE_PARAM] = {

{IE_CHANNEL_ID,        OPTIONAL, 1, 1, BINARY, BOTH },
{IE_RESTART_INDICATOR, MANDATORY, 1, 1, BINARY, BOTH },
{UNKNOWN,         0,   0, 0, 0,   0 }
};

UCHAR code FacilityIE[MAX_FACILITY_IE][MAX_IE_PARAM] = {

{IE_FACILITY,     OPTIONAL, 3, 127, BINARY, NETWORK },
{IE_EX_FACILITY,  OPTIONAL, 3, 127, BINARY, NETWORK },
{UNKNOWN,      0,   0, 0, 0,   0 }
```

```
};

UCHAR code RegisterIE[MAX_REGISTER_IE][MAX_IE_PARAM] = {

{IE_FACILITY,          OPTIONAL, 3, 127, BINARY, NETWORK },
    {IE_EX_FACILITY,       OPTIONAL, 3, 127, BINARY, NETWORK },
    {UNKNOWN,              0,    0, 0, 0,    0 }
};

UCHAR code NotifyIE[MAX_NOTIFY_IE][MAX_IE_PARAM] = {

{UNKNOWN,              0,    0, 0, 0,    0 }
};

UCHAR code InfoIE[MAX_INFO_IE][MAX_IE_PARAM] = {

{IE_CAUSE,             OPTIONAL, 2,  4, BINARY, NETWORK },
    {IE_SENDING_COMPLETE,  OPTIONAL, 0,  0, FLAG,   USER },
    {IE_CHANNEL_ID,        OPTIONAL, 1,  1, BINARY, NETWORK },
    {IE_KEYPAD,            OPTIONAL, 1, 11, STRING, USER },
    {IE_SIGNAL,            OPTIONAL, 1,  1, BINARY, NETWORK },
    {IE_SWITCH_HOOK,       OPTIONAL, 1,  1, BINARY, USER },
    {IE_SERVICE_PROFILE_ID, OPTIONAL, 0, 20, STRING, USER },
    {IE_ENDPOINT_ID,       OPTIONAL, 2,  4, BINARY, NETWORK },
    {IE_CALLED_PARTY_NUMBER, OPTIONAL, 1, 12, STRING, BOTH },
    {IE_LOCKING_SHIFT_5,   OPTIONAL, 0,  0, SHIFT,  BOTH },
    {IE5_DISPLAY_TEXT,     OPTIONAL, 1, 32, STRING, NETWORK },
    {IE_LOCKING_SHIFT_6,   OPTIONAL, 0,  0, SHIFT,  BOTH },
    {IE6_SELECTED_CA,      OPTIONAL, 1,  1, BINARY, NETWORK },
    {IE6_DESTINATION_CA,   OPTIONAL, 1,  1, BINARY, NETWORK },
    {IE6_KEYPAD_CONTROL,   OPTIONAL, 1,  1, BINARY, NETWORK },
    {IE6_OTHER_CALL_REF,   OPTIONAL, 1,  1, BINARY, USER },
    {IE6_FEATURE_ACT,      OPTIONAL, 1,  2, BINARY, USER },
    {IE6_FEATURE_IND,      OPTIONAL, 1,  2, BINARY, NETWORK },
    {IE6_ADJUNCT_CONTROL,  OPTIONAL, 1,  1, BINARY, NETWORK },
    {IE6_DISPLAY_CONTROL,  OPTIONAL, 1,  1, BINARY, NETWORK },
    {IE6_DISPLAY_FIELD,    OPTIONAL, 3, 20, REPEAT, NETWORK },
    {IE6_DISPLAY_FIELD,    OPTIONAL, 3, 20, REPEAT, NETWORK },
    {IE6_DISPLAY_FIELD,    OPTIONAL, 3, 20, REPEAT, NETWORK },
    {IE6_DISPLAY_FIELD,    OPTIONAL, 3, 20, REPEAT, NETWORK },
    {IE6_CALL_APPEARANCE,  OPTIONAL, 1,  2, BINARY, NETWORK },
    {UNKNOWN,              0,    0, 0, 0,    0 }
};

UCHAR code StatusIE[MAX_STATUS_IE][MAX_IE_PARAM] = {

{IE_CAUSE,             MANDATORY, 2, 4, BINARY, BOTH },
    {IE_CALL_STATE,        MANDATORY, 1, 1, BINARY, BOTH },
    {UNKNOWN,              0,    0, 0, 0, 0 }
};
```

```
UCHAR code StatEnqIE[MAX_STATENQ_IE][MAX_IE_PARAM] = {

{UNKNOWN,              0,      0, 0, 0, 0 }
};

UCHAR code HoldIE[MAX_HOLD_IE][MAX_IE_PARAM] = {

{UNKNOWN,              0,      0, 0, 0, 0 }
};

UCHAR code HoldAckIE[MAX_HOLD_ACK_IE][MAX_IE_PARAM] = {

{IE_NOTIFICATION_INDICATOR,   OPTIONAL, 1, 1, BINARY, NETWORK },
    {IE_SIGNAL,            OPTIONAL, 1, 1, BINARY, NETWORK },
    {IE_LOCKING_SHIFT_6,   OPTIONAL, 0, 0, SHIFT, NETWORK },
    {IE6_CALL_APPEARANCE,  OPTIONAL, 1, 2, BINARY, NETWORK },
    {UNKNOWN,              0,      0, 0, 0, 0 }
};

UCHAR code HoldRejIE[MAX_HOLD_REJ_IE][MAX_IE_PARAM] = {

{IE_CAUSE,             MANDATORY, 2, 4, BINARY, BOTH },
    {UNKNOWN,              0,      0, 0, 0, 0 }
};

UCHAR code RetIE[MAX_RET_IE][MAX_IE_PARAM] = {

{IE_CHANNEL_ID,        OPTIONAL, 1, 1, BINARY, NETWORK },
    {UNKNOWN,              0,      0, 0, 0, 0 }
};

UCHAR code RetAckIE[MAX_RET_ACK_IE][MAX_IE_PARAM] = {

{IE_CHANNEL_ID,        OPTIONAL, 1, 1, BINARY, NETWORK },
    {IE_NOTIFICATION_INDICATOR,   OPTIONAL, 1, 1, BINARY, NETWORK },
    {UNKNOWN,              0,      0, 0, 0, 0 }
};

UCHAR code RetRejIE[MAX_RET_REJ_IE][MAX_IE_PARAM] = {

{IE_CAUSE,             MANDATORY, 2, 4, BINARY, BOTH },
    {UNKNOWN,              0,      0, 0, 0, 0 }
};

UCHAR code X25[MAX_X25_IE][MAX_IE_PARAM] = {

{UNKNOWN,              0,      0, 0, 0, 0 }
};

UCHAR code NetConfIE[MAX_NET_CONF_IE][MAX_IE_PARAM] = {

{UNKNOWN,              0,      0, 0, 0, 0 }
};
```

```
UCHAR code NetConfAckIE[MAX_NET_CONF_ACK_IE][MAX_IE_PARAM] = {

{UNKNOWN,        0,      0, 0, 0, 0 }
};

UCHAR code NetConfRejIE[MAX_NET_CONF_REJ_IE][MAX_IE_PARAM] = {

{IE_CAUSE,       MANDATORY, 2, 4, BINARY, NETWORK },
    {UNKNOWN,        0,      0, 0, 0, 0 }
};

UCHAR code NetTransIE[MAX_NET_TRANS_IE][MAX_IE_PARAM] = {

{UNKNOWN,        0,      0, 0, 0, 0 }
};

UCHAR code NetTransAckIE[MAX_NET_TRANS_ACK_IE][MAX_IE_PARAM] = {

{UNKNOWN,        0,      0, 0, 0, 0 }
};

UCHAR code NetTransRejIE[MAX_NET_TRANS_REJ_IE][MAX_IE_PARAM] = {

{IE_CAUSE,       MANDATORY, 2, 4, BINARY, NETWORK },
    {UNKNOWN,        0,      0, 0, 0, 0 }
};

UCHAR code NetAssocIE[MAX_NET_ASSOC_IE][MAX_IE_PARAM] = {

{UNKNOWN,        0,      0, 0, 0, 0 }
};

UCHAR code NetAssocAckIE[MAX_NET_ASSOC_ACK_IE][MAX_IE_PARAM] = {

{UNKNOWN,        0,      0, 0, 0, 0 }
};

UCHAR code NetDropIE[MAX_NET_DROP_IE][MAX_IE_PARAM] = {

{UNKNOWN,        0,      0, 0, 0, 0 }
};

UCHAR code NetDropAckIE[MAX_NET_DROP_ACK_IE][MAX_IE_PARAM] = {

{UNKNOWN,        0,      0, 0, 0, 0 }
};

UCHAR code NetDropRejIE[MAX_NET_DROP_REJ_IE][MAX_IE_PARAM] = {

{UNKNOWN,        0,      0, 0, 0, 0 }
};

UCHAR code NetHoldIE[MAX_NET_HOLD_IE][MAX_IE_PARAM] = {
```

```
    {UNKNOWN,           0,     0, 0, 0, 0 }
};

UCHAR code NetHoldAckIE[MAX_NET_HOLD_ACK_IE][MAX_IE_PARAM] = {

{IE_LOCKING_SHIFT_6,     OPTIONAL, 0, 0, SHIFT, NETWORK },
    {IE6_SELECTED_CA,        OPTIONAL, 1, 1, BINARY, NETWORK },
    {UNKNOWN,           0,     0, 0, 0, 0 }
};

UCHAR code NetHoldRejIE[MAX_NET_HOLD_REJ_IE][MAX_IE_PARAM] = {

{IE_CAUSE,           MANDATORY, 2, 4, BINARY, NETWORK },
    {UNKNOWN,           0,     0, 0, 0, 0 }
};

UCHAR code NetReconnIE[MAX_NET_RECONN_IE][MAX_IE_PARAM] = {

{IE_CHANNEL_ID,      OPTIONAL, 1, 1, BINARY, USER },
    {IE_SWITCH_HOOK,     OPTIONAL, 1, 1, BINARY, USER },
    {UNKNOWN,           0,     0, 0, 0, 0 }
};

UCHAR code NetReconnAckIE[MAX_NET_RECONN_ACK_IE][MAX_IE_PARAM] = {

{IE_CHANNEL_ID,      OPTIONAL, 1, 1, BINARY, NETWORK },
    {IE_SIGNAL,          OPTIONAL, 1, 1, BINARY, NETWORK },
    {IE_LOCKING_SHIFT_6, OPTIONAL, 0, 0, SHIFT, BOTH },
    {IE6_DISPLAY_CONTROL,   OPTIONAL, 1, 1, BINARY, NETWORK },
    {IE6_DISPLAY_FIELD,     OPTIONAL, 3, 20, REPEAT, NETWORK },
    {IE6_DISPLAY_FIELD,     OPTIONAL, 3, 20, REPEAT, NETWORK },
    {IE6_DISPLAY_FIELD,     OPTIONAL, 3, 20, REPEAT, NETWORK },
    {IE6_DISPLAY_FIELD,     OPTIONAL, 3, 20, REPEAT, NETWORK },
    {UNKNOWN,           0,     0, 0, 0, 0 }
};

UCHAR code NetReconnRejIE[MAX_NET_RECONN_REJ_IE][MAX_IE_PARAM] = {

{IE_CAUSE,           MANDATORY, 2, 4, BINARY, NETWORK },
    {IE_LOCKING_SHIFT_6, OPTIONAL, 0, 0, SHIFT, NETWORK },
    {IE6_SELECTED_CA,    OPTIONAL, 1, 1, BINARY, NETWORK },
    {UNKNOWN,           0,     0, 0, 0, 0 }
};

UCHAR code NetRedirectIE[MAX_NET_REDIRECT_IE][MAX_IE_PARAM] = {

{UNKNOWN,           0,     0, 0, 0, 0 }
};

UCHAR code NetMimIE[MAX_NET_MIM_IE][MAX_IE_PARAM] = {

{UNKNOWN,           0,     0, 0, 0, 0 }
};
```

```
UCHAR code Unknown[MAX_UNKNOWN_IE][MAX_IE_PARAM] = {
    {UNKNOWN,        0,    0, 0, 0, 0 }
};

/*****************************************************************
    Q.931 Call State Index Table
*****************************************************************/

UCHAR code CallStates[MAX_CALL_STATES] = {

CS_NULL,
    CS_OVERLAP_SEND,
    CS_OUT_PROCEEDING,
    CS_DELIVERED,
    CS_PRESENT,
    CS_RECEIVED,
    CS_CONNECT_REQUEST,
    CS_IN_PROCEEDING,
    CS_ACTIVE,
    CS_DISCONNECT_REQUEST,
    CS_DISCONNECT_INDICATION,
    CS_RELEASE_REQUEST };

/*****************************************************************
    Q.931 Call State Tested Message Index Table
*****************************************************************/

UCHAR code TestedMsgIndex[MAX_CS_MSG_TYPES] = {

SETUP,
    CONNECT_ACK,
    CALL_PROCEEDING,
    ALERTING,
    CONNECT,
    DISCONNECT,
    RELEASE,
    RELEASE_COMPLETE,
    RESTART,
    RESTART_ACK };

/*****************************************************************
    Message Type/Call State Lookup Tables Note: The columns are network call states as define in the
        CallStates array and the rows are message types as
        defined in the TestedMsgIndex array.
*****************************************************************/

UCHAR code StateTable[MAX_CALL_STATES][MAX_CS_MSG_TYPES] = {
```

{ TRUE, FALSE,FALSE,FALSE,FALSE,FALSE,TRUE, TRUE, TRUE,FALSE },
{ FALSE,FALSE,FALSE,FALSE,FALSE,TRUE, TRUE, TRUE, TRUE,TRUE },
{ FALSE,FALSE,FALSE,FALSE,FALSE,TRUE, TRUE, TRUE, TRUE,TRUE },
{ FALSE,FALSE,FALSE,FALSE,FALSE,TRUE, TRUE, TRUE, TRUE,TRUE },
{ FALSE,FALSE,TRUE, TRUE, TRUE, FALSE,TRUE, TRUE, TRUE,TRUE },
{ FALSE,FALSE,FALSE,TRUE, TRUE, TRUE, TRUE, TRUE, TRUE,TRUE },
{ FALSE,FALSE,FALSE,FALSE,FALSE,TRUE, TRUE, TRUE, TRUE,TRUE },
{ FALSE,FALSE,FALSE,TRUE, TRUE, TRUE, TRUE, TRUE, TRUE,TRUE },
{ FALSE,TRUE, FALSE,FALSE,FALSE,TRUE, TRUE, TRUE, TRUE,TRUE },
{ FALSE,FALSE,FALSE,FALSE,FALSE,FALSE,TRUE, TRUE, TRUE,TRUE },
{ FALSE,FALSE,FALSE,FALSE,FALSE,TRUE, TRUE, TRUE, TRUE,TRUE },
{ TRUE, TRUE, TRUE, TRUE, TRUE, TRUE, TRUE, TRUE, TRUE,TRUE }};

/*****************************************************************
Function: LoadMsgPtrTable
Input:   None
Returns: None This is an initialization routine, called by
    Layer 3, that loads the message array addresses,
    defined above, into a lookup table accessed by other
    functions.
*****************************************************************/ void LoadMsgPtrTable (void) {

MsgPtrTable[0] = NetEscIE[0];
  MsgPtrTable[1] = SetupIE[0];
  MsgPtrTable[2] = SetupAckIE[0];
  MsgPtrTable[3] = CallProcIE[0];
  MsgPtrTable[4] = ProgressIE[0];
  MsgPtrTable[5] = AlertingIE[0];
  MsgPtrTable[6] = ConnectIE[0];
  MsgPtrTable[7] = ConnAckIE[0];
  MsgPtrTable[8] = DiscIE[0];
  MsgPtrTable[9] = RelIE[0];
  MsgPtrTable[10] = RelComplE[0];
  MsgPtrTable[11] = RestartIE[0];
  MsgPtrTable[12] = RestAckIE[0];
  MsgPtrTable[13] = FacilityIE[0];
  MsgPtrTable[14] = RegisterIE[0];
  MsgPtrTable[15] = NotifyIE[0];
  MsgPtrTable[16] = InfoIE[0];
  MsgPtrTable[17] = StatusIE[0];
  MsgPtrTable[18] = StatEnqIE[0];
  MsgPtrTable[19] = HoldIE[0];
  MsgPtrTable[20] = HoldAckIE[0];
  MsgPtrTable[21] = HoldRejIE[0];
  MsgPtrTable[22] = RetIE[0];
  MsgPtrTable[23] = RetAckIE[0];
  MsgPtrTable[24] = RetRejIE[0];
  MsgPtrTable[25] = X25[0];
  MsgPtrTable[26] = NetConfIE[0];

```
MsgPtrTable[27] = NetConfAckIE[0];
MsgPtrTable[28] = NetConfRejIE[0];
MsgPtrTable[29] = NetTransIE[0];
MsgPtrTable[30] = NetTransAckIE[0];
MsgPtrTable[31] = NetTransRejIE[0];
MsgPtrTable[32] = NetAssocIE[0];
MsgPtrTable[33] = NetAssocAckIE[0];
MsgPtrTable[34] = NetDropIE[0];
MsgPtrTable[35] = NetDropAckIE[0];
MsgPtrTable[36] = NetDropRejIE[0];
MsgPtrTable[37] = NetHoldIE[0];
MsgPtrTable[38] = NetHoldAckIE[0];
MsgPtrTable[39] = NetHoldRejIE[0];
MsgPtrTable[40] = NetReconnIE[0];
MsgPtrTable[41] = NetReconnAckIE[0];
MsgPtrTable[42] = NetReconnRejIE[0];
MsgPtrTable[43] = NetRedirectIE[0];
MsgPtrTable[44] = NetMimIE[0];
MsgPtrTable[45] = Unknown[0];

}

/****************************************************************
    Information Element Lookup Table
****************************************************************/

UCHAR code IeIndex[MAX_IE_TYPES] = {

IE_SENDING_COMPLETE,
    IE_BEARER,
    IE_CAUSE,
    IE_CONNECTED_NUMBER,
    IE_EX_FACILITY,
    IE_CALL_STATE,
    IE_CHANNEL_ID,
    IE_FACILITY,
    IE_PROGRESS_INDICATOR,
    IE_TERMINAL_CAPABILITIES,
    IE_NOTIFICATION_INDICATOR,
    IE_KEYPAD,
    IE_INFORMATION_REQUEST,
    IE_SIGNAL,
    IE_SWITCH_HOOK,
    IE_SERVICE_PROFILE_ID,
    IE_ENDPOINT_ID,
    IE_CALLING_PARTY_NUMBER,
    IE_CALLING_PARTY_SUBADDR,
    IE_CALLED_PARTY_NUMBER,
    IE_CALLED_PARTY_SUBADDR,
    IE_TRANSIT_NETWORK_SEL,
    IE_RESTART_INDICATOR,
    IE_LOW_LAYER_CAP,
    IE_HIGH_LAYER_CAP,
```

IE_USER_INFO,
IE_LOCKING_SHIFT_5,
IE5_OPERATOR_ACCESS,
IE5_DISPLAY_TEXT,
IE_LOCKING_SHIFT_6,
IE6_USER_CODE,
IE6_LOGICAL_LINK_ID,
IE6_ASSOCIATED_TYPE,
IE6_SELECTED_CA,
IE6_ORIGINATION_CA,
IE6_DESTINATION_CA,
IE6_ENDPOINT_ID,
IE6_KEYPAD_CONTROL,
IE6_OTHER_CALL_REF,
IE6_FEATURE_ACT,
IE6_FEATURE_IND,
IE6_ADJUNCT_CONTROL,
IE6_DISPLAY_CONTROL,
IE6_DISPLAY_FIELD,
IE6_DISPLAY_FIELD,
IE6_DISPLAY_FIELD,
IE6_DISPLAY_FIELD,
IE6_PACKET_LAYER_PARAMETERS,
IE6_LINK_LAYER_PARAMETERS,
IE6_CLOSED_USER_GROUP,
IE6_REVERSE_CHARGING,
IE6_THROUGHPUT_CLASS,
IE6_REDIRECTING_SUBADDR,
IE6_REDIRECTION_NUMBER,
IE6_MANAGEMENT,
IE6_CALL_APPEARANCE,
UNKNOWN };

```
/***************************************************************
Function: TestCallState
Input:   Message type and call state variables
Returns: True, if message is allowed during the
         current call state.

This function accesses the call state tables
         defined above.
****************************************************************/

UCHAR TestCallState (UCHAR MsgType, UCHAR CallState) {

UCHAR i;
    UCHAR MessageIndex = MAX_CS_MSG_TYPES;
    UCHAR CallStateIndex = MAX_CALL_STATES;
    UCHAR TestResult = FALSE;

for (i = 0; i < MAX_CS_MSG_TYPES; ++ i) {
      if (MsgType == TestedMsgIndex[i]) {
        MessageIndex = i;
        break;
```

```
      }
    }
    if (MessageIndex >= MAX_CS_MSG_TYPES)
      TestResult = TRUE;
    else {
      for (i = 0; i < MAX_CALL_STATES; ++i) {
        if (CallState == CallStates[i]) {
          CallStateIndex = i;
          break;
        }
      }
      TestResult = StateTable[CallStateIndex][MessageIndex];
    }
    return (TestResult);
}

/****************************************************************
Function: GetMsgIndex
Input:    Message type variable
Returns:  Message pointer lookup table index This is an access funtion, used by COE_DB.C, to
        get the index to a message structure array.
****************************************************************/

UCHAR GetMsgIndex (UCHAR MsgType) {

UCHAR i = 0;
  UCHAR MessageIndex = MAX_MSG_TYPES;

while (( i < MAX_MSG_TYPES) && (MsgType != MsgIndex[i]))
    ++i;
  if (i >= MAX_MSG_TYPES)
    i = (MAX_MSG_TYPES - 1);
  else
    MessageIndex = i;

return (MessageIndex);
}

/****************************************************************
Function: GetMsgPtr
Input:    Index to a message array
Returns:  Pointer to a message array This is an access funtion, used by COE_DB.C, to
        get the pointer to a message structure array.
****************************************************************/

PUCHAR GetMsgPtr (UCHAR MsgCode) { return (MsgPtrTable[MsgCode]);
}
```

/****************************************************************
Function: GetIeIndex
Input:   Information element code and code set
Returns: Index to an information element array This is an access funtion, used by COE_DB.C, to
        get the index to the information element array.
****************************************************************/

UCHAR GetIeIndex (UCHAR IeType, UCHAR CodeSet) {

UCHAR i = 0;
  UCHAR hIe = (MAX_IE_TYPES - 1);
  UCHAR CodeRange = IE_LOCKING_SHIFT_5;

if (CodeSet == IE_LOCKING_SHIFT_5) {
    CodeRange = IE_LOCKING_SHIFT_6;
    while (( i < MAX_IE_TYPES) && (CodeSet != IeIndex[i]))
       ++i;
  }
  else if (CodeSet == IE_LOCKING_SHIFT_6) {
    CodeRange = MAX_IE_TYPES;
    while (( i < MAX_IE_TYPES) && (CodeSet != IeIndex[i]))
       ++i;
  }
  while (( i < MAX_IE_TYPES) && (IeType != IeIndex[i]))
     ++i;
  if (i >= CodeRange)
     i = (MAX_IE_TYPES - 1);
  else {
    if (IeType == gLastIeType) {
      hIe = (i + (++gIeRepeatCnt));
    }
    else {
      gIeRepeatCnt = 0;
      hIe = i;
    }
    gLastIeType = IeType;
  } return (hIe);
}

/****************************************************************
Function: GetMaxIe
Input:   Q.931 message code
Returns: The maximum number of information elements
        stored in the message array for that message
        type.

This is an access funtion, used by COE_DB.C.

```
*****************************************************************/
UCHAR GetMaxIe (UCHAR MsgCode) {
  return (MaxIEIndex[MsgCode]);
}
```

```
/*****************************************************************
    ISDN 2000 Central Office Emulator Strings and String Access Functions (c) 1994 Merge Technologies Inc.

NSG Version Strings

General: This module defines various string constants and
    provides access functions for them, particularly strings
    that describe Q.931 message types and information elements.
*****************************************************************/ ifndef NODEBUG
pragma DEBUG CODE SYMBOLS OBJECTEXTEND
endif include <coe.h>
include <lib_str.h>
#include <lib_msg.h>

XUCHAR gCodeSet;  // added 3/2/95 rev2.02

/*****************************************************************
    Display Characters and Strings
*****************************************************************/

XCHAR  ErrorCode[3];
PXCHAR pszErrorCode;
PCHAR  pszErrorMsg;

CHAR code pszVersion2[MAX_DESCRIPT_LENGTH] = " Mod 2-144E Rev2.02";

CHAR code pszTiming1[MAX_DESCRIPT_LENGTH] = "    Self Test    ";
CHAR code pszTiming2[MAX_DESCRIPT_LENGTH] = "  Please Stand By ";
CHAR code pszTiming3[MAX_DESCRIPT_LENGTH] = "  Timing Acquired ";

CHAR code pszSignOn1[MAX_DESCRIPT_LENGTH] = "    Model 2-144E    ";
CHAR code pszSignOn2[MAX_DESCRIPT_LENGTH] = "    Version 2.02    ";
CHAR code pszSignOn3[MAX_DESCRIPT_LENGTH] = "      Network       ";
CHAR code pszSignOn4[MAX_DESCRIPT_LENGTH] = "   Services Group   ";

CHAR code pszEmuHalt1[MAX_DESCRIPT_LENGTH] = " Emulation Halted ";
CHAR code pszAnyKey[MAX_DESCRIPT_LENGTH]   = "   Press Any Key   ";
CHAR code pszPressF1[MAX_DESCRIPT_LENGTH]  = "     Press F1     ";
CHAR code pszPressF2[MAX_DESCRIPT_LENGTH]  = "     Press F2     ";
CHAR code pszEmuHalt3[MAX_DESCRIPT_LENGTH] = "  Remote Control  ";
CHAR code pszTrcEmpty[MAX_DESCRIPT_LENGTH] = " Trace Buffer Empty";
CHAR code pszSetSwitch[MAX_DESCRIPT_LENGTH] =" Change Switch Type ";
CHAR code pszSetEKTS[MAX_DESCRIPT_LENGTH]  = " Change EKTS Setting";
CHAR code pszTotalErr[MAX_DESCRIPT_LENGTH] = " Total Errors: XX ";
CHAR code pszPhyLayer[15] =            "Physical Layer";
```

```
CHAR code pszDataLayer[16] =        "Data Link Layer";
CHAR code pszNetLayer[14] =         "Network Layer";
CHAR code pszActive[8] =            " ACTIVE";
CHAR code pszHalted[7] =            " BREAK";
CHAR code pszRestart[17] =          " INITIALIZING...";
CHAR code pszError[7] =             " ERROR";
CHAR code pszTraceOn[MAX_DESCRIPT_LENGTH] = " TRACE:     ON";
CHAR code pszTraceOff[MAX_DESCRIPT_LENGTH] = " TRACE:    OFF";
CHAR code pszOverOn[MAX_DESCRIPT_LENGTH] = " REM LOCK:  OFF";
CHAR code pszOverOff[MAX_DESCRIPT_LENGTH] = " REM LOCK:   ON";

CHAR code pszDashLine[MAX_DESCRIPT_LENGTH] = "--------------------";
CHAR code pszBlankLine[MAX_DESCRIPT_LENGTH] ="                    ";

CHAR code pszNoDN[21] =             "IDLE   ";
CHAR code pszReady[21] =            "READY";
CHAR code pszPort1[21] =            "PORT1 ";
CHAR code pszPort2[21] =            "PORT2 ";

CHAR code Menu1[2] =      {0xe1, 0x00};
CHAR code Menu2[2] =      {0xe2, 0x00};
CHAR code Menu3[2] =      {0xe3, 0x00};
CHAR code Menu4[2] =      {0xe4, 0x00};
CHAR code BulletOff[2] =  {0xd9, 0x00};
CHAR code BulletOn[2] =   {0xda, 0x00};
CHAR code RightArrowOff[2] = {0xbd, 0x00};
CHAR code RightArrowOn[2] =  {0xbc, 0x00};
CHAR code SolidBlock[2] = {0xef, 0x00};

CHAR code MsgStr[MAX_MSG_TYPES][MAX_DESCRIPT_LENGTH] = {

"NETwork ESCape    ",
   "SETUP             ",
   "SETUP ACKnowledge ",
   "CALL PROCeeding   ",
   "PROGress          ",
   "ALERTing          ",
   "CONNect           ",
   "CONNect ACKnowledge ",
   "DISConnect        ",
   "RELease           ",
   "RELease COMplete  ",
   "RESTart           ",
   "RESTart ACKnowledge ",
   "FACility          ",
   "REGister          ",
   "NOTIFY            ",
   "INFOrmation       ",
   "STATus            ",
   "STATus ENQuiry    ",
   "HOLD              ",
   "HOLD ACKnowledge  ",
   "HOLD REJect       ",
```

```
"RETrieve         ",
"RETrieve ACK     ",
"RETrieve REJect  ",
"X.25 Protocol    ",
"AT&T CONFerence  ",
"AT&T CONF ACK    ",
"AT&T CONF REJect ",
"AT&T TRANSfer    ",
"AT&T TRANSfer ACK",
"AT&T TRANSfer REJ",
"AT&T ASSOCiate   ",
"AT&T ASSOCiate ACK",
"AT&T DROP        ",
"AT&T DROP ACK    ",
"AT&T DROP REJect ",
"AT&T HOLD        ",
"AT&T HOLD ACK    ",
"AT&T HOLD REJect ",
"AT&T RECONNect   ",
"AT&T RECONNect ACK",
"AT&T RECONNect REJ",
"AT&T REDIRect    ",
"AT&T MIM         ",
"MSG NOT SUPPORTED" };

CHAR code IeStr[MAX_IE_TYPES][MAX_DESCRIPT_LENGTH] = {

"Sending Complete",
"Bearer Capability",
"Cause",
"Connected Number",
"Extended Facility",
"Call State",
"Channel ID",
"Facility",
"Progress Indicator",
"Terminal Capability",
"Notification",
"Keypad",
"Information Request",
"Signal",
"Switch Hook",
"Service Profile ID",
"Endpoint ID",
"Calling Party Number",
"Calling Sub Address",
"Called Party Number",
"Called Sub Address",
"Transit Net Select",
"Restart Indicator",
"Low Layer Compat",
"Hi Layer Compat",
"User Information",
```

```
"Locking Shift 5",
"Operator Access",
"Display Text",
"Locking Shift 6",
"User Code",
"Logical Link ID",
"Associated Type",
"Selected CA",
"Origination CA",
"Destination CA",
"Endpoint ID",
"Keypad Control",
"Other Call Ref",
"Feature Activation",
"Feature Indication",
"Adjunct Control",
"Display Control",
"Display Field",
"Display Field",
"Display Field",
"Display Field",
"Packet Layer Param",
"Link Layer Param",
"Closed User Group",
"Reverse Charging",
"Throughput Class",
"Redirect Subaddress",
"Redirection Number",
"AT&T Management IE",
"Call Appearance",
"Unknown Info Element" };

CHAR code ErrStr[MAX_ERROR_TYPES][MAX_DESCRIPT_LENGTH] = {

"  No Errors Logged  ",
"  L1: No Packet    ",
"  L1: Timeout Error ",
"  L1: Loss Of Sync  ",
"L2: Invalid Request ",
" L1: Undefined SAP  ",
"L1: Undefined Frame ",
"L2: TEI Negotiation ",
"  L1: Fatal Error  ",
"   L2: TEI Limit   ",
"   L2: PHF Busy    ",
"  L2: TEI Disc Mode ",
"  L2: Unsupported  ",
"  L2: Timer Expire ",
"  L2: Timer Expire ",
"   L2: LC Error    ",
" L2: Msg Queue Full ",
"  L2: NR-NS Error  ",
"   L2: Ack Error   ",
```

```
"L2: Unknown Protocol",
"   L2: No Ack    ",
"   L2: Port Error  ",
" L1: Local Xmt Busy ",
" L1: Packet Corrupt ",
"L1: Rcv Packets Lost",
"L1: Rcv Packet Lost ",
"L1: Xmt Packet Lost ",
"L1: Xmt Packets Lost",
"L3: Unknown Msg Type",
" No Errors Logged  " };

/****************************************************************
 Error Code Table - so, where would you put it?
****************************************************************/

CHAR code ErrIndex[MAX_ERROR_TYPES] = {

LOG_ERR_NO_ERRORS,
   LOG_ERR_NO_PACKET,
   LOG_ERR_TIMEOUT,
   LOG_ERR_INTERFACE_CHANGE,
   LOG_ERR_INVALID_REQUEST,
   LOG_ERR_UNDEFINED_SAP,
   LOG_ERR_UNDEFINED_FRAME,
   LOG_ERR_NO_TEI_AVAIL,
   LOG_ERR_LAYER1_FAIL,
   LOG_ERR_TEI_LIMIT_EXCEEDED,
   LOG_ERR_LOCAL_BUSY,
   LOG_ERR_TEI_INACTIVE,
   LOG_ERR_NOT_SUPPORTED,
   LOG_ERR_T200_EXPIRE,
   LOG_ERR_T203_EXPIRE,
   LOG_ERR_LC_LIMIT_EXCEEDED,
   LOG_ERR_MSG_QUEUE_FULL,
   LOG_ERR_NR_ERROR,
   LOG_ERR_MSG_QUEUE_EMPTY,
   LOG_ERR_UNKNOWN_PROTOCOL,
   LOG_ERR_NO_ACK,
   LOG_ERR_UNDEFINED_PORT,
   LOG_ERR_L1_XMT_BUSY,
   LOG_ERR_FATAL_INT0,
   LOG_ERR_INT0_RCV_RESET,
   LOG_ERR_INT0_RCV_MSG_LOST,
   LOG_ERR_INT0_XDU,
   LOG_ERR_INT0_XDU_XPR,
   LOG_ERR_UNKNOWN_MSG,
   0 };

/****************************************************************
 Function: InitString
```

```
Input:   None
Returns: None

*****************************************************************/ void InitString (void) { pszErrorCode = ErrorCode;
    pszErrorMsg = ErrStr[0];
}

/****************************************************************
Function: SetShift
Input:   None
Returns: None

*****************************************************************/ void SetShift (UCHAR CodeSet) { gCodeSet = CodeSet;

}

/****************************************************************
Function: GetString
Input:   String type constant and code point
Returns: Pointer to an ASCII string This access function selects a string array based
        on StringType and matches the code point based
        on MsgType. A corresponding array holds a descriptive
        string at the same index position.
*****************************************************************/

PCHAR GetString (UCHAR StringType, UCHAR MsgType) {

UCHAR i;
    UCHAR MaxElements;
    PCHAR pMsgArray;
    PCHAR pStringArray;
    PCHAR pMsgString;

switch (StringType) { case STR_ERRORS:
         pMsgArray = ErrIndex;
         pStringArray = ErrStr[0];
         MaxElements = MAX_ERROR_TYPES;
         break;
```

```
        case STR_INFO_ELEMENT:
          if (gCodeSet == IE_LOCKING_SHIFT_0) {
            pMsgArray = &IeIndex[0];
            pStringArray = IeStr[0];
            MaxElements = MAX_IE_TYPES;
          }
          else if (gCodeSet == IE_LOCKING_SHIFT_5) {
            pMsgArray = &IeIndex[26];
            pStringArray = IeStr[26];
            MaxElements = (MAX_IE_TYPES - 26);
          }
          else if (gCodeSet == IE_LOCKING_SHIFT_6) {
            pMsgArray = &IeIndex[29];
            pStringArray = IeStr[29];
            MaxElements = (MAX_IE_TYPES - 29);
          }
          break;

default:
          pMsgArray = MsgIndex;
          pStringArray = MsgStr[0];
          MaxElements = MAX_MSG_TYPES;
          break;

}
    i = 0;
    while ((i < MaxElements) && (MsgType != *(pMsgArray + i)))
        ++i;
    if (i >= MaxElements)
        pMsgString = (pStringArray + ((MaxElements - 1) * MAX_DESCRIPT_LENGTH));
    else
        pMsgString = (pStringArray + (i * MAX_DESCRIPT_LENGTH));

return (pMsgString);
}
```

```
/****************************************************************

ISDN 2000 Central Office Emulator

Settings Display and Processing Module (c) 1994 Merge Technologies Inc.

General: The user may change several operating characteristics
ofr emulation using the function keys. This module provides
the interface and updates global variables based on the
user's selections.
****************************************************************/ ifndef NODEBUG
pragma DEBUG CODE SYMBOLS OBJECTEXTEND
endif include <coe.h>
include <coe_reg.h>
#include <coe_set.h>
#include <lib_io.h>
include <lib_util.h>
include <lib_str.h>

/****************************************************************
  Function: FormatSetStr
  Input:   Index to a settting and an index to the value of
           that setting.
  Returns: Pointer to a formatted string, showing the
           setting in ASCII text.

****************************************************************/

PUCHAR FormatSetStr (UCHAR hSetting, UCHAR hValue) {

XUCHAR pFormatBuffer[MAX_DESCRIPT_LENGTH];
    PUCHAR pValueArray = pSettingArrays[hSetting];

ClearMem (pFormatBuffer, MAX_DESCRIPT_LENGTH);
    AddString (pFormatBuffer," ");
    AddString (pFormatBuffer, (pszSetNames[0] + (MAX_LABEL_LENGTH * hSetting)));
    AddString (pFormatBuffer, (pValueArray + (MAX_SETTING_LENGTH * hValue)));

return (pFormatBuffer);
}

/****************************************************************
  Function: GetCurrentValue
  Input:   Index to the setting array
  Returns: Current value of that setting

****************************************************************/
```

```c
UCHAR GetCurrentValue (UCHAR hSetting) {

UCHAR hValue = *(pCurrentSettings[hSetting]);

return (hValue);
}
/*****************************************************************
Function: PutCurrentValue
Input:   Index to the setting array and the user's
         current selection for that setting.
Returns: None

*****************************************************************/ void PutCurrentValue (UCHAR hSetting, UCHAR hValue) {

*(pCurrentSettings[hSetting]) = hValue;

}

/*****************************************************************
Function: DefaultSettings
Input:   None
Returns: None Initializes settings to their default values.
*****************************************************************/ void DefaultSettings (void) { if (*pSwitchTypeSet != ETSI_SWITCH_SET) {
        if (*pSwitchTypeSet == ATT_SWITCH_SET) {
            *pConfigSet = FALSE;
            *pEKTSSet = FALSE;
            *pHoldSet = FALSE;
            *pTotalCASet = 0;
            *pACOSet = FALSE;
        }
        else {
            *pConfigSet = TRUE;
            *pEKTSSet = TRUE;
            *pHoldSet = HOLD_AUTO_SET;
            *pTotalCASet = 15;
            *pACOSet = TRUE;
        }
        *pDisplaySet = TRUE;
        *pCallerIDSet = TRUE;
    }
    else {
        *pConfigSet = FALSE;
        *pDisplaySet = FALSE;
        *pCallerIDSet = FALSE;
        *pEKTSSet = FALSE;
```

```
      *pHoldSet = FALSE;
      *pTotalCASet = FALSE;
      *pACOSet = FALSE;
    }
    if (*pEKTSSet == FALSE) {
      *pHoldSet = FALSE;
      *pTotalCASet = FALSE;
      *pACOSet = FALSE;
    }
}

/****************************************************************
Function: TestSettings
Input:   None
Returns: None Ensures that all settings are within valid ranges.
        If not, assumes the setting is corrupt and
        initalizes it. Should only be true the first
        time the emulator is powered up or after memory is
        replaced. Also updates the status of the Defaults
        setting.
****************************************************************/ void TestSettings (void) { if (*pSwitchTypeSet >= MAX_SWITCH_SETTINGS)
        *pSwitchTypeSet = NI1_SWITCH_SET;
    if (*pConfigSet >= MAX_CONFIG_SETTINGS)
        *pConfigSet = TRUE;
    if (*pProvision >= MAX_PROVISION_SETTINGS)
        *pProvision = CHANNEL_NONE_SET;
    if (*pDX25Set >= MAX_DX25_SETTINGS)
        *pDX25Set = FALSE;
    if (*pDisplaySet >= MAX_DISPLAY_SETTINGS)
        *pDisplaySet = TRUE;
    if (*pCallerIDSet >= MAX_CALLER_ID_SETTINGS)
        *pCallerIDSet = TRUE;
    if (*pEKTSSet >= MAX_EKTS_SETTINGS)
        *pEKTSSet = TRUE;
    if (*pHoldSet >= MAX_HOLD_SETTINGS)
        *pHoldSet = HOLD_AUTO_SET;
    if (*pTotalCASet >= MAX_CA_SETTINGS)
        *pTotalCASet = 15;
    if (*pACOSet >= MAX_ACO_SETTINGS)
        *pACOSet = TRUE;
    if (*pDefaultSet >= MAX_DEFAULT_SETTINGS)
        DefaultSettings ();

if (*pSwitchTypeSet == ATT_SWITCH_SET) {
        if ((*pConfigSet == FALSE) &&
            (*pDisplaySet == TRUE) &&
            (*pCallerIDSet == TRUE) &&
            (*pEKTSSet == FALSE) &&
```

```
        (*pHoldSet == FALSE) &&
        (*pTotalCASet == FALSE) &&
        (*pACOSet == FALSE))
        *pDefaultSet = TRUE;
     else
        *pDefaultSet = FALSE;
   }
   else if (*pSwitchTypeSet == ETSI_SWITCH_SET) {
      if ((*pConfigSet == FALSE) &&
        (*pDisplaySet == FALSE) &&
        (*pCallerIDSet == FALSE) &&
        (*pEKTSSet == FALSE) &&
        (*pHoldSet == FALSE) &&
        (*pTotalCASet == FALSE) &&
        (*pACOSet == FALSE))
        *pDefaultSet = TRUE;
     else
        *pDefaultSet = FALSE;
   }
   else {
      if ((*pProvision == CHANNEL_NONE_SET) &&
        (*pDisplaySet == TRUE) &&
        (*pCallerIDSet == TRUE) &&
        (*pEKTSSet == TRUE) &&
        (*pHoldSet == HOLD_AUTO_SET) &&
        (*pTotalCASet == 15) &&
        (*pACOSet == TRUE))
        *pDefaultSet = TRUE;
     else
        *pDefaultSet = FALSE;
   }
   if (*pEKTSSet == FALSE) {
      *pHoldSet = FALSE;
      *pTotalCASet = FALSE;
      *pACOSet = FALSE;
   }
}

/****************************************************************
Function: DoSettings
Input:   Key pressed by operator upon entry (F1-3)
Returns: Key pressed by operator to exit This is the main entry function for this module.
         It processes all user selections for emulator
         settings and displays the interface.
****************************************************************/

UCHAR DoSettings (UCHAR MenuKey) {

UCHAR Done = FALSE;
   UCHAR i;
   UCHAR CurrentLine;
   UCHAR FirstSetting;
```

```
UCHAR MaxSettings;
UCHAR hSetting;
UCHAR hValue;
UCHAR ReturnKey;

ClrDisplay ();

switch (MenuKey) { case KBD_F1:
      FirstSetting = SWITCH_SETTING;
      MaxSettings = 4;
      break;

case KBD_F2:
      FirstSetting = CALLER_ID_SETTING;
      if (*pSwitchTypeSet == ETSI_SWITCH_SET) {
         FirstSetting = CONFIG_SETTING;
         MaxSettings = 1;
      }
      else if ((*pSwitchTypeSet == NI1_SWITCH_SET) ||
           (*pSwitchTypeSet == DMS_SWITCH_SET))
         MaxSettings = 3;
      else
         MaxSettings = 4;
      break;

case KBD_F3:
      FirstSetting = CA_SETTING;
      if ((*pSwitchTypeSet == ETSI_SWITCH_SET) ||
         (*pEKTSSet == FALSE))
         MaxSettings = 0;
      else
         MaxSettings = 3;
      break;
} if (MaxSettings) {
   hSetting = FirstSetting;
   CurrentLine = 1;
   for (i = CurrentLine; i <= MaxSettings; ++i) {
      hValue = GetCurrentValue (hSetting);
      DisplayPosition (i, 1);
      Display (FormatSetStr (hSetting, hValue));
      ++hSetting;
   }
   CurrentLine = 1;
   hSetting = FirstSetting;
   hValue = GetCurrentValue (hSetting);
   DisplayPosition (CurrentLine, 1);
   Display (RightArrowOn);

while (!Done) {
```

```
ReturnKey = OnKbd ();

switch (ReturnKey) { case KBD_UP:
    DisplayPosition (CurrentLine, 1);
    Display (" ");
    if ((CurrentLine - 1) == 0) {
      hSetting = (FirstSetting + (MaxSettings - 1));
      CurrentLine = MaxSettings;
    }
    else {
      --CurrentLine;
      --hSetting;
    }
    hValue = GetCurrentValue (hSetting);
    break;

case KBD_DOWN:
    DisplayPosition (CurrentLine, 1);
    Display (" ");
    if ((CurrentLine + 1) > MaxSettings) {
      hSetting = FirstSetting;
      CurrentLine = 1;
    }
    else {
      ++CurrentLine;
      ++hSetting;
    }
    hValue = GetCurrentValue (hSetting);
    break;

case KBD_PGUP:
    if ((hValue + 1) == SetLimits[hSetting])
      hValue = 0;
    else
      ++hValue;
    PutCurrentValue (hSetting, hValue);
    if ((hSetting == DEFAULT_SETTING) &&
        (hValue == TRUE))
      DefaultSettings ();
    if (hSetting == SWITCH_SETTING)
      DefaultSettings ();
    break;

case KBD_PGDOWN:
    if (hValue == 0)
      hValue = (SetLimits[hSetting] - 1);
    else
      --hValue;
    PutCurrentValue (hSetting, hValue);
    if ((hSetting == DEFAULT_SETTING) &&
        (hValue == TRUE))
      DefaultSettings ();
```

```
            if (hSetting == SWITCH_SETTING)
                DefaultSettings ();
            break;

default:
            Done = TRUE;
            TestSettings ();
            break;

}

DisplayPosition (CurrentLine, 1);
        Display (FormatSetStr (hSetting, hValue));
        DisplayPosition (CurrentLine, 1);
        Display (RightArrowOn);
        }
    }
    else if (*pSwitchTypeSet == ETSI_SWITCH_SET) {
        DisplayMsg (pszSetSwitch, pszPressF1);
        ReturnKey = OnKbd ();
    }
    else {
        DisplayMsg (pszSetEKTS, pszPressF2);
        ReturnKey = OnKbd ();
    } return (ReturnKey);
}

/***************************************************************
Function: DoRemSettings
Input:   None
Returns: None

***************************************************************/ void DoRemSettings (void) {

UCHAR hSetting = gRemSet;
    UCHAR hValue;
    PCHAR pStr;

--hSetting;

if (gRemParam == UNKNOWN)
        hValue = GetCurrentValue (hSetting);
    else
        hValue = gRemParam;

if ((hSetting >= 0) && (hSetting <= MAX_SETTINGS)) {
        PutCurrentValue (hSetting, hValue);
        if ((hSetting == DEFAULT_SETTING) && (hValue == TRUE)) {
            DefaultSettings ();
        }
```

```
        else {
            TestSettings ();
            hValue = GetCurrentValue (hSetting);
        }
        pStr = FormatSetStr (hSetting, hValue);
        Print (PRT_RESPONSE, pStr);
    }
    else {
        pStr = pszError;
        Print (PRT_RESPONSE, pStr);
    }
    gRemSet = 0;
    gRemParam = 0;
}
```

```
/****************************************************************

ISDN 2000 Central Office Emulator

Strings and String Access Functions (c) 1994 Merge Technologies Inc.

General: This module defines various string constants and
    provides access functions for them, particularly strings
    that describe Q.931 message types and information elements.
****************************************************************/ ifndef NODEBUG
pragma DEBUG CODE SYMBOLS OBJECTEXTEND
endif include <coe.h>
include <lib_str.h>
#include <lib_msg.h>

/****************************************************************
    Locking Shift Codeset Indicator
****************************************************************/

XUCHAR gCodeSet;  // added 3/2/95 rev2.02

/****************************************************************
    Display Characters and Strings
****************************************************************/

XCHAR ErrorCode[3];
PXCHAR pszErrorCode;
PCHAR pszErrorMsg;

CHAR code pszVersion2[MAX_DESCRIPT_LENGTH] = " ISDN 2000A Rev2.03";

CHAR code pszTiming1[MAX_DESCRIPT_LENGTH] = "    Self Test    ";
CHAR code pszTiming2[MAX_DESCRIPT_LENGTH] = "  Please Stand By ";
CHAR code pszTiming3[MAX_DESCRIPT_LENGTH] = "  Timing Acquired ";
CHAR code pszSignOn1[MAX_DESCRIPT_LENGTH] = "    ISDN 2000A   ";
CHAR code pszSignOn2[MAX_DESCRIPT_LENGTH] = "    Version 2.03 ";
CHAR code pszSignOn3[MAX_DESCRIPT_LENGTH] = "      (c) 1994   ";
CHAR code pszSignOn4[MAX_DESCRIPT_LENGTH] = " Merge Technologies ";

CHAR code pszEmuHalt1[MAX_DESCRIPT_LENGTH] = " Emulation Halted ";
CHAR code pszAnyKey[MAX_DESCRIPT_LENGTH]   = "  Press Any Key  ";
CHAR code pszPressF1[MAX_DESCRIPT_LENGTH]  = "     Press F1    ";
CHAR code pszPressF2[MAX_DESCRIPT_LENGTH]  = "     Press F2    ";
CHAR code pszEmuHalt3[MAX_DESCRIPT_LENGTH] = "  Remote Control ";
CHAR code pszTrcEmpty[MAX_DESCRIPT_LENGTH] = " Trace Buffer Empty ";
CHAR code pszSetSwitch[MAX_DESCRIPT_LENGTH] =" Change Switch Type ";
CHAR code pszSetEKTS[MAX_DESCRIPT_LENGTH]  = " Change EKTS Setting";
CHAR code pszTotalErr[MAX_DESCRIPT_LENGTH] = " Total Errors: XX ";
```

```
CHAR code pszPhyLayer[15] =            "Physical Layer";
CHAR code pszDataLayer[16] =           "Data Link Layer";
CHAR code pszNetLayer[14] =            "Network Layer";
CHAR code pszActive[8] =               " ACTIVE";
CHAR code pszHalted[7] =               " BREAK";
CHAR code pszRestart[17] =             " INITIALIZING...";
CHAR code pszError[7] =                " ERROR";
CHAR code pszTraceOn[MAX_DESCRIPT_LENGTH] = " TRACE:     ON";
CHAR code pszTraceOff[MAX_DESCRIPT_LENGTH] = " TRACE:     OFF";
CHAR code pszOverOn[MAX_DESCRIPT_LENGTH] =  " REM LOCK:  OFF";
CHAR code pszOverOff[MAX_DESCRIPT_LENGTH] = " REM LOCK:  ON";
CHAR code pszXmtP1Eoc[] =              " P1 XMT EOC: ";
CHAR code pszXmtP2Eoc[] =              " P2 XMT EOC: ";
CHAR code pszRcvP1Eoc[] =              " P1 RCV EOC: ";
CHAR code pszRcvP2Eoc[] =              " P2 RCV EOC: ";

CHAR code pszDashLine[MAX_DESCRIPT_LENGTH] = "--------------------";
CHAR code pszBlankLine[MAX_DESCRIPT_LENGTH] ="                    ";

CHAR code pszNoDN[21] =                "IDLE  ";
CHAR code pszReady[21] =               "READY";
CHAR code pszPort1[21] =               "PORT1 ";
CHAR code pszPort2[21] =               "PORT2 ";

CHAR code Menu1[2] =       {0xe1, 0x00};
CHAR code Menu2[2] =       {0xe2, 0x00};
CHAR code Menu3[2] =       {0xe3, 0x00};
CHAR code Menu4[2] =       {0xe4, 0x00};
CHAR code BulletOff[2] =   {0xd9, 0x00};
CHAR code BulletOn[2] =    {0xda, 0x00};
CHAR code RightArrowOff[2] = {0xbd, 0x00};
CHAR code RightArrowOn[2] =  {0xbc, 0x00};
CHAR code SolidBlock[2] =  {0xef, 0x00};

CHAR code MsgStr[MAX_MSG_TYPES][MAX_DESCRIPT_LENGTH] = {

"NETwork ESCape    ",
    "SETUP             ",
    "SETUP ACKnowledge ",
    "CALL PROCeeding   ",
    "PROGress          ",
    "ALERTing          ",
    "CONNect           ",
    "CONNect ACKnowledge ",
    "DISConnect        ",
    "RELease           ",
    "RELease COMplete  ",
    "RESTart           ",
    "RESTart ACKnowledge ",
    "FACility          ",
    "REGister          ",
    "NOTIFY            ",
    "INFOrmation       ",
```

```
"STATus            ",
"STATus ENQuiry   ",
"HOLD              ",
"HOLD ACKnowledge  ",
"HOLD REJect       ",
"RETrieve          ",
"RETrieve ACK      ",
"RETrieve REJect   ",
"X.25 Protocol     ",
"AT&T CONFerence   ",
"AT&T CONF ACK     ",
"AT&T CONF REJect  ",
"AT&T TRANSfer     ",
"AT&T TRANSfer ACK ",
"AT&T TRANSfer REJ ",
"AT&T ASSOCiate    ",
"AT&T ASSOCiate ACK ",
"AT&T DROP         ",
"AT&T DROP ACK     ",
"AT&T DROP REJect  ",
"AT&T HOLD         ",
"AT&T HOLD ACK     ",
"AT&T HOLD REJect  ",
"AT&T RECONNect    ",
"AT&T RECONNect ACK ",
"AT&T RECONNect REJ ",
"AT&T REDIRect     ",
"AT&T MIM          ",
"MSG NOT SUPPORTED " };

CHAR code IeStr[MAX_IE_TYPES][MAX_DESCRIPT_LENGTH] = {

"Sending Complete",
    "Bearer Capability",
    "Cause",
    "Connected Number",
    "Extended Facility",
    "Call State",
    "Channel ID",
    "Facility",
    "Progress Indicator",
    "Terminal Capability",
    "Notification",
    "Keypad",
    "Information Request",
    "Signal",
    "Switch Hook",
    "Service Profile ID",
    "Endpoint ID",
    "Calling Party Number",
    "Calling Sub Address",
    "Called Party Number",
    "Called Sub Address",
```

"Transit Net Select",
"Restart Indicator",
"Low Layer Compat",
"Hi Layer Compat",
"User Information",
"Locking Shift 5",
"Operator Access",
"Display Text",
"Locking Shift 6",
"User Code",
"Logical Link ID",
"Associated Type",
"Selected CA",
"Origination CA",
"Destination CA",
"Endpoint ID",
"Keypad Control",
"Other Call Ref",
"Feature Activation",
"Feature Indication",
"Adjunct Control",
"Display Control",
"Display Field",
"Display Field",
"Display Field",
"Display Field",
"Packet Layer Param",
"Link Layer Param",
"Closed User Group",
"Reverse Charging",
"Throughput Class",
"Redirect Subaddress",
"Redirection Number",
"AT&T Management IE",
"Call Appearance",
"Unknown Info Element" };

CHAR code ErrStr[MAX_ERROR_TYPES][MAX_DESCRIPT_LENGTH] = {

" No Errors Logged ",
" L1: No Packet ",
" L1: Timeout Error ",
" L1: Loss Of Sync ",
"L2: Invalid Request ",
" L1: Undefined SAP ",
"L1: Undefined Frame ",
"L2: TEI Negotiation ",
" L1: Fatal Error ",
"   L2: TEI Limit   ",
"   L2: PHF Busy   ",
" L2: TEI Disc Mode ",
" L2: Unsupported ",
" L2: Timer Expire ",

```
" L2: Timer Expire  ",
"   L2: LC Error    ",
" L2: Msg Queue Full ",
"  L2: NR-NS Error  ",
"   L2: Ack Error   ",
"L2: Unknown Protocol",
"    L2: No Ack     ",
"   L2: Port Error  ",
" L1: Local Xmt Busy ",
" L1: Packet Corrupt ",
"L1: Rcv Packets Lost",
"L1: Rcv Packet Lost ",
"L1: Xmt Packet Lost ",
"L1: Xmt Packets Lost",
"L3: Unknown Msg Type",
"  No Errors Logged  " };

/****************************************************************
Error Code Lookup Table
****************************************************************/

CHAR code ErrIndex[MAX_ERROR_TYPES] = {

LOG_ERR_NO_ERRORS,
  LOG_ERR_NO_PACKET,
  LOG_ERR_TIMEOUT,
  LOG_ERR_INTERFACE_CHANGE,
  LOG_ERR_INVALID_REQUEST,
  LOG_ERR_UNDEFINED_SAP,
  LOG_ERR_UNDEFINED_FRAME,
  LOG_ERR_NO_TEI_AVAIL,
  LOG_ERR_LAYER1_FAIL,
  LOG_ERR_TEI_LIMIT_EXCEEDED,
  LOG_ERR_LOCAL_BUSY,
  LOG_ERR_TEI_INACTIVE,
  LOG_ERR_NOT_SUPPORTED,
  LOG_ERR_T200_EXPIRE,
  LOG_ERR_T203_EXPIRE,
  LOG_ERR_LC_LIMIT_EXCEEDED,
  LOG_ERR_MSG_QUEUE_FULL,
  LOG_ERR_NR_ERROR,
  LOG_ERR_MSG_QUEUE_EMPTY,
  LOG_ERR_UNKNOWN_PROTOCOL,
  LOG_ERR_NO_ACK,
  LOG_ERR_UNDEFINED_PORT,
  LOG_ERR_L1_XMT_BUSY,
  LOG_ERR_FATAL_INT0,
  LOG_ERR_INT0_RCV_RESET,
  LOG_ERR_INT0_RCV_MSG_LOST,
  LOG_ERR_INT0_XDU,
  LOG_ERR_INT0_XDU_XPR,
  LOG_ERR_UNKNOWN_MSG,
```

```
    0 };

/****************************************************************
    Function: InitString
    Input:    None
    Returns:  None

****************************************************************/ void InitString (void) { pszErrorCode = ErrorCode;
    pszErrorMsg = ErrStr[0];
}

/****************************************************************
    Function: SetShift
    Input:    None
    Returns:  None

****************************************************************/ void SetShift (UCHAR CodeSet) { gCodeSet = CodeSet;

}

/****************************************************************
    Function: GetString
    Input:    String type constant and code point
    Returns:  Pointer to an ASCII string This access function selects a string array based
        on StringType and matches the code point based
        on MsgType. A corresponding array holds a descriptive
        string at the same index position.
****************************************************************/

PCHAR GetString (UCHAR StringType, UCHAR MsgType) {

UCHAR i;
    UCHAR MaxElements;
    PCHAR pMsgArray;
    PCHAR pStringArray;
    PCHAR pMsgString;

switch (StringType) { case STR_ERRORS:
```

```
        pMsgArray = ErrIndex;
        pStringArray = ErrStr[0];
        MaxElements = MAX_ERROR_TYPES;
        break;

case STR_INFO_ELEMENT:
        if (gCodeSet == IE_LOCKING_SHIFT_0) {
            pMsgArray = &IeIndex[0];
            pStringArray = IeStr[0];
            MaxElements = MAX_IE_TYPES;
        }
        else if (gCodeSet == IE_LOCKING_SHIFT_5) {
            pMsgArray = &IeIndex[26];
            pStringArray = IeStr[26];
            MaxElements = (MAX_IE_TYPES - 26);
        }
        else if (gCodeSet == IE_LOCKING_SHIFT_6) {
            pMsgArray = &IeIndex[29];
            pStringArray = IeStr[29];
            MaxElements = (MAX_IE_TYPES - 29);
        }
        break;

default:
        pMsgArray = MsgIndex;
        pStringArray = MsgStr[0];
        MaxElements = MAX_MSG_TYPES;
        break;
    }
    i = 0;
    while ((i < MaxElements) && (MsgType != *(pMsgArray + i)))
        ++i;
    if (i >= MaxElements)
        pMsgString = (pStringArray + ((MaxElements - 1) * MAX_DESCRIPT_LENGTH));
    else
        pMsgString = (pStringArray + (i * MAX_DESCRIPT_LENGTH));

return (pMsgString);
}
```

```c
/****************************************************************

ISDN 2000 Central Office Emulator

Telephony Switch Simulation Module (c) 1994 Merge Technologies Inc.

General: This module performs all Input/Output functions for
telephony related devices, including:

T7270 Time Slot Interchanger
   T7264 U Interface Transceiver
   T7254 S/T Interface Transceiver
   Call Progress Tone Generator (CPTG) Circuit
   IDEC (PEB 2075 D Channel Packet Handler)

****************************************************************/ ifndef NODEBUG
pragma DEBUG CODE SYMBOLS OBJECTEXTEND
endif include <coe.h>
include <coe_reg.h>
#include <coe_swch.h>
#include <lib_swch.h>
include <lib_util.h>
include <lib_set.h>

// Concentration Highway Interface (CHI) Data Structure struct HWY_CONFIG xdata HwyConfig[MAX_HIGHWAYS];

/****************************************************************
  Function: WriteTsi
  Input:   Pointer to a TSI register, data to write
  Returns: None This function exists only to slow TSI access time,
         based on a 512K CLK rate.
****************************************************************/ void WriteTsi (PUCHAR pRegister, UCHAR Data) {

*pRegister = Data;

}

/****************************************************************
  Function: ReadTsi
```

```
       Input:  Pointer to a TSI register
       Returns: Data read from register This function exists only to slow TSI access time,
           based on a 512K CLK rate.
***************************************************************/

UCHAR ReadTsi (PUCHAR pRegister) { return (*pRegister);

}

/***************************************************************
   Function: SetAltData
   Input:  Hwy 0-3, Time Slot, Alternate Data
   Returns: None Sets specified hwy and time slot to xmt the
           specified data byte
***************************************************************/ void SetAltData (UCHAR Hwy, UCHAR Ts, UCHAR AltData) {

UCHAR NearEnd = HwyConfig[Hwy].HwyID | ChanID[Hwy][Ts];

WriteTsi (CHI_HWY_SEL, NearEnd);
   WriteTsi (CHI_CONFIG_XMT_HWY, CHI_SEND_ALT_DATA);
   WriteTsi (CHI_ALTDATA_OUT, AltData);

}

/***************************************************************
   Function: SetHwyData
   Input:  Output Hwy & Time Slot, Input Hwy & Time Slot
   Returns: None Sets specified output hwy and time slot to xmit the
           data received on the specified input time slot and
           hwy.
***************************************************************/ void SetHwyData (UCHAR Hwy1, UCHAR Ts1, UCHAR Hwy2, UCHAR Ts2) {

UCHAR NearEnd = HwyConfig[Hwy1].HwyID | ChanID[Hwy1][Ts1];
   UCHAR FarEnd  = HwyConfig[Hwy2].HwyID | ChanID[Hwy2][Ts2];

WriteTsi (CHI_HWY_SEL, NearEnd);
   WriteTsi (CHI_CONFIG_XMT_HWY, CHI_SEND_HWY_DATA);
   WriteTsi (CHI_ALTDATA_OUT, FarEnd);
}
```

```
/***************************************************************
Function: GetHwyData
Input:   Hwy, Time Slot
Returns: Byte received on specified hwy and time slot

***************************************************************/

UCHAR GetHwyData (UCHAR Hwy, UCHAR Ts) {

UCHAR NearEnd = HwyConfig[Hwy].HwyID | ChanID[Hwy][Ts];
  UCHAR HwyData;

WriteTsi (CHI_HWY_SEL, NearEnd);
  HwyData = ReadTsi (CHI_REC_IN);
  return (HwyData);
}

/***************************************************************
Function: InitHwys
Input:   None
Returns: None
         Loads initial values for HwyConfig struct
         and initializes T7270 TSI
***************************************************************/ void InitHwys ( ) {

UCHAR TsiReg1;
  XUCHAR HwyNumber;
  XUCHAR TimeSlot;

HwyConfig[HWY0].RegBaseAddr =  CHI_HWY0_BASE;
  HwyConfig[HWY0].Status =       CHI_IDLE;
  HwyConfig[HWY0].Type =         CHI_U;
  HwyConfig[HWY0].HwyID =        CHI_ID0;

HwyConfig[HWY1].RegBaseAddr =  CHI_HWY1_BASE;
  HwyConfig[HWY1].Status =       CHI_IDLE;
  HwyConfig[HWY1].Type =         CHI_U;
  HwyConfig[HWY1].HwyID =        CHI_ID1;

HwyConfig[HWY2].RegBaseAddr =  CHI_HWY2_BASE;
  HwyConfig[HWY2].Status =       CHI_IDLE;
  HwyConfig[HWY2].Type =         CHI_ST;
  HwyConfig[HWY2].HwyID =        CHI_ID2;

HwyConfig[HWY3].RegBaseAddr =  CHI_HWY3_BASE;
  HwyConfig[HWY3].Status =       CHI_IDLE;
  HwyConfig[HWY3].Type =         CHI_ST;
  HwyConfig[HWY3].HwyID =        CHI_ID3;

for (HwyNumber = 0; HwyNumber < MAX_HIGHWAYS; ++HwyNumber) {
```

```
    WriteTsi (HwyConfig[HwyNumber].RegBaseAddr, CHI_XR_BOFF);
    WriteTsi ((HwyConfig[HwyNumber].RegBaseAddr + 1), CHI_XTS_OFFSET);
    WriteTsi ((HwyConfig[HwyNumber].RegBaseAddr + 2), CHI_RTS_OFFSET);
    WriteTsi ((HwyConfig[HwyNumber].RegBaseAddr + 3), CHI_HWY_SIZE);
  } for (HwyNumber = 0; HwyNumber < MAX_HIGHWAYS; ++HwyNumber) {
    for (TimeSlot = 0; TimeSlot < MAX_TIME_SLOTS; ++TimeSlot)
       SetAltData (HwyNumber, TimeSlot, AltHwyData[HwyNumber][TimeSlot]);
  }

WriteTsi (CHI_BASE_ADDR, CHI_GLOBAL_ENABLE);
  for (HwyNumber = 0; HwyNumber < MAX_HIGHWAYS; ++HwyNumber) {
    TsiReg1 = ReadTsi (HwyConfig[HwyNumber].RegBaseAddr + 1);
    TsiReg1 |= CHI_XMT_ENABLE;
    WriteTsi ((HwyConfig[HwyNumber].RegBaseAddr + 1), TsiReg1);
  }
}

/****************************************************************
Function: InitSt
Input:    None
Returns:  None Initializes the S/T interface.
****************************************************************/ void ResetSt (void) {

*(ST_BASE + 2) = 0x80; // soft reset

}

/****************************************************************
Function: InitSt
Input:    None
Returns:  None Initializes the S/T interface.
****************************************************************/ void InitSt ( ) {

PXUCHAR pStBase = ST_BASE;
  XUCHAR i, j;

*(ST_BASE + 2) = 0x00; // remove reset
  HwyConfig[HWY2].Status = CHI_IDLE;
  HwyConfig[HWY3].Status = CHI_IDLE;

for (i = 0; i < 6; ++i)
     *(pStBase + i) = StGlobalData[i];

for (i = 0; i < 2; ++i) {
```

```c
      for (j = 0; j < 12; ++j)
         *(pStInitReg[i] + j) = StRegData[i][j];
   }

/* Mask interrupts on unused ports */

*(pStInitReg[2] + 4) = 0x4a;
   *(pStInitReg[3] + 4) = 0x4a;

/* Open CHATS for S/T interface */

*(pStBase + 3) = 0x87;

/* Enable interrupt for S/T interface */

EX0 = TRUE;
   *(pStBase + 4) = 0x40;

}

/******************************************************************
Function: GetActiveHwys
Input:    None
Returns:  Byte mask of active hwys Reads SYNC, XACT, and DS from the Time Slot
          Interchanger for the U interfaces. The S/T
          interface is auto-updating via the Int0Handler.
******************************************************************/

UCHAR GetActiveHwys (void) {

UCHAR Hwy;
   UCHAR UM1Chan;
   UCHAR UM2Chan;
   UCHAR DSChan;
   UCHAR ActiveHwys = 0x00;

for (Hwy = HWY0; Hwy < HWY2; ++Hwy) {

UM1Chan = GetHwyData (Hwy, TS_UM1);
      UM2Chan = GetHwyData (Hwy, TS_UM2);
      DSChan  = GetHwyData (Hwy, TS_DS);

if (((UM1Chan & EOC_ADDR_MASK) == EOC_NORMAL) &&
          (UM2Chan & ACT) &&
          ((DSChan & DS_MASK) == (SYNC | XACT)))
         HwyConfig[Hwy].Status = CHI_ACTIVE;
      else
         HwyConfig[Hwy].Status = CHI_IDLE;
   }
   for (Hwy = HWY0; Hwy < MAX_HIGHWAYS; ++Hwy) {
```

```
      if (HwyConfig[Hwy].Status == CHI_ACTIVE)
         ActiveHwys |= HwyStatusByte[Hwy];
   }
   return (ActiveHwys);
}

/****************************************************************
Function: GetIdlePort
Input:   None
Returns: Status of Port deactivation based on Hwy deactivation

****************************************************************/

UCHAR GetIdlePort (void) {

UCHAR IdlePort = FALSE;

if (!(gActiveHwys & 0x05))
      IdlePort |= PORT1;
   if (!(gActiveHwys & 0x0a))
      IdlePort |= PORT2;

return (IdlePort);
}

/****************************************************************
Function: GetActivePort
Input:   None
Returns: Status of Port deactivation based on Hwy activation

****************************************************************/

UCHAR GetActivePort (void) {

UCHAR ActivePort = FALSE;

if ((gOldHwys ^ gActiveHwys) & 0x05)
      ActivePort |= PORT1;
   if ((gOldHwys ^ gActiveHwys) & 0x0a)
      ActivePort |= PORT2;

return (ActivePort);
}

/****************************************************************
Function: SetIDEC
Input:   IDEC command constant
Returns: Active highway status byte This is the access routine used by other modules
         to determine which highways are synchronized and
         to set up or restart packet handling (IDEC operation).
****************************************************************/
```

```
UCHAR SetIDEC (UCHAR IDECCommand) {

XUCHAR i;
    XUCHAR HwyStatus;

HwyStatus = GetActiveHwys ();

switch (IDECCommand) { case IDEC_INT_ON:

if (HwyStatus & STATUS_HWY0) {
                *(IDEC_HWY0_BASE + IDEC_CMDR_OFFSET) = (IDEC_RRES | IDEC_XRES);
                *(IDEC_HWY0_BASE + IDEC_ISM_OFFSET) = IDEC_NO_INT_MASK;
            }
            else {
                *(IDEC_HWY0_BASE + IDEC_CMDR_OFFSET) = (IDEC_XRES);
                *(IDEC_HWY0_BASE + IDEC_ISM_OFFSET) = IDEC_REC_INT_MASK;
            }
            if (HwyStatus & STATUS_HWY2) {
                *(IDEC_HWY2_BASE + IDEC_CMDR_OFFSET) = (IDEC_RRES | IDEC_XRES);
                *(IDEC_HWY2_BASE + IDEC_ISM_OFFSET) = IDEC_NO_INT_MASK;
            }
            else {
                *(IDEC_HWY2_BASE + IDEC_CMDR_OFFSET) = (IDEC_XRES);
                *(IDEC_HWY2_BASE + IDEC_ISM_OFFSET) = IDEC_REC_INT_MASK;
            }
            if (HwyStatus & STATUS_HWY1) {
                *(IDEC_HWY1_BASE + IDEC_CMDR_OFFSET) = (IDEC_RRES | IDEC_XRES);
                *(IDEC_HWY1_BASE + IDEC_ISM_OFFSET) = IDEC_NO_INT_MASK;
            }
            else {
                *(IDEC_HWY1_BASE + IDEC_CMDR_OFFSET) = (IDEC_XRES);
                *(IDEC_HWY1_BASE + IDEC_ISM_OFFSET) = IDEC_REC_INT_MASK;
            }
            if (HwyStatus & STATUS_HWY3) {
                *(IDEC_HWY3_BASE + IDEC_CMDR_OFFSET) = (IDEC_RRES | IDEC_XRES);
                *(IDEC_HWY3_BASE + IDEC_ISM_OFFSET) = IDEC_NO_INT_MASK;
            }
            else {
                *(IDEC_HWY3_BASE + IDEC_CMDR_OFFSET) = (IDEC_XRES);
                *(IDEC_HWY3_BASE + IDEC_ISM_OFFSET) = IDEC_REC_INT_MASK;
            }

*(IDEC_VISM) = IDEC_VISM_INT_ON;

gIdecXPR1 =    TRUE;
            gIdecXPR2 =    TRUE;

gInBufferPtr = 0;
            gOutBufferPtr = 0;

for (i = 0; i < MAX_INPUT_BUFFERS; ++i) {
```

```
        gInBufferIndex[i] = 0;
        gInBufferStatus[i] = LOG_STAT_BUFFER_EMPTY;
      }
      for (i = 0; i < MAX_OUTPUT_BUFFERS; ++i) {
        gOutBufferIndex[i] =  0;
        gOutBufferStatus[i] =  LOG_STAT_BUFFER_EMPTY;
      }
      break;

case IDEC_INT_UPDATE:

if (gOldHwys != HwyStatus) { if (HwyStatus & STATUS_HWY0) {
          *(IDEC_HWY0_BASE + IDEC_ISM_OFFSET) = IDEC_NO_INT_MASK;
        }
        else {
          *(IDEC_HWY0_BASE + IDEC_ISM_OFFSET) = IDEC_REC_INT_MASK;
        }
        if (HwyStatus & STATUS_HWY2) {
          *(IDEC_HWY2_BASE + IDEC_ISM_OFFSET) = IDEC_NO_INT_MASK;
        }
        else {
          *(IDEC_HWY2_BASE + IDEC_ISM_OFFSET) = IDEC_REC_INT_MASK;
        }
        if (HwyStatus & STATUS_HWY1) {
          *(IDEC_HWY1_BASE + IDEC_ISM_OFFSET) = IDEC_NO_INT_MASK;
        }
        else {
          *(IDEC_HWY1_BASE + IDEC_ISM_OFFSET) = IDEC_REC_INT_MASK;
        }
        if (HwyStatus & STATUS_HWY3) {
          *(IDEC_HWY3_BASE + IDEC_ISM_OFFSET) = IDEC_NO_INT_MASK;
        }
        else {
          *(IDEC_HWY3_BASE + IDEC_ISM_OFFSET) = IDEC_REC_INT_MASK;
        }
      }
      *(IDEC_VISM) = IDEC_VISM_INT_ON;
      break;

case IDEC_INT_OFF:

*(IDEC_VISM) = IDEC_VISM_INT_OFF;
      break;
  }
  return (HwyStatus);
}

/****************************************************************
Function: InitIDEC
Input:   None
Returns: None
```

Initializes the packet handler (IDEC).
**************************************************************/ void InitIDEC (void) {

*(IDEC_VISM) = IDEC_VISM_INT_OFF;
  *(IDEC_CCR) = IDEC_CCR_INIT;
  *(IDEC_ACR) = IDEC_ACR_INIT;

*(IDEC_HWY0_BASE + IDEC_ISM_OFFSET) = IDEC_REC_INT_MASK;
  *(IDEC_HWY0_BASE + IDEC_TSR_OFFSET) = IDEC_D_TS;
  *(IDEC_HWY0_BASE + IDEC_MODE_OFFSET) = IDEC_DCHAN_MODE;

*(IDEC_HWY1_BASE + IDEC_ISM_OFFSET) = IDEC_REC_INT_MASK;
  *(IDEC_HWY1_BASE + IDEC_TSR_OFFSET) = IDEC_D_TS;
  *(IDEC_HWY1_BASE + IDEC_MODE_OFFSET) = IDEC_DCHAN_MODE;

*(IDEC_HWY2_BASE + IDEC_ISM_OFFSET) = IDEC_REC_INT_MASK;
  *(IDEC_HWY2_BASE + IDEC_TSR_OFFSET) = IDEC_D_TS;
  *(IDEC_HWY2_BASE + IDEC_MODE_OFFSET) = IDEC_DCHAN_MODE;

*(IDEC_HWY3_BASE + IDEC_ISM_OFFSET) = IDEC_REC_INT_MASK;
  *(IDEC_HWY3_BASE + IDEC_TSR_OFFSET) = IDEC_D_TS_HWY3;
  *(IDEC_HWY3_BASE + IDEC_MODE_OFFSET) = IDEC_DCHAN_MODE;

}

/**************************************************************
Function: InitTone
Input:    None
Returns:  None Initializes the tone generator circuit.
**************************************************************/ void InitTone (void) {

EA = FALSE;
  ENABLE_TONE = ENABLE;
  *(NULL_ADDR) = 0x00;
  ENABLE_TONE = DISABLE;
  EA = TRUE;

}

/**************************************************************
Function: DoTone
Input:    Tone State
Returns:  None This is a primary service access function for Layer 3

```
                that sets up the CPTG circuit with tone and
                an unused source hwy, then configures the hwy at the
                selected port and channel to receive tone.
*****************************************************************/ void DoTone (UCHAR CptgState, UCHAR Port, UCHAR Channel) {

PXUCHAR pCptg =    NULL_ADDR;
    UCHAR Hwy =        0;
    UCHAR ToneHwy =    0;
    UCHAR HwyStatus =  GetActiveHwys ();

switch (CptgState) { case SIGNAL_DIALTONE:
          CptgState = TONE_DIAL_TONE;
          break;

case SIGNAL_BUSY:
          CptgState = TONE_BUSY;
          break;

case SIGNAL_RINGBACK:
          CptgState = TONE_AUDIBLE_RING;
          break;

case SIGNAL_REORDER:
          CptgState = TONE_REORDER;
          break;

default:
          CptgState = TONE_IDLE;
          break;

} switch (Port) { case PORT1:
          if (HwyStatus & STATUS_HWY0)
             Hwy = HWY0;
          else
             Hwy = HWY2;
          break;

case PORT2:
          if (HwyStatus & STATUS_HWY1)
             Hwy = HWY1;
          else
             Hwy = HWY3;
          break;

default:
          LogError (LOG_ERR_UNDEFINED_PORT);
```

```
      break;
   } switch (Channel & CHANNEL_ID_ANY) { case CHANNEL_ID_B1:
         Channel = TS_B1;
         break;

default:
         Channel = TS_B2;
         break;
   } switch (CptgState) { case TONE_IDLE:
         SetAltData (Hwy, Channel, 0xff);
         break;

default:

CptgState &= TONE_HWY_MASK;
         if (!(HwyStatus & STATUS_HWY2)) {
            CptgState = (CptgState | TONE_HWY2);
            ToneHwy = HWY2;
         }
         else if (!(HwyStatus & STATUS_HWY0)) {
            CptgState = (CptgState | TONE_HWY0);
            ToneHwy = HWY0;
         }
         SetHwyData (Hwy, Channel, ToneHwy, Channel);
         EA = FALSE;
         ENABLE_TONE = ENABLE;
         *pCptg = CptgState;
         ENABLE_TONE = DISABLE;
         EA = TRUE;
         break;
   }
}

/***************************************************************
Function: SendIntPacket
Input:    None
Returns:  None If the IDEC's transmit function completes the
         sending of a packet, which generates an interrupt
         to Int0Handler, this function is called to send
         another packet, if one is buffered for output. See
         SendPutPacket, in COE_L1.C.
***************************************************************/
```

```
void SendIntPacket (void) {

XUCHAR PacketPort =        0;
   XUCHAR XmtRdy =            0;
   XUCHAR BytesLeft =         0;
   XUINT ByteCnt =            0;
   PXUCHAR pIdecBase =              NULL;
   PXUCHAR pIdecXPR =               NULL;

if (gOutBufferStatus[gOutBufferPtr] == LOG_STAT_BUFFER_FULL) {

PacketPort = gOutBuffer[gOutBufferPtr][0];

if ((PacketPort & PORT_MASK) == PORT1_BIT) {
         PacketPort = PORT1;
         pIdecXPR = &gIdecXPR1;
         if (gActiveHwys & HWY0_STATUS) {
            pIdecBase = IDEC_HWY0_BASE;
         }
         else if (gActiveHwys & HWY2_STATUS) {
            pIdecBase = IDEC_HWY2_BASE;
         }
      }
      else if ((PacketPort & PORT_MASK) == PORT2_BIT) {
         PacketPort = PORT2;
         pIdecXPR = &gIdecXPR2;
         if (gActiveHwys & HWY1_STATUS) {
            pIdecBase = IDEC_HWY1_BASE;
         }
         else if (gActiveHwys & HWY3_STATUS) {
            pIdecBase = IDEC_HWY3_BASE;
         }
      }
      else
         LogIntError (LOG_ERR_UNDEFINED_PORT);

if ((pIdecXPR != NULL) && (pIdecBase != NULL)) {

XmtRdy = *(pIdecBase + IDEC_CMDR_OFFSET);
         XmtRdy &= IDEC_XMT_ENABLED;

if (XmtRdy)
            *pIdecXPR = TRUE;
         else
            *pIdecXPR = FALSE;

if (*pIdecXPR == TRUE) {
            if (gOutBufferIndex[gOutBufferPtr] == 0)
               ++gOutBufferIndex[gOutBufferPtr];
            while ((gOutBufferIndex[gOutBufferPtr] - 1 <
               gOutBytes[gOutBufferPtr]) &&
               (ByteCnt < MAX_IDEC_BYTES)) {
               *(pIdecBase + ByteCnt) =
                  gOutBuffer[gOutBufferPtr][gOutBufferIndex[gOutBufferPtr]];
```

```
            ++gOutBufferIndex[gOutBufferPtr];
            ++ByteCnt;
        }
        BytesLeft = (gOutBytes[gOutBufferPtr] -
        (gOutBufferIndex[gOutBufferPtr] - 1));
        if (BytesLeft == 0) {
            BytesLeft = gOutBytes[gOutBufferPtr];
            for (ByteCnt = 0; ByteCnt < (BytesLeft + 1); ++ByteCnt)
                gOutBuffer[gOutBufferPtr][ByteCnt] = 0x00;
            gOutBufferStatus[gOutBufferPtr] = LOG_STAT_BUFFER_EMPTY;
            if (++gOutBufferPtr == MAX_OUTPUT_BUFFERS)
                gOutBufferPtr = 0;
            *(pIdecBase + IDEC_CMDR_OFFSET) = (IDEC_XHF | IDEC_XME);
        }
        else {
            *(pIdecBase + IDEC_CMDR_OFFSET) = IDEC_XHF;
            XmtRdy = *(pIdecBase + IDEC_CMDR_OFFSET);
            XmtRdy &= IDEC_XMT_ENABLED;

if (XmtRdy)
                *pIdecXPR = TRUE;
            else
                *pIdecXPR = FALSE;

while ((gOutBufferIndex[gOutBufferPtr] - 1 <
                gOutBytes[gOutBufferPtr]) &&
                (ByteCnt < MAX_IDEC_BYTES)) {
                *(pIdecBase + ByteCnt) =
                gOutBuffer[gOutBufferPtr][gOutBufferIndex[gOutBufferPtr]];
                ++gOutBufferIndex[gOutBufferPtr];
                ++ByteCnt;
            }
            BytesLeft = (gOutBytes[gOutBufferPtr] -
            (gOutBufferIndex[gOutBufferPtr] - 1));
            if (BytesLeft == 0) {
                BytesLeft = gOutBytes[gOutBufferPtr];
                for (ByteCnt = 0; ByteCnt < (BytesLeft + 1); ++ByteCnt)
                    gOutBuffer[gOutBufferPtr][ByteCnt] = 0x00;
                gOutBufferStatus[gOutBufferPtr] = LOG_STAT_BUFFER_EMPTY;
                if (++gOutBufferPtr == MAX_OUTPUT_BUFFERS)
                    gOutBufferPtr = 0;
                *(pIdecBase + IDEC_CMDR_OFFSET) = (IDEC_XHF | IDEC_XME);
            }
            else {
                *pIdecXPR = FALSE;
                *(pIdecBase + IDEC_CMDR_OFFSET) = IDEC_XHF;
            }
        }
      }
     }
    }
   }
  }
}
```

/****************************************************************
Function: Int0Handler
Input:   S/T interface and IDEC (PEB 2075) interrupts
Returns: None This function supports all interrupts from telephony
        devices, which include the S/T interface and the
        packet handler (IDEC).

S/T interface: reads the INFO states and sends
        the appropriate response to achieve sync.

IDEC: reads in packets to the gInBuffer array
        and returns the appropriate command to the IDEC,
        or parcels out packets to the IDEC transmitter,
        followed by the appropriate command.
****************************************************************/ void Int0Handler (void) interrupt 0 {

XUCHAR InBufferIndex =      gInBufferPtr;
    XUCHAR Hwy =                            0;
    XUCHAR IDECVisr =           0;
    XUCHAR IDECIsta =           0;
    XUCHAR ByteCount =                      0;
    XUINT BufferCount =  0;
    XUCHAR Index =                  0;
    XUCHAR HwyInt =             0;
    XUCHAR PortBit =            0;
    XUCHAR BufCnt =             0;
    PXUCHAR pIDECBase =         NULL;
    PXUCHAR pXPRFlag =                      NULL;

XUCHAR P1RcvInfo =              0;
    XUCHAR P2RcvInfo =              0;

// PEB 2075 IDEC Interrupts and Packet Reception Routines

IDECVisr = *(IDEC_VISR);

if (IDECVisr & IDEC_VISR_STATUS_MASK) { for (Hwy = 0; Hwy < MAX_HIGHWAYS; ++Hwy) { switch (Hwy) { case HWY0:
                    HwyInt = IDEC_HWY0_INT;
                    if (IDECVisr & HwyInt) {
                        pIDECBase = IDEC_HWY0_BASE;
                        PortBit = PORT1_BIT;
                        pXPRFlag = &gIdecXPR1;
                        IDECIsta = *(IDEC_HWY0_BASE + IDEC_ISTA_OFFSET);
```

```
      ByteCount = *(IDEC_HWY0_BASE + IDEC_RFBC_OFFSET);
    }
    break;

case HWY1:
    HwyInt = IDEC_HWY1_INT;
    if (IDECVisr & HwyInt) {
      pIDECBase = IDEC_HWY1_BASE;
      PortBit = PORT2_BIT;
      pXPRFlag = &gIdecXPR2;
      IDECIsta = *(IDEC_HWY1_BASE + IDEC_ISTA_OFFSET);
      ByteCount = *(IDEC_HWY1_BASE + IDEC_RFBC_OFFSET);
    }
    break;

case HWY2:
    HwyInt = IDEC_HWY2_INT;
    if (IDECVisr & HwyInt) {
      pIDECBase = IDEC_HWY2_BASE;
      PortBit = PORT1_BIT;
      pXPRFlag = &gIdecXPR1;
      IDECIsta = *(IDEC_HWY2_BASE + IDEC_ISTA_OFFSET);
      ByteCount = *(IDEC_HWY2_BASE + IDEC_RFBC_OFFSET);
    }
    break;

case HWY3:
    HwyInt = IDEC_HWY3_INT;
    if (IDECVisr & HwyInt) {
      pIDECBase = IDEC_HWY3_BASE;
      PortBit = PORT2_BIT;
      pXPRFlag = &gIdecXPR2;
      IDECIsta = *(IDEC_HWY3_BASE + IDEC_ISTA_OFFSET);
      ByteCount = *(IDEC_HWY3_BASE + IDEC_RFBC_OFFSET);
    }
    break;

default:
    LogIntError (LOG_ERR_FATAL_INT0);
    break;
} if ((IDECVisr & HwyInt) &&
   (IDECIsta & IDEC_RCV_ISTA_MASK)) { for (Index = 0; Index < MAX_INPUT_BUFFERS; ++Index) {
    if ((gInBufferStatus[Index] ==
        LOG_STAT_BUFFER_FILLING) &&
        ((gInBuffer[Index][0] & PORT_MASK) == PortBit)) {
      InBufferIndex = Index;
      break;
    }
  }
  while ((gInBufferStatus[InBufferIndex] == LOG_STAT_BUFFER_FULL) &&
```

```
            (BufCnt < MAX_INPUT_BUFFERS)) {
        if (++InBufferIndex == MAX_INPUT_BUFFERS)
            InBufferIndex = 0;
        ++BufCnt;
    }
    if (gInBufferStatus[InBufferIndex] != LOG_STAT_BUFFER_FULL) {

BufferCount = gInBufferIndex[InBufferIndex];
        if (ByteCount > 32)
            ByteCount = (ByteCount - BufferCount);

if (((IDECIsta & IDEC_RCV_ISTA_MASK) == IDEC_RME) &&
            ((BufferCount + ByteCount) <= MAX_MSG_LENGTH)) { for (Index = 0; Index < ByteCount; ++Index) {
                gInBuffer[InBufferIndex][(BufferCount + Index + 1)] =
                *(pIDECBase + Index);
                }
                gInBuffer[InBufferIndex][0] = PortBit;
                gInBytes[InBufferIndex] = (ByteCount + BufferCount);
                BufferCount = gInBytes[InBufferIndex];
                if (gInBuffer[InBufferIndex][BufferCount] == IDEC_FRAME_GOOD) {
                    gInBuffer[InBufferIndex][BufferCount] = 0x00;
                    --gInBytes[InBufferIndex];
                    gInBufferStatus[InBufferIndex] = LOG_STAT_BUFFER_FULL;
                }
                else {
                    gInBufferStatus[InBufferIndex] = LOG_STAT_BUFFER_EMPTY;
                    gInBufferIndex[InBufferIndex] = 0;
                    for (Index = 0; Index <= BufferCount; ++Index)
                        gInBuffer[InBufferIndex][Index] = 0x00;
                    gInBytes[InBufferIndex] = 0;
                                        LogIntError (LOG_ERR_FATAL_INT0);
                }
                *(pIDECBase + IDEC_CMDR_OFFSET) = IDEC_RMC;
        }
        else if (((IDECIsta & IDEC_RCV_ISTA_MASK) == IDEC_RPF) &&
            ((gInBufferIndex[InBufferIndex] + MAX_IDEC_BYTES) <= MAX_MSG_LENGTH)) { for (Index = 0; Index < MAX_IDEC_BYTES; ++Index) {
                gInBuffer[InBufferIndex][(BufferCount + Index + 1)] = *(pIDECBase + Index);
            }
            gInBufferIndex[InBufferIndex] = (MAX_IDEC_BYTES + BufferCount);
            gInBuffer[InBufferIndex][0] = PortBit;
            gInBytes[InBufferIndex] = (Index + BufferCount);
            gInBufferStatus[InBufferIndex] = LOG_STAT_BUFFER_FILLING;
            *(pIDECBase + IDEC_CMDR_OFFSET) = IDEC_RMC;
        }
        else {
            *(pIDECBase + IDEC_CMDR_OFFSET) = IDEC_RRES;
            LogIntError (LOG_ERR_INT0_RCV_RESET);
        }
    }
    else {
```

```
                *(pIDECBase + IDEC_CMDR_OFFSET) = IDEC_RMD;
                LogIntError (LOG_ERR_INT0_RCV_MSG_LOST);
            }
        } if ((IDECVisr & HwyInt) && (IDECIsta & IDEC_XMT_ISTA_MASK)) {
            if ((IDECIsta & IDEC_XMT_ISTA_MASK) == IDEC_XPR) {
                *pXPRFlag = TRUE;
            }
            else if ((IDECIsta & IDEC_XMT_ISTA_MASK) == IDEC_XDU) {
                *(pIDECBase + IDEC_CMDR_OFFSET) = IDEC_XRES;
                LogIntError (LOG_ERR_INT0_XDU);
            }
            else if ((IDECIsta & IDEC_XMT_ISTA_MASK) == (IDEC_XPR | IDEC_XDU)) {
                *(pIDECBase + IDEC_CMDR_OFFSET) = IDEC_XRES;
                *pXPRFlag = TRUE;
                LogIntError (LOG_ERR_INT0_XDU_XPR);
            }
        }
    }
}

// T7254 ST Interface Info State Interrupts

P1RcvInfo = *(ST_PORT1_REG15);
P2RcvInfo = *(ST_PORT2_REG15);

if (P1RcvInfo & INFO_INT) {

P1RcvInfo &= INFOMASK;
    if (P1RcvInfo == REC_INFO3) {
        *(ST_PORT1_REG7) |= XMT_INFO4;
        HwyConfig[HWY2].Status = CHI_ACTIVE;
    }
    else {
        *(ST_PORT1_REG7) &= CLEARINFO;
        *(ST_PORT1_REG7) |= XMT_INFO2;
        HwyConfig[HWY2].Status = CHI_IDLE;
    }
}
if (P2RcvInfo & INFO_INT) {

P2RcvInfo &= INFOMASK;
    if (P2RcvInfo == REC_INFO3) {
        *(ST_PORT2_REG7) |= XMT_INFO4;
        HwyConfig[HWY3].Status = CHI_ACTIVE;
    }
    else {
        *(ST_PORT2_REG7) &= CLEARINFO;
        *(ST_PORT2_REG7) |= XMT_INFO2;
        HwyConfig[HWY3].Status = CHI_IDLE;
    }
}
```

```
   SendIntPacket ();
}

/****************************************************************
Function: GetUStatus
Input:   Hwy number and pointer to three byte array
Returns: None Fills array with UM2, UM3, and DS bytes from TSI.
         This is an access function for COE_MON.C.
****************************************************************/ void GetUStatus (UCHAR Hwy, PUCHAR StatusByteArray) {

*StatusByteArray = GetHwyData (Hwy, TS_UM2);
   *(StatusByteArray + 1) = GetHwyData (Hwy, TS_UM3);
   *(StatusByteArray + 2) = GetHwyData (Hwy, TS_DS);

}

/****************************************************************
Function: GetSTStatus
Input:   Hwy number and pointer to three byte array
Returns: None Fills an arrray with INFO, Link Error (LERR),
         loopback, Q and S bit status. This is an access
         function for COE_MON.C.
****************************************************************/ void GetSTStatus (UCHAR Hwy, PUCHAR StatusByteArray) {

XUCHAR i;
   PXUCHAR pSTPortBase;
   PXUCHAR pPZR3;
   PXUCHAR pPZR4;
   PXUCHAR pPZR7;
   PXUCHAR pPZR8;
   PXUCHAR pPZR15;
   UCHAR RegBuffer;

if (Hwy == HWY2)
      pSTPortBase = ST_PORT1_BASE;
   if (Hwy == HWY3)
      pSTPortBase = ST_PORT2_BASE;

pPZR3  =   pSTPortBase;
   pPZR4  =   pSTPortBase + 1;
   pPZR7  =   pSTPortBase + 4;
   pPZR8  =   pSTPortBase + 5;
   pPZR15 =   pSTPortBase + 12;

/* Set Loopback state */
```

```
*(StatusByteArray + 2) &= 0x0f;
*pPZR4 = *(StatusByteArray + 2);

/* Send S bits */

*pPZR3 = *(StatusByteArray + 1);

/* Read Q bits */

RegBuffer = *pPZR8;
RegBuffer <<= 4;
*(StatusByteArray + 1) &= 0x0f;
*(StatusByteArray + 1) |= RegBuffer;

/* Get Xmt INFO */

RegBuffer = *pPZR7;
RegBuffer &= 0x30;
*StatusByteArray = 0x00;
*StatusByteArray |= RegBuffer;

/* Get Rcv INFO */

RegBuffer = *pPZR15;
RegBuffer &= 0x30;
RegBuffer >>= 4;
*StatusByteArray |= RegBuffer;

}

/****************************************************************
Function: DoSwitch
Input:   Switch interface command, port and B channel
         identifiers.
Returns: None This is a primary service access function for
         Layer 3. It translates a port number and Channel
         ID information element into highway and time
         slot information it uses to program the Time
         Slot Interchanger, connecting one B channel to
         another.
****************************************************************/ void DoSwitch (

UCHAR Command,
    UCHAR OrigPort,
    UCHAR OrigChan,
    UCHAR TermPort,
    UCHAR TermChan) {

UCHAR Port1Hwy;
```

```
UCHAR Port2Hwy;
UCHAR OrigHwy;
UCHAR TermHwy;
UCHAR HwyStatus = GetActiveHwys ();

if (HwyStatus & STATUS_HWY0)
   Port1Hwy = HWY0;
else
   Port1Hwy = HWY2;

if (HwyStatus & STATUS_HWY1)
   Port2Hwy = HWY1;
else
   Port2Hwy = HWY3;

if (OrigPort == PORT1)
   OrigHwy = Port1Hwy;
else if (OrigPort == PORT2)
   OrigHwy = Port2Hwy;
else
   OrigHwy = UNKNOWN;

if (TermPort == PORT1)
   TermHwy = Port1Hwy;
else if (TermPort == PORT2)
   TermHwy = Port2Hwy;
else
   TermHwy = UNKNOWN;

switch (OrigChan & CHANNEL_ID_ANY) { case CHANNEL_ID_B1:
      OrigChan = TS_B1;
      break;

case CHANNEL_ID_B2:
      OrigChan = TS_B2;
      break;

default:
      OrigChan = UNKNOWN;
      break;
} switch (TermChan & CHANNEL_ID_ANY) { case CHANNEL_ID_B1:
      TermChan = TS_B1;
      break;

case CHANNEL_ID_B2:
      TermChan = TS_B2;
      break;
```

```
      default:
        TermChan = UNKNOWN;
        break;
  } switch (Command) { case SWCH_IDLE:
      SetAltData (HWY0, TS_B1, 0xff);
      SetAltData (HWY0, TS_B2, 0xff);
      SetAltData (HWY1, TS_B1, 0xff);
      SetAltData (HWY1, TS_B2, 0xff);
      SetAltData (HWY2, TS_B1, 0xff);
      SetAltData (HWY2, TS_B2, 0xff);
      SetAltData (HWY3, TS_B1, 0xff);
      SetAltData (HWY3, TS_B2, 0xff);
      gP1BusyChan = 0x00;
      gP2BusyChan = 0x00;
      gOldProvision = 0x00;
      break;

case SWCH_CONNECT:
      if ((OrigHwy != UNKNOWN) && (OrigChan != UNKNOWN) &&
          (TermHwy != UNKNOWN) && (TermChan != UNKNOWN)) {
        SetHwyData (OrigHwy, OrigChan, TermHwy, TermChan);
        SetHwyData (TermHwy, TermChan, OrigHwy, OrigChan);
      }
      break;

case SWCH_DISCONNECT:
      if ((OrigHwy != UNKNOWN) && (OrigChan != UNKNOWN))
        SetAltData (OrigHwy, OrigChan, 0xff);
      if ((TermHwy != UNKNOWN) && (TermChan != UNKNOWN))
        SetAltData (TermHwy, TermChan, 0xff);
      break;

case SWCH_LOOPBACK:
      SetHwyData (OrigHwy, TS_B1, OrigHwy, TS_B1);
      SetHwyData (OrigHwy, TS_B2, OrigHwy, TS_B2);
      SetHwyData (TermHwy, TS_B1, TermHwy, TS_B1);
      SetHwyData (TermHwy, TS_B2, TermHwy, TS_B2);
      break;

}
}

/*************************************************************
Function: InitSwitch
Input:   None
Returns: Active highways status byte This function is called by Layer 3 to initialize
         all peripherals serviced by this module.
```

```
*****************************************************************/

UCHAR InitSwitch (void) { gActiveHwys = FALSE;

InitHwys ();
  InitIDEC ();
  InitTone ();
  DoTone (SIGNAL_TONES_OFF, PORT1, CHANNEL_ID_B1);
  DoTone (SIGNAL_TONES_OFF, PORT1, CHANNEL_ID_B2);
  DoTone (SIGNAL_TONES_OFF, PORT2, CHANNEL_ID_B1);
  DoTone (SIGNAL_TONES_OFF, PORT2, CHANNEL_ID_B2);
  DoSwitch (SWCH_IDLE, PORT1, BLANK, PORT2, BLANK);
  InitSt ();
  return (GetActiveHwys ());
}

/****************************************************************
Function: ProvSwitch
Input:    B Channels to provision
Returns:  None Provisions (nails-up) or loopbacks B Channels
        outside of call control - based on Provision Setting
        selected by user via F1.
*****************************************************************/ void ProvSwitch (UCHAR Channels) { if (gOldProvision != Channels) {

DoSwitch (SWCH_IDLE, PORT1, BLANK, PORT2, BLANK);
    gOldProvision = Channels;

switch (Channels) { case CHANNEL_B1_SET:
        gP1BusyChan = 0x01;
        gP2BusyChan = 0x01;
        DoSwitch (SWCH_CONNECT, PORT1, CHANNEL_ID_B1, PORT2, CHANNEL_ID_B1);
        break;

case CHANNEL_B2_SET:
        gP1BusyChan = 0x02;
        gP2BusyChan = 0x02;
        DoSwitch (SWCH_CONNECT, PORT1, CHANNEL_ID_B2, PORT2, CHANNEL_ID_B2);
        break;

case CHANNEL_BOTH_SET:
        gP1BusyChan = 0x03;
        gP2BusyChan = 0x03;
        DoSwitch (SWCH_CONNECT, PORT1, CHANNEL_ID_B1, PORT2, CHANNEL_ID_B1);
```

```
                DoSwitch (SWCH_CONNECT, PORT1, CHANNEL_ID_B2, PORT2, CHANNEL_ID_B2);
                break;

case CHANNEL_LPBK_SET:
                gP1BusyChan = 0x03;
                gP2BusyChan = 0x03;
                DoSwitch (SWCH_LOOPBACK, PORT1, BLANK, PORT2, BLANK);
                break;

}
    }
}

/****************************************************************
Function: GetEoc
Input:    Port and pointer to a string
Returns:  True if port number recognized Reads the TSI and returns the current Embedded
          Operations Channel (EOC) address, D/M bit, and
          Message. Encodes the values as a string delimited
          with commas, formatted: ADDR,D/M,MSG
****************************************************************/

UCHAR GetEoc (UCHAR Port, PCHAR pEocStr) {

UCHAR UM1byte;
    UCHAR UM2byte;
    UCHAR Temp;
    UCHAR Hwy;
    UCHAR ParseOk = TRUE;

if (Port == PORT1)
        Hwy = HWY0;
    else if (Port == PORT2)
        Hwy = HWY1;
    else
        ParseOk = FALSE;

if (ParseOk) {
        UM1byte = GetHwyData (Hwy, TS_UM1);
        UM2byte = GetHwyData (Hwy, TS_UM2);
        Temp = UM1byte;
        Temp >>= 5;
        Temp |= 0x30;
        *pEocStr = Temp;
        *(pEocStr + 1) = ',';
        if (UM1byte & DM_MASK)
            *(pEocStr + 2) = '1';
        else
            *(pEocStr + 2) = '0';
        *(pEocStr + 3) = ',';
        UM1byte <<= 4;
        UM2byte >>= 4;
```

```
      HexToAscii (UM1byte | UM2byte, pEocStr + 4);
   } return (ParseOk);
}

/******************************************************
Function: PutEoc
Input:   Port and pointer to a string
Returns: True if EOC string parses correctly Parses the input string and sends the decoded
         EOC address, D/M bit, and message to the port
         indicated.
******************************************************/

UCHAR PutEoc (UCHAR Port, PCHAR pEocStr) {

UCHAR UM1byte;
   UCHAR UM2byte;
   UCHAR Temp;
   UCHAR Hwy;
   UCHAR ParseOk = TRUE;

if (Port == PORT1)
      Hwy = HWY0;
   else if (Port == PORT2)
      Hwy = HWY1;
   else
      ParseOk = FALSE;

UM1byte = *pEocStr;
   UM1byte <<= 5;
   if (*(pEocStr + 2) == '1')
      UM1byte |= DM_MASK;
   else if (*(pEocStr + 2) != '0')
      ParseOk = FALSE;

if ((*(pEocStr + 4) >= '0' && *(pEocStr + 4) <= '9') ||
       (*(pEocStr + 4) >= 'A' && *(pEocStr + 4) <= 'F')) {
      if ((*(pEocStr + 5) >= '0' && *(pEocStr + 5) <= '9') ||
          (*(pEocStr + 5) >= 'A' && *(pEocStr + 5) <= 'F')) {

Temp = AscToHex (pEocStr + 4);
         UM2byte = Temp;
         Temp >>= 4;
         UM1byte |= Temp;
         UM2byte <<= 4;
         UM2byte |= 0x0f;
      }
      else
         ParseOk = FALSE;
   }
```

```
    else
       ParseOk = FALSE;

if (ParseOk) {
       SetAltData (Hwy, TS_UM1, UM1byte);
       SetAltData (Hwy, TS_UM2, UM2byte);
    }
    return (ParseOk);
}
```

```
/*****************************************************************

ISDN 2000 Central Office Emulator

Trace Processing Module (c) 1994 Merge Technologies Inc.

General: All packets are stored in a trace buffer, and may
be inspected by the user, either as layer 2 LAP-D packet
headers or as Layer 3 Call Control messages. This module
performs these services, including the user interface
presented when the LAYER 2 TRACE or the LAYER 3 TRACE
keys are pressed.

Packets are stored in a wrapping buffer. The packets may be any
size up to a defined maximum based on available RAM. Each
packet entry is identified by a pointer to an array. All packet
headers are parsed and displayed for the Layer 2 trace inspection,
but only I Frame packets are processed for Layer 3 inspection.
*****************************************************************/ ifndef NODEBUG
pragma DEBUG CODE SYMBOLS OBJECTEXTEND
endif include <coe.h>
include <coe_trc.h>
include <lib_io.h>
include <lib_util.h>
include <lib_db.h>
include <lib_str.h>
include <lib_set.h>

XUCHAR gTrcBuffer[MAX_TRACE_LENGTH];
XUCHAR gTrcIndex;
XUCHAR gFirstEntry;
XUCHAR gNextEntry;
XUCHAR gCurrentEntry;
XUCHAR gTrcTotalEntries;
XUCHAR gRemDisplayIndex;
XPXUCHAR gTrcPtrArray[MAX_TRACE_ENTRIES];
XUCHAR gTrcDirArray[MAX_TRACE_ENTRIES];
XUINT gTrcByteCnt[MAX_TRACE_ENTRIES];
XUINT gTrcTimeArray[MAX_TRACE_ENTRIES];
UINT gTraceStartTime;
BOOL gWrapFlag;

XCHAR gDisplayBuffer[MAX_DISP_BUFF_LENGTH][MAX_DISP_WIDTH];

/*************************************************************
  Function: ClrTrace
  Input:   None
  Returns: None
```

Initializes the global trace variables and pointers.
Clears the trace buffers to zeros. Four buffers are
used:

1. Packet buffer (unsigned char)
2. Packet length in bytes (unsigned int)
3. Message direction (unsigned char)
4. Time packet arrived (unsigned integer)

****************************************************************/

```
void ClrTrace (void) {

XUCHAR i;

gTrcIndex =          1;
    gFirstEntry =        1;
    gNextEntry =         1;
    gCurrentEntry =      1;
    gTrcTotalEntries =   0;
    gRemDisplayIndex =       0;
    gWrapFlag =          FALSE;
    gTrcPtrArray[gCurrentEntry] =   gTrcBuffer;
    gTraceStartTime =    GetTime ();

ClearMem (gTrcBuffer, MAX_TRACE_LENGTH);
    ClearMem (gTrcDirArray, MAX_TRACE_ENTRIES);
    ClearMem (&gDisplayBuffer[0][0], MAX_DISP_WIDTH);
    for (i = 0; i < MAX_TRACE_ENTRIES; ++ i) {
        gTrcByteCnt[i] = 0;
        gTrcTimeArray[i] = 0;
    }
}
```

/****************************************************************
Function: PutTrace
Input:   The message direction flag, pointers to a packet
         and the packet length.
Returns: None Called by Layer 1 to store packets in the trace
         buffer. If the buffer exceeds the maximum entries,
         the next entry is "wrapped" to the beginning of
         the buffer.
****************************************************************/

```
void PutTrace (UCHAR MsgDir, PUCHAR pTrcMsg, PUINT pTrcBytes) {

XUCHAR hTrcEntry;
    XUCHAR TrcEntries;
    XUINT TrcTime;
    PXUCHAR pThisBuffer;
    PXUCHAR pNextBuffer;
```

```
hTrcEntry = gNextEntry;
TrcEntries = 0;
TrcTime = GetTime ();
pThisBuffer = gTrcPtrArray[hTrcEntry];
pNextBuffer = (pThisBuffer + (*pTrcBytes + 1));
CopyBuffer (pThisBuffer, pTrcMsg, pTrcBytes);
gTrcByteCnt[hTrcEntry] = *pTrcBytes;
if (gTrcByteCnt[hTrcEntry] > MAX_PACKET_TRACE_LENGTH)
   gTrcByteCnt[hTrcEntry] = MAX_PACKET_TRACE_LENGTH;

gTrcDirArray[hTrcEntry] = MsgDir;
gTrcTimeArray[hTrcEntry] = TrcTime;
gCurrentEntry = hTrcEntry;

if (++gTrcTotalEntries >= MAX_TRACE_ENTRIES)
   gTrcTotalEntries = (MAX_TRACE_ENTRIES - 1);

++gNextEntry;

if (gNextEntry < MAX_TRACE_ENTRIES) {
   gTrcPtrArray[gNextEntry] = pNextBuffer;
   if (gWrapFlag) {
      gFirstEntry = gNextEntry;
      if ((gFirstEntry + 1) < MAX_TRACE_ENTRIES) {
         do {
            ++gFirstEntry;
            if ((gFirstEntry - 1) > (gNextEntry))
               gTrcPtrArray[gFirstEntry - 1] = NULL;
            if (gFirstEntry >= MAX_TRACE_ENTRIES) {
               gFirstEntry = 1;
               break;
            }
            ++TrcEntries;
         }
         while ((gTrcPtrArray[gFirstEntry] <= pNextBuffer) &&
            (gTrcPtrArray[gFirstEntry] != NULL) &&
            (TrcEntries < MAX_TRACE_ENTRIES));
      }
      else
         gFirstEntry = 1;
   }
}
else {
   gWrapFlag = TRUE;
   gNextEntry = 1;
   pNextBuffer = gTrcBuffer;
   gTrcPtrArray[gNextEntry] = pNextBuffer;
   gFirstEntry = gNextEntry;
   do {
      ++gFirstEntry;
      if ((gFirstEntry - 1) > gNextEntry)
         gTrcPtrArray[gFirstEntry - 1] = NULL;
      ++TrcEntries;
```

```
    }
    while ((gTrcPtrArray[gFirstEntry] <= pNextBuffer) &&
        (gTrcPtrArray[gFirstEntry] != NULL) &&
        (TrcEntries < MAX_TRACE_ENTRIES));
  }
}

/***************************************************************
Function: GetFirstTrc
Input:   A flag indicating the trace mode (Layer 2 or 3)
Returns: An index to a trace entry Gets the oldest packet from the trace buffer if
        the mode is Layer 2, or gets the oldest I Frame
        if the mode is Layer 3.
***************************************************************/

UCHAR GetFirstTrc (UCHAR TraceMode) {

XUCHAR hTrcEntry;
  XUCHAR EntriesChecked = 0;

hTrcEntry = gFirstEntry;
  if (TraceMode == TRC_L3_TRACE) {
      while (((GetField (GET_PROTOCOL, gTrcPtrArray[hTrcEntry]) != Q931_PROTOCOL) ||
          (gTrcByteCnt[hTrcEntry] < 8)) && (EntriesChecked <= gTrcTotalEntries)) {
          ++EntriesChecked;
          if (hTrcEntry != gCurrentEntry) {
              if (hTrcEntry < (MAX_TRACE_ENTRIES - 1))
                  ++hTrcEntry;
              else
                  hTrcEntry = 1;
          }
            }
  }
  if (EntriesChecked > gTrcTotalEntries)
      hTrcEntry = 0;
  else if (gTrcByteCnt[hTrcEntry] == 0)
      hTrcEntry = 0;

return (hTrcEntry);
}

/***************************************************************
Function: GetLastTrc
Input:   A flag indicating the trace mode
Returns: An index to a trace entry Gets the newest packet from the trace buffer if
        the mode is Layer 2, or gets the newest I Frame
        if the mode is Layer 3.
***************************************************************/
```

```
UCHAR GetLastTrc (UCHAR TraceMode) {

UCHAR hTrcEntry;
   UCHAR EntriesChecked = 0;

hTrcEntry = gCurrentEntry;
   if (TraceMode == TRC_L3_TRACE) {
      while ((((GetField (GET_PROTOCOL, gTrcPtrArray[hTrcEntry]) != Q931_PROTOCOL) ||
         (gTrcByteCnt[hTrcEntry] < 8)) && (EntriesChecked <= gTrcTotalEntries)) {
         ++EntriesChecked;
         if (hTrcEntry != gFirstEntry) {
            if (hTrcEntry != 1)
               --hTrcEntry;
            else
               hTrcEntry = (MAX_TRACE_ENTRIES - 1);
         }
      }
   }
   if (gTrcTotalEntries == 0)
      hTrcEntry = 0;
   else if ((EntriesChecked > 0) && (hTrcEntry == 1))
      hTrcEntry = 0;
   else if (gTrcByteCnt[hTrcEntry] == 0)
      hTrcEntry = 0;

return (hTrcEntry);
}

/*****************************************************************
   Function: GetPrevTrc
   Input:    A flag indicating the trace mode
   Returns:  An index to a trace entry Gets the next oldest packet or I Frame from the
         currently selected packet.
*****************************************************************/

UCHAR GetPrevTrc (UCHAR TraceMode) {

XUCHAR hTrcEntry;

if (TraceMode == TRC_L2_TRACE) {
      if (gTrcIndex != GetFirstTrc (TraceMode)) {
         --gTrcIndex;
         if (gTrcIndex == 0)
            gTrcIndex = (MAX_TRACE_ENTRIES - 1);
         if (gTrcPtrArray[gTrcIndex] == NULL)
            gTrcIndex = GetFirstTrc (TraceMode);
      }
   }
   else if (TraceMode == TRC_L3_TRACE) {
      do {
         if (gTrcIndex != GetFirstTrc (TraceMode)) {
```

```
            --gTrcIndex;
            if (gTrcIndex == 0)
                gTrcIndex = (MAX_TRACE_ENTRIES - 1);
            if (gTrcPtrArray[gTrcIndex] == NULL)
                gTrcIndex = GetFirstTrc (TraceMode);
        }
    }
    while (((GetField (GET_PROTOCOL, gTrcPtrArray[gTrcIndex]) != Q931_PROTOCOL) ||
        (gTrcByteCnt[gTrcIndex] < 8));
  }
  hTrcEntry = gTrcIndex;
  return (hTrcEntry);
}

/****************************************************************
Function: GetNextTrc
Input:   Flag indicating the trace mode
Returns: Index to a trace array entry Gets the next most recent packet or I Frame.
****************************************************************/

UCHAR GetNextTrc (UCHAR TraceMode) {

XUCHAR hTrcEntry;

if (TraceMode == TRC_L2_TRACE) {
        if (gTrcIndex != GetLastTrc (TraceMode)) {
            ++gTrcIndex;
            if (gTrcIndex >= MAX_TRACE_ENTRIES)
                gTrcIndex = 1;
            if (gTrcPtrArray[gTrcIndex] == NULL)
                gTrcIndex = GetLastTrc (TraceMode);
        }
    }
    else if (TraceMode == TRC_L3_TRACE) {
        do {
            if (gTrcIndex != GetLastTrc (TraceMode)) {
                ++gTrcIndex;
                if (gTrcIndex >= MAX_TRACE_ENTRIES)
                    gTrcIndex = 1;
                if (gTrcPtrArray[gTrcIndex] == NULL)
                    gTrcIndex = GetLastTrc (TraceMode);
            }
        }
        while (((GetField (GET_PROTOCOL, gTrcPtrArray[gTrcIndex]) != Q931_PROTOCOL) ||
            (gTrcByteCnt[gTrcIndex] < 8));
    }
    hTrcEntry = gTrcIndex;
    return (hTrcEntry);
}

/****************************************************************
```

```
Function: GetPrevTime
Input:   None
Returns: An index to an time array entry Gets the last trace entry's arrival time so that
         elapsed time between it and current trace entry
         may be calculated.
****************************************************************/

UCHAR GetPrevTrcTime (void) {

XUCHAR hTrcEntry = gTrcIndex;

if (hTrcEntry != gFirstEntry) {
    --hTrcEntry;
    if (hTrcEntry == 0)
      hTrcEntry = (MAX_TRACE_ENTRIES - 1);
    if (gTrcPtrArray[hTrcEntry] == NULL)
      hTrcEntry = gFirstEntry;
  }
  else
    hTrcEntry = 0;

return (hTrcEntry);
}

/***************************************************************
Function: GetTrcNo
Input:   Index to a trace entry
Returns: The trace entry's relative position in the buffer Each entry is sequentially numbered for reference,
         but the number won't correspond to the array index
         in a wrapping buffer.
****************************************************************/

UCHAR GetTrcNo (UCHAR hTrcEntry) {

XUCHAR TrcNo =      1;
  XUCHAR SearchCntr = 1;
  XUCHAR hTrcSearch;

if (gFirstEntry <= gCurrentEntry)
    TrcNo = hTrcEntry;
  else {
    hTrcSearch = gFirstEntry;
    while (SearchCntr < MAX_TRACE_ENTRIES) {
      if (hTrcSearch == hTrcEntry) {
        TrcNo = SearchCntr;
        break;
      }
      ++SearchCntr;
      if (++hTrcSearch >= MAX_TRACE_ENTRIES)
```

```
        hTrcSearch = 1;
    }
  }
  return (TrcNo);
}

/***************************************************************
Function: FormatTrace
Input:   Trace mode and an index to a trace entry
Returns: Total lines to display Parses a trace entry and formats ASCII strings
        in the display buffer.
****************************************************************/

UCHAR FormatTrace (UCHAR TraceMode, UCHAR hTrcEntry) {

XPXUCHAR pTraceBuffer = gTrcPtrArray[hTrcEntry];
    XUCHAR TrcNo =        GetTrcNo (hTrcEntry);
    XUINT TrcMsgLen =     gTrcByteCnt[hTrcEntry];
    XUCHAR TotalLines =   1;
    XUCHAR TotalBytes;
    XUCHAR TrcDir =       gTrcDirArray[hTrcEntry];
    XUCHAR TrcPort =      GetField (GET_PORT, pTraceBuffer);
    XUCHAR TrcSapi =      GetField (GET_SAPI, pTraceBuffer);
    XUCHAR TrcTei =       GetField (GET_TEI, pTraceBuffer);
    XUCHAR TrcNR =        GetField (GET_NR, pTraceBuffer);
    XUCHAR TrcNS =        GetField (GET_NS, pTraceBuffer);
    XUCHAR TrcPF =        GetField (GET_PF, pTraceBuffer);
    XUCHAR TrcCR =        GetField (GET_CR, pTraceBuffer);
    XUCHAR TrcFrameFormat = GetField (GET_FRAME_FORMAT, pTraceBuffer);
    XUCHAR TrcCrefLength = GetField (GET_CREF_LENGTH, pTraceBuffer);
    XUCHAR TrcCref =      GetField (GET_CREF_NUMBER, pTraceBuffer);
    XUCHAR SacMsgType;
    XUCHAR IeBytes;
    XPXCHAR pTrcDn =      GetDn (TrcTei);
    XPXUCHAR pInfoPtr =   NULL;
    XUCHAR TrcPacketType;
    XUCHAR TrcMsgType;
    XUCHAR hLastTrcTime;
    XUINT TrcTime =       gTrcTimeArray[hTrcEntry];
    XUINT LastTrcTime =   gTraceStartTime;
    XCHAR Text1[7];
    XCHAR Text2[5];
    XCHAR Text3[5];
    XCHAR Text4[5];
    XCHAR Text5[5];
    XCHAR Text6[5];
    XCHAR Text7[5];
    XPCCHAR pMsgPtr;
    XPCCHAR pInfoElement;
    XPCCHAR pszPort;
    XPCCHAR pszFrom;
    XPCCHAR pszTo;
```

```
XPCCHAR pszPF;
XPCCHAR pszCR;
XPXCHAR pszTrcTime = Text1;
XPXCHAR pszNR = Text2;
XPXCHAR pszNS = Text3;
XPXCHAR pszSapi = Text4;
XPXCHAR pszTei = Text5;
XPXCHAR pszCref = Text6;
XPXCHAR pszTrcNo = Text7;
XPXCHAR pDisplayBuffer;
UCHAR CodeSet = IE_LOCKING_SHIFT_0;

if (TraceMode == TRC_REM_TRACE)
   IeBytes = 20;
else
   IeBytes = 7;

TrcSapi >>= 2;
TrcCref &= 0x7f;

BinToAscii ((UINT)TrcNo, pszTrcNo);
BinToAscii ((UINT)TrcSapi, pszSapi);
BinToAscii ((UINT)TrcTei, pszTei);
BinToAscii ((UINT)TrcCref, pszCref);
BinToAscii ((UINT)TrcNR, pszNR);
BinToAscii ((UINT)TrcNS, pszNS);

if (hLastTrcTime = GetPrevTrcTime ())
   LastTrcTime = gTrcTimeArray[hLastTrcTime];
if (TrcTime < LastTrcTime)
   TrcTime += 6000;
TrcTime -= LastTrcTime;
FormatTime (TrcTime, pszTrcTime);

if (TrcPort == PORT1)
   pszPort = "PORT1 ";
else if (TrcPort == PORT2)
   pszPort = "PORT2 ";
else {
   pszPort = "UNKNOWN";
   LogError (LOG_ERR_UNDEFINED_PORT);
} if (TrcDir == DIR_XMT) {
   pszFrom = "NET->";
   pszTo = "USER";
   if (TrcCR) {
      pszCR = " COM";
      if (TrcPF)
         pszPF = " POLL";
      else
         pszPF = "     ";
   }
```

```
        else {
          pszCR = " RES";
          if (TrcPF)
             pszPF = " FINAL";
          else
             pszPF = "      ";
        }
    }
    else {
      pszFrom = "USER->";
      pszTo = "NET";
      if (TrcCR) {
         pszCR = " RES";
         if (TrcPF)
            pszPF = " FINAL";
         else
            pszPF = "      ";
      }
      else {
         pszCR = " COM";
         if (TrcPF)
            pszPF = " POLL";
         else
            pszPF = "      ";
      }
    } if (TraceMode != TRC_REM_TRACE) {
      pDisplayBuffer = &gDisplayBuffer[(TotalLines - 1)][0];
      ClearMem ((PUCHAR)pDisplayBuffer, MAX_DESCRIPT_LENGTH);
      AddString (pDisplayBuffer, "#");
      AddString (pDisplayBuffer, pszTrcNo);
      AddString (pDisplayBuffer, " ");
      AddString (pDisplayBuffer, pszPort);
      AddString (pDisplayBuffer, pszFrom);
      AddString (pDisplayBuffer, pszTo);
    } if (TraceMode == TRC_L2_TRACE) {
      ++TotalLines;
      pDisplayBuffer = &gDisplayBuffer[(TotalLines - 1)][0];
      ClearMem ((PUCHAR)pDisplayBuffer, MAX_DESCRIPT_LENGTH);
      AddString (pDisplayBuffer, "TEI=");
      AddString (pDisplayBuffer, pszSapi);
      AddString (pDisplayBuffer, ",");
      AddString (pDisplayBuffer, pszTei);
      AddString (pDisplayBuffer, pszCR);
      AddString (pDisplayBuffer, pszPF);

++TotalLines;
      pDisplayBuffer = &gDisplayBuffer[(TotalLines - 1)][0];
      ClearMem ((PUCHAR)pDisplayBuffer, MAX_DESCRIPT_LENGTH);
      if (TrcFrameFormat != U_FRAME) {
         AddString (pDisplayBuffer, "NR=");
```

```
      AddString (pDisplayBuffer, pszNR);
      if (TrcFrameFormat == I_FRAME) {
         AddString (pDisplayBuffer, " NS=");
         AddString (pDisplayBuffer, pszNS);
         AddString (pDisplayBuffer, " ");
      }
      else
         AddString (pDisplayBuffer, " ET=");
   }
   else
      AddString (pDisplayBuffer, "ET=");
   AddString (pDisplayBuffer, pszTrcTime);
} if (TraceMode == TRC_L3_TRACE) {
   ++TotalLines;
   pDisplayBuffer = &gDisplayBuffer[(TotalLines - 1)][0];
   ClearMem ((PUCHAR)pDisplayBuffer, MAX_DESCRIPT_LENGTH);
   AddString (pDisplayBuffer, "DN");
   AddString (pDisplayBuffer, pTrcDn);
   AddString (pDisplayBuffer, " TEI=");
   AddString (pDisplayBuffer, pszSapi);
   AddString (pDisplayBuffer, ",");
   AddString (pDisplayBuffer, pszTei);

++TotalLines;
   pDisplayBuffer = &gDisplayBuffer[(TotalLines - 1)][0];
   ClearMem ((PUCHAR)pDisplayBuffer, MAX_DESCRIPT_LENGTH);
   if (TrcCrefLength == 0)
      AddString (pDisplayBuffer, "CREF=NULL");
   else {
      TrcCref &= 0x7f;
      if (TrcCref == 0)
         AddString (pDisplayBuffer, "CREF=GLOBAL");
      else {
         AddString (pDisplayBuffer, "CREF=");
         AddString (pDisplayBuffer, pszCref);
      }
   }
   AddString (pDisplayBuffer, " ET=");
   AddString (pDisplayBuffer, pszTrcTime);
} if (TraceMode == TRC_REM_TRACE) {
   pDisplayBuffer = &gDisplayBuffer[(TotalLines - 1)][0];
   ClearMem ((PUCHAR)pDisplayBuffer, MAX_DISP_WIDTH);
   if (TrcDir == DIR_XMT)
      AddString (pDisplayBuffer, "<< ");
   else
      AddString (pDisplayBuffer, ">> ");
   AddString (pDisplayBuffer, pszPort);
   AddString (pDisplayBuffer, "SAPI=");
   AddString (pDisplayBuffer, pszSapi);
   AddString (pDisplayBuffer, " TEI=");
```

```
AddString (pDisplayBuffer, pszTei);

switch (TrcFrameFormat) { case S_FRAME:
        AddString (pDisplayBuffer, " TYPE=");
        AddString (pDisplayBuffer, "S");
        break;

case U_FRAME:
        AddString (pDisplayBuffer, " TYPE=");
        AddString (pDisplayBuffer, "U");
        break;

case I_FRAME:
        AddString (pDisplayBuffer, " TYPE=");
        AddString (pDisplayBuffer, "I");
        break;

}
if (TrcFrameFormat != U_FRAME) {
    AddString (pDisplayBuffer, " NR=");
    AddString (pDisplayBuffer, pszNR);
    if (TrcFrameFormat == I_FRAME) {
        AddString (pDisplayBuffer, " NS=");
        AddString (pDisplayBuffer, pszNS);
    }
}
AddString (pDisplayBuffer, " TIME=");
AddString (pDisplayBuffer, pszTrcTime);
AddString (pDisplayBuffer, pszCR);
AddString (pDisplayBuffer, pszPF);

++TotalLines;
pDisplayBuffer = &gDisplayBuffer[(TotalLines - 1)][0];
ClearMem ((PUCHAR)pDisplayBuffer, MAX_DESCRIPT_LENGTH);
AddString (pDisplayBuffer, "DN=");
AddString (pDisplayBuffer, pTrcDn);
if ((TrcFrameFormat == I_FRAME) ||
    ((TrcFrameFormat == U_FRAME) &&
    (GetField (GET_U_FRAME, pTraceBuffer) == UI) &&
    (*(pTraceBuffer + 4) == Q931_PROTOCOL) &&
    (GetField (GET_MSG_TYPE, pTraceBuffer) == SETUP))) {
    ++TotalLines;
    pDisplayBuffer = &gDisplayBuffer[(TotalLines - 1)][0];
    ClearMem ((PUCHAR)pDisplayBuffer, MAX_DESCRIPT_LENGTH);
    if (TrcCrefLength == 0)
        AddString (pDisplayBuffer, "CALL REF=NULL");
    else {
        if (TrcCref == 0)
            AddString (pDisplayBuffer, "CALL REF=GLOBAL");
        else {
            AddString (pDisplayBuffer, "CALL REF=");
            AddString (pDisplayBuffer, pszCref);
```

```
            }
          }
        }
      }

++TotalLines;
      pDisplayBuffer = &gDisplayBuffer[(TotalLines - 1)][0];
      ClearMem ((PUCHAR)pDisplayBuffer, MAX_DESCRIPT_LENGTH);

if (TrcFrameFormat == I_FRAME) {
        if (TrcSapi == SAPI_0) {
          TrcMsgType = GetField (GET_MSG_TYPE, pTraceBuffer);
          pMsgPtr = GetString (STR_MSG, TrcMsgType);
          CopyString (pDisplayBuffer, pMsgPtr);
          if (TrcMsgType != NET_ESCAPE)
            pInfoPtr = (pTraceBuffer + MSG_TYPE_POS);
          else {
            ++TotalLines;
            pDisplayBuffer = &gDisplayBuffer[(TotalLines - 1)][0];
            ClearMem ((PUCHAR)pDisplayBuffer, MAX_DESCRIPT_LENGTH);
            TrcMsgType = GetField (GET_NET_MSG_TYPE, pTraceBuffer);
            pMsgPtr = GetString (STR_MSG, TrcMsgType);
            CopyString (pDisplayBuffer, pMsgPtr);
            pInfoPtr = (pTraceBuffer + (MSG_TYPE_POS + 1));
          }
          if (TrcCrefLength != 0)
            ++pInfoPtr;
        }
        else
          pMsgPtr = "X.25 Packet";
      }
      else if (TrcFrameFormat == U_FRAME) {
        TrcPacketType = GetField (GET_U_FRAME, pTraceBuffer);
        switch (TrcPacketType) {
          case SABME:
            pMsgPtr = "SABME";
            break;

case UA:
            pMsgPtr = "Unnumbered Ack";
            break;

case DM:
            pMsgPtr = "Disconnect Mode";
            break;

case FRMR:
            pMsgPtr = "Frame Reject";
            break;

case DISC:
            pMsgPtr = "Disconnect";
            break;
```

```
      case XID:
         pMsgPtr = "XID";
         break;

case UI:
         pMsgPtr = "UI";
         break;

default:
         pMsgPtr = "Unknown";
         break;
   }
   AddString (pDisplayBuffer, pMsgPtr);
   if ((TrcFrameFormat == U_FRAME) && (TrcPacketType == UI)) {
      if (GetField (GET_CONTROLLER, pTraceBuffer) == SAC_FRAME_TYPE) {
         SacMsgType = GetField (GET_TEI_MSG, pTraceBuffer);
         TrcTei = (*(pTraceBuffer + SAC_TEI_POS));
         TrcTei >>= 1;
         BinToAscii ((UINT)TrcTei, pszTei);

if (SacMsgType == ID_REQUEST)
            AddString (pDisplayBuffer, " TEI REQUEST:");
         else if (SacMsgType == ID_ASSIGNED)
            AddString (pDisplayBuffer, " TEI ASSIGNED:");
         else if (SacMsgType == ID_VERIFY)
            AddString (pDisplayBuffer, " TEI VERIFY:");
         else if (SacMsgType == ID_DENIED)
            AddString (pDisplayBuffer, " TEI DENIED:");
         else if (SacMsgType == ID_REMOVE)
            AddString (pDisplayBuffer, " TEI REMOVED:");
         else if (SacMsgType == ID_CHECK_REQUEST)
            AddString (pDisplayBuffer, " TEI CHECK:");
         else if (SacMsgType == ID_CHECK_RESPONSE)
            AddString (pDisplayBuffer, " TEI RESPONSE:");
         AddString (pDisplayBuffer, pszTei);
      }
      else if (GetField (GET_MSG_TYPE, pTraceBuffer) == SETUP) {
         AddString (pDisplayBuffer, " (SETUP)");
         pInfoPtr = (pTraceBuffer + 8);
      }
   }
}
else if (TrcFrameFormat == S_FRAME) {
   TrcPacketType = GetField (GET_S_FRAME, pTraceBuffer);
   switch (TrcPacketType) {
      case RR:
         pMsgPtr = "Receiver Ready";
         break;

case RNR:
         pMsgPtr = "Receiver Not Ready";
         break;

case REJ:
```

```
            pMsgPtr = "Reject";
            break;

default:
            pMsgPtr = "Unknown";
            break;
        }
        AddString (pDisplayBuffer, pMsgPtr);
    } if (TraceMode != TRC_L2_TRACE) {
        if (pInfoPtr != NULL) {
            while ((pInfoPtr < (pTraceBuffer + TrcMsgLen)) && (TotalLines <=
MAX_DISP_BUFF_LENGTH)) {
                ++TotalLines;
                pDisplayBuffer = &gDisplayBuffer[(TotalLines - 1)][0];
                ClearMem (pDisplayBuffer, MAX_DISP_WIDTH);
                SetShift (CodeSet);

pInfoElement = GetString (STR_INFO_ELEMENT, *pInfoPtr);
                CopyString (pDisplayBuffer, pInfoElement);
                if (!(*pInfoPtr & 0x80)) {
                    ++TotalLines;
                    pDisplayBuffer = &gDisplayBuffer[(TotalLines - 1)][0];
                    ClearMem (pDisplayBuffer, MAX_DISP_WIDTH);
                    TotalBytes = (*(++pInfoPtr));
                        if (TotalBytes) {
                         ++pInfoPtr;
                         while (TotalBytes > IeBytes) {
                            InfoToString (pDisplayBuffer, pInfoPtr, IeBytes);
                            ++TotalLines;
                            pDisplayBuffer = &gDisplayBuffer[(TotalLines - 1)][0];
                            TotalBytes -= IeBytes;
                            pInfoPtr += IeBytes;
                         }
                         InfoToString (pDisplayBuffer, pInfoPtr, TotalBytes);
                         pInfoPtr += (TotalBytes - 1);
                     }
                }
                else {
                    if (*pInfoPtr == IE_LOCKING_SHIFT_5)
                        CodeSet = IE_LOCKING_SHIFT_5;
                    else if (*pInfoPtr == IE_LOCKING_SHIFT_6)
                        CodeSet = IE_LOCKING_SHIFT_6;
                }

++pInfoPtr;
            }
        }
    }
    else
        TotalLines = 4;

return (TotalLines);
```

}

/****************************************************************
Function: DisplayTrace
Input:   The first line in the display buffer to display
Returns: None Displays four lines of formatted trace
        information, beginning at FirstLine.
****************************************************************/ void DisplayTrace (UCHAR FirstLine) {

UCHAR i;
  UCHAR DispPos = 1;

--FirstLine;
  for (i = FirstLine; i < (FirstLine + MAX_DISPLAY_ROWS); ++i) {
    DisplayPosition (DispPos, 1);
    Display (&gDisplayBuffer[i][0]);
    ++DispPos;
  }
}

/****************************************************************
Function: PrintTrace
Input:   Total number of lines to print
Returns: None Sends all formatted trace information to the
        printer.
****************************************************************/ void PrintTrace (UCHAR TotalLines) {

UCHAR i;

for (i = 0; i < TotalLines; ++i) {
    Print (PRT_PTR, &gDisplayBuffer[i][0]);
  }
  PrintLF (3);

}

/****************************************************************
Function: DoTrace
Input:   Trace mode flag, wither Layer 2 or 3.
Returns: Exit key pressed by user This function processes all user requests for
        trace functions and present the interface.
****************************************************************/

```
UCHAR DoTrace (UCHAR TraceMode) {

UCHAR hTrcEntry =      GetLastTrc (TraceMode);
   UCHAR ReturnKey =         KBD_NULL;
   UCHAR DisplayKey =     KBD_NULL;
   UCHAR DisplayIndex =   1;
   UCHAR MaxLines =       1;
   BOOL Reformat =        TRUE;
   BOOL RefreshDisplay =  TRUE;
   BOOL HeaderPrinted =   FALSE;
   BOOL Done =            FALSE;

gTrcIndex = hTrcEntry;

while ((!Done) && (hTrcEntry)) { if (Reformat) {
         Reformat = FALSE;
         if (hTrcEntry)
            MaxLines = FormatTrace (TraceMode, hTrcEntry);
      }
      if (RefreshDisplay) {
         RefreshDisplay = FALSE;
         ClrDisplay ();
         DisplayTrace (DisplayIndex);
      }
      DisplayKey = OnKbd ();

switch (DisplayKey) { case KBD_F1:
            if (hTrcEntry = GetFirstTrc (TraceMode)) {
               gTrcIndex = hTrcEntry;
               DisplayIndex = 1;
               RefreshDisplay = TRUE;
               Reformat = TRUE;
            }
            break;

case KBD_PGUP:
            if (hTrcEntry = GetPrevTrc (TraceMode)) {
               DisplayIndex = 1;
               RefreshDisplay = TRUE;
               Reformat = TRUE;
            }
            break;

case KBD_UP:
            if ((DisplayIndex - 1) > 0) {
               --DisplayIndex;
               RefreshDisplay = TRUE;
               Reformat = FALSE;
            }
            break;
```

```
case KBD_DOWN:
   if ((DisplayIndex + 1) <= (MaxLines - (MAX_DISPLAY_ROWS - 1))) {
      ++DisplayIndex;
      RefreshDisplay = TRUE;
      Reformat = FALSE;
   }
   break;

case KBD_PGDOWN:
   if (hTrcEntry = GetNextTrc (TraceMode)) {
      DisplayIndex = 1;
      RefreshDisplay = TRUE;
      Reformat = TRUE;
   }
   break;

case KBD_F2:
   if (hTrcEntry = GetLastTrc (TraceMode)) {
      gTrcIndex = hTrcEntry;
      DisplayIndex = 1;
      RefreshDisplay = TRUE;
      Reformat = TRUE;
   }
   break;

case KBD_PRINT:
   if (!HeaderPrinted) {
      HeaderPrinted = TRUE;
      Print (PRT_HEADER, "");
   }
   PrintTrace (MaxLines);
   break;

case KBD_EMULATE:
   Done = TRUE;
   ReturnKey = KBD_EMULATE;
   break;

case KBD_BREAK:
   Done = TRUE;
   ReturnKey = KBD_BREAK;
   break;

case KBD_MON_L1:
   Done = TRUE;
   ReturnKey = KBD_MON_L1;
   break;

case KBD_TRC_L2:
   if (TraceMode == TRC_L3_TRACE) {
      Done = TRUE;
      ReturnKey = KBD_TRC_L2;
   }
```

```
            break;

case KBD_TRC_L3:
         if (TraceMode == TRC_L2_TRACE) {
            Done = TRUE;
            ReturnKey = KBD_TRC_L3;
         }
         break;

case KBD_RESTART:
         Done = TRUE;
         ReturnKey = KBD_RESTART;
         break;

default:
         Reformat = FALSE;
         RefreshDisplay = FALSE;
         break;
      }
   }
   if (!hTrcEntry) {
      DisplayMsg (pszTrcEmpty, pszBlankLine);
      ReturnKey = OnKbd ();
   } return (ReturnKey);
}

/****************************************************************
 Function: DoL2Trace
 Input:    None
 Returns:  Exit key pressed by user This is the entry point for this module when the
         user selects LAYER 2 TRACE in COE.C.
 ****************************************************************/

UCHAR DoL2Trace (void) { return (DoTrace (TRC_L2_TRACE));

}

/****************************************************************
 Function: DoL3Trace
 Input:    None
 Returns:  Exit key pressed by user This is the entry point for this module when the
         user selects LAYER 3 TRACE in COE.C.
 ****************************************************************/

UCHAR DoL3Trace (void) {
```

```
   return (DoTrace (TRC_L3_TRACE));

}

/******************************************************************
Function: DoRemTrace
Input:   None
Returns: None This is the entry point for this module when
    the trace buffer content is sent via the Serial
    interface. The gRemote and gTraceOn flags must be set.
    Called from COE_L1.C.
******************************************************************/ void DoRemTrace (void) {

PXCHAR pDisplayBuffer = &gDisplayBuffer[gRemDisplayIndex][0];
  XUCHAR LastTrcIndex = gTrcIndex;
  XUCHAR TrcIndex;

if ((gRemote) && (gTraceOn)) { if (*pDisplayBuffer) {
      Print (PRT_LINE, pDisplayBuffer);
      *pDisplayBuffer = 0;
      ++gRemDisplayIndex;
    }
    else if (gTrcTotalEntries) {
      gRemDisplayIndex = 0;
      TrcIndex = GetNextTrc (TRC_L2_TRACE);
      if (TrcIndex != LastTrcIndex) {
        FormatTrace (TRC_REM_TRACE, TrcIndex);
        Print (PRT_LINE, "");
      }
    }
  }
}
```

```
/****************************************************************

ISDN 2000 Central Office Emulator

Utilities and General-Purpose Functions (c) 1994 Merge Technologies Inc.

General: This module is a catch-all for utility and general
purpose functions. Most functions are self-evident.
****************************************************************/ ifndef NODEBUG
pragma DEBUG CODE SYMBOLS OBJECTEXTEND
endif include <coe.h>
include <coe_reg.h>
include <lib_io.h>
include <lib_util.h>
include <lib_str.h>

XUCHAR gError;
XUCHAR gErrCnt;

/****************************************************************
Function:  Pause
Input:     Delay in milliseconds
Returns:   None Supports timing for other functions
****************************************************************/ void Pause (UINT Count) {

UINT i,j;

if (!FRAME_SYNC)
       while(!FRAME_SYNC)
       ;
    if (FRAME_SYNC)
       while (FRAME_SYNC);

for (i = 0; i < Count; ++i) { for (j = 1; j <= 8; ++j) {
          while (!FRAME_SYNC)
          ;
          while (FRAME_SYNC)
          ;
       }
    }
    return;
}
```

```
/*****************************************************************
Function: CopyData
Input:   Pointers to destination and source bytes, number
         of bytes to copy.
Returns: None

*****************************************************************/ void CopyData (PUCHAR pDstData, PUCHAR pSrcData, UCHAR DataBytes) {

UCHAR BytesCopied = 0;

while (BytesCopied < DataBytes) {
     *(pDstData + BytesCopied) = *(pSrcData + BytesCopied);
     ++BytesCopied;
  }
}

/*****************************************************************
Function: CopyBuffer
Input:   Pointers to destination and source buffer, number
         of bytes to copy.
Returns: None

*****************************************************************/ void CopyBuffer (PUCHAR pDstBuf, PUCHAR pSrcBuf, PUINT pDataBytes) {

UINT BytesCopied = 0;

while (BytesCopied <= *pDataBytes) {
     *(pDstBuf + BytesCopied) = *(pSrcBuf + BytesCopied);
     ++BytesCopied;
  }
}

/*****************************************************************
Function: CmpString
Input:   Pointers to destination and source strings, number
         of bytes to compare.
Returns: True if match found

*****************************************************************/

UCHAR CmpString (PCHAR pDest, PCHAR pSource, UCHAR TotalBytes) {

UCHAR Match =       TRUE;
  UCHAR BytesCompared = 0;
```

```c
   while (BytesCompared <= TotalBytes) {
      if (*(pDest + BytesCompared) != *(pSource + BytesCompared)) {
         Match = FALSE;
         break;
      }
      else
         ++BytesCompared;
   }
   return (Match);
}

/****************************************************************
Function: ClearMem
Input:    Pointer to a memory location, total bytes to clear
Returns:  None

****************************************************************/ void ClearMem (PUCHAR pMem, UINT TotalBytes) {

UINT i;

for (i = 0; i < TotalBytes; ++i)
      *(pMem + i) = 0x00;

}
/****************************************************************
Function: CopyString
Input:    Pointers to destination and source string.
Returns:  Number of characters copied less null terminator Copies until null terminator encountered
****************************************************************/ void CopyString (PCHAR pDstStr, PCHAR pSrcStr) {

BOOL FoundNull = FALSE;

while (!FoundNull) {
      if (*pSrcStr == 0)
         FoundNull = TRUE;
      *(pDstStr++) = *(pSrcStr++);
   }
}

/****************************************************************
Function: AddString
Input:    Pointers to destination and source string.
Returns:  None
```

```
       Appends source string to destination string
*******************************************************************/ void AddString (PCHAR pDstStr, PCHAR pSrcStr) { while (*pDstStr != 0)
      ++pDstStr;
  while (*pSrcStr != 0)
      *pDstStr++ = *pSrcStr++;
  *pDstStr = 0; // terminate null

}

/*****************************************************************
Function: BinToAscii
Input:   Unsigned Integer to convert
Returns: ASCII string in pCharBuffer Converts a one byte binary number to up to four byte
       decimal equivalent as an ASCII string terminated
       with zero.
*******************************************************************/ void BinToAscii (UINT Int, PCHAR pCharBuffer) {

UCHAR TotalChar = 0;
  BOOL ZeroPlace = FALSE;

if (Int > 999) {
     ZeroPlace = TRUE;
     *pCharBuffer = (Int / 1000);
     Int %= 1000;
     *pCharBuffer |= 0x30;
     ++TotalChar;
  }
  if (Int > 99) {
     ZeroPlace = TRUE;
     *(pCharBuffer + TotalChar) = (Int / 100);
     Int %= 100;
     *(pCharBuffer + TotalChar) |= 0x30;
     ++TotalChar;
  }
  else if (ZeroPlace) {
     *(pCharBuffer + TotalChar) = 0x30;
     ++TotalChar;
  }
  if (Int > 9) {
     *(pCharBuffer + TotalChar) = (Int / 10);
     Int %= 10;
     *(pCharBuffer + TotalChar) |= 0x30;
     ++TotalChar;
  }
```

```
     else if (ZeroPlace) {
        *(pCharBuffer + TotalChar) = 0x30;
        ++TotalChar;
     }
     *(pCharBuffer + TotalChar) = (Int | 0x30);
     ++TotalChar;
     *(pCharBuffer + TotalChar) = 0;

}

/****************************************************************
Function: HexToAscii
Input:    Byte to convert
Returns:  ASCII string in pHexString Converts one byte hex value to two byte
          ASCII string terminated with zero.
****************************************************************/ void HexToAscii (UCHAR HexNumber, PCHAR pHexString) {

UCHAR TempHex = HexNumber;

TempHex >>= 4;
   if (TempHex > 9)
      *pHexString = (TempHex - 9) + 0x40;
   else
      *pHexString = TempHex + 0x30;
   ++pHexString;
   TempHex = HexNumber & 0x0f;
   if (TempHex > 9)
      *pHexString = (TempHex - 9) + 0x40;
   else
      *pHexString = TempHex + 0x30;
   *(++pHexString) = 0x00;

}

/****************************************************************
Function: AscToHex
Input:    Pointer to a 2 byte ASCII string
Returns:  1 byte conversion Converts two byte ASCII value to one byte
          hex value.
****************************************************************/

UCHAR AscToHex (PCHAR pString) {

UCHAR HexByte;
   UCHAR Temp;
```

```
  Temp = *(pString++);
  if (Temp > 0x40)
     Temp += 9;
  Temp &= 0x0f;
  Temp <<= 4;
  HexByte = Temp;
  Temp = *pString;
  if (Temp > 0x40)
     Temp += 9;
  Temp &= 0x0f;
  return (HexByte += Temp);
}

/****************************************************************
Function: InfoToString
Input:   Pointer to a destination string, pointer to a
         series of info element bytes, total bytes to
         convert.
Returns: None Converts a series of information element bytes
         into their ASCII representation.
****************************************************************/ void InfoToString (PCHAR pDstStr, PUCHAR pInfoBytes, UCHAR NoBytes) {

UCHAR BytesProcessed = 0;
  XCHAR pTempHexStr[3];

while (BytesProcessed < NoBytes) {
     HexToAscii (*pInfoBytes++, pTempHexStr);
     *pDstStr = *pTempHexStr;
     *(++pDstStr) = *(pTempHexStr + 1);
     *(++pDstStr) = ' ';
     ++pDstStr;
     ++BytesProcessed;
  }
  *(--pDstStr) = 0;
}

/****************************************************************
Function: FormatTime
Input:   Unsigned Integer to convert
Returns: ASCII string in pTimeBuffer Converts one byte binary time to four byte
         ASCII string terminated with zero and
         formatted XX:XX
****************************************************************/ void FormatTime (UINT Int, PCHAR pTimeBuffer) {

UCHAR TotalChar = 0;
```

```
   UCHAR i;

for (i = 0; i < MAX_TIME_LENGTH; ++i)
      *(pTimeBuffer + i) = 0x00;

if (Int > 999) {
      *pTimeBuffer = (Int / 1000);
      Int %= 1000;
   }
   *pTimeBuffer |= 0x30;
   ++TotalChar;

if (Int > 99) {
      *(pTimeBuffer + TotalChar) = (Int / 100);
      Int %= 100;
   }
   *(pTimeBuffer + TotalChar) |= 0x30;
   ++TotalChar;

*(pTimeBuffer + TotalChar) = '.';
   ++TotalChar;

if (Int > 9) {
      *(pTimeBuffer + TotalChar) = (Int / 10);
      Int %= 10;
   }
   *(pTimeBuffer + TotalChar) |= 0x30;
   ++TotalChar;

*(pTimeBuffer + TotalChar) = (Int | 0x30);
   ++TotalChar;

*(pTimeBuffer + TotalChar) = 0;
}

/****************************************************************
Function: GetField
Input:    Field ID and pointer to a packet frame
Returns:  Formatted value from field, or an error indication Locates and returns field variables,
          such as SAPI, TEI, FRAME_FORMAT, etc.
****************************************************************/

UCHAR GetField (UCHAR Field, PUCHAR pFrame) {

UCHAR FieldValue = 0;
   UCHAR TempValue  = 0;

switch (Field) { case GET_PORT:
         if ((*pFrame & PORT_MASK) == PORT1_BIT)
```

```
            FieldValue = PORT1;
         else if ((*pFrame & PORT_MASK) == PORT2_BIT)
            FieldValue = PORT2;
         else
            LogError (LOG_ERR_UNDEFINED_PORT);
         break;

case GET_SAPI:
         FieldValue = *(pFrame + SAPI_POS) & SAPI_ID;
         if (FieldValue == SAPI_0);
         else if (FieldValue == SAPI_16);
         else if (FieldValue == SAPI_63);
         else
            LogError (LOG_ERR_UNDEFINED_SAP);
         break;

case GET_CR:
         FieldValue = *(pFrame + CR_POS) & CR_MASK;
         break;

case GET_TEI:
         FieldValue = *(pFrame + TEI_POS);
         FieldValue >>= 1;
         break;

case GET_FRAME_FORMAT:
         FieldValue = *(pFrame + FRAME_FORMAT_POS) & FRAME_FORMAT;
         if ((FieldValue & I_FRAME_TYPE) == I_FRAME)
            FieldValue = I_FRAME;
         else if (FieldValue == S_FRAME);
         else if (FieldValue == U_FRAME);
         else
            LogError (LOG_ERR_UNDEFINED_FRAME);
         break;

case GET_S_FRAME:
         FieldValue = *(pFrame + S_FRAME_POS);
         if (FieldValue == RR);
         else if (FieldValue == RNR);
         else if (FieldValue == REJ);
         else
            LogError (LOG_ERR_UNDEFINED_FRAME);
         break;

case GET_U_FRAME:
         FieldValue = *(pFrame + U_FRAME_POS) & U_FRAME_TYPE;
         if (FieldValue == SABME);
         else if (FieldValue == DM);
         else if (FieldValue == UI);
         else if (FieldValue == DISC);
         else if (FieldValue == UA);
         else if (FieldValue == FRMR);
         else if (FieldValue == XID);
         else
```

```
      LogError (LOG_ERR_UNDEFINED_FRAME);
   break;

case GET_NR:
   FieldValue = ((*(pFrame + FRAME_FORMAT_POS)) & FRAME_FORMAT);
   if ((FieldValue & I_FRAME_TYPE) == I_FRAME) {
      FieldValue = (*(pFrame + NR_POS));
      FieldValue >>= 1;
   }
   else if (FieldValue == S_FRAME) {
      FieldValue = (*(pFrame + NR_POS));
      FieldValue >>= 1;
   }
   else if (FieldValue == U_FRAME)
      FieldValue = 0;
   else
      LogError (LOG_ERR_UNDEFINED_FRAME);
   break;

case GET_NS:
   FieldValue = ((*(pFrame + FRAME_FORMAT_POS)) & FRAME_FORMAT);
   if ((FieldValue & I_FRAME_TYPE) == I_FRAME) {
      FieldValue = (*(pFrame + NS_POS));
      FieldValue >>= 1;
   }
   else
      FieldValue = 0;
   break;

case GET_PF:
   FieldValue = *(pFrame + FRAME_FORMAT_POS) & FRAME_FORMAT;
   if ((FieldValue & I_FRAME_TYPE) == I_FRAME) {
      FieldValue = *(pFrame + I_PF_POS);
      FieldValue &= I_POLL_MASK;
   }
   else if (FieldValue == S_FRAME) {
      FieldValue = *(pFrame + S_PF_POS);
      FieldValue &= S_POLL_MASK;
   }
   else if (FieldValue == U_FRAME) {
      FieldValue = *(pFrame + U_PF_POS);
      FieldValue &= U_POLL_MASK;
   }
   else
      LogError (LOG_ERR_UNDEFINED_FRAME);
   break;

case GET_PROTOCOL:
   if ((*(pFrame + 3) & FRAME_FORMAT) == UI)
      FieldValue = *(pFrame + 4);
   else
      FieldValue = *(pFrame + PROTOCOL_POS);
   break;
```

```
case GET_CREF_LENGTH:
   if ((*(pFrame + 3) & FRAME_FORMAT) == UI)
      FieldValue = *(pFrame + 5);
   else
      FieldValue = *(pFrame + CREF_LENGTH_POS);
   break;

case GET_CREF_NUMBER:
   if ((*(pFrame + 3) & FRAME_FORMAT) == UI)
      FieldValue = *(pFrame + 6);
   else if (*(pFrame + CREF_LENGTH_POS) == 0)
      FieldValue = 0;
   else {
      TempValue = *(pFrame + CREF_NUMBER_POS);
      FieldValue = (TempValue & 0x7f);
      TempValue = ~TempValue;
      TempValue &= 0x80;
      FieldValue |= TempValue;
   }
   break;

case GET_MSG_TYPE:
   if ((*(pFrame + 3) & FRAME_FORMAT) == UI)
      FieldValue = *(pFrame + 7);
   else if (*(pFrame + CREF_LENGTH_POS) == 0)
      FieldValue = *(pFrame + (MSG_TYPE_POS - 1));
   else
      FieldValue = *(pFrame + MSG_TYPE_POS);
   break;

case GET_NET_MSG_TYPE:
   if (*(pFrame + CREF_LENGTH_POS) == 0)
      FieldValue = *(pFrame + (NET_MSG_TYPE_POS - 1));
   else
      FieldValue = *(pFrame + NET_MSG_TYPE_POS);
   break;

case GET_CONTROLLER:
   FieldValue = *(pFrame + CONTROLLER_POS);
   break;

case GET_RANDOM1:
   FieldValue = *(pFrame + RANDOM1_POS);
   break;

case GET_RANDOM2:
   FieldValue = *(pFrame + RANDOM2_POS);
   break;

case GET_TEI_MSG:
   FieldValue = *(pFrame + TEI_MSG_POS);
   break;

case GET_X25_PACKET_TYPE:
```

```
        FieldValue = *(pFrame + X25_PACKET_TYPE_POS);
        break;

case GET_X25_CHANNEL:
        FieldValue = *(pFrame + X25_CHANNEL_POS);
        break;

case GET_SAC_TEI:
        FieldValue = *(pFrame + SAC_TEI_POS);
        FieldValue >>= 1;
        break;
    } return (FieldValue);
}

/***************************************************************
Function: ClearBuffer
Input:    Pointer of packet buffer to clear and byte count
Returns:  None Overwrites previous packet with zeros.
***************************************************************/ void ClearBuffer (PUCHAR pBuffer, PUINT pByteCnt) {

UINT i;

if ((*pByteCnt != 0) && (*pByteCnt < MAX_MSG_LENGTH)) {
        for (i = 0; i <= *pByteCnt; ++i)
            *(pBuffer + i) = 0x00;
    }
}

/***************************************************************
Function: ClrError
Input:    None
Returns:  None

***************************************************************/ void ClrError (void) { gError = 0;
    gErrCnt = 0;

}

/***************************************************************
Function: LogError
Input:    One Byte Error Code
Returns:  None
```

Internal errors are posted here for viewing/tracing
       by 8051 code emulator
******************************************************************/ void LogError (UCHAR ErrCode) {

UCHAR Temp = 0;

gError = ErrCode;
   ++gErrCnt;
   if ((gErrCnt & 0x0f) > 9) {
      gErrCnt &= 0xf0;
      Temp = gErrCnt;
      Temp >>= 4;
      ++Temp;
      if (Temp > 9)
         gErrCnt = 0;
      else {
         Temp <<= 4;
         gErrCnt = Temp;
      }
   }
}

/******************************************************************
Function: LogIntError
Input:    Similar to LogError, for Int0Handler in COE_SWCH.C
Returns:  None

******************************************************************/ void LogIntError (UCHAR ErrCode) {

UCHAR Temp = 0;

gError = ErrCode;
   ++gErrCnt;
   if ((gErrCnt & 0x0f) > 9) {
      gErrCnt &= 0xf0;
      Temp = gErrCnt;
      Temp >>= 4;
      ++Temp;
      if (Temp > 9)
         gErrCnt = 0;
      else {
         Temp <<= 4;
         gErrCnt = Temp;
      }
   }
}

/******************************************************************
Function: GetError
Input:    None Returns: Last error code logged \*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*/

```
UCHAR GetError (void) { return (gError);
}

/****************************************************************
Function: GetErrCnt
Input:   None
Returns: Last error code logged

****************************************************************/

UCHAR GetErrCnt (void) { return (gErrCnt);
}
```

```
/****************************************************************
    ISDN 2000 Central Office Emulator ISDN X.25 Packet Processing Module (c) 1994 Merge Technologies Inc.

****************************************************************/ ifndef NODEBUG
pragma DEBUG CODE SYMBOLS OBJECTEXTEND
endif include <coe.h>
include <lib_l2.h>
include <lib_util.h>
include <lib_set.h>

XUCHAR X25Port[2];
XUCHAR X25Tei[2];
XUCHAR X25Channel[2];

/****************************************************************
    Function: MakeX25Header
    Input:    Array index of packet node,
              pointer to a packet buffer.
    Returns:  None Formats the first 5 (header) bytes of an X.25 packet.
****************************************************************/ void MakeX25Header (UCHAR PktIdx, PUCHAR pPkt) {

UCHAR PktTei;

*pPkt = X25Port[PktIdx];
    PktTei = X25Tei[PktIdx];
    PktTei <<= 1;
    PktTei |= 0x01;
    *(pPkt + TEI_POS) = PktTei;
    *(pPkt + NS_POS) = UNKNOWN;
    *(pPkt + NR_POS) = UNKNOWN;
    *(pPkt + X25_CHANNEL_POS) = X25Channel[PktIdx];

}

/****************************************************************
    Function: GetPktIdx
    Input:    Command and current port bit
    Returns:  Index to packet data array
```

```
*****************************************************************/

UCHAR GetPktIdx (UCHAR Command, UCHAR PktPort) {

UCHAR PktIdx = UNKNOWN;

switch (Command) { case THIS_PORT:

if (PktPort == PORT1_BIT)
        PktIdx = 0;
      else if (PktPort == PORT2_BIT)
        PktIdx = 1;
      else
        LogError (LOG_ERR_UNDEFINED_PORT);
      break;

case OTHER_PORT:

if (PktPort == PORT1_BIT)
        PktIdx = 1;
      else if (PktPort == PORT2_BIT)
        PktIdx = 0;
      else
        LogError (LOG_ERR_UNDEFINED_PORT);
      break;

} return (PktIdx);
}

/****************************************************************
 Function: DoX25
 Input:   None
 Returns: None Execution of DoLayer3() branches here upon reciept
        of a X.25 I Frame. This is a simple method of
        transferring X.25 data from incoming I Frames to
        outgoing I Frames to simulate a Packet Handler.
*****************************************************************/ void DoX25 (PUCHAR pRcvPkt,
            PUINT  pRcvPktBytes,
            PUCHAR pXmtPkt,
            PUINT  pXmtPktBytes) {

UCHAR PacketPort =   *pRcvPkt;
  UCHAR PacketType =   GetField (GET_X25_PACKET_TYPE, pRcvPkt);
  UCHAR PacketIndex;
```

```
if (!(PacketType & X25_DATA_MASK))
    PacketType = X25_DATA;
if ((PacketType & X25_RR_MASK) == X25_RR)
    PacketType = X25_RR;
else if ((PacketType & X25_RR_MASK) == X25_RNR)
    PacketType = X25_RNR;
else if ((PacketType & X25_RR_MASK) == X25_REJ)
    PacketType = X25_REJ;

*pXmtPktBytes = *pRcvPktBytes;
CopyBuffer (pXmtPkt, pRcvPkt, pXmtPktBytes);

switch (PacketType) { case X25_RESTART:
        if (*pDX25Set) {
            PacketIndex = GetPktIdx (THIS_PORT, PacketPort);
            X25Port[PacketIndex] = *pXmtPkt;
            X25Tei[PacketIndex] = GetField (GET_TEI, pXmtPkt);
            X25Channel[PacketIndex] = 0;
            *pXmtPktBytes = 7;
            *(pXmtPkt + X25_PACKET_TYPE_POS) = X25_RESTART_CONFIRM;
            DoILC (DL_DATA_RESPONSE, pXmtPkt, pXmtPktBytes);
        }
        break;

case X25_RESET:
        PacketIndex = GetPktIdx (THIS_PORT, PacketPort);
        if ((*pDX25Set == X25_PVC_SET) ||
            (X25Channel[PacketIndex] != 0)) {
            X25Channel[PacketIndex] = GetField (GET_X25_CHANNEL, pXmtPkt);
            *pXmtPktBytes = 7;
            MakeX25Header (PacketIndex, pXmtPkt);
            *(pXmtPkt + X25_PACKET_TYPE_POS) = X25_RESET_CONFIRM;
            DoILC (DL_DATA_RESPONSE, pXmtPkt, pXmtPktBytes);

PacketIndex = GetPktIdx (OTHER_PORT, PacketPort);

if (X25Channel[PacketIndex]) {
                *pXmtPktBytes = *pRcvPktBytes;
                CopyBuffer (pXmtPkt, pRcvPkt, pXmtPktBytes);
                MakeX25Header (PacketIndex, pXmtPkt);
                *(pXmtPkt + X25_PACKET_TYPE_POS) = X25_RESET;
                DoILC (DL_DATA_RESPONSE, pXmtPkt, pXmtPktBytes);
            }
        }
        break;

case X25_RESET_CONFIRM:
        Pause (1);
        break;

case X25_RR:
```

```
            PacketIndex = GetPktIdx (OTHER_PORT, PacketPort);
            MakeX25Header (PacketIndex, pXmtPkt);
            DoILC (DL_DATA_RESPONSE, pXmtPkt, pXmtPktBytes);
            break;

case X25_RNR:
            PacketIndex = GetPktIdx (OTHER_PORT, PacketPort);
            MakeX25Header (PacketIndex, pXmtPkt);
            DoILC (DL_DATA_RESPONSE, pXmtPkt, pXmtPktBytes);
            break;

case X25_REJ:
            PacketIndex = GetPktIdx (OTHER_PORT, PacketPort);
            MakeX25Header (PacketIndex, pXmtPkt);
            DoILC (DL_DATA_RESPONSE, pXmtPkt, pXmtPktBytes);
            break;

case X25_DIAG:
            PacketIndex = GetPktIdx (OTHER_PORT, PacketPort);
            MakeX25Header (PacketIndex, pXmtPkt);
            DoILC (DL_DATA_RESPONSE, pXmtPkt, pXmtPktBytes);
            break;

case X25_INTERRUPT:
            PacketIndex = GetPktIdx (OTHER_PORT, PacketPort);
            MakeX25Header (PacketIndex, pXmtPkt);
            DoILC (DL_DATA_RESPONSE, pXmtPkt, pXmtPktBytes);
            break;

case X25_INTERRUPT_CONFIRM:
            PacketIndex = GetPktIdx (OTHER_PORT, PacketPort);
            MakeX25Header (PacketIndex, pXmtPkt);
            DoILC (DL_DATA_RESPONSE, pXmtPkt, pXmtPktBytes);
            break;

case X25_DATA:
            PacketIndex = GetPktIdx (OTHER_PORT, PacketPort);
            MakeX25Header (PacketIndex, pXmtPkt);
            DoILC (DL_DATA_RESPONSE, pXmtPkt, pXmtPktBytes);
            break;

case X25_CALL_REQUEST:
            if (*pDX25Set == X25_VC_SET) {
                PacketIndex = GetPktIdx (THIS_PORT, PacketPort);
                X25Channel[PacketIndex] = GetField (GET_X25_CHANNEL, pXmtPkt);
                PacketIndex = GetPktIdx (OTHER_PORT, PacketPort);
                X25Channel[PacketIndex] = GetField (GET_X25_CHANNEL, pXmtPkt);
                MakeX25Header (PacketIndex, pXmtPkt);
                // *(pXmtPkt + X25_ADDR_LENGTH_POS) <<= 4;
                DoILC (DL_DATA_RESPONSE, pXmtPkt, pXmtPktBytes);
            }
            break;

case X25_CALL_ACCEPTED:
```

```
            PacketIndex = GetPktIdx (OTHER_PORT, PacketPort);
            MakeX25Header (PacketIndex, pXmtPkt);
            // if (*pXmtPkt + X25_ADDR_LENGTH_POS)
            //    *(pXmtPkt + X25_ADDR_LENGTH_POS) >>= 4;
            DoILC (DL_DATA_RESPONSE, pXmtPkt, pXmtPktBytes);
            break;

case X25_CLEAR_REQUEST:
            PacketIndex = GetPktIdx (OTHER_PORT, PacketPort);
            MakeX25Header (PacketIndex, pXmtPkt);
            // if (*(pXmtPkt + X25_ADDR_LENGTH_POS) & 0xf0)
            //    *(pXmtPkt + X25_ADDR_LENGTH_POS) >>= 4;
            // else if (*(pXmtPkt + X25_ADDR_LENGTH_POS) & 0x0f)
            //    *(pXmtPkt + X25_ADDR_LENGTH_POS) <<= 4;
            DoILC (DL_DATA_RESPONSE, pXmtPkt, pXmtPktBytes);
            break;

case X25_CLEAR_CONFIRM:
            PacketIndex = GetPktIdx (OTHER_PORT, PacketPort);
            MakeX25Header (PacketIndex, pXmtPkt);
            // if (*(pXmtPkt + X25_ADDR_LENGTH_POS) & 0xf0)
            //    *(pXmtPkt + X25_ADDR_LENGTH_POS) >>= 4;
            // else if (*(pXmtPkt + X25_ADDR_LENGTH_POS) & 0x0f)
            //    *(pXmtPkt + X25_ADDR_LENGTH_POS) <<= 4;
            DoILC (DL_DATA_RESPONSE, pXmtPkt, pXmtPktBytes);
            PacketIndex = GetPktIdx (THIS_PORT, PacketPort);
            X25Channel[PacketIndex] = 0;
            PacketIndex = GetPktIdx (OTHER_PORT, PacketPort);
            X25Channel[PacketIndex] = 0;
            break;

default:
            Pause (1);
            break;
        }
    }
}
```

```
SET C51INC=\DEV\INC_2000
SET C51LIB=\DEV\LIB
```

```
COE.OBJ,      &
COE_SET.OBJ,  &
COE_IO.OBJ,   &
COE_SWCH.OBJ, &
COE_UTIL.OBJ, &
COE_L1.OBJ,   &
COE_L2.OBJ,   &
COE_L3.OBJ,   &
COE_MSG.OBJ,  &
COE_STR.OBJ,  &
COE_TRC.OBJ,  &
COE_DB.OBJ,   &
COE_MON.OBJ,  &
COE_X25.OBJ   &
TO ISDN2000   &
MAP RAMSIZE (256)
```

```
CALL ENV.BAT
L51 @ISDN2000.MAK
ECHO OFF
ECHO ****************************************************************
ECHO *   REV 2.03  4/17/95
ECHO * 1 Added TEI Check/Remove timers and logic (COE_L2.C)
ECHO * 2 Added B channel LPBK setting (COE_SET.C)
ECHO * 3 Return INFO with CAUSE_100 if wrong NI-1 SPID
ECHO * 4 Screen if Call Ref Length = 1 for AT&T MIM
ECHO * 5 Modified SendSetup() to always send CPN for data calls
ECHO * 6 Added timed call release when terminals removed
ECHO * 7 Added call release for rejected calls (COE_L3.C)
ECHO * 8 Increased trace buffer packet length to 100 bytes
ECHO * 9 Added SAPI 16 UI/S frame trace
ECHO * 10 Fixed byte limit bug (COE_TRC.C)
ECHO * 11 Change elapsed timers to use RTC (COE_IO.C)
ECHO * 12 Changed TSI LATMOD to Frame Integrity (COE_SWCH.C)
ECHO * 13 Fixed Calling/Called Address bug (COE_X25.C)
ECHO ****************************************************************
OH51 ISDN2000
```

```
CALL ENV.BAT
CLS
C51 COE.C
CLS
C51 COE_SET.C
CLS
C51 COE_L1.C
CLS
C51 COE_L2.C
CLS
C51 COE_L3.C
CLS
C51 COE_MSG.C
CLS
C51 COE_SWCH.C
CLS
C51 COE_IO.C
CLS
C51 COE_UTIL.C
CLS
C51 COE_STR.C
CLS
C51 COE_TRC.C
CLS
C51 COE_DB.C
CLS
C51 COE_MON.C
CLS
C51 COE_X25.C
CLS
CALL L.BAT
```

```
/****************************************************************

ISDN 2000 Central Offic Emulator

Global Definitions and Macros (c) 1994 Merge Technologies

****************************************************************/ define TRUE    1
define FALSE   0
define NULL    ((void *) 0L)
define ON      TRUE
define OFF     FALSE
define ENABLE  0
define DISABLE 1
define UNKNOWN 0xff
define BLANK   0x00
define SPACE   0x30

/****************************************************************
  Variable Type Definitions
****************************************************************/ define INT                 int
define UINT      unsigned int
define IUINT     unsigned int idata
define XUINT     unsigned int xdata
define CHAR      char
define XCHAR       char xdata
define UCHAR     unsigned char
define IUCHAR    unsigned char idata
define XUCHAR      unsigned char xdata
define CUCHAR      unsigned char code
define PCHAR     char *
define PXCHAR      char xdata *
define XPXCHAR     char xdata * xdata
define PUCHAR      unsigned char *
define PUINT     unsigned int *
define PIUCHAR     unsigned char idata *
define PXUCHAR     unsigned char xdata *
define PXUINT      unsigned int xdata *
define PCUCHAR     unsigned char code *
define XPXUCHAR    unsigned char xdata * xdata
define XPXUINT     unsigned int xdata * xdata
define XPCCHAR     unsigned char code * xdata
define XPCUCHAR    unsigned char code * xdata
define BOOL        bit /****************************************************************
  All Constant Limits This Application Are Here
****************************************************************/
```

```
define MAX_PORTS           2
define MAX_RAM             32765
define MAX_SETTINGS_RAM    16
define MAX_ERROR_TYPES     30
define MAX_MSG_LENGTH      150
define MAX_IDEC_BYTES      32
define MAX_TRACE_LENGTH    10000
define MAX_PACKET_TRACE_LENGTH 100
define MAX_TRACE_ENTRIES   (MAX_TRACE_LENGTH/MAX_PACKET_TRACE_LENGTH)
// NTE 255 (UCHAR)
define MAX_DISP_BUFF_LENGTH 25
define MAX_DISP_WIDTH      81
define MAX_MSG_QUEUE       5
define MAX_INPUT_BUFFERS   6
define MAX_OUTPUT_BUFFERS  3
define MAX_KBD_MAP_LENGTH  16
define MAX_DISPLAY_ROWS    4
define MAX_DISPLAY_COLUMNS 20
define MAX_HIGHWAYS        4
define MAX_TIME_SLOTS      8
define MAX_CONFIG_REG      4
define MAX_ST_REG          4
define MAX_LC              10
define MAX_STATUS_BYTES    3
define MAX_RTC_REG         8
define MAX_RETRY_COUNT     3
define MAX_RETRY_TIME      1
define MAX_IDLE_TIME       25
define MAX_SFRAME_TYPES    4
define MAX_UFRAME_TYPES    8
define MAX_SAC_TYPES       8
define MAX_ERROR_CODES     19
define MAX_TIME_LENGTH     6
define MAX_LOG_RECORD_SIZE 9
define MAX_LOG_RECORDS     30
define MAX_ERR_RECORD_SIZE 4
define MAX_ERR_RECORDS     20
define MAX_TERMINALS       5
define MAX_SPID_LENGTH     11
define MAX_DN_LENGTH       11
define MAX_CA              26
define MAX_CALL_REF        64
define MAX_CALLS           11
define MAX_NAME_LENGTH     11
define MAX_NET_ERRORS      7 define MAX_SETTINGS            11
define MAX_LABEL_LENGTH        14
define MAX_SETTING_LENGTH      5
define MAX_SWITCH_SETTINGS     4
define MAX_DEFAULT_SETTINGS    2
define MAX_CONFIG_SETTINGS     2
define MAX_PROVISION_SETTINGS  5
define MAX_DX25_SETTINGS       3
```

```
define MAX_DISPLAY_SETTINGS    2
define MAX_CALLER_ID_SETTINGS  2
define MAX_EKTS_SETTINGS       2
define MAX_HOLD_SETTINGS       3
define MAX_CA_SETTINGS         16
define MAX_ACO_SETTINGS        2 define MAX_DESCRIPT_LENGTH    (MAX_DISPLAY_COLUMNS + 1)
define MAX_LOG_BYTES          (MAX_LOG_RECORD_SIZE * MAX_LOG_RECORDS)
define MAX_ERR_BYTES          (MAX_ERR_RECORD_SIZE * MAX_ERR_RECORDS)

define MAX_MSG_TYPES      46
define MAX_IE_TYPES       57
define MAX_CALL_STATES    12
define MAX_CS_MSG_TYPES   10 define MAX_IE_PARAM       6
define MAX_NETESC_IE      1
define MAX_SETUP_IE       39
define MAX_SETUPACK_IE    11
define MAX_CALLPROC_IE    14
define MAX_PROGRESS_IE    11
define MAX_ALERTING_IE    14
define MAX_CONNECT_IE     17
define MAX_CONNACK_IE     11
define MAX_DISC_IE        13
define MAX_REL_IE         15
define MAX_RELCOMP_IE     14
define MAX_RESTART_IE     3
define MAX_RESTACK_IE     3
define MAX_FACILITY_IE    3
define MAX_REGISTER_IE    3
define MAX_NOTIFY_IE      1
define MAX_INFO_IE        26
define MAX_STATUS_IE      3
define MAX_STATENQ_IE     1 define MAX_HOLD_IE        1
define MAX_HOLD_ACK_IE    5
define MAX_HOLD_REJ_IE    2
define MAX_RET_IE         2
define MAX_RET_ACK_IE     3
define MAX_RET_REJ_IE     2 define MAX_X25_IE             1
define MAX_NET_CONF_IE        1
define MAX_NET_CONF_ACK_IE    1
define MAX_NET_CONF_REJ_IE    2
define MAX_NET_TRANS_IE       1
define MAX_NET_TRANS_ACK_IE   1
define MAX_NET_TRANS_REJ_IE   2
define MAX_NET_ASSOC_IE       1
define MAX_NET_ASSOC_ACK_IE   1
define MAX_NET_DROP_IE        1
```

```
define MAX_NET_DROP_ACK_IE    1
define MAX_NET_DROP_REJ_IE    1
define MAX_NET_HOLD_IE        1
define MAX_NET_HOLD_ACK_IE    3
define MAX_NET_HOLD_REJ_IE    2
define MAX_NET_RECONN_IE      3
define MAX_NET_RECONN_ACK_IE  9
define MAX_NET_RECONN_REJ_IE  4
define MAX_NET_REDIRECT_IE    1
define MAX_NET_MIM_IE         1
define MAX_UNKNOWN_IE         1 define MAX_EOC_STRING         7

/****************************************************************
    ISDN X.25 Message Types
****************************************************************/ define X25_PROTOCOL           0x10
define X25_DATA               0x00
define X25_RESET              0x1b
define X25_RESET_CONFIRM      0x1f
define X25_RESTART            0xfb
define X25_RESTART_CONFIRM    0xff
define X25_RR                 0x01
define X25_RNR                0x05
define X25_REJ                0x09
define X25_DIAG               0xf1
define X25_INTERRUPT          0x23
define X25_INTERRUPT_CONFIRM  0x27
define X25_CALL_REQUEST       0x0b
define X25_CALL_ACCEPTED      0x0f
define X25_CLEAR_REQUEST      0x13
define X25_CLEAR_CONFIRM      0x17 define X25_DATA_MASK          0x01
define X25_RR_MASK            0x1f

/****************************************************************
    ISDN Q.931 (Layer 3) Message Types
****************************************************************/ define NO_MESSAGE             0xff
define Q931_PROTOCOL          0x08
define SETUP                  0x05
define SETUP_ACK              0x0d
define CALL_PROCEEDING        0x02
define PROGRESS               0x03
define ALERTING               0x01
define CONNECT                0x07
define CONNECT_ACK            0x0f
define DISCONNECT             0x45
define RELEASE                0x4d
define RELEASE_COMPLETE       0x5a
```

```
define RESTART         0x46
define RESTART_ACK     0x4e
define FACILITY        0x62
define REGISTER        0x64
define NOTIFY          0x6e
define INFO            0x7b
define STATUS          0x7d
define STATUS_ENQUIRY  0x75

/****************************************************************
  NI-1 Supplementary Services Message Types
****************************************************************/ define HOLD            0x24
define HOLD_ACK        0x28
define HOLD_REJ        0x30
define RET             0x31
define RET_ACK         0x33
define RET_REJ         0x37

/****************************************************************
  Network Message Types for AT&T
  These follow the NET_ESCAPE message Type
****************************************************************/ define NET_ESCAPE      0x00 define NET_CONF        0x90
define NET_CONF_ACK    0x91
define NET_CONF_REJ    0x92
define NET_TRANS       0x93
define NET_TRANS_ACK   0x94
define NET_TRANS_REJ   0x95
define NET_ASSOC       0x96
define NET_ASSOC_ACK   0x97
define NET_DROP        0x98
define NET_DROP_ACK    0x99
define NET_DROP_REJ    0x9a
define NET_HOLD        0x9b
define NET_HOLD_ACK    0x9c
define NET_HOLD_REJ    0x9d
define NET_RECONN      0x9e
define NET_RECONN_ACK  0x9f
define NET_RECONN_REJ  0xb0
define NET_REDIRECT    0xb1
define NET_MIM         0xf7

/****************************************************************
  AT&T/NI-1 Information Elements
****************************************************************/ define IE_LOCKING_SHIFT_0   0x90
```

```
define IE_BEARER            0x04
define IE_CAUSE             0x08
define IE_CONNECTED_NUMBER       0x0c
define IE_EX_FACILITY       0x0d
define IE_CALL_STATE        0x14
define IE_CHANNEL_ID        0x18
define IE_FACILITY          0x1c
define IE_PROGRESS_INDICATOR     0x1e
define IE_TERMINAL_CAPABILITIES  0x24
define IE_NOTIFICATION_INDICATOR 0x27
define IE_KEYPAD            0x2c
define IE_INFORMATION_REQUEST    0x32
define IE_SIGNAL            0x34
define IE_SWITCH_HOOK       0x36
define IE_SERVICE_PROFILE_ID     0x3a
define IE_ENDPOINT_ID       0x3b
define IE_CALLING_PARTY_NUMBER   0x6c
define IE_CALLING_PARTY_SUBADDR  0x6d
define IE_CALLED_PARTY_NUMBER    0x70
define IE_CALLED_PARTY_SUBADDR   0x71
define IE_TRANSIT_NETWORK_SEL    0x78
define IE_RESTART_INDICATOR      0x79
define IE_LOW_LAYER_CAP     0x7c
define IE_HIGH_LAYER_CAP    0x7d
define IE_USER_INFO         0x7e
define IE_SENDING_COMPLETE       0xa1
define IE_LOCKING_SHIFT_5        0x95
define IE5_OPERATOR_ACCESS       0x1d
define IE5_DISPLAY_TEXT     0x2a
define IE_LOCKING_SHIFT_6        0x96
define IE6_USER_CODE        0x02
define IE6_LOGICAL_LINK_ID       0x1a
define IE6_ASSOCIATED_TYPE       0x21
define IE6_SELECTED_CA      0x22
define IE6_ORIGINATION_CA   0x23
define IE6_DESTINATION_CA   0x25
define IE6_ENDPOINT_ID      0x26
define IE6_KEYPAD_CONTROL        0x32
define IE6_OTHER_CALL_REF        0x37
define IE6_FEATURE_ACT      0x38
define IE6_FEATURE_IND      0x39
define IE6_ADJUNCT_CONTROL       0x3a
define IE6_DISPLAY_CONTROL       0x3b
define IE6_DISPLAY_FIELD         0x3c
define IE6_PACKET_LAYER_PARAMETERS 0x3e
define IE6_LINK_LAYER_PARAMETERS   0x40
define IE6_CLOSED_USER_GROUP     0x41
define IE6_REVERSE_CHARGING      0x42
define IE6_THROUGHPUT_CLASS      0x62
define IE6_REDIRECTING_SUBADDR   0x75
define IE6_REDIRECTION_NUMBER    0x76
define IE6_MANAGEMENT       0x7a
define IE6_CALL_APPEARANCE       0x7b
```

```
/***************************************************************
    NI-1 Information Element Parameters * NOT YET IMPLEMENTED *
***************************************************************/ define IE_SEGMENTED_MSG        0x00
define IE_FEATURE_ACTIVATION   0x38
define IE_FEATURE_INDICATION   0x39
define IE_INFO_RATE            0x40
define IE_TRANSIT_DELAY        0x42
define IE_TRANSIT_DELAY_SEL    0x43
define IE_PACKET_LAYER_PARAM   0x44
define IE_PACKET_LAYER_WINDOW_SIZE 0x45
define IE_PACKET_SIZE          0x46
define IE_CLOSED_USER_GROUP    0x47
define IE_REVERSE_CHARGING     0x4a define IE_REDIRECTING_NUMBER   0x74
define IE_REDIRECTION_NUMBER   0x76

/***************************************************************
   AT&T Messages * NOT YET IMPLEMENTED *
***************************************************************/ define KEY_HOLD        0xfb
define KEY_REL         0xfc
define KEY_SETUP       0xfd
define KEY_SETUP_ACK   0xfe /***************************************************************
   AT&T Information Element Parameters
***************************************************************/ define EXT_BIT_FLAG    0x80

// Bearer Capability

// Octet 3 define BC_VOICE            0x01
define BC_DATA             0x02
define BC_SPEECH           0x80
define BC_UNRESTRICTED_DATA    0x88
define BC_RESTRICTED_DATA      0x89
define BC_3KHZ             0x90
define BC_7KHZ             0x91

// Octet 4 define BC_CIRCUIT_MODE     0x90
define BC_PACKET_MODE      0xc0

// Called Party Number
```

```
define CPN_LOCAL_ISDN_NO        0xc1

// Calling Party Number define CPN_LOCAL_ISDN_EXT       0x41
define CPN_PRESENTATION         0x81
define CPN_NO_PRESENTATION      0x20

// Restart Indicator define RESTART_IND_CHANNEL      0x80
define RESTART_ALL_CHANNELS     0x87

// Progress Indicator define NATIONAL_STANDARD_LOC    0xc2
define CCITT_STANDARD_LOC       0x82
define TONES_APPLIED            0x88
define INTERFACE_DELAY          0x8a // Cause define CAUSE_1          0x81
define CAUSE_14         0x8e
define CAUSE_16         0x90
define CAUSE_17         0x91
define CAUSE_18         0x92
define CAUSE_21         0x95
define CAUSE_26         0x9a
define CAUSE_28         0x9c
define CAUSE_30         0x9e
define CAUSE_31         0x9f
define CAUSE_34         0xa2
define CAUSE_41         0xa9
define CAUSE_42         0xaa
define CAUSE_44         0xac
define CAUSE_47         0xaf
define CAUSE_52         0xb4
define CAUSE_58         0xba
define CAUSE_65         0xc1
define CAUSE_66         0xc2
define CAUSE_81         0xd1
define CAUSE_86         0xd6
define CAUSE_79         0xcf
define CAUSE_96         0xe0
define CAUSE_97         0xe1
define CAUSE_98         0xe2
define CAUSE_100        0xe4
define CAUSE_101        0xe5
define CAUSE_102        0xe6
define CAUSE_111        0xef // Channel ID
```

```
define CHANNEL_ID_NONE        0x80
define CHANNEL_ID_B1          0x81
define CHANNEL_ID_B2          0x82
define CHANNEL_ID_BOTH        0x83
define CHANNEL_ID_ANY         0x83
define CHANNEL_ID_D           0x84
define CHANNEL_ID_MASK        0x03 define CHANNEL_ID_EXCLUSIVE   0x88

// Call State define CS_NULL                0
define CS_INITIATED           1
define CS_OVERLAP_SEND        2
define CS_OUT_PROCEEDING      3
define CS_DELIVERED           4
define CS_PRESENT             6
define CS_RECEIVED            7
define CS_CONNECT_REQUEST     8
define CS_IN_PROCEEDING       9
define CS_ACTIVE              10
define CS_DISCONNECT_REQUEST  11
define CS_DISCONNECT_INDICATION 12
define CS_RELEASE_REQUEST     19

// Signal define SIGNAL_DIALTONE        0x00
define SIGNAL_RINGBACK        0x01
define SIGNAL_REORDER         0x03
define SIGNAL_BUSY            0x04
define SIGNAL_TONES_OFF       0x3f
define SIGNAL_ALERT_0         0x40

// Display Control define DISP_CTRL_NORMAL       0x10

// Display Field (AT&T)

define FIELD_MODE_NORMAL      0x11
define FIELD_CA               0x01
define FIELD_CALLED_PARTY_ID  0x02
define FIELD_CALLING_PARTY_ID 0x03
define FIELD_CALLED_NAME      0x04
define FIELD_CALLING_NAME     0x05

// Display Text define DISPLAY_TYPE           0x80

// Display Text tags
```

```
define TAG_CALLED_DN          0x83
define TAG_CALLING_DN         0x8b
define TAG_CALLING_NAME       0x8d
define TAG_CALLED_NAME        0x8e
define TAG_CA_ID              0x94

// Switch Hook define ON_HOOK                0x00
define OFF_HOOK               0x01

/****************************************************************
  ISDN Layer 3 Call Status
****************************************************************/ define CALL_HOLD       0x01
define CALL_TRANSFER   0x02
define CALL_CONFERENCE 0x03

/****************************************************************
  Network Message Elements for 5ESS Switch
  Management and Maintenance. These follow the MIM
  message type.
****************************************************************/ define IE_MIE                 0x7a
define MANAGEMENT_PROTOCOL    0x03
define TR_SYNC                0x80
define TR_ASYNC               0x81
define OP_TYPE_UNCONFIRMED    0x80
define OP_TYPE_CONFIRMED      0x90
define OP_TYPE_RETURN_RESULT  0xa0
define OP_TYPE_CONTINUED      0xb0
define OP_TYPE_RETURN_ERROR   0xc0
define OP_TYPE_REJECT         0xd0
define OP_TYPE_ACTION         0x00
define OP_TYPE_EVENT_REPORT   0x01
define OP_TYPE_GET            0x02
define OP_TYPE_SET            0x03
define OP_CODE_INIT_REQUEST   0x81
define OP_CODE_SERVICE_PROFILE 0x80
define OP_CODE_ADDRESS_INFO   0x81
define OP_CODE_CALL_STATUS_INFO 0x84
define OP_CODE_EQUIPMENT_INFO 0x88
define OP_PARAM_ID_ENDPOINT_ID 0x82
define OP_PARAM_SUPPLEMENTARY  0xaa define OP_TYPE_UNCONFIRMED_EVENT_REPORT (OP_TYPE_UNCONFIRMED |
OP_TYPE_EVENT_REPORT)
define OP_TYPE_RETURN_RESULT_SET (OP_TYPE_RETURN_RESULT | OP_TYPE_SET)
define OP_TYPE_CONFIRM_SET (OP_TYPE_CONFIRMED | OP_TYPE_SET)

/****************************************************************
```

```
O/S Setting Identifiers
****************************************************************/ define SWITCH_SETTING      0
define DX25_SETTING        1
define PROVISION_SETTING   2
define DEFAULT_SETTING     3 define CALLER_ID_SETTING   4
define DISPLAY_SETTING     5
define EKTS_SETTING        6
define CONFIG_SETTING      7 define CA_SETTING          8
define HOLD_SETTING        9
define ACO_SETTING         10 define NI1_SWITCH_SET      0
define ATT_SWITCH_SET      1
define DMS_SWITCH_SET      2
define ETSI_SWITCH_SET     3 define HOLD_SET            1
define HOLD_AUTO_SET       2 define CHANNEL_NONE_SET    0
define CHANNEL_B1_SET      1
define CHANNEL_B2_SET      2
define CHANNEL_BOTH_SET    3
define CHANNEL_LPBK_SET    4 define X25_PVC_SET         1
define X25_VC_SET          2

/****************************************************************
  Global Packet/Frame/Message Parsing Constants And Identifiers
****************************************************************/ define PORT1           0x01
define PORT2           0x02
define THIS_PORT       0x01
define OTHER_PORT      0x02
define PORT_MASK       0x80
define BYTE_CNT_MASK   0x7f
define PORT1_BIT       0x00
define PORT2_BIT       0x80
define CALL_REF_FLAG   0x80
define CALL_REF_MASK   0x7f
define GLOBAL_CALL     0x00 define HEADER_POS      0
define SAPI_POS        1
define CR_POS          1
```

```
define TEI_POS              2
define FRAME_FORMAT_POS     3
define S_FRAME_POS          3
define U_FRAME_POS          3
define U_PF_POS             3
define NS_POS               3
define NR_POS               4
define I_PF_POS             4
define S_PF_POS             4
define CONTROLLER_POS       4
define PROTOCOL_POS         5
define RANDOM1_POS          5
define CREF_LENGTH_POS      6
define RANDOM2_POS          6
define X25_CHANNEL_POS      6
define CREF_NUMBER_POS      7
define TEI_MSG_POS          7
define X25_PACKET_TYPE_POS  7
define SAC_TEI_POS          8
define X25_ADDR_LENGTH_POS  8
define MSG_TYPE_POS         8
define NET_MSG_TYPE_POS     9
define FIRST_IE_POS         9
define FIRST_NET_IE_POS     10
define NET_OP_TYPE_POS      15
define NET_OP_CODE_POS      16
define NET_PARAM_POS        17
define SPID_POS             19 define FRAME_FORMAT         0x03
define I_FRAME_TYPE         0x01
define U_FRAME_TYPE         0xef
define S_FRAME_TYPE         0x02
define SAC_FRAME_TYPE       0x0f define NR_MASK              0xfe
define CR_MASK              0x02
define I_POLL_MASK          0x01
define S_POLL_MASK          0x01
define U_POLL_MASK          0x10 define DIR_XMT              0x01
define DIR_RCV              0x02 define DEFAULT_SCA          0x01

/***************************************************************
  ISDN Q.921 (Layer 2) Frame Types, Delimiters, and Commands
 ***************************************************************/ define FLAG_PATTERN         0x7e define SAPI_ID              0xfc
```

```
define SAPI_0              0x00
define SAPI_16             0x40
define SAPI_63             0xfc
define BROADCAST_TEI       0x7f
define CMD_FLAG            0x02 define I_FRAME             0x00
define S_FRAME             0x01
define U_FRAME             0x03 define RR                  0x01
define RNR                 0x05
define REJ                 0x09 define SABME               0x6f
define DM                  0x0f
define UI                  0x03
define DISC                0x43
define UA                  0x63
define FRMR                0x87
define XID                 0xaf define SAC_CTRL            0x0f
define ID_REQUEST          0x01
define ID_ASSIGNED         0x02
define ID_DENIED           0x03
define ID_CHECK_REQUEST    0x04
define ID_CHECK_RESPONSE   0x05
define ID_REMOVE           0x06
define ID_VERIFY           0x07

/***************************************************************
  Inter-Layer State Table Primitives
***************************************************************/ define TEI_UNASSIGN        1
define ASSIGN_WAIT_TEI     2
define EST_WAIT_TEI        3
define TEI_ASSIGNED        4
define AWAIT_EST           5
define AWAIT_REL           6
define MF_EST_NORM         70
define MF_EST_REJ          71
define MF_EST_BUSY         72
define TM_REC_NORM         80
define TM_REC_REJ          81
define TM_REC_BUSY         82

/***************************************************************
  Inter-Layer Type And Activity Primitives
***************************************************************/

/* Types */
```

```
define RESPONSE           0x01
define INDICATION         0x02

/* Activities */ define DL_NULL                   0x00
define DL_ESTABLISH              0x01
define DL_RELEASE                0x02
define DL_DATA_INDICATION        0x03
define DL_DATA_RESPONSE          0x04
define DL_UNIT_DATA              0x05
define MDL_ASSIGN_INDICATION     0x06
define MDL_ASSIGN_REQUEST        0x07
define MDL_ERROR_INDICATION      0x08
define MDL_ERROR_RESPONSE        0x09
define MDL_RELEASE               0x0a
define MDL_REMOVE_REQUEST        0x0b
define MDL_REMOVE_INDICATE       0x0c
define MDL_UNIT_DATA_INDICATION  0x0d
define MDL_UNIT_DATA_REQUEST     0x0e
define MDL_CHECK_REQUEST         0x0f
define MDL_VERIFY_REQUEST        0x10
define MDL_CHECK_RESPONSE        0x11
define MDL_UNIT_DATA_RESPONSE    0x12
define PH_DEACTIVATE             0x13
define PH_ACTIVATE               0x14

/* add XID primitives here */

/******************************************************************
  Inter-Layer Error Condition Codes
 ******************************************************************/

// Layer 1 Errors define LOG_ERR_NO_ERRORS         0xff
define LOG_ERR_NO_PACKET         0xfe
define LOG_ERR_TIMEOUT           0xfc
define LOG_ERR_INTERFACE_CHANGE  0xfb // Layer 2 Errors define LOG_ERR_INVALID_REQUEST   0xef
define LOG_ERR_UNDEFINED_SAP     0xee
define LOG_ERR_UNDEFINED_FRAME   0xed
define LOG_ERR_NO_TEI_AVAIL      0xec
define LOG_ERR_LAYER1_FAIL       0xeb
define LOG_ERR_TEI_LIMIT_EXCEEDED 0xea
define LOG_ERR_LOCAL_BUSY        0xe9
define LOG_ERR_TEI_INACTIVE      0xe8
define LOG_ERR_NOT_SUPPORTED     0xe7
define LOG_ERR_T200_EXPIRE       0xe6
define LOG_ERR_T203_EXPIRE       0xe5
```

```
define LOG_ERR_LC_LIMIT_EXCEEDED  0xe4
define LOG_ERR_MSG_QUEUE_FULL     0xe3
define LOG_ERR_NR_ERROR           0xe2
define LOG_ERR_MSG_QUEUE_EMPTY    0xe1
define LOG_ERR_UNKNOWN_PROTOCOL   0xe0
define LOG_ERR_NO_ACK             0xdf
define LOG_ERR_UNDEFINED_PORT     0xde
define LOG_ERR_L1_XMT_BUSY        0xdd
define LOG_ERR_FATAL_INT0         0xdc
define LOG_ERR_INT0_RCV_RESET     0xdb
define LOG_ERR_INT0_RCV_MSG_LOST  0xda
define LOG_ERR_INT0_XDU           0xd9
define LOG_ERR_INT0_XDU_XPR       0xd8

// Layer 3 Errors define LOG_ERR_UNKNOWN_MSG        0xdf

/*****************************************************************
    Layer 3 Timers
*****************************************************************/

// Timer Types define TIMER_T301        0x01
define TIMER_T303        0x03
define TIMER_T305        0x05
define TIMER_T306        0x06
define TIMER_T308        0x08
define TIMER_T309        0x09
define TIMER_T310        0x0a
define TIMER_T312        0x0c
define TIMER_T400        0x0d
define TIMER_T401        0x0e
define TIMER_T408        0x0f // Timer Times define T301_TIME         100
define T303_TIME         400
define T305_TIME         500
define T306_TIME         3000
define T308_TIME         400
define T309_TIME         100
define T310_TIME         100
define T312_TIME         (T303_TIME + 200)
define T400_TIME         1600
define T401_TIME         300
define T408_TIME         3000
```

```
/****************************************************************

ISDN 2000 Central Office Emulator

System Input/Output Module Definitions (c) 1994 Merge Technologies Inc.

****************************************************************/

XUCHAR gEmulateEsc =   KBD_NULL;
XUCHAR gKbdBuffer =    KBD_NULL;

IUCHAR gRemote =       FALSE;      // Added 11/17/94 to support serial i/o
IUCHAR gTraceOn =      FALSE;      // Added 11/17/94 to support serial i/o XUCHAR gKeyPressed =   FALSE;
XUCHAR gXmtBusy =      FALSE;      // Added 11/17/94 to support serial i/o
XUCHAR gRemCmd =       FALSE;      // Added 11/17/94 to support serial i/o
XUCHAR gRemSet =       FALSE;      // Added 11/17/94 to support serial i/o
XUCHAR gRemParam =     FALSE;      // Added 11/17/94 to support serial i/o XUCHAR pEocStr[MAX_EOC_STRING];    // Added 4/12/95 to support EOC (M) command XUCHAR RcvBuffer[MAX_DESCRIPT_LENGTH];  // Added 11/17/94 to support serial i/o
XUCHAR XmtBuffer[MAX_DISP_WIDTH];       // Added 11/17/94 to support serial i/o
XUCHAR RcvIndex = 0;               // Added 11/17/94 to support serial i/o
XUCHAR XmtIndex = 0;               // Added 11/17/94 to support serial i/o /****************************************************************
  Display Cursor Positioning Lookup Table
****************************************************************/

UCHAR code CursorMap [MAX_DISPLAY_ROWS][MAX_DISPLAY_COLUMNS] = {

{0x00,0x01,0x02,0x03,0x04,0x05,0x06,0x07,0x08,0x09,
 0x0a,0x0b,0x0c,0x0d,0x0e,0x0f,0x10,0x11,0x12,0x13,},
{0x20,0x21,0x22,0x23,0x24,0x25,0x26,0x27,0x28,0x29,
 0x2a,0x2b,0x2c,0x2d,0x2e,0x2f,0x30,0x31,0x32,0x33,},
{0x40,0x41,0x42,0x43,0x44,0x45,0x46,0x47,0x48,0x49,
 0x4a,0x4b,0x4c,0x4d,0x4e,0x4f,0x50,0x51,0x52,0x53,},
{0x60,0x61,0x62,0x63,0x64,0x65,0x66,0x67,0x68,0x69,
 0x6a,0x6b,0x6c,0x6d,0x6e,0x6f,0x70,0x71,0x72,0x73,}

};

/****************************************************************
  RTC Enable and Initialization Sequences
****************************************************************/

UCHAR code EnableSequence[MAX_RTC_REG] = {

0xc5, 0x3a, 0xa3, 0x5c, 0xc5, 0x3a, 0xa3, 0x5c};
```

```c
UCHAR code RTCData[MAX_RTC_REG] = {

0x00, 0x00, 0x00, 0x01, 0x11, 0x01, 0x01, 0x94};

/****************************************************************
    Keypad Key Assignments
****************************************************************/ define KEYPAD_1    0x00    //Upper Left Position
define KEYPAD_2    0x01
define KEYPAD_3    0x02
define KEYPAD_4    0x03
define KEYPAD_5    0x04
define KEYPAD_6    0x05
define KEYPAD_7    0x06
define KEYPAD_8    0x07
define KEYPAD_9    0x08
define KEYPAD_10   0x09
define KEYPAD_11   0x0a
define KEYPAD_12   0x0b
define KEYPAD_13   0x0c
define KEYPAD_14   0x0d
define KEYPAD_15   0x0e
define KEYPAD_16   0x0f    //Bottom Right Position /****************************************************************
    Serial/Printer Port Control Constants
****************************************************************/ define SERIAL_BS   0x08
define SERIAL_CR   0x0d
define SERIAL_LF   0x0a
define SERIAL_XON  0x11
define SERIAL_XOFF 0x13
define CAP_MASK    0xdf /****************************************************************
    Display Control Constants
****************************************************************/ define CURSOR_OFF 0x0e
define CURSOR_ON 0x0f
define RST 0x14
define CLR 0x15
define AUTO_CR_OFF 0x12
define CR_LF 0x0a
define HME 0x16
define CURSOR_MOVE 0x1b
define BK_SP 0x08
define LINE_1 0x00
define LINE_2 0x20
define LINE_3 0x40
define LINE_4 0x60
```

```c
/******************************************************************
  RTC Constants
******************************************************************/ define RTC_INPUT 0x01
```

```
/****************************************************************
    ISDN 2000 Central Office Emulator Layer 1 Module Constants and Definitions (c) 1994 Merge Technologies Inc.
****************************************************************/

/****************************************************************
    Packet processing constants
****************************************************************/ define L1_ONE_SECOND    587 define L1_D_BITS        0x3f
define L1_D_MASK        0xc0
define L1_D_BIT         0x80

/****************************************************************
    Packet header (byte 0) masks and constants
****************************************************************/ define L1_PACKET_PORT   0x80
define L1_PACKET_CNT    0x7f
define L1_PORT1         0x00
define L1_PORT2         0x80
```

```
/****************************************************************

ISDN 2000 Central Office Emulator

Layer 2 Module Constants and Definitions (c) 1994 Merge Technologies Inc.

****************************************************************/

UCHAR DoMsgQueue (

UCHAR QueueCommand,
    PUCHAR pInputBuffer,
    PUINT pByteCnt);

void MakeFrame (

UCHAR Command,
    PUCHAR pMakeBuffer,
    PUINT pByteCnt);

/****************************************************************
   Layer 2 module global variables
****************************************************************/

CUCHAR ActivePort[MAX_LC] = {

PORT1,
    PORT2,
    PORT1,
    PORT1,
    PORT1,
    PORT1,
    PORT2,
    PORT2,
    PORT2,
    PORT2
};

CUCHAR ActiveSAPI[MAX_LC] = {

SAPI_63,
    SAPI_63,
    SAPI_0,
    SAPI_0,
    SAPI_16,
    SAPI_16,
    SAPI_0,
    SAPI_0,
    SAPI_16,
    SAPI_16
};
```

```
XUCHAR ActiveTEI[MAX_LC];
XUCHAR VR[MAX_LC];
XUCHAR VA[MAX_LC];
XUCHAR VS[MAX_LC];
XUCHAR RC[MAX_LC];
XUCHAR PollMode[MAX_LC];
XUCHAR LapdState[MAX_LC];
XUCHAR LapdType[MAX_LC];
XUCHAR LapdActivity[MAX_LC];
XUCHAR CRbit[MAX_LC];
XUCHAR UserBusy[MAX_LC];
XUCHAR LCMsgInQueue[MAX_LC];

XUCHAR TeiChecked[MAX_LC];

XUCHAR gLCindex;
XUCHAR gLastLC;
XUCHAR gRandom1;
XUCHAR gRandom2;
XUCHAR gCheckTei;
XUCHAR gCheckPort;
XUCHAR gCheckBusy;
XUCHAR gCheckResponse;
XUINT  gCheckTime;
XUCHAR gAckPending;

XUCHAR gMsgInQueue;
XUCHAR gLCMsgInQueue;
XUCHAR gNextInputMsg[MAX_LC];
XUCHAR gNextOutputMsg[MAX_LC];
XUCHAR LCMsgQueue[MAX_LC][MAX_MSG_QUEUE][MAX_MSG_LENGTH];
XUINT  LCMsgBytes[MAX_LC][MAX_MSG_QUEUE];
XUCHAR LCMsgNumber[MAX_LC][MAX_MSG_QUEUE];

XUCHAR pLCXmtBuffer[MAX_MSG_LENGTH];
XUCHAR pLCRcvBuffer[MAX_MSG_LENGTH];
XUINT  LCRcvBytes;
XUINT  LCXmtBytes;
XPXUINT pLCRcvBytes;
XPXUINT pLCXmtBytes;

UCHAR gActivePort;
UCHAR gActiveSAPI;
UCHAR gActiveTEI;
UCHAR gVR;
UCHAR gVA;
UCHAR gVS;
UCHAR gPollMode;
XUCHAR gAssignedTEI;
XUCHAR gLapdState;
XUCHAR gLapdType;
XUCHAR gLapdActivity;
XUCHAR gCRbit;
```

```
XUCHAR gUserBusy;

/****************************************************************
   SAC Unnumbered Information (UI) message types
****************************************************************/ define UI_TEI_REQUEST    0x01
define UI_TEI_ASSIGNED   0x02
define UI_TEI_DENIED     0x03
define UI_TEI_CHK_RQST   0x04
define UI_TEI_CHK_RESP   0x05
define UI_TEI_REMOVE     0x06
define UI_TEI_VERIFY     0x07 define L2_TEI_NO_SERVICE 0x00
define L2_TEI_DISABLED   0x01
define L2_TEI_INACTIVE   0x02
define L2_TEI_ACTIVE     0x03 define L2_EA_BIT_SET     0x01 define L2_LC_XMT_BUFFER  0x01
define L2_LC_RCV_BUFFER  0x02 define L2_CC_RESPONSE    0x01
define L2_CC_REQUEST     0x02
define L2_CC_INDICATE    0x03
define L2_CC_CONFIRM     0x04 define L2_SAC_CONT_ID    0x0f
define L2_SAC_TEI_EA     0xff

/****************************************************************
   MakeFrame command constants
****************************************************************/ define MAKE_RR           0x00
define MAKE_RNR          0x01
define MAKE_REJ          0x02
define MAKE_SABME        0x03
define MAKE_DM           0x04
define MAKE_UI_SETUP     0x05
define MAKE_UI_TEI_ASSIGN 0x06
define MAKE_UI_TEI_DENIED 0x07
define MAKE_UI_TEI_CHECK  0x08
define MAKE_UI_TEI_REMOVE 0x09
define MAKE_DISC         0x0a
define MAKE_UA           0x0b
define MAKE_FRMR         0x0c
define MAKE_XID          0x0d
define MAKE_IFRAME_HEADER 0x0e
```

```
/****************************************************************
    DoMsgQueue command constants
****************************************************************/ define QUEUE_INIT          0x01
define QUEUE_PUT_MSG       0x02
define QUEUE_PUT_UI_MSG    0x03
define QUEUE_GET_LC_MSG    0x04
define QUEUE_GET_ANY_MSG   0x05
define QUEUE_REMOVE_MSG    0x06
define QUEUE_CLEAR_LC      0x07
```

```
/***************************************************************
ISDN 2000 Central Office Emulator Layer 3 Module Constants and Definitions (c) 1994 Merge Technologies Inc.
***************************************************************/

/***************************************************************
Layer 3 Global Variables
***************************************************************/

XUINT   gL3RcvBytes;
XUINT   gL3XmtBytes;
XPXUINT pL3RcvBytes;
XPXUINT pL3XmtBytes;
XUCHAR  pL3RcvMessage[MAX_MSG_LENGTH];
XUCHAR  pL3XmtMessage[MAX_MSG_LENGTH];

PCHAR  pP1DN;
PCHAR  pP2DN;
PCHAR  pP1StatDisplay;
PCHAR  pP2StatDisplay;
XUCHAR gP1DisplayMsg;
XUCHAR gP2DisplayMsg;
XUCHAR gAlertingTei[3];

/***************************************************************
SendNetMsg Function Commands
***************************************************************/ define MSG_TE_INIT       0x01
define MSG_TE_RESTRICT   0x02
```

```
/****************************************************************

ISDN 2000 Central Office Emulator

Monitor Functions Module Constants and Definitions (c) 1994 Merge Technologies Inc.

****************************************************************/

/****************************************************************
Typedefs and structures
****************************************************************/

/****************************************************************
Constants
****************************************************************/ define MON_UM2         0x00
define MON_UM3         0x01
define MON_DS          0x02 define MON_INFO        0x00
define MON_QSBITS      0x01
define MON_LBITS       0x02 define MON_ACT         0x08
define MON_PS1         0x01
define MON_FEBE        0x40
define MON_PS2         0x20
define MON_NTM         0x10
define MON_CSO         0x08
define MON_SAI         0x02
define MON_NIB         0x01
define MON_NEBE        0x80
define MON_XACT        0x40
define MON_OOF         0x08
define MON_EOC_MASK    0xf0
define MON_EOC_LBB1    0x10
define MON_EOC_LBB2    0x20
define MON_EOC_RCRC    0x30
define MON_EOC_NCRC    0x40
define MON_EOC_NORM    0xf0
define MON_EOC_HOLD    0x00
define MON_EOC_UNABLE  0xa0 define MON_REC_MASK    0x03
define MON_REC_INFO0   0x00
define MON_REC_INFO1   0x01
define MON_REC_INFO3   0x02
```

```
define MON_XMT_MASK    0x30
define MON_XMT_INFO0   0x00
define MON_XMT_INFO1   0x10
define MON_XMT_INFO2   0x20
define MON_XMT_INFO4   0x30 define MON_SBIT_MASK   0x0f
define MON_SBIT_NORM   0x00
define MON_SBIT_PWR    0x0f
define MON_SBIT_LB1    0x0b
define MON_SBIT_LB2    0x0d
define MON_SBIT_LOSSR  0x05
define MON_SBIT_LPBK   0x09
define MON_SBIT_TEST   0x0e
define MON_SBIT_PASS   0x02
define MON_SBIT_FAIL   0x01 define MON_QBIT_MASK   0xf0
define MON_QBIT_NORM   0xf0
define MON_QBIT_PWR    0x00
define MON_QBIT_RQST   0x80
define MON_QBIT_LB1    0xe0
define MON_QBIT_LB2    0xd0
define MON_QBIT_LPBK   0xc0 define MON_LPBK_MASK   0x0f
define MON_LPBK_NORM   0x0f
define MON_LPBK_B1     0x01
define MON_LPBK_B2     0x02
define MON_LPBK_D      0x03
define MON_LPBK_2BD    0x04
define MON_LPBK_B1B2   0x0d
```

```
/****************************************************************

ISDN 2000 Central Office Emulator

Layer 3 Messages (c) 1994 Merge Technologies Inc.

****************************************************************/

/****************************************************************
  These globals support REPEAT Info Elements.
  Inititalized by ReadMsgData () and WriteMsgData ();
  Used by GetIeIndex ()
****************************************************************/

XUCHAR gLastIeType;
XUCHAR gIeRepeatCnt;

/****************************************************************
  Pointer Table to Message/IE Lookup Tables
****************************************************************/

XPCUCHAR MsgPtrTable[MAX_MSG_TYPES];
```

```
/****************************************************************
  ISDN 2000 Central Office Emulator Register and Port Definitions (c) 1994 Merge Technologies Inc.

****************************************************************/

/****************************************************************
  Constant RAM Addresses for Settings Variables in COE_SET.C
****************************************************************/ define PTR_SWITCH_TYPE   ((PXUCHAR) 0x7ff0L)
define PTR_DX25          ((PXUCHAR) 0x7ff1L)
define PTR_PROVISION     ((PXUCHAR) 0x7ff2L)
define PTR_DEFAULTS      ((PXUCHAR) 0x7ff3L)

define PTR_CALLER_ID     ((PXUCHAR) 0x7ff4L)
define PTR_DISPLAY       ((PXUCHAR) 0x7ff5L)
define PTR_EKTS          ((PXUCHAR) 0x7ff6L)
define PTR_CONFIG        ((PXUCHAR) 0x7ff7L)

define PTR_TOTAL_CA      ((PXUCHAR) 0x7ff8L)
define PTR_HOLD          ((PXUCHAR) 0x7ff9L)
define PTR_ACO           ((PXUCHAR) 0x7ffaL)

define PTR_NEXT_TEI      ((PXUCHAR) 0x7ffbL)

/****************************************************************
  T7270 (U4) Time Slot Interchanger Registers
****************************************************************/ define CHI_BASE_ADDR       ((PXUCHAR) 0x8100L)
define CHI_HWY_SEL         (CHI_BASE_ADDR + 0x08)
define CHI_REC_IN          (CHI_BASE_ADDR + 0x09)
define CHI_CONFIG_XMT_HWY  (CHI_BASE_ADDR + 0x0a)
define CHI_ALTDATA_OUT     (CHI_BASE_ADDR + 0x0b)

define CHI_HWY0_BASE       (CHI_BASE_ADDR + 0x10)
define CHI_HWY1_BASE       (CHI_BASE_ADDR + 0x14)
define CHI_HWY2_BASE       (CHI_BASE_ADDR + 0x18)
define CHI_HWY3_BASE       (CHI_BASE_ADDR + 0x1c)

/****************************************************************
  T7254 (U3) S/T Interface Registers
****************************************************************/ define ST_BASE         ((PXUCHAR) 0x8000L)
define ST_PORT1_BASE   (ST_BASE + 0x13)
define ST_PORT2_BASE   (ST_BASE + 0x23)
define ST_PORT3_BASE   (ST_BASE + 0x33)
```

```
define ST_PORT4_BASE    (ST_BASE + 0x43)

define ST_PORT1_REG7    (ST_BASE + 0x17)
define ST_PORT2_REG7    (ST_BASE + 0x27)
define ST_PORT1_REG15   (ST_BASE + 0x1f)
define ST_PORT2_REG15   (ST_BASE + 0x2f)

/****************************************************************
  PEB 2075 IDEC (U25) Registers
****************************************************************/ define IDEC_CCR  ((PXUCHAR)0x8237L)
define IDEC_ACR  ((PXUCHAR)0x8234L)
define IDEC_VISR ((PXUCHAR)0x8236L)
define IDEC_VISM ((PXUCHAR)0x8236L)

define IDEC_HWY0_BASE ((PXUCHAR)0x8200L)
define IDEC_HWY1_BASE ((PXUCHAR)0x8240L)
define IDEC_HWY2_BASE ((PXUCHAR)0x8280L)
define IDEC_HWY3_BASE ((PXUCHAR)0x82c0L)

/****************************************************************
  8051 Port 1 Assignments (ISDN 2000A)
****************************************************************/ sbit DISPLAY_BUSY =   0x97;
sbit ENABLE_DISPLAY = 0x96;
sbit FRAME_SYNC =     0x95;
sbit PTR_BUSY =       0x94;
sbit NOT_USED_1 =     0x93;
sbit NOT_USED_2 =     0x92;
sbit ENABLE_TONE =    0x91;
sbit RESET_ALL =      0x90;

/****************************************************************
  RAM Starting Address
****************************************************************/ define RAM_START_ADDR ((PXUCHAR)0x0000L)

/****************************************************************
  Display and Tone Generator Output Address
****************************************************************/ define NULL_ADDR ((PXUCHAR)0x7fefL)

/****************************************************************
  Real-Time Clock (RTC) Output Address
****************************************************************/ define PTR_RTC ((PXUCHAR)0x7feeL)

/****************************************************************
  8051 Special Function Registers
```

```
/****************************************************************/ sfr P0   = 0x80;
sfr P1   = 0x90;
sfr P2   = 0xA0;
sfr P3   = 0xB0;
sfr PSW  = 0xD0;
sfr ACC  = 0xE0;
sfr B    = 0xF0;
sfr SP   = 0x81;
sfr DPL  = 0x82;
sfr DPH  = 0x83;
sfr PCON = 0x87;
sfr TCON = 0x88;
sfr TMOD = 0x89;
sfr TL0  = 0x8A;
sfr TL1  = 0x8B;
sfr TH0  = 0x8C;
sfr TH1  = 0x8D;
sfr IE   = 0xA8;
sfr IP   = 0xB8;
sfr SCON = 0x98;
sfr SBUF = 0x99;

sbit CY  = 0xD7;
sbit AC  = 0xD6;
sbit F0  = 0xD5;
sbit RS1 = 0xD4;
sbit RS0 = 0xD3;
sbit OV  = 0xD2;
sbit P   = 0xD0;

sbit TF1 = 0x8F;
sbit TR1 = 0x8E;
sbit TF0 = 0x8D;
sbit TR0 = 0x8C;
sbit IE1 = 0x8B;
sbit IT1 = 0x8A;
sbit IE0 = 0x89;
sbit IT0 = 0x88;

sbit EA  = 0xAF;
sbit ES  = 0xAC;
sbit ET1 = 0xAB;
sbit EX1 = 0xAA;
sbit ET0 = 0xA9;
sbit EX0 = 0xA8;

sbit PS  = 0xBC;
sbit PT1 = 0xBB;
sbit PX1 = 0xBA;
sbit PT0 = 0xB9;
sbit PX0 = 0xB8;
```

```
sbit RD   = 0xB7;
sbit WR   = 0xB6;
sbit CTS  = 0xB5;
sbit T0   = 0xB4;
sbit INT1 = 0xB3;
sbit INT0 = 0xB2;
sbit TXD  = 0xB1;
sbit RXD  = 0xB0;

sbit SM0  = 0x9F;
sbit SM1  = 0x9E;
sbit SM2  = 0x9D;
sbit REN  = 0x9C;
sbit TB8  = 0x9B;
sbit RB8  = 0x9A;
sbit TI   = 0x99;
sbit RI   = 0x98;
```

```
/****************************************************************

ISDN 2000 Central Office Emulator

Settings Module Global Variables (c) 1994 Merge Technologies Inc.

****************************************************************/

/****************************************************************
   Setting Pointers
****************************************************************/

PXUCHAR code pSwitchTypeSet =  PTR_SWITCH_TYPE;
PXUCHAR code pDX25Set =        PTR_DX25;
PXUCHAR code pProvision =      PTR_PROVISION;
PXUCHAR code pDefaultSet =     PTR_DEFAULTS;

PXUCHAR code pCallerIDSet =    PTR_CALLER_ID;
PXUCHAR code pDisplaySet =     PTR_DISPLAY;
PXUCHAR code pEKTSSet =        PTR_EKTS;
PXUCHAR code pConfigSet =      PTR_CONFIG;

PXUCHAR code pTotalCASet =     PTR_TOTAL_CA;
PXUCHAR code pHoldSet =        PTR_HOLD;
PXUCHAR code pACOSet =         PTR_ACO;

/****************************************************************
   Table of Setting Pointers
****************************************************************/

PXUCHAR code pCurrentSettings[MAX_SETTINGS] = {

PTR_SWITCH_TYPE,
   PTR_DX25,
   PTR_PROVISION,
   PTR_DEFAULTS,
   PTR_CALLER_ID,
   PTR_DISPLAY,
   PTR_EKTS,
   PTR_CONFIG,
   PTR_TOTAL_CA,
   PTR_HOLD,
   PTR_ACO
};

/****************************************************************
   Table of Setting Names
****************************************************************/
```

```
UCHAR code pszSetNames[MAX_SETTINGS][MAX_LABEL_LENGTH] = {

{"SWITCH TYPE: "},
    {"DX25 PHF:    "},
    {"NAIL UP:     "},
    {"DEFAULTS:    "},
    {"CALLER ID:   "},
    {"DISPLAY:     "},
    {"EKTS:        "},
    {"MULTI-POINT: "},
    {"CACH:        "},
    {"HDTC:        "},
    {"ACO:         "}
};

/****************************************************************
 Table of Setting Limits
****************************************************************/

UCHAR code SetLimits[MAX_SETTINGS] = {

MAX_SWITCH_SETTINGS,
    MAX_DX25_SETTINGS,
    MAX_PROVISION_SETTINGS,
    MAX_DEFAULT_SETTINGS,
    MAX_CALLER_ID_SETTINGS,
    MAX_DISPLAY_SETTINGS,
    MAX_EKTS_SETTINGS,
    MAX_CONFIG_SETTINGS,
    MAX_CA_SETTINGS,
    MAX_HOLD_SETTINGS,
    MAX_ACO_SETTINGS
};

/****************************************************************
 Tables of Possible Values For Each Setting
****************************************************************/

UCHAR code pszSwitchTypes[MAX_SWITCH_SETTINGS][MAX_SETTING_LENGTH] = {

{"NI-1"},{"AT&T"},{"DMS "},{"ETSI"}
};

UCHAR code pszDefaults[MAX_DEFAULT_SETTINGS][MAX_SETTING_LENGTH] = {

{"NO "},{"YES"}
};

UCHAR code pszConfig[MAX_CONFIG_SETTINGS][MAX_SETTING_LENGTH] = {

{"NO "},{"YES"}
};

UCHAR code pszProvision[MAX_PROVISION_SETTINGS][MAX_SETTING_LENGTH] = {
```

```
  {"NONE"},{"B1 "},
  {"B2 "},{"BOTH"},{"LPBK"}
};

UCHAR code pszDX25[MAX_DX25_SETTINGS][MAX_SETTING_LENGTH] = {

{"OFF "},{"PVC "},{"SVC "}
};

UCHAR code pszDisplay[MAX_DISPLAY_SETTINGS][MAX_SETTING_LENGTH] = {

{"OFF"},{"ON "}
};

UCHAR code pszCallerID[MAX_CALLER_ID_SETTINGS][MAX_SETTING_LENGTH] = {

{"OFF"},{"ON "}
};

UCHAR code pszEKTS[MAX_EKTS_SETTINGS][MAX_SETTING_LENGTH] = {

{"OFF"},{"ON "}
};

UCHAR code pszHold[MAX_HOLD_SETTINGS][MAX_SETTING_LENGTH] = {

{"OFF "},{"DROP"},{"HOLD"}
};

UCHAR code pszTotalCA[MAX_CA_SETTINGS][MAX_SETTING_LENGTH] = {

{"OFF"}, {"1 "}, {"2 "},
  {"3 "}, {"4 "}, {"5 "},
  {"6 "}, {"7 "}, {"8 "},
  {"9 "}, {"10 "}, {"11 "},
  {"12 "}, {"13 "}, {"14 "},
  {"15 "}
};

UCHAR code pszACO[MAX_ACO_SETTINGS][MAX_SETTING_LENGTH] = {

{"OFF"},{"ON "}
};

PUCHAR code pSettingArrays[MAX_SETTINGS] = {

{pszSwitchTypes[0]},
  {pszDX25[0]},
  {pszProvision[0]},
  {pszDefaults[0]},
  {pszCallerID[0]},
  {pszDisplay[0]},
  {pszEKTS[0]},
```

```
    {pszConfig[0]},
    {pszTotalCA[0]},
    {pszHold[0]},
    {pszACO[0]}
};
```

```
/****************************************************************

ISDN 2000 Central Office Emulator

Switch Control Module Constants and Definitions (c) 1994 Merge Technologies Inc.

****************************************************************/

/****************************************************************
  IDEC Buffers and Pointers
****************************************************************/

XUCHAR  gActiveHwys;
XUCHAR  gOldHwys;
XUCHAR  gP1BusyChan;
XUCHAR  gP2BusyChan;
XUCHAR  gOldProvision;

// IDEC Input/Output Buffers

XUCHAR  gInBufferPtr;
XUCHAR  gInBuffer[MAX_INPUT_BUFFERS][MAX_MSG_LENGTH];
XUINT   gInBytes[MAX_INPUT_BUFFERS];
XUINT   gInBufferIndex[MAX_INPUT_BUFFERS];
XUCHAR  gInBufferStatus[MAX_INPUT_BUFFERS];

XUCHAR  gOutBufferPtr;
XUCHAR  gOutBuffer[MAX_OUTPUT_BUFFERS][MAX_MSG_LENGTH];
XUINT   gOutBytes[MAX_OUTPUT_BUFFERS];
XUINT   gOutBufferIndex[MAX_OUTPUT_BUFFERS];
XUCHAR  gOutBufferStatus[MAX_OUTPUT_BUFFERS];

XUCHAR  gIdecXPR1;
XUCHAR  gIdecXPR2;

/****************************************************************
  Typedefs and structures
****************************************************************/ struct HWY_CONFIG {

PUCHAR  RegBaseAddr;
    UCHAR   Status;
    UCHAR   Type;
    UCHAR   HwyID;
};

UCHAR code ChanID[MAX_HIGHWAYS][MAX_TIME_SLOTS] = {

{0x00, 0x01, 0x02, 0x03, 0x04, 0x05, 0x06, 0x07},
    {0x00, 0x01, 0x02, 0x03, 0x04, 0x05, 0x06, 0x07},
```

```
    {0x00, 0x01, 0x02, 0x03, 0x04, 0x05, 0x06, 0x07},
    {0x03, 0x04, 0x05, 0x06, 0x07, 0x00, 0x01, 0x02}
};

UCHAR code AltHwyData[MAX_HIGHWAYS][MAX_TIME_SLOTS] = {
    {0xff,0xff,0xff,0xff,0x1f,0xff,0xff,0xa4},  // SKSI bit low
    {0xff,0xff,0xff,0xff,0x1f,0xff,0xff,0xa4},
    {0xff,0xff,0xff,0xff,0xff,0xff,0xff,0xff},
    {0xff,0xff,0xff,0xff,0xff,0xff,0xff,0xff}
};

PUCHAR code pStInitReg[MAX_ST_REG] = {

ST_PORT1_BASE,
                ST_PORT2_BASE,
                ST_PORT3_BASE,
                ST_PORT4_BASE };

// Rcv uses negative clock edge
                            // And Adaptive Timing mode
                            // CHANGED: 3/21 (Silent)
UCHAR code StGlobalData[6] = {

0x1e, 0x16, 0x07, 0x07, 0x00, 0x70 };    //0x1e, 0x9f, 0x07, 0x07, 0x00, 0x70 };

UCHAR code StRegData[2][12] = {
    {0x00, 0x0f, 0x00, 0x00, 0x62, 0x00,
     0x80, 0x81, 0x82, 0x80, 0x81, 0x82},
    {0x00, 0x0f, 0x00, 0x00, 0x62, 0x00,
     0x43, 0x44, 0x45, 0xc3, 0xc4, 0xc5}
};

/***************************************************************
  Hwy Status Constants
***************************************************************/ define STATUS_HWY0     0x01
define STATUS_HWY1     0x02
define STATUS_HWY2     0x04
define STATUS_HWY3     0x08

UCHAR code HwyStatusByte[MAX_HIGHWAYS] = { STATUS_HWY0,
                            STATUS_HWY1,
                            STATUS_HWY2,
                            STATUS_HWY3 };
```

```
/****************************************************************

ISDN 2000 Central Office Emulator

Trace Module Definitions (c) 1994 Merge Technologies Inc.

****************************************************************/

/****************************************************************
    Constants
****************************************************************/ define TRC_L2_TRACE    0x02
define TRC_L3_TRACE    0x03
define TRC_REM_TRACE   0x04
```

```
/******************************************************************
ISDN 2000 Central Office Emulator Exported Functions and Data Pointers From COE_DB.C (c) 1994 Merge Technologies Inc.

******************************************************************/

/******************************************************************
Exported Database Access Functions
******************************************************************/ extern UCHAR GetTeHandle (UCHAR SearchType, PUCHAR pSearchItem);
extern void InitTeData (void);
extern void GetTsp (UCHAR TeIndex);
extern void ClearTsp (UCHAR TeIndex);
extern void ClearTeCalls (UCHAR TeIndex);
extern void ClearTerminal (UCHAR hTerminal);

extern UCHAR CreateCall (UCHAR CallTei, UCHAR CallRef);
extern UCHAR GetCallHandle (UCHAR CallTei, UCHAR CallRef);
extern UCHAR GetCAHandle (UCHAR CallTei, UCHAR CallAppearance);
extern void GetCall (UCHAR hCall);
extern void GetGlobalCall (void);
extern void ClearCall (void);

extern void GetMsgHeader (PUCHAR pMsgBuffer);
extern UCHAR ReadMsgData (PUCHAR pMsg);
extern UINT WriteMsgData (UCHAR IePosition, PUCHAR pMsg);

extern UCHAR ReserveChannel (void);
extern UCHAR SelectChannel (void);
extern void ReleaseChannel (void);

extern UCHAR GetNextCallRef (void);
extern UCHAR GetCallState (UCHAR hCall);
extern UCHAR GetCallType (void);
extern void SetCallState (UCHAR CallState);
extern UCHAR GetAddressInfo (PUCHAR pAddressIe);
extern UCHAR GetFeatureInfo (void);
extern UCHAR GetCalledTe (void);
extern UCHAR TestCallingPartyNo (void);
extern UCHAR GetIdleCA (void);
extern UCHAR GetOtherCall (UCHAR hCall);
extern PUCHAR GetDn (UCHAR Tei);
extern UCHAR TestBearerCap (void);
extern UCHAR TestCallTimer (UCHAR hCall);
extern void SendDisplay (UCHAR TeID);
extern void SendATTDisplay (UCHAR TeID);
extern void PutIeData (
            PUCHAR pIe,
```

```
                UCHAR IeLen,
                UCHAR Var1,
                UCHAR Var2,
                UCHAR Var3);

extern void SendIeData (
                PUCHAR pIe,
                UCHAR IeLen,
                UCHAR Var1,
                UCHAR Var2,
                UCHAR Var3);

extern void CopyIeData (UCHAR hDestCall,
                UCHAR hSrcCall,
                PUCHAR pIe);

/****************************************************************
    Exported Global Variables
****************************************************************/ extern XUCHAR gNextCallRef;
extern XUCHAR gCauseDiag;

/****************************************************************
    Call Data Pointers
****************************************************************/ extern XPXUCHAR pDbTei;
extern XPXUCHAR pDbPort;
extern XPXUCHAR pDbCallRefLen;
extern XPXUCHAR pDbCallRef;
extern XPXUCHAR pDbRcvMsgType;
extern XPXUCHAR pDbXmtMsgType;
extern XPXUCHAR pDbCallAppearance;
extern XPXUCHAR pDbCalledDN;
extern XPXUCHAR pDbDNIndex;
extern XPXUCHAR pDbLocalhCall;
extern XPXUCHAR pDbRemotehCall;
extern XPXUCHAR pDbTimerType;
extern XPXUINT  pDbTimerTime;
extern XPXUINT  pDbTimerStart;

extern XPXUCHAR pIeBearer;
extern XPXUCHAR pIeCause;
extern XPXUCHAR pIeConnectedNo;
extern XPXUCHAR pIeExFacility;
extern XPXUCHAR pIeCallState;
extern XPXUCHAR pIeChannelID;
extern XPXUCHAR pIeProgressInd;
extern XPXUCHAR pIeTerminalCap;
extern XPXUCHAR pIeNotificationInd;
extern XPXUCHAR pIeKeypad;
extern XPXUCHAR pIeInfoRqst;
```

```
extern XPXUCHAR pIeSignal;
extern XPXUCHAR pIeSwitchHook;
extern XPXUCHAR pIeSPID;
extern XPXUCHAR pIeEndpointID;
extern XPXUCHAR pIeCallingPartyNo;
extern XPXUCHAR pIeCallingPartySubaddr;
extern XPXUCHAR pIeCalledPartyNo;
extern XPXUCHAR pIeCalledPartySubaddr;
extern XPXUCHAR pIeTransitNetSel;
extern XPXUCHAR pIeRestartInd;
extern XPXUCHAR pIeLowLayerCap;
extern XPXUCHAR pIeHighLayerCap;
extern XPXUCHAR pIeUserInfo;
extern XPXUCHAR pIeSendComplete;
extern XPXUCHAR pIeDisplayText;
extern XPXUCHAR pIeUserCode;
extern XPXUCHAR pIeLogicalLinkID;
extern XPXUCHAR pIeAssocType;
extern XPXUCHAR pIeSelCA;
extern XPXUCHAR pIeOrigCA;
extern XPXUCHAR pIeDestCA;
extern XPXUCHAR pIe6EndpointID;
extern XPXUCHAR pIeKeypadCont;
extern XPXUCHAR pIeOtherCallRef;
extern XPXUCHAR pIeFeatureAct;
extern XPXUCHAR pIeFeatureInd;
extern XPXUCHAR pIeAdjunctCont;
extern XPXUCHAR pIeDisplayCont;
extern XPXUCHAR pIeDisplayField1;
extern XPXUCHAR pIeDisplayField2;
extern XPXUCHAR pIeDisplayField3;
extern XPXUCHAR pIeDisplayField4;
extern XPXUCHAR pIePacketLayerParam;
extern XPXUCHAR pIeLinkLayerParam;
extern XPXUCHAR pIeCUG;
extern XPXUCHAR pIeReverseCharge;
extern XPXUCHAR pIeThroughPutClass;
extern XPXUCHAR pIeRedirectSub;
extern XPXUCHAR pIeRedirectNo;
extern XPXUCHAR pIeCallAppear;
extern XPXUCHAR pIeNotUsed;

/***************************************************************
    Terminating Equipment Data Pointers
***************************************************************/ extern XPXUCHAR pTePort;
extern XPXUCHAR pTeTei;
extern XPXUCHAR pTeFirstCref;
extern XPXUCHAR pTeAutoInit;
extern XPXUCHAR pTeSelCA;
extern XPXUCHAR pTeSwitchHook;
extern XPXUCHAR pTeUSID;
```

```
extern XPXUCHAR pTeTID;
extern XPXCHAR  pTeSPID;
extern XPXCHAR  pTeDN;
extern XPXCHAR  pTeName;
extern XPXUCHAR pTeDisplay;
extern XPXUCHAR pTeErrors;

/***************************************************************
   Constants For Terminal Equipment Data Access Functions
***************************************************************/ define TE_NOT_AUTO_INIT   0x00
define TE_ATT_INIT        0x01
define TE_NI1_INIT        0x02
define ORIGINATING        0x01
define TERMINATING        0x02 define TSP_FULL_SERVICE   0x80 define SEARCH_TEI     0x01
define SEARCH_CREF    0x02
define SEARCH_SPID    0x03
define SEARCH_DN      0x04
define SEARCH_CA      0x05
define SEARCH_CALLS   0x06 define IE_SEND_FLAG   0x80
define IE_SEND_MASK   0x7f define PORT1_DEFAULT_TSP   1
define PORT2_DEFAULT_TSP   2

/***************************************************************
   Constants For Channel Assignments
***************************************************************/ define PORT1_B1    0x01
define PORT1_B2    0x02
define PORT2_B1    0x04
define PORT2_B2    0x08
```

```
/****************************************************************
   ISDN 2000 Central Office Emulator Exported Input/Output Functions From COE_IO.C (c) 1994 Merge Technologies Inc.

****************************************************************/

/****************************************************************
   Display Functions
****************************************************************/ extern void ClrDisplay (void);
extern void Display (PCHAR pszString);
extern void DisplayMsg (PCHAR pLine1, PCHAR pLine2);
extern void DisplayPosition (CHAR Row, CHAR Column);
extern void DisplayProgress (PCHAR pString, UINT Seconds);

/****************************************************************
   Printer Functions
****************************************************************/ extern void PrintLF (CHAR TotalLF);
extern void Print (UCHAR Format, PCHAR PrtString);

define PRT_PTR       1
define PRT_RESPONSE  2
define PRT_LINE      3
define PRT_HEADER    4

/****************************************************************
   Keyboard Variables and Functions
****************************************************************/
extern XUCHAR gEmulateEsc;

extern UCHAR GetKbd (void);
extern UCHAR OnKbd (void);
extern void SetEmuOn (void);
extern void SetEmuOff (void);

/****************************************************************
   Serial I/O Variables and Functions
****************************************************************/ extern IUCHAR gRemote;
extern IUCHAR gTraceOn;
extern XUCHAR gRemCmd;
extern XUCHAR gRemSet;
extern XUCHAR gRemParam;

extern XUCHAR pEocStr[MAX_EOC_STRING];
```

```
extern UCHAR SendStr (PCHAR pStr);
extern void DoRemote (void);

/****************************************************************
    Real Time Clock Functions
****************************************************************/ extern void InitTime (void);
extern UINT GetTime (void);
extern UCHAR TimeExpire (UINT StartTime, UINT Duration);

/****************************************************************
    The Ultimate Functions
****************************************************************/ extern void Reset (void);
extern void InitRegisters (void);

/****************************************************************
    Emulator Keypad Constants
****************************************************************/ define KBD_NULL        0x00
define KBD_BREAK       0x01
define KBD_EMULATE     0x91
define KBD_MON_L1      0x92
define KBD_TRC_L2      0x93
define KBD_TRC_L3      0x94
define KBD_RESTART     0x95
define KBD_UP          0x81
define KBD_PGUP        0x82
define KBD_PRINT       0x8b
define KBD_DOWN        0x86
define KBD_PGDOWN      0x87
define KBD_F1          0x31
define KBD_F2          0x32
define KBD_F3          0x33
define KBD_F4          0x34
define KBD_ENTER       0x0d /****************************************************************
    DisplayCtrl Commands
****************************************************************/ define CR              0x01
define HOME            0x02
define RESET           0x03
define CLEAR           0x04
define BACK_SPACE      0x05
define CURSOR          0x06
define NO_CURSOR       0x07
```

```
/*****************************************************************

ISDN 2000 Central Office Emulator

Layer 1 Module Exported Functions (c) 1994 Merge Technologies Inc.

*****************************************************************/ extern UCHAR GetPacket (PUCHAR pPacket, PUINT pByteCnt);
extern void PutPacket (PUCHAR pPacket, PUINT pByteCnt);
```

```
/****************************************************************

ISDN 2000 Central Office Emulator

Layer 2 Module Exported Functions (c) 1994 Merge Technologies Inc.

****************************************************************/ extern void InitLayer2 (void);
extern UCHAR DoILC (UCHAR Layer2Primitive,
          PUCHAR pRcvMsg,
          PUINT pRcvBytes);
```

```
/*****************************************************************

ISDN 2000 Central Office Emulator

Layer 3 Exported Functions From COE_L3.C (c) 1994 Merge Technologies Inc.

*****************************************************************/ extern XUCHAR gPVC;

extern UCHAR DoLayer3 (UCHAR Startup);
```

```
/*****************************************************************
    ISDN 2000 Central Office Emulator
    Line Monitor Module Exported Functions
    (c) 1994 Merge Technologies Inc.
*****************************************************************/ extern UCHAR DoMonitor (void);
```

```
/****************************************************************

ISDN 2000 Central Office Emulator

Layer 3 Message Library Functions and Constants from COE_MSG.C (c) 1994 Merge Technologies Inc.

****************************************************************/

/****************************************************************
    Exported Functions and Strings
****************************************************************/ extern void LoadMsgPtrTable (void);
extern UCHAR GetMsgIndex (UCHAR MsgType);
extern PUCHAR GetMsgPtr (UCHAR MsgCode);
extern UCHAR GetIeIndex (UCHAR IeType, UCHAR CodeSet);
extern UCHAR GetMaxIe (UCHAR MsgCode);
extern UCHAR TestCallState (UCHAR MsgType, UCHAR CallState);

extern UCHAR code MsgIndex[MAX_MSG_TYPES];
extern UCHAR code IeIndex[MAX_IE_TYPES];

extern XUCHAR gLastIeType;
extern XUCHAR gIeRepeatCnt;

/****************************************************************
    Message Parsing Constants
****************************************************************/ define MANDATORY       0x01
define OPTIONAL        0x02
define COPY            0x03
define CONDITION       0x04
define REPEAT          0x05 define BINARY          0x01
define STRING          0x02
define FLAG            0x03
define SHIFT           0x04 define NETWORK         0x01
define USER            0x02
define BOTH            0x03
```

```
/******************************************************************

ISDN 2000 Central Office Emulator

Exported Setting Variables and Functions From COE_SET.C (c) 1994 Merge Technologies Inc.

******************************************************************/ extern UCHAR DoSettings (UCHAR MenuKey);
extern void DoRemSettings (void);
extern void TestSettings (void);

extern PXUCHAR code pSwitchTypeSet;
extern PXUCHAR code pPrinterSet;
extern PXUCHAR code pDefaultSet;
extern PXUCHAR code pConfigSet;

extern PXUCHAR code pProvision;
extern PXUCHAR code pDX25Set;
extern PXUCHAR code pDisplaySet;
extern PXUCHAR code pCallerIDSet;

extern PXUCHAR code pEKTSSet;
extern PXUCHAR code pHoldSet;
extern PXUCHAR code pTotalCASet;
extern PXUCHAR code pACOSet;
```

```
/****************************************************************
    ISDN 2000 Central Office Emulator String Library Functions and Constants from COE_STR.C (c) 1994 Merge Technologies Inc.
****************************************************************/

/****************************************************************
    Exported Functions and Strings
****************************************************************/ extern void InitString (void);
extern void SetShift (UCHAR CodeSet);
extern PCHAR GetString (UCHAR StringType, UCHAR MsgType);

/****************************************************************
    Display Characters and Strings
****************************************************************/ extern CHAR code pszVersion1[MAX_DESCRIPT_LENGTH];
extern CHAR code pszVersion2[MAX_DESCRIPT_LENGTH];
extern CHAR code pszTiming1[MAX_DESCRIPT_LENGTH];
extern CHAR code pszTiming2[MAX_DESCRIPT_LENGTH];
extern CHAR code pszTiming3[MAX_DESCRIPT_LENGTH];
extern CHAR code pszSignOn1[MAX_DESCRIPT_LENGTH];
extern CHAR code pszSignOn2[MAX_DESCRIPT_LENGTH];
extern CHAR code pszSignOn3[MAX_DESCRIPT_LENGTH];
extern CHAR code pszSignOn4[MAX_DESCRIPT_LENGTH];
extern CHAR code pszEmuHalt1[MAX_DESCRIPT_LENGTH];
extern CHAR code pszPressF1[MAX_DESCRIPT_LENGTH];
extern CHAR code pszPressF2[MAX_DESCRIPT_LENGTH];
extern CHAR code pszAnyKey[MAX_DESCRIPT_LENGTH];
extern CHAR code pszSetSwitch[MAX_DESCRIPT_LENGTH];
extern CHAR code pszSetEKTS[MAX_DESCRIPT_LENGTH];
extern CHAR code pszEmuHalt3[MAX_DESCRIPT_LENGTH];
extern CHAR code pszEmuRem1[MAX_DESCRIPT_LENGTH];
extern CHAR code pszEmuRem2[MAX_DESCRIPT_LENGTH];
extern CHAR code pszTrcEmpty[MAX_DESCRIPT_LENGTH];
extern CHAR code pszTotalErr[MAX_DESCRIPT_LENGTH];
extern CHAR code pszPhyLayer[15];
extern CHAR code pszDataLayer[16];
extern CHAR code pszNetLayer[14];
extern CHAR code pszActive[8];
extern CHAR code pszHalted[7];
extern CHAR code pszRestart[17];
extern CHAR code pszError[7];
extern CHAR code pszTraceOn[MAX_DESCRIPT_LENGTH];
extern CHAR code pszTraceOff[MAX_DESCRIPT_LENGTH];
extern CHAR code pszOverOn[MAX_DESCRIPT_LENGTH];
extern CHAR code pszOverOff[MAX_DESCRIPT_LENGTH];
```

```c
extern CHAR code pszXmtP1Eoc[];
extern CHAR code pszXmtP2Eoc[];
extern CHAR code pszRcvP1Eoc[];
extern CHAR code pszRcvP2Eoc[];

extern CHAR code pszDashLine[MAX_DESCRIPT_LENGTH];
extern CHAR code pszBlankLine[MAX_DESCRIPT_LENGTH];
extern CHAR code pszPort1[MAX_DESCRIPT_LENGTH];
extern CHAR code pszPort2[MAX_DESCRIPT_LENGTH];
extern CHAR code pszNoDN[MAX_DESCRIPT_LENGTH];
extern CHAR code pszReady[MAX_DESCRIPT_LENGTH];

extern CHAR code Menu1[2];
extern CHAR code Menu2[2];
extern CHAR code Menu3[2];
extern CHAR code Menu4[2];
extern CHAR code BulletOff[2];
extern CHAR code BulletOn[2];
extern CHAR code RightArrowOff[2];
extern CHAR code RightArrowOn[2];
extern CHAR code SolidBlock[2];

extern CHAR code MsgStr[MAX_MSG_TYPES][MAX_DESCRIPT_LENGTH];
extern CHAR code IeStr[MAX_IE_TYPES][MAX_DESCRIPT_LENGTH];
extern CHAR code ErrStr[MAX_ERROR_TYPES][MAX_DESCRIPT_LENGTH];
extern CHAR code ErrIndex[MAX_ERROR_TYPES];

extern PXCHAR pszErrorCode;
extern PCHAR pszErrorMsg;

/***************************************************************
   GetString command constants
***************************************************************/ define STR_MSG            0x01
define STR_INFO_ELEMENT   0x02
define STR_ERRORS         0x03
```

```
/****************************************************************

ISDN 2000 Central Office Emulator

Switch Module Exported Functions and Variables (c) 1994 Merge Technologies Inc.

****************************************************************/

/****************************************************************
Exported Functions and variables
****************************************************************/ extern UCHAR GetEoc (UCHAR Port, PCHAR pEocStr);
extern UCHAR PutEoc (UCHAR Port, PCHAR pEocStr);

extern UCHAR InitSwitch (void);
extern void ProvSwitch (UCHAR Channel);
extern void InitTone (void);
extern void DoTone (UCHAR CptgState, UCHAR Port, UCHAR Channel);
extern UCHAR SetIDEC (UCHAR IDECCommand);
extern void GetUStatus (UCHAR Hwy, PUCHAR StatusByteArray);
extern void GetSTStatus (UCHAR Hwy, PUCHAR StatusByteArray);
extern void ResetSt ();
extern UCHAR GetActiveHwys (void);
extern UCHAR GetIdlePort ();
extern UCHAR GetActivePort ();
extern void DoSwitch (
        UCHAR Command,
        UCHAR OrigPort,
        UCHAR OrigChan,
        UCHAR TermPort,
        UCHAR TermChan);

extern XUCHAR gActiveHwys;
extern XUCHAR gOldHwys;
extern XUCHAR gP1BusyChan;
extern XUCHAR gP2BusyChan;

// IDEC Input/Output Buffers extern XUCHAR gInBufferPtr;
extern XUCHAR gInBuffer[MAX_INPUT_BUFFERS][MAX_MSG_LENGTH];
extern XUINT gInBytes[MAX_INPUT_BUFFERS];
extern XUINT gInBufferIndex[MAX_INPUT_BUFFERS];
extern XUCHAR gInBufferStatus[MAX_INPUT_BUFFERS];

extern XUCHAR gOutBufferPtr;
extern XUCHAR gOutBuffer[MAX_OUTPUT_BUFFERS][MAX_MSG_LENGTH];
extern XUINT gOutBytes[MAX_OUTPUT_BUFFERS];
extern XUINT gOutBufferIndex[MAX_OUTPUT_BUFFERS];
```

```c
extern XUCHAR gOutBufferStatus[MAX_OUTPUT_BUFFERS];

extern XUCHAR gIdecXPR1;
extern XUCHAR gIdecXPR2;

/****************************************************************
    PEB 2075 IDEC (U25) Register Offsets
****************************************************************/ define IDEC_ISTA_OFFSET    0x20
define IDEC_ISM_OFFSET     0x20
define IDEC_STAR_OFFSET    0x28
define IDEC_CMDR_OFFSET    0x28
define IDEC_MODE_OFFSET    0x22
define IDEC_RFBC_OFFSET    0x2c
define IDEC_TSR_OFFSET     0x2c /****************************************************************
    IDEC Data Constants
****************************************************************/ define IDEC_CCR_INIT       0xc5    // Quad TS mode, 512 bit frame, open drain
define IDEC_ACR_INIT       0x00    // Accept all HDLC frames (was 0xf1
                                    // which rejects SAPI 16 )
define IDEC_VISM_INT_OFF   0xff    // All interrupts masked
define IDEC_VISM_INT_ON    0xf0    // All interrupts enabled define IDEC_HWY0_INT       0x01    // Interrupt positions in VISR
define IDEC_HWY1_INT       0x02
define IDEC_HWY2_INT       0x04
define IDEC_HWY3_INT       0x08 define IDEC_HWY0_MASK      0xfe    // Interrupt masks for VISM
define IDEC_HWY1_MASK      0xfd
define IDEC_HWY2_MASK      0xfb
define IDEC_HWY3_MASK      0xf7 define IDEC_VISR_STATUS_MASK  0x0f
define IDEC_RCV_ISTA_MASK     0xe0   // Recieve interrupts
define IDEC_XMT_ISTA_MASK     0x18   // Transmit interrupts
define IDEC_RFBC_MASK         0x1f   // Byte count
define IDEC_XMT_ENABLED       0x40   // STAR Reg Xmt Enabled flag define IDEC_FRAME_GOOD        0xa0   // Appended to end of frame
                                      // if the frame is good /****************************************************************
    IDEC Command Constants
****************************************************************/

// Interrupt Status Commands (ISTA)
```

```
define IDEC_RME        0x80    // Receive Messsage End
define IDEC_RPF        0x40    // Receive Pool Full
define IDEC_RFO        0x20    // Receive Frame Overflow
define IDEC_XPR        0x10    // Transmit Pool Ready
define IDEC_XDU        0x08    // Transmit Data Underrun // Command Register Commands (CMDR)

define IDEC_RMC        0x80    // Receive Message Complete
define IDEC_RRES       0x40    // Receiver Reset
define IDEC_RMD        0x20    // Receive Message Delete
define IDEC_XRES       0x01    // Transmitter Reset
define IDEC_XME        0x02    // Transmit Message End
define IDEC_XHF        0x08    // Transmit HDLC Frame // Interrupt Register Masks (ISM)

define IDEC_REC_INT_MASK   0xe7
define IDEC_XMT_INT_MASK   0x1f
define IDEC_NO_INT_MASK    0x07

// Mode Register Commands (MODE)

define IDEC_BCHAN_MODE     0x1e
define IDEC_DCHAN_MODE     0x0c

// Time Slot Register Constants (TSR)

define IDEC_B1_TS          0x03
define IDEC_B2_TS          0x07
define IDEC_D_TS           0x08
define IDEC_D_TS_HWY3      0x14

/***************************************************************
    T7254 (CHI) Register Data Constants
***************************************************************/ define CHI_PORT1       0x01
define CHI_PORT2       0x02 define CHI_U           0x01
define CHI_ST          0x02 define CHI_ID0         0x00
define CHI_ID1         0x40
define CHI_ID2         0x80
define CHI_ID3         0xc0 define CHI_TS0         0x00
define CHI_TS1         0x01
define CHI_TS2         0x02
define CHI_TS3         0x03
define CHI_TS4         0x04
```

```c
define CHI_TS5            0x05
define CHI_TS6            0x06
define CHI_TS7            0x07 define CHI_SEND_ALT_DATA  0x05   // was 0x04 (min latency)
define CHI_SEND_HWY_DATA  0x07   // was 0x06
define CHI_GLOBAL_ENABLE  0xc0
define CHI_XMT_ENABLE     0x80 define CHI_XR_BOFF        0x36
define CHI_XTS_OFFSET     0x47
define CHI_RTS_OFFSET     0x07
define CHI_HWY_SIZE       0x07 define CHI_NOT_ATTACHED   FALSE
define CHI_TE_ATTACHED    TRUE define CHI_IDLE           FALSE
define CHI_ACTIVE         TRUE

/****************************************************************
    S/T Interface Constants
****************************************************************/ define ST_REG7_OFFSET 0x04
define ST_REG15_OFFSET 0x0c
define INFO_INT 0x08
define INFOMASK 0x30
define CLEARINFO 0xcf
define REC_INFO3 0x20
define XMT_INFO2 0x20
define XMT_INFO4 0x30

/****************************************************************
    U Interface Constants
****************************************************************/ define DS_MASK         0x4a
define S1_NORMAL       0xff
define XACT            0x40
define SYNC            0x08
define ACT             0x08
define EOC_ADDR_MASK   0x1f
define EOC_NORMAL      0x1f
define EOC_HOLD        0x10
define EOC_NOCOMPLY    0x1a
define DM_MASK         0x10

/****************************************************************
    U and S/T Port Status Constants
****************************************************************/ define PORT_OUT_OF_SERVICE  0x01
define PORT_INACTIVE        0x02
```

```
define PORT_ACTIVE       0x03
define PORT_BUSY         0x04

/*****************************************************************
  Switch Interface Commands
*****************************************************************/ define SWCH_IDLE         0x01
define SWCH_CONNECT      0x02
define SWCH_DISCONNECT   0x03
define SWCH_LOOPBACK     0x04

/*****************************************************************
  Call Progress Tone Generator Constants
*****************************************************************/ define TONE_IDLE         0x00
define TONE_DIAL_TONE        0x01
define TONE_AUDIBLE_RING     0x02
define TONE_BUSY         0x03
define TONE_REORDER          0x04
define TONE_RECALL_DIAL      0x05
define TONE_AUDIBLE_RING_PABX 0x06
define TONE_INTERCEPT        0x07
define TONE_CALL_WAITING     0x08
define TONE_BUSY_VERIFICATION 0x09
define TONE_EXECUTIVE_OVERRIDE 0x0a
define TONE_CONFIRMATION     0x0b define TONE_HWY0         0x10
define TONE_HWY1         0x20
define TONE_HWY2         0x40
define TONE_HWY3         0x80
define TONE_HWY_MASK         0x0f /*****************************************************************
  IDEC Input Buffer Status Codes
*****************************************************************/ define LOG_STAT_BUFFER_EMPTY    0x01
define LOG_STAT_BUFFER_FILLING  0x02
define LOG_STAT_BUFFER_FULL     0x03

/*****************************************************************
  IDEC Function Command Constants
*****************************************************************/ define IDEC_INT_ON       0x01
define IDEC_INT_UPDATE   0x02
define IDEC_INT_OFF      0x03

/*****************************************************************
  Port, Hwy, and Time Slot Identification Constants
*****************************************************************/
```

```
define ALL_PORTS      0x03
define HWY0           0x00
define HWY1           0x01
define HWY2           0x02
define HWY3           0x03
define HWY0_STATUS    0x01
define HWY1_STATUS    0x02
define HWY2_STATUS    0x04
define HWY3_STATUS    0x08
define ALL_HWYS       MAX_HIGHWAYS
define TS_B1          0x00
define TS_B1_ST3      0x03
define TS_B2          0x01
define TS_B2_ST3      0x04
define TS_D           0x02
define TS_D_ST3       0x05
define TS_S1          0x03
define TS_UM1         0x04
define TS_UM2         0x05
define TS_UM3         0x06
define TS_DC          0x07
define TS_DS          0x07
```

```
/******************************************************************

ISDN 2000 Central Office Emulator

Exported Trace Functions From COE_TRC.C (c) 1994 Merge Technologies Inc.

******************************************************************/ extern void ClrTrace (void);
extern void PutTrace (UCHAR MsgDir, PUCHAR pTrcMsg, PUINT pTrcBytes);
extern void DisplayTrace (UCHAR FirstLine);
extern UCHAR DoL2Trace (void);
extern UCHAR DoL3Trace (void);
extern void DoRemTrace (void);
```

```
/****************************************************************
    ISDN 2000 Central Office Emulator Exported General-Purpose Utility Functions From COE_UTIL.C (c) 1994 Merge Technologies Inc.
*****************************************************************/

/****************************************************************
    Timer Functions
*****************************************************************/ extern void Pause (UINT Count);

/****************************************************************
    Memory Functions
*****************************************************************/ extern void ClearMem (PUCHAR pBuffer, UINT TotalBytes);
extern void ClearBuffer (PUCHAR pBuffer, PUINT pByteCnt);

/****************************************************************
    Copy Functions
*****************************************************************/ extern void CopyData (PUCHAR pDstData, PUCHAR pSrcData, UCHAR DataBytes);
extern void CopyBuffer (PUCHAR pDstBuf, PUCHAR pSrcBuf, PUINT pDataBytes);

/****************************************************************
    Packet Parsing Function
*****************************************************************/ extern UCHAR GetField (UCHAR Field, PUCHAR pFrame);

/****************************************************************
    String Functions
*****************************************************************/ extern void BinToAscii (UINT Int, PCHAR pCharBuffer);
extern void HexToAscii (UCHAR HexNumber, PCHAR pHexString);
extern UCHAR AscToHex (PCHAR pString);
extern void FormatTime (UINT Int, PCHAR pTimeBuffer);
extern void CopyString (PCHAR pDstStr, PCHAR pSrcStr);
extern void AddString (PCHAR pDstStr, PCHAR pSrcStr);
extern void InfoToString (PCHAR pDstStr, PUCHAR pInfoBytes, UCHAR NoBytes);
extern UCHAR CmpString (PCHAR pDest, PCHAR pSource, UCHAR TotalBytes);

/****************************************************************
    Error Log Functions
*****************************************************************/ extern void ClrError (void);
```

```c
extern void LogError (UCHAR ErrCode);
extern void LogIntError (UCHAR ErrCode);
extern UCHAR GetError (void);
extern UCHAR GetErrCnt (void);

/****************************************************************
    GetField command constants
****************************************************************/ define GET_PORT            0x01
define GET_SAPI            0x02
define GET_CR              0x03
define GET_TEI             0x04
define GET_FRAME_FORMAT    0x05
define GET_S_FRAME         0x06
define GET_U_FRAME         0x07
define GET_NR              0x08
define GET_NS              0x09
define GET_PF              0x0a
define GET_CREF_LENGTH     0x0b
define GET_CREF_NUMBER     0x0c
define GET_PROTOCOL        0x0d
define GET_MSG_TYPE        0x0e
define GET_NET_MSG_TYPE    0x0f
define GET_CONTROLLER      0x10
define GET_RANDOM1         0x11
define GET_RANDOM2         0x12
define GET_TEI_MSG         0x13
define GET_X25_PACKET_TYPE 0x14
define GET_X25_CHANNEL     0x15
define GET_SAC_TEI         0x16
```

```
/****************************************************************

ISDN 2000 Central Office Emulator

X.25 Packet Module Exported Functions (c) 1994 Merge Technologies Inc.

****************************************************************/ void DoX25 (PUCHAR pRcvPkt,
       PUINT  pRcvPktBytes,
       PUCHAR pXmtPkt,
       PUINT  pXmtPktBytes);
```

APPENDIX 2

```
        DEVICE   PIC16C54,XT_OSC,WDT_OFF,PROTECT_OFF
        RESET    start
                                          ;04-16-94
                                          ;CHECKSUM AF02,127B
count0    equ    08h                      ;.775ms @ 3.579Mhz
count1    equ    09h                      ;7.75ms
count2    equ    0Ah                      ;#13    100ms      100
count4    equ    0Bh                      ;#30    230ms      231
loopid    equ    0Ch                      ;#32    250MS      248
                                          ;#65    500MS      503
                                          ;#84    650MS      651
                                          ;#129   1000       1000
                                          ;#181   1400MS     1402
                                          ;#226   1750MS     1751
                                          ;#256   2000MS     1985 start     mov    !RA,#00001111b           ;set RA to input
          mov    !RB,#00000000b           ;set RB to output progtone  mov    RB,#11111111b            ;set portB idle
          cje    RA,#00h,progtone         ;idle
          cje    RA,#01h,dialtone         ;go make dial tone
          cje    RA,#02h,audring          ;go make audible ring
          cje    RA,#03h,busy             ;go make busy tone
          cje    RA,#04h,reorder          ;go make reorder
          cje    RA,#05h,recall           ;go make recall dial tone
          cje    RA,#06h,arpabx           ;go make aud ring pabx
          cje    RA,#07h,intercept        ;go make intercept tone
          cje    RA,#08h,callwait         ;go make call waiting tone
          cje    RA,#09h,exeor            ;go make executive overide tone
          cje    RA,#0Ah,conftone         ;go make confirmation tone
          cje    RA,#0Bh,bv1              ;go make busy verification 1
          cje    RA,#0Ch,bv2              ;go make busy verification 2
          cje    RA,#0Dh,special          ;go make apecial audiable ring
          cje    RA,#0Eh,hltone           ;go make high low test tone
          cje    RA,#0Fh,dtmf             ;go make dtmf *
          jmp    progtone                 ;return to idle loop delay1    mov    count0,#01h              ;0.775ms delay
loop1     djnz   count0,loop1
          ret delay13   mov    count2,#13               ;100ms
          jmp    loop delay30   mov    count2,#30               ;230ms
          jmp    loop delay32   mov    count2,#32               ;250ms
          jmp    loop delay65   mov    count2,#65               ;500ms
          jmp    loop delay84   mov    count2,#84               ;650ms
          jmp    loop
```

```
delay129    mov     count2,#129         ;1000ms
            jmp     loop delay181    mov     count2,#181         ;1400ms
            jmp     loop delay226    mov     count2,#226         ;1750ms
            jmp     loop delay256    mov     count2,#00          ;256 times,2000ms delay
            jmp     loop loop        mov     count0,#00
            mov     count1,#10
loop2       djnz    count0,loop2        ;always 0.775ms
loop3       djnz    count1,loop2        ;always 7.75ms
            mov     count1,#10          ;reset counter
            mov     w,RA                ;test for early end of cycle
            xor     w,loopid
            jnz     progtone
            djnz    count2,loop3        ;whatever delay()
            ret hltone      mov     RB,#18h             ;prepare h tone
            mov     loopid,#0Eh
            call    delay1              ;.775ms
            mov     RB,#08h              ;h tone on
            call    delay13
            call    delay13             ;200ms
            mov     RB,#1Fh             ;tone off
            cjne    RA,#0Eh,progtone    ;test for end of cycle
            mov     RB,#11h             ;prepare l tone
            call    delay1              ;.775ms
            mov     RB,#01              ;l tone on
            call    delay13
            call    delay13             ;200ms
            mov     RB,#1Fh             ;l tone off
            cjne    RA,#0Eh,progtone    ;test again for end of cycle
            jmp     hltone dtmf        mov     RB,#19h             ;prepare * tone
            call    delay1              ;.775ms
            mov     RB,#09h             ;* tone on
dtmf1       cjne    RA,#0Fh,progtone    ;test for end of cycle
            jmp     dtmf1
```

;2

```
special     mov     RB,#10h             ;prepare special AR
            mov     loopid,#0Dh
            mov     count4,#03
            call    delay1              ;.775ms
            mov     RB,#00h             ;tone on
            call    delay13             ;100ms
            call    delay13             ;100ms, 200ms total
            mov     RB,#11h             ;tone off
            cjne    RA,#0Dh,progtone    ;look for end of cycle
            mov     RB,#12              ;prepare second tone
            call    delay1              ;.775ms
            mov     RB,#02h             ;second tone on
            call    delay13
            call    delay13             ;200ms total
            mov     RB,#11h             ;second tone off
special1    cjne    RA,#0Dh,progtone    ;look again for end of cycle
            call    delay129            ;1000ms
            djnz    count4,special1     ;count for 3000ms
            jmp     special             ;do cycle again bv1         mov     RB,#12h             ;prepare busy verfication 1
            mov     loopid,#0Bh
            call    delay1              ;.775
            mov     RB,#02h             ;tone on
            call    delay226            ;1750ms
            mov     RB,#12h             ;tone off
bv11        cjne    RA,#0Bh,progtone    ;look for end of cycle
            jmp     bv11 bv2         mov     RB,#12h             ;prepare busy verification 2
            mov     loopid,#0Ch
            mov     count4,#04
            call    delay1              ;.775ms
bv22        mov     RB,#02h             ;tone on
            call    delay84              ;650ms
            mov     RB,#12h             ;tone off
            cjne    RA,#0Ch,progtone    ;look for end of cycle
bv23        djnz    count4,bv21         ;count 2000ms 4 times, 8sec
            jmp     bv22
bv21        call    delay256
            cjne    RA,0Ch,progtone
            jmp     bv23
```

;3

```
conftone    mov     RB,#10h                     ;prepare confirmation tone
            mov     loopid,#0Ah
            mov     count4,#03                  ;prepare to count to 3
            call    delay1                      ;.775ms
conftone1   mov     RB,#00h                     ;tone on
            call    delay13                     ;100ms
            mov     RB,#10h                     ;tone off
            cjne    RA,#0Ah,progtone            ;look for end of cycle
            call    delay13                     ;100ms
            djnz    count4,conftone1            ;do 3 times
            mov     RB,#10h                     ;tone off
conftone2   cjne    RA,#0Ah,progtone            ;look again for end of cycle
            jmp     conftone2 exeor       mov     RB,#10h
            mov     loopid,#09h
            call    delay1
            mov     RB,#00h
            call    delay129                    ;1000ms delay
            call    delay256                    ;2000ms, 3000ms total
            mov     RB,#10h
exeor1      cjne    RA,#09h,progtone            ;test for end of cycle
            jmp     exeor1 callwait    mov     RB,#12h                     ;prepare call waiting tone
            mov     loopid,#08h
            mov     count4,#05
            call    delay1
callwait2   mov     RB,#02h
            call    delay13
            call    delay13
            call    delay13                     ;100ms x 3 300ms total
            mov     RB,#12h                     ;tone off
            cjne    RA,#08h,progtone            ;test for end of cycle
            mov     count4,#05
callwait1   call    delay256
            cjne    RA,#08,progtone
            djnz    count4,callwait1
            jmp     callwait2
```

;4

```
intercept       mov     RB,#14h                 ;prepare intercept tone
                mov     loopid,#07h
                call    delay1
intercept1      mov     RB,#04h                 ;start tone
                call    delay30                 ;230ms delay
                mov     RB,#14h                 ;tone off
                cjne    RA,#07h,progtone        ;test for end of cycle
                call    delay30
                jmp     intercept1 arpabx          mov     RB,#13h                 ;prepare aud ring pabx
                mov     loopid,#06h
                call    delay1
arpabx1         mov     RB,#03
                call    delay129                ;1000ms delay
                mov     RB,#13h
                cjne    RA,#06h,progtone
                call    delay256                ;1000ms delay
                call    delay129                ;2000ms delay,3000ms total
                jmp     arpabx1 recall          mov     RB,#10h                 ;prepare recall dial tone
                mov     loopid,#05h
                mov     count4,#3
                call    delay1                  ;.775ms
recall1         mov     RB,#00h                 ;dial tone enabled
                call    delay13                 ;100ms
                mov     RB,#10h                 ;tone off
                cjne    RA,#05h,progtone        ;look for end of recall
                call    delay13
                djnz    count4,recall1          ;loop 2 times
                mov     RB,#00h                 ;more tone
recall2         cjne    RA,#05h,progtone        ;look again for end of recall
                jmp     recall2 reorder         mov     RB,#16h                 ;prepare reorder
                mov     loopid,#04h             ;reorder loop ID
                call    delay1                  ;wait .775ms
reorder1        mov     RB,#06h                 ;reorder tone enabled
                call    delay32                 ;tone on 250ms
                mov     RB,#16h                 ;tone off
                cjne    RA,#04h,progtone        ;test for end of cycle
                call    delay32                 ;tone off 250ms
                jmp     reorder1 busy            mov     RB,#16h                 ;prepare busy tone
                mov     loopid,#03h             ;busy loop ID
                call    delay1                  ;wait .775MS
busy1           mov     RB,#06h                 ;busy tone enabled
                call    delay65                 ;tone on 500MS
                mov     RB,#16h                 ;tone off
                cjne    RA,#03h,progtone        ;test for end of cycle
                call    delay65                 ;tone off 500MS
                jmp     busy1                   ;redo cycle
                                                                                ;5
```

```
audring     mov     RB,#13h             ;prepare first cycle
            mov     loopid,#02h         ;audring loop ID
            call    delay1              ;wait .775MS
audring1    mov     RB,#03h             ;aud tone enabled
            call    delay256            ;tone for 2 sec
            mov     RB,#13h             ;tone off
            cjne    RA,#02h,progtone    ;look for end of cycle
            call    delay256
            call    delay256            ;tone off for 4 sec
            jmp     audring1            ;redo cycle dialtone    mov     RB,#10h             ;prepare for dialtone
            call    delay1              ;wait .775ms
            mov     RB,#00h             ;dial tone enabled
dialtone1   cjne    RA,#01h,progtone    ;look for end of dial tone
            jmp     dialtone1           ;continue dial tone
```

What is claimed is:

1. A method of generating all relevant in-band call progress tones, said method executed by a single microcomputer in a call progress tone generator circuit having (i) an analog tone generator connected to said single microcomputer, (ii) a compressor-decompressor connected to said tone generator; and (iii) a cut-through logic circuit for routing the output of said tone generator to one of a plurality of temporarily unused digital PCM highways, said method comprising:

(a) receiving from an external source a command which requests a tone;

(b) determining proper inputs to said tone generator and said cut-through logic circuit to generate the tone requested by said command;

(c) sending said proper inputs to said tone generator and said cut-through logic circuit; and (d) converting output of said tone generator to a digital signal compatible with at least one of the digital PCM highways.

* * * * *

UNITED STATES PATENT AND TRADEMARK OFFICE
CERTIFICATE OF CORRECTION

PATENT NO.   :   5,805,570

DATED        :   September 8, 1998

INVENTOR(S)  :   Fields et al.

It is certified that error appears in the above-identified patent and that said Letters Patent is hereby corrected as shown below:

On the title page, item [75] delete Inventor --James G. Fields --.

Signed and Sealed this

Twelfth Day of September, 2000

Attest:

Q. TODD DICKINSON

*Attesting Officer*          *Director of Patents and Trademarks*